United States Patent
Inadome

Patent Number: 5,748,387
Date of Patent: May 5, 1998

[54] ZOOM LENS SYSTEM

[75] Inventor: Kiyotaka Inadome, Kawasaki, Japan

[73] Assignee: Nikon Corporation, Tokyo, Japan

[21] Appl. No.: 798,836

[22] Filed: Feb. 12, 1997

[30] Foreign Application Priority Data

Feb. 23, 1994 [JP] Japan ................................. 8-35994
Feb. 15, 1996 [JP] Japan ................................. 8-27182

[51] Int. Cl.$^6$ .......................... G02B 15/14; G02B 15/22; G02B 7/02; G03B 17/00
[52] U.S. Cl. .......................... 359/699; 359/700; 359/705; 359/823; 359/826; 396/76; 396/77; 396/79; 396/124
[58] Field of Search .................... 359/697–701, 359/691, 705–706, 823, 825, 826; 396/75–77, 79

[56] References Cited

U.S. PATENT DOCUMENTS

| | | | |
|---|---|---|---|
| 4,841,325 | 6/1989 | Hoshino et al. | 354/402 |
| 4,963,006 | 10/1990 | Inadome | 359/684 |
| 5,337,187 | 8/1994 | Fukino et al. | 359/699 |

FOREIGN PATENT DOCUMENTS

| | | |
|---|---|---|
| 57-4018 | 1/1982 | Japan. |
| 57-37307 | 3/1982 | Japan. |
| 57-37308 | 3/1982 | Japan. |
| 58-137812 | 8/1983 | Japan. |
| 58-137814 | 8/1983 | Japan. |
| 58-144808 | 8/1983 | Japan. |
| 58-149014 | 9/1983 | Japan. |
| 58-150925 | 9/1983 | Japan. |
| 61-77027 | 4/1986 | Japan. |
| 62-78519 | 4/1987 | Japan. |
| 62-170924 | 7/1987 | Japan. |
| 63-49715 | 3/1988 | Japan. |
| 63-163808 | 7/1988 | Japan. |
| 63-314511 | 12/1988 | Japan. |
| 64-35515 | 2/1989 | Japan. |
| 64-35516 | 2/1989 | Japan. |
| 1-131507 | 5/1989 | Japan. |
| 1-131508 | 5/1989 | Japan. |
| 1-131509 | 5/1989 | Japan. |
| 1-154014 | 6/1989 | Japan. |
| 1-232313 | 9/1989 | Japan. |
| 2-256011 | 10/1990 | Japan. |
| 3-101707 | 4/1991 | Japan. |
| 3-144411 | 6/1991 | Japan. |
| 3-228006 | 10/1991 | Japan. |
| 3-2235908 | 10/1991 | Japan. |
| 3-249717 | 11/1991 | Japan. |
| 4-140704 | 5/1992 | Japan. |
| 4-184402 | 7/1992 | Japan. |
| 4-184403 | 7/1992 | Japan. |
| 4-184404 | 7/1992 | Japan. |
| 4-184405 | 7/1992 | Japan. |
| 4-184406 | 7/1992 | Japan. |
| 4-186207 | 7/1992 | Japan. |
| 4-186208 | 7/1992 | Japan. |
| 4-293008 | 10/1992 | Japan. |
| 5-142475 | 6/1993 | Japan. |
| 7-5362 | 1/1995 | Japan. |
| 7-110446 | 4/1995 | Japan. |
| 7-120662 | 5/1995 | Japan. |

*Primary Examiner*—Georgia Y. Epps
*Assistant Examiner*—Jordan M. Schwartz
*Attorney, Agent, or Firm*—Shapiro and Shapiro

[57] ABSTRACT

There is provided a zoom lens of an inner focusing system which is capable of an auto-focusing operation and a manual focusing operation with a high precision.

A zoom lens system in which a movement locus of a focusing lens unit is defined by synthesizing a focus cam and a zoom compensation cam is arranged such that a ratio of an amount of rotation for focusing from infinity to closest to an amount of rotation for zooming from wide angle to telephoto in the focus cam is set within a predetermined range so that, when the sensitivity of a movement of an imaging point with respect to a movement of the focusing lens unit in the direction of the optical axis in the closest in-focus state is larger than that in the infinity in-focus state, the sensitivity of the movement of the imaging point with respect to the movement of the focusing lens unit in the rotational direction satisfies specific conditions.

8 Claims, 4 Drawing Sheets

ZOOM LENS SYSTEM

The entire disclosure of Japanese Patent Application Nos. 8-27182 and 8-35994 including specifications, claims, drawings and summaries is incorporated herein by reference in their entirety.

BACKGROUND OF THE INVENTION

1. Field of the Invention

The present invention relates to a zoom lens and, more particularly, to a zoom lens attached to a so-called auto-focusing camera, video camera, or the like, which has a focus detection device, and moves a focusing lens unit in a photographing optical system in accordance with the detected defocus amount.

2. Related Background Art

In recent years, along with the wide spread use of auto-focusing cameras, various focusing systems such as a so-called inner focusing system, rear focusing system, and the like have been examined to make a focusing lens of a zoom lens compact.

However, in general, when a focusing system other than a so-called front focusing system is adopted, the lens driving amount for focusing changes upon a change in focal length. To solve this problem, Japanese Patent Application Laid-Open Nos. 4-293008 and 5-142475 assigned to the same assignee as the present invention proposed a method of realizing a so-called manual focusing operation in a zoom lens having a plurality of lens units including a focusing lens unit having both zooming and focusing functions. In this method, when a predetermined movement locus for zooming is expressed by the amount of movement of the lens units in the direction of the optical axis and the angle of rotation of a rotatable lens barrel, the movement locus of the focusing lens unit is defined by synthesizing a focus cam and a zoom compensation cam. With this arrangement, even when the amount of movement for focusing along the optical axis changes depending on the zooming state, the angle of rotation of the rotatable lens barrel for focusing is left unchanged, thus achieving a manual focusing operation.

However, when the above-mentioned zoom lens is applied to an auto-focusing camera system, which comprises focus detection means, storage means for storing the conversion coefficient γ and the correction coefficient ε used for calculating the lens driving amount Δx for focusing the focusing lens unit on the basis of the detected defocus amount ΔBf of a photographing optical system, and calculation means for calculating the lens driving amount Δx for focusing using the defocus amount ΔBf, the conversion coefficient γ, and the correction coefficient ε, problems associated with the storage capacity, calculation error, and the like are posed.

As in Japanese Patent Application Laid-Open Nos. 4-293008 and 5-142475 above, in a zoom lens disclosed in Japanese Patent Application Laid-Open Nos. 57-37307, 57-37308, 63-49715, 63-314511, 3-144411, 3-235908, 3-249717, 4-184402, 4-184403, 4-184404, 4-184405, 4-184406, 4-186207, 4-186208, 7-110446, and the like, in each of which the movement locus of the focusing lens unit is defined by synthesizing a focus cam and a zoom compensation cam, the above-mentioned problems concerning the storage capacity, calculation error, and the like have not been examined, either.

Furthermore, in a zoom lens disclosed in Japanese Patent Application Laid-Open Nos. 57-4018, 58-137812, 58-137814, 58-144808, 58-149014, 58-150925, and the like, each of which utilizes only a focus cam, the problems of the storage capacity, calculation error, and the like have not been examined, either.

On the other hand, as in Japanese Patent Application Laid-Open Nos. 63-163808, 1-154014, and the like, in a zoom lens disclosed in Japanese Patent Application Laid-Open Nos. 64-35515, 64-35516, 4-140704, and the like, each of which commonly uses a single cam as both a focus cam and a zoom cam, the above-mentioned problems of the storage capacity, calculation error, and the like have not been examined, either. In addition, the zoom lens disclosed in these references has a basic structure different from that of the present invention since it does not require any zoom compensation cam, and does not take a so-called flexible manual focusing operation into account, which has been examined in Japanese Patent Application Laid-Open Nos. 4-293008, 5-142475, and the like.

A zoom lens disclosed in Japanese Patent Application Laid-open Nos. 2-256011 and 3-101707 which have been assigned to the same assignee as the present invention, and Japanese Patent Application Laid-Open No. 7-120662 which discloses a technical content similar to those disclosed in the above Japanese Patent Application Laid-Open Nos. 2-256011 and 3-101707, has a basic structure different from that of the present invention since it realizes zooming by a relative movement, in the direction of rotation of a lens barrel, between a focus cam and a zoom cam, and focusing by a relative movement in the direction of the optical axis, and does not examine an auto-focusing operation at all.

Similarly, in Japanese Patent Application Laid-Open No. 7-5362, a zoom lens disclosed therein has a basic structure different from that of the present invention since the amount of movement for focusing is to be defined by synthesizing two kinds of cams without using a focus cam directly, and the above-mentioned problems concerning the storage capacity, calculation error, and the like have not been examined.

Furthermore, Japanese Patent Application Laid-Open Nos. 61-77027, 1-232313, and the like disclose a lens system having a focus cam so as to realize an accurate auto-focusing operation with a small calculation error. However, these references relate to a single-focus lens having no zooming function, and cannot be applied to a focus cam required to achieve a so-called manual focusing operation in a zoom lens in which the amount of movement in the direction of the optical axis for focusing changes depending on the zooming state.

The principle of the auto-focus operation will be briefly described below.

An auto-focusing system disclosed in Japanese Patent Application Laid-Open Nos. 62-78519, 62-170924, 1-131507, 1-131508, 1-131509, 3-228006, and the like, comprises focus detection means, calculation means for calculating the lens driving amount for focusing, and storage means for storing specific constants used in calculations. In this system, the focus detection means detects the defocus amount ΔBf between the imaging position of an actual object by the photographing optical system and a predetermined imaging point position, and the calculation means for calculating the lens driving amount for focusing calculates the lens driving amount Δx for focusing on the basis of the detected defocus amount ΔBf of the photographing optical system, thus achieving an auto-focusing operation.

If the relationship between the lens driving amount Δx for focusing and the defocus amount ΔBf is expressed using a conversion coefficient K associated with focusing as follows:

$$\Delta x = \Delta Bf/K$$

then, the lens driving amount $\Delta x$ can be calculated by setting the conversion coefficient K.

However, as described in Japanese Patent Application Laid-Open No. 62-170924, the conversion coefficient K changes in correspondence not only with the focal length but also with the object position and lens arrangement.

Therefore, as described in Japanese Patent Application Laid-Open Nos. 62-78519, 62-170924, and the like, using the conversion coefficient $\gamma$ defined as the ratio (sensitivity) of the amount of infinitesimal movement of the imaging plane with respect to the amount of infinitesimal movement of the focusing lens unit in the vicinity of a predetermined in-focus point, and the correction coefficient $\epsilon$ for correcting the conversion coefficient in accordance with the defocus amount $\Delta Bf$, the conversion coefficient K is calculated by the following formulas:

$$K = \gamma + \epsilon \cdot f(\Delta Bf)$$

$K = \gamma + \epsilon \cdot \Delta Bf^2$ in Japanese Patent Application Laid-Open No. 62-78519

$K = \gamma(1 + \epsilon \cdot \Delta Bf)$ in Japanese Patent Application Laid-Open No. 62-170924 and thereafter, the lens driving amount $\Delta x$ is calculated based on the conversion coefficient K. (Of course, the lens driving amount $\Delta x$ for focusing may be directly calculated from the defocus amount $\Delta Bf$ using the conversion coefficient $\gamma$ and the correction coefficient $\epsilon$.)

Furthermore, in a photographing system having a zooming optical system, since the values of the conversion coefficient $\gamma$ and the correction coefficient $\epsilon$ change depending on the lens arrangement, a plurality of pairs of data of the conversion coefficient $\gamma$ and the correction coefficient $\epsilon$ are stored in the storage means in units of a plurality of divided zoom ranges and focus ranges, as described in Japanese Patent Application Laid-Open No. 3-228006.

In other words, in the photographing system having the zooming optical system, the focus detection means detects the defocus amount $\Delta Bf$ caused by the zooming optical system, and values of the conversion coefficient $\gamma$ and the correction coefficient $\epsilon$ corresponding to the zoom and focus positions respectively detected by zoom and focus position detection means are read out from the storage means. The calculation means for calculating the lens driving amount for focusing calculates the lens driving amount $\Delta x$ for focusing using the defocus amount $\Delta Bf$, the conversion coefficient $\gamma$, and the correction coefficient $\epsilon$, and driving means drives a lens by the calculated lens driving amount $\Delta x$ for focusing, thus achieving a focusing operation.

However, in a normal focusing mechanism using a helicoid mechanism or a cam mechanism, the lens driving amount for focusing must be described not as a lens driving amount $\Delta x$ in the direction of the optical axis but as a lens driving amount $\Delta a$ in the direction of rotation.

Therefore, when the relationship between the lens driving amount $\Delta x$ and the defocus amount $\Delta Bf$ in the direction of the optical axis is converted into the relationship between the lens driving amount $\Delta a$ and the defocus amount $\Delta Bf$ in the direction of rotation using a conversion coefficient $K_a$ associated with the direction of rotation, we have:

$$\Delta a = \Delta Bf/K_a$$

If conversion coefficient K associated with the direction of the optical axis is newly defined as $K_x$, the conversion coefficient $K_a$ associated with the direction of rotation is expressed using a conversion coefficient $\Phi$ between the lens driving amount $\Delta x$ in the direction of the optical axis and the lens driving amount $\Delta a$ in the direction of rotation as follows:

$$K_a = K_x \cdot \Phi$$

Thus, the formula in Japanese Patent Application Laid-Open No. 62-170924 is modified to a formula associated with the conversion coefficient $K_a$ in the direction of rotation as follows:

$$K_a = \Phi \gamma (1 + \epsilon \cdot \Delta Bf)$$

If $\Delta x$ and $\Delta a$ have a linear relationship therebetween like in a helicoid mechanism, $\Phi$ becomes a constant. However, when a cam mechanism is used, the conversion coefficient $\Phi$ changes depending on the cam shape. The conversion coefficient $\Phi$ can be replaced by a slope (dx/da) defined by the cam shape as follows:

$$K_a = \gamma (dx/da)(1 + \epsilon \cdot \Delta Bf)$$

The conversion coefficient $\gamma$ and the correction coefficient $\epsilon$ in an inner focusing type zoom lens disclosed in Japanese Patent Application Laid-Open Nos. 4-293008, 5-142475, and the like will be examined below.

When a zoom lens system is constituted by n lens units, and its k-th lens unit is used as the focusing lens unit, if the ratio of the amount dBf of infinitesimal movement of the imaging plane to the amount dx of infinitesimal movement, in the direction of the optical axis, of the focusing lens unit, i.e., the conversion coefficient $\gamma$ (dBf/dx: the sensitivity associated with movement in the direction of the optical axis) is defined as a new conversion coefficient $\gamma_x$ associated with the amount x of movement in the direction of the optical axis, the conversion coefficient $\gamma_x$ can be expressed using the imaging magnifications $\beta$ of the respective lens units as follows:

$$\gamma_x = (1 - \beta_k^2)\beta_{k+1}^2 \beta_{k+2}^2 \cdots \beta_n^2$$

Therefore, the rate of change, from the infinity in-focus value ($\gamma_{xO}$) to the closest in-focus value ($\gamma_{xR}$), of the conversion coefficient $\gamma_x$ associated with the amount x of movement in the direction of the optical axis can be expressed using the imaging magnifications $\beta_{Ok}$ and $\beta_{Rk}$ of the focusing lens unit at the infinity and closest in-focus points as follows:

$$\gamma_{xR}/\gamma_{xO} = (1 - \beta_{Rk}^2)/(1 - \beta_{Ok}^2)$$

Furthermore, if the ratio of the amount dBf of infinitesimal movement of the imaging plane to the angle da of infinitesimal rotation of the focusing lens unit (dBf/da: the sensitivity associated with movement in the direction of rotation) is defined as a new conversion coefficient $\gamma_a$ associated with the angle a of rotation of a rotatable lens barrel, the conversion coefficient $\gamma_a$ associated with the angle a of rotation of the rotatable lens barrel can be expressed by:

$$\gamma_a = \gamma_x \cdot (dx/da)$$

where dx/da is the slope of the focus cam.

Therefore, the rate of change, from the infinity in-focus value ($\gamma_{aO}$) to the closest in-focus value ($\gamma_{aR}$), of the conversion coefficient $\gamma_a$ associated with the angle a of rotation of the rotatable lens barrel can be expressed using slopes $(dx/da)_O$ and $(dx/da)_R$ at the infinity and closest corresponding positions on the focus cam as follows:

$$\gamma_{aR}/\gamma_{aO} = (\gamma_{xR}/\gamma_{xO}) \cdot ((dx/da)_R/(dx/da)_O)$$

The rate of change of the conversion coefficient $\gamma_x$ with respect to the amount x of movement in the direction of the optical axis and the rate of change of the conversion coefficient $\gamma_a$ with respect to the angle a of rotation of the rotatable lens barrel will be examined below in association with a case in which the amount of rotation corresponding to the zooming from the wide-angle end to the telephoto end and the ratio of amounts of rotation ($a_F/a_Z$) with respect to the focusing from the infinity in-focus state to the closest in-focus state are set to be 1.0 in the first embodiment of the present invention, like in an embodiment of Japanese Patent Application Laid-Open No. 5-142475 mentioned above. Note that the amount of rotation for zooming from the wide-angle end to the telephoto end and the amount of rotation for focusing are respectively re-set to be 10.0 for the purpose of a comparison with an embodiment of the present invention.

Table 1 below summarizes various paraxial data of an optical system and data for defining the shape of the focus cam in a case in which the ratio of the amounts of rotation ($a_F/a_Z$) is to set to be 1.0 in the first embodiment of the present invention, like in the embodiment of Japanese Patent Application Laid-Open No. 5-142475. (Said case will be hereinafter called the comparative example I).

The upper table in Table 1 summarizes the focal length data and principal point interval data of the respective lens units of the optical system corresponding to the comparative example I. In this table, F1, F2, F3, and F4 are respectively the focal lengths of first, second, third and fourth lens units, and D1, D2, D3, and D4 are respectively the principal point interval between the first and second lens units, the principal point interval between the second and third lens units, the principal point interval between the third and fourth lens units, and the principal point interval between the fourth lens unit and a predetermined imaging plane in six zooming states (focal lengths F=28.8 (1-POS), 35.0 (2-POS), 50.0 (3-POS), 85.0 (4-POS), 135.0 (5-POS), and 194.0 mm (6-POS)).

The middle table in Table 1 summarizes spline sample point data when the shape of the focus cam in the second lens unit which is used for focusing is expressed by a spline function associated with the angle a of rotation of the rotatable lens barrel and the amount x of movement in the direction of the optical axis (complying with "Numerical Analysis and FORTRAN", MARUZEN, "Spline Function and Its Applications", Kyoiku Shuppan, and the like). In this middle table, (1), (2), (3), and (4) correspond to the first, second, third, and fourth lens units, respectively.

Furthermore, the lower table in Table 1 summarizes the infinity focusing positions (infinity corresponding positions) at the respective focal lengths (F=28.8, 35.0, 50.0, 85.0, 135.0, and 194.0 mm), and the amounts of rotation (amounts of rotation for focusing) upon focusing to respective photographing distances (R=5.0, 3.0, 2.0, 1.5, 1.2, and 0.95 m) using the focus cam. Since both the amount of rotation for zooming from the wide-angle end (F=28.8) to the telephoto end (F=194.0) and the amount of rotation for focusing from the infinity in-focus position to the closest in-focus position (R=0.95 m) are 10.0, the rotation amount ratio ($a_F/a_Z$) of the amount of rotation for focusing to the amount of rotation for zooming is 1.0.

TABLE 1

$F = 28.0-194.0$ (Rotation Amount Ratio: $a_F/a_z = 1.0$)

Focal lengths and Principal Point Intervals of Lens Units of Comparative Example I

|    |          |    | 1-POS   | 2-POS   | 3-POS   | 4-POS   | 5-POS    | 6-POS    |
|----|----------|----|---------|---------|---------|---------|----------|----------|
|    |          | F  | 28.8000 | 35.0000 | 50.0000 | 85.0000 | 135.0000 | 194.0000 |
| F1 | 85.0000  | D1 | 11.5063 | 15.6399 | 23.6055 | 35.1974 | 44.4737  | 50.4202  |
| F2 | -14.7000 | D2 | 25.8069 | 23.2088 | 19.3898 | 14.8844 | 11.1724  | 7.8560   |
| F3 | 43.5000  | D3 | 8.0000  | 7.3138  | 5.7748  | 3.8464  | 2.8540   | 2.0039   |
| F4 | 61.0000  | D4 | 59.7035 | 64.5166 | 73.5311 | 86.9840 | 97.2356  | 104.6041 |

Focus Cam Shape (Spline Interpolation Sample Point) of Comparative Example I

|    | ANGLE   | (1)   | (2)    | (3)   | (4)   |
|----|---------|-------|--------|-------|-------|
| 1  | .0000   | .0000 | .0000  | .0000 | .0000 |
| 2  | 4.8070  | .0000 | .0973  | .0000 | .0000 |
| 3  | 6.1968  | .0000 | .1633  | .0000 | .0000 |
| 4  | 7.4292  | .0000 | .2472  | .0000 | .0000 |
| 5  | 8.3658  | .0000 | .3325  | .0000 | .0000 |
| 6  | 9.1510  | .0000 | .4194  | .0000 | .0000 |
| 7  | 10.0000 | .0000 | .5362  | .0000 | .0000 |
| 8  | 14.8070 | .0000 | 1.9234 | .0000 | .0000 |
| 9  | 16.1968 | .0000 | 2.6178 | .0000 | .0000 |
| 10 | 17.4292 | .0000 | 3.3494 | .0000 | .0000 |
| 11 | 18.3658 | .0000 | 3.9814 | .0000 | .0000 |
| 12 | 19.1510 | .0000 | 4.5444 | .0000 | .0000 |
| 13 | 20.0000 | .0000 | 5.2095 | .0000 | .0000 |

Amount of Rotation for Zooming and Amount of Rotation for Focusing of Comparative Example I
Rotation Amount Ratio: $a_F/a_Z = 1.0$

| Focal Length | Infinity Corresponding Position | Photographing Distance | Amount of Rotation for Focusing |
|---|---|---|---|
| 28.8 mm | .0000  | 5.00 m | 4.807 |
| 35.0 mm | .5467  | 3.00 m | 6.197 |
| 50.0 mm | 1.7264 | 2.00 m | 7.429 |

TABLE 1-continued

| F = 28.0–194.0 (Rotation Amount Ratio: $a_r/a_z$ = 1.0) | | | |
|---|---|---|---|
| 85.0 mm | 4.0063 | 1.50 m | 8.366 |
| 135.0 mm | 6.8742 | 1.20 m | 9.151 |
| 194.0 mm | 10.0000 | 0.95 m | 10.000 |
| Condition Corresponding Value (1) | | 1.81 | |
| Condition Corresponding Value (2) | | 8.72 | |
| Condition Corresponding Value (3) | | 1.00 | |
| Condition Corresponding Value (4) | | 14.32 (wide-angle end) | |
| | | 9.37 (telephoto end) | |
| Condition Corresponding Value (5) | | 5.05 (wide-angle end) | |
| | | 9.49 (telephoto end) | |
| Condition Corresponding Value (6) | | 0.33 (wide-angle end) | |
| | | 0.30 (telephoto end) | |

Table 2 below summarizes the numerical value data of the cams of the focusing lens unit in the comparative example I, which data are calculated by interpolation based on a spline function on the basis of the sample data of the focus cam summarized in the middle table in Table 1. In this table, (ANGLE) is the angle of rotation of the rotatable lens barrel, (2) is the amount (mm) of movement, in the direction of the optical axis, of the second lens unit, and (F) is the focal length (mm) of the entire system in an infinity in-focus state corresponding to the amount (ANGLE) of rotation.

TABLE 2

Cam Numerical Value Data of Focusing Lens Unit in Comparative Example I

| Focus Cam Numerical Value Data | | | Zoom Compensation Cam Numerical Value Data | | |
|---|---|---|---|---|---|
| ANGLE | (2) | F | ANGLE | (2) | F |
| .0000 | .0000 | 28.8000 | .0000 | .0000 | 28.8000 |
| .5000 | .0056 | 34.4507 | .5000 | 1.3899 | 34.4507 |
| 1.0000 | .0114 | 40.4957 | 1.0000 | 2.8644 | 40.4957 |
| 1.5000 | .0179 | 46.9366 | 1.5000 | 4.4323 | 46.9366 |
| 2.0000 | .0252 | 53.8335 | 2.0000 | 6.0605 | 53.8335 |
| 2.5000 | .0338 | 61.1687 | 2.5000 | 7.6964 | 61.1687 |
| 3.0000 | .0438 | 68.8474 | 3.0000 | 9.2783 | 68.8474 |
| 3.5000 | .0557 | 76.7811 | 3.5000 | 10.7612 | 76.7811 |
| 4.0000 | .0696 | 84.8965 | 4.0000 | 12.1183 | 84.8965 |
| 4.5000 | .0860 | 93.1568 | 4.5000 | 13.3400 | 93.1568 |
| 5.0000 | .1050 | 101.6074 | 5.0000 | 14.4342 | 101.6074 |
| 5.5000 | .1271 | 110.2708 | 5.5000 | 15.4096 | 110.2708 |
| 6.0000 | .1524 | 119.1222 | 6.0000 | 16.2732 | 119.1222 |
| 6.5000 | .1814 | 128.1362 | 6.5000 | 17.0347 | 128.1362 |
| 7.0000 | .2146 | 137.3353 | 7.0000 | 17.7078 | 137.3353 |
| 7.5000 | .2529 | 146.7582 | 7.5000 | 18.3072 | 146.7582 |
| 8.0000 | .2969 | 156.3343 | 8.0000 | 18.8416 | 156.3343 |
| 8.5000 | .3462 | 165.8058 | 8.5000 | 19.3089 | 165.8058 |
| 9.0000 | .4013 | 175.1330 | 9.0000 | 19.7185 | 175.1330 |
| 9.5000 | .4641 | 184.6090 | 9.5000 | 20.0905 | 184.6090 |
| 10.0000 | .5362 | 194.0000 | 10.0000 | 20.4174 | 194.0000 |
| 10.5000 | .6194 | .0000 | | | |
| 11.0000 | .7146 | .0000 | | | |
| 11.5000 | .8227 | .0000 | | | |
| 12.0000 | .9446 | .0000 | | | |
| 12.5000 | 1.0810 | .0000 | | | |
| 13.0000 | 1.2328 | .0000 | | | |
| 13.5000 | 1.4009 | .0000 | | | |
| 14.0000 | 1.5861 | .0000 | | | |
| 14.5000 | 1.7894 | .0000 | | | |
| 15.0000 | 2.0114 | .0000 | | | |
| 15.5000 | 2.2523 | .0000 | | | |
| 16.0000 | 2.5112 | .0000 | | | |
| 16.5000 | 2.7872 | .0000 | | | |
| 17.0000 | 3.0811 | .0000 | | | |
| 17.5000 | 3.3952 | .0000 | | | |
| 18.0000 | 3.7290 | .0000 | | | |
| 18.5000 | 4.0750 | .0000 | | | |

TABLE 2-continued

Cam Numerical Value Data of Focusing Lens Unit in Comparative Example I

| Focus Cam Numerical Value Data | | | Zoom Compensation Cam Numerical Value Data | | |
|---|---|---|---|---|---|
| ANGLE | (2) | F | ANGLE | (2) | F |
| 19.0000 | 4.4323 | .0000 | | | |
| 19.5000 | 4.8124 | .0000 | | | |
| 20.0000 | 5.2095 | .0000 | | | |

The left table in Table 2 summarizes the numerical value data of the focus cam in the comparative example I, and the right table in Table 2 summarizes the numerical value data of the zoom compensation cam of the comparative example I. A value obtained by synthesizing the amount (2) of movement in the direction of the optical axis in the numerical value data of the focus cam and the amount (2) of movement in the direction of the optical axis in the numerical value data of the zoom compensation cam in a range from the amount of rotation (ANGLE=0.0) to the amount of rotation (ANGLE=10.0) agrees with the movement locus of the second lens unit calculated using the paraxial data in the upper table in Table 1.

Tables 3, 4, and 5 below summarize the amount DX (mm) of movement for focusing, in the direction of the optical axis, of the focusing lens unit, the imaging magnifications $\beta_k$ of the respective lens units, the conversion coefficient $\gamma_x$ associated with the direction of the optical axis, the slope (dx/da) of the focus cam, and the conversion coefficient $\gamma_a$ associated with the direction of rotation at the wide-angle end (F=28.8), the middle position (F=85.0), and the telephoto end (F=194.0), respectively. In these tables, (R) on the left side is the photographing distance (m), (ANG) is the amount of rotation on the focus cam upon focusing to the respective photographing distances, and 1), 2), 3), and 4) on the right side respectively represent the first, second, third, and fourth lens units. Also, in these tables, the first table summarizes the amount DX (mm) of movement for focusing in the direction of the optical axis upon focusing to the respective photographing distances (R=10.0, 5.0, 3.0, 2.0, 1.5, 1.2, and 0.95 m) (note that movement toward the object side is positive). The second table summarizes the imaging magnifications $\beta_k$ of the respective lens units in an in-focus state at the respective photographing distances (R=10.0, 5.0, 3.0, 2.0, 1.5, 1.2, and 0.95 m). The third table summarizes the conversion coefficient $\gamma_x$ associated with the direction of the optical axis of the focusing lens unit in an in-focus state at the respective photographing distances (R=10.0, 5.0, 3.0, 2.0, 1.5, 1.2, and 0.95 m). Furthermore, the fourth table summarizes the slope (dx/da) of the focus cam at the positions, on the focus cam, corresponding to an in-focus state at the respective photographing distances (R=10.0, 5.0, 3.0, 2.0, 1.5, 1.2, and 0.95 m), and the fifth table summarizes the conversion coefficient $\gamma_a$ associated with the direction of rotation of the focusing lens unit in an in-focus state at the respective photographing distances (R=10.0, 5.0, 3.0, 2.0, 1.5, 1.2, and 0.95 m).

TABLE 3

Amount DX (mm) of Movement for Focusing in Direction of Optical Axis at Wide-angle End (28.8 mm) in Comparative Example 1

| R | .000 | ANG | .000 | 1) | .000 | 2) | .000 | 3) | .000 | 4) | .000 |
|---|---|---|---|---|---|---|---|---|---|---|---|
| R | 10.000 | ANG | 3.203 | 1) | .000 | 2) | .048 | 3) | .000 | 4) | .000 |
| R | 5.000 | ANG | 4.807 | 1) | .000 | 2) | .097 | 3) | .000 | 4) | .000 |
| R | 3.000 | ANG | 6.197 | 1) | .000 | 2) | .163 | 3) | .000 | 4) | .000 |
| R | 2.000 | ANG | 7.429 | 1) | .000 | 2) | .247 | 3) | .000 | 4) | .000 |
| R | 1.500 | ANG | 8.366 | 1) | .000 | 2) | .332 | 3) | .000 | 4) | .000 |
| R | 1.200 | ANG | 9.151 | 1) | .000 | 2) | .419 | 3) | .000 | 4) | .000 |
| R | .950 | ANG | 10.000 | 1) | .000 | 2) | .536 | 3) | .000 | 4) | .000 |

Imaging Magnification $\beta_K$ of Lens Units at Wide-angle End (28.8 mm) in Comparative Example I

| R | .000 | ANG | .000 | 1) | .000 | 2) | −.250 | 3) | −63.758 | 4) | .021 |
|---|---|---|---|---|---|---|---|---|---|---|---|
| R | 10.000 | ANG | 3.203 | 1) | −.009 | 2) | −.247 | 3) | −63.758 | 4) | .021 |
| R | 5.000 | ANG | 4.807 | 1) | −.018 | 2) | −.243 | 3) | −63.758 | 4) | .021 |
| R | 3.000 | ANG | 6.197 | 1) | −.030 | 2) | −.239 | 3) | −63.758 | 4) | .021 |
| R | 2.000 | ANG | 7.429 | 1) | −.047 | 2) | −.233 | 3) | −63.758 | 4) | .021 |
| R | 1.500 | ANG | 8.366 | 1) | −.065 | 2) | −.227 | 3) | −63.758 | 4) | .021 |
| R | 1.200 | ANG | 9.151 | 1) | −.084 | 2) | −.221 | 3) | −63.758 | 4) | .021 |
| R | .950 | ANG | 10.000 | 1) | −.112 | 2) | −.214 | 3) | −63.758 | 4) | .021 |

Conversion Coefficient $\gamma_x$ Associated With Direction of Optical Axis at Wide-angle End (28.8 mm) in Comparative Example I

| R | .000 | ANG | .000 | 1) | .000 | 2) | 1.722 | 3) | .000 | 4) | .000 |
|---|---|---|---|---|---|---|---|---|---|---|---|
| R | 10.000 | ANG | 3.203 | 1) | .000 | 2) | 1.725 | 3) | .000 | 4) | .000 |
| R | 5.000 | ANG | 4.807 | 1) | .000 | 2) | 1.728 | 3) | .000 | 4) | .000 |
| R | 3.000 | ANG | 6.197 | 1) | .000 | 2) | 1.732 | 3) | .000 | 4) | .000 |
| R | 2.000 | ANG | 7.429 | 1) | .000 | 2) | 1.737 | 3) | .000 | 4) | .000 |
| R | 1.500 | ANG | 8.366 | 1) | .000 | 2) | 1.741 | 3) | .000 | 4) | .000 |
| R | 1.200 | ANG | 9.151 | 1) | .000 | 2) | 1.746 | 3) | .000 | 4) | .000 |
| R | .950 | ANG | 10.000 | 1) | .000 | 2) | 1.753 | 3) | .000 | 4) | .000 |

Slope dx/da of Focus Cam at Wide-angle End (28.8 mm) in Comparative Example I

| R | .000 | ANG | .000 | 1) | .000 | 2) | .011 | 3) | .000 | 4) | .000 |
|---|---|---|---|---|---|---|---|---|---|---|---|
| R | 10.000 | ANG | 3.203 | 1) | .000 | 2) | .023 | 3) | .000 | 4) | .000 |
| R | 5.000 | ANG | 4.807 | 1) | .000 | 2) | .039 | 3) | .000 | 4) | .000 |
| R | 3.000 | ANG | 6.197 | 1) | .000 | 2) | .057 | 3) | .000 | 4) | .000 |
| R | 2.000 | ANG | 7.429 | 1) | .000 | 2) | .081 | 3) | .000 | 4) | .000 |
| R | 1.500 | ANG | 8.366 | 1) | .000 | 2) | .101 | 3) | .000 | 4) | .000 |
| R | 1.200 | ANG | 9.151 | 1) | .000 | 2) | .122 | 3) | .000 | 4) | .000 |
| R | .950 | ANG | 10.000 | 1) | .000 | 2) | .155 | 3) | .000 | 4) | .000 |

Conversion Coefficient $\gamma_a$ Associated With Direction of Rotation at Wide-angle End (28.8 mm) in Comparative Example I

| R | .000 | ANG | .000 | 1) | .000 | 2) | .019 | 3) | .000 | 4) | .000 |
|---|---|---|---|---|---|---|---|---|---|---|---|
| R | 10.000 | ANG | 3.203 | 1) | .000 | 2) | .040 | 3) | .000 | 4) | .000 |
| R | 5.000 | ANG | 4.807 | 1) | .000 | 2) | .067 | 3) | .000 | 4) | .000 |
| R | 3.000 | ANG | 6.197 | 1) | .000 | 2) | .099 | 3) | .000 | 4) | .000 |
| R | 2.000 | ANG | 7.429 | 1) | .000 | 2) | .140 | 3) | .000 | 4) | .000 |
| R | 1.500 | ANG | 8.366 | 1) | .000 | 2) | .176 | 3) | .000 | 4) | .000 |
| R | 1.200 | ANG | 9.151 | 1) | .000 | 2) | .213 | 3) | .000 | 4) | .000 |
| R | .950 | ANG | 10.000 | 1) | .000 | 2) | .272 | 3) | .000 | 4) | .000 |

Condition Corresponding Values: $\gamma_{aR}/\gamma_{a0} = 1.02$, $\gamma_{aR}/\gamma_{a0} = 14.32$

TABLE 4

Amount DX (mm) of Movement for Focusing in Direction of Optical Axis at Middle Position (85.0 mm) in Comparative Example I

| R | .000 | ANG | .000 | 1) | .000 | 2) | .000 | 3) | .000 | 4) | .000 |
|---|---|---|---|---|---|---|---|---|---|---|---|
| R | 10.000 | ANG | 3.101 | 1) | .000 | 2) | .152 | 3) | .000 | 4) | .000 |
| R | 5.000 | ANG | 4.741 | 1) | .000 | 2) | .303 | 3) | .000 | 4) | .000 |
| R | 3.000 | ANG | 6.206 | 1) | .000 | 2) | .500 | 3) | .000 | 4) | .000 |
| R | 2.000 | ANG | 7.448 | 1) | .000 | 2) | .743 | 3) | .000 | 4) | .000 |
| R | 1.500 | ANG | 8.387 | 1) | .000 | 2) | .981 | 3) | .000 | 4) | .000 |
| R | 1.200 | ANG | 9.154 | 1) | .000 | 2) | 1.215 | 3) | .000 | 4) | .000 |
| R | .950 | ANG | 10.000 | 1) | .000 | 2) | 1.519 | 3) | .000 | 4) | .000 |

TABLE 4-continued

Imaging Magnification $\beta_K$ of Lens Units at Middle Position (85.0 mm) in Comparative Example I

| | | | | | | | | | | | |
|---|---|---|---|---|---|---|---|---|---|---|---|
| R | .000 | ANG | .000 | 1) | .000 | 2) | −.419 | 3) | 5.606 | 4) | −.426 |
| R | 10.000 | ANG | 3.101 | 1) | −.009 | 2) | −.408 | 3) | 5.606 | 4) | −.426 |
| R | 5.000 | ANG | 4.741 | 1) | −.018 | 2) | −.398 | 3) | 5.606 | 4) | −.426 |
| R | 3.000 | ANG | 6.206 | 1) | −.031 | 2) | −.385 | 3) | 5.606 | 4) | −.426 |
| R | 2.000 | ANG | 7.448 | 1) | −.048 | 2) | −.368 | 3) | 5.606 | 4) | −.426 |
| R | 1.500 | ANG | 8.387 | 1) | −.067 | 2) | −.352 | 3) | 5.606 | 4) | −.426 |
| R | 1.200 | ANG | 9.154 | 1) | −.087 | 2) | −.336 | 3) | 5.606 | 4) | −.426 |
| R | .950 | ANG | 10.000 | 1) | −.117 | 2) | −.315 | 3) | 5.606 | 4) | −.426 |

Conversion Coefficient $\gamma_x$ Associated With Direction of Optical Axis at Middle Position (85.0 mm) in Comparative Example I

| | | | | | | | | | | | |
|---|---|---|---|---|---|---|---|---|---|---|---|
| R | .000 | ANG | .000 | 1) | .000 | 2) | 4.702 | 3) | .000 | 4) | .000 |
| R | 10.000 | ANG | 3.101 | 1) | .000 | 2) | 4.751 | 3) | .000 | 4) | .000 |
| R | 5.000 | ANG | 4.741 | 1) | .000 | 2) | 4.798 | 3) | .000 | 4) | .000 |
| R | 3.000 | ANG | 6.206 | 1) | .000 | 2) | 4.858 | 3) | .000 | 4) | .000 |
| R | 2.000 | ANG | 7.448 | 1) | .000 | 2) | 4.929 | 3) | .000 | 4) | .000 |
| R | 1.500 | ANG | 8.387 | 1) | .000 | 2) | 4.995 | 3) | .000 | 4) | .000 |
| R | 1.200 | ANG | 9.154 | 1) | .000 | 2) | 5.058 | 3) | .000 | 4) | .000 |
| R | .950 | ANG | 10.000 | 1) | .000 | 2) | 5.135 | 3) | .000 | 4) | .000 |

Slope dx/da of Focus Cam at Middle Position (85.0 mm) in Comparative Example I

| | | | | | | | | | | | |
|---|---|---|---|---|---|---|---|---|---|---|---|
| R | .000 | ANG | .000 | 1) | .000 | 2) | .030 | 3) | .000 | 4) | .000 |
| R | 10.000 | ANG | 3.101 | 1) | .000 | 2) | .073 | 3) | .000 | 4) | .000 |
| R | 5.000 | ANG | 4.741 | 1) | .000 | 2) | .110 | 3) | .000 | 4) | .000 |
| R | 3.000 | ANG | 6.206 | 1) | .000 | 2) | .165 | 3) | .000 | 4) | .000 |
| R | 2.000 | ANG | 7.448 | 1) | .000 | 2) | .227 | 3) | .000 | 4) | .000 |
| R | 1.500 | ANG | 8.387 | 1) | .000 | 2) | .281 | 3) | .000 | 4) | .000 |
| R | 1.200 | ANG | 9.154 | 1) | .000 | 2) | .330 | 3) | .000 | 4) | .000 |
| R | .950 | ANG | 10.000 | 1) | .000 | 2) | .389 | 3) | .000 | 4) | .000 |

Conversion Coefficient $\gamma_a$ Associated With Direction of Rotation at Middle Position (85.0 mm) in Comparative Example I

| | | | | | | | | | | | |
|---|---|---|---|---|---|---|---|---|---|---|---|
| R | .000 | ANG | .000 | 1) | .000 | 2) | .142 | 3) | .000 | 4) | .000 |
| R | 10.000 | ANG | 3.101 | 1) | .000 | 2) | .349 | 3) | .000 | 4) | .000 |
| R | 5.000 | ANG | 4.741 | 1) | .000 | 2) | .528 | 3) | .000 | 4) | .000 |
| R | 3.000 | ANG | 6.206 | 1) | .000 | 2) | .799 | 3) | .000 | 4) | .000 |
| R | 2.000 | ANG | 7.448 | 1) | .000 | 2) | 1.120 | 3) | .000 | 4) | .000 |
| R | 1.500 | ANG | 8.387 | 1) | .000 | 2) | 1.406 | 3) | .000 | 4) | .000 |
| R | 1.200 | ANG | 9.154 | 1) | .000 | 2) | 1.670 | 3) | .000 | 4) | .000 |
| R | .950 | ANG | 10.000 | 1) | .000 | 2) | 1.996 | 3) | .000 | 4) | .000 |

Condition Corresponding Values: $\gamma_{xR}/\gamma_{x0} = 1.09$, $\gamma_{aR}/\gamma_{a0} = 14.06$

TABLE 5

Amount DX (mm) of Movement for Focusing in Direction of Optical Axis at Telephoto End (194.0 mm) in Comparative Example I

| | | | | | | | | | | | |
|---|---|---|---|---|---|---|---|---|---|---|---|
| R | .000 | ANG | .000 | 1) | .000 | 2) | .000 | 3) | .000 | 4) | .000 |
| R | 10.000 | ANG | 3.212 | 1) | .000 | 2) | .766 | 3) | .000 | 4) | .000 |
| R | 5.000 | ANG | 4.807 | 1) | .000 | 2) | 1.387 | 3) | .000 | 4) | .000 |
| R | 3.000 | ANG | 6.197 | 1) | .000 | 2) | 2.082 | 3) | .000 | 4) | .000 |
| R | 2.000 | ANG | 7.429 | 1) | .000 | 2) | 2.813 | 3) | .000 | 4) | .000 |
| R | 1.500 | ANG | 8.366 | 1) | .000 | 2) | 3.445 | 3) | .000 | 4) | .000 |
| R | 1.200 | ANG | 9.151 | 1) | .000 | 2) | 4.008 | 3) | .000 | 4) | .000 |
| R | .950 | ANG | 10.000 | 1) | .000 | 2) | 4.673 | 3) | .000 | 4) | .000 |

Imaging Magnification $\beta_K$ of Lens Units at Telephoto End (194.0 mm) in Comparative Example I

| | | | | | | | | | | | |
|---|---|---|---|---|---|---|---|---|---|---|---|
| R | .000 | ANG | .000 | 1) | .000 | 2) | −.739 | 3) | 4.318 | 4) | −.715 |
| R | 10.000 | ANG | 3.212 | 1) | −.009 | 2) | −.687 | 3) | 4.318 | 4) | −.715 |
| R | 5.000 | ANG | 4.807 | 1) | −.018 | 2) | −.645 | 3) | 4.318 | 4) | −.715 |
| R | 3.000 | ANG | 6.197 | 1) | −.031 | 2) | −.598 | 3) | 4.318 | 4) | −.715 |
| R | 2.000 | ANG | 7.429 | 1) | −.049 | 2) | −.548 | 3) | 4.318 | 4) | −.715 |
| R | 1.500 | ANG | 8.366 | 1) | −.068 | 2) | −.505 | 3) | 4.318 | 4) | −.715 |
| R | 1.200 | ANG | 9.151 | 1) | −.089 | 2) | −.467 | 3) | 4.318 | 4) | −.715 |
| R | .950 | ANG | 10.000 | 1) | −.121 | 2) | −.422 | 3) | 4.318 | 4) | −.715 |

Conversion Coefficient $\gamma_x$ Associated With Direction of Optical Axis at Telephoto End (194.0 mm) in Comparative Example I

| | | | | | | | | | | | |
|---|---|---|---|---|---|---|---|---|---|---|---|
| R | .000 | ANG | .000 | 1) | .000 | 2) | 4.318 | 3) | .000 | 4) | .000 |
| R | 10.000 | ANG | 3.212 | 1) | .000 | 2) | 5.026 | 3) | .000 | 4) | .000 |
| R | 5.000 | ANG | 4.807 | 1) | .000 | 2) | 5.563 | 3) | .000 | 4) | .000 |
| R | 3.000 | ANG | 6.197 | 1) | .000 | 2) | 6.122 | 3) | .000 | 4) | .000 |

TABLE 5-continued

| | | | | | | | | | | |
|---|---|---|---|---|---|---|---|---|---|---|
| R | 2.000 | ANG | 7.429 | 1) | .000 | 2) | 6.665 | 3) | .000 | 4) .000 |
| R | 1.500 | ANG | 8.366 | 1) | .000 | 2) | 7.097 | 3) | .000 | 4) .000 |
| R | 1.200 | ANG | 9.151 | 1) | .000 | 2) | 7.451 | 3) | .000 | 4) .000 |
| R | .950 | ANG | 10.000 | 1) | .000 | 2) | 7.834 | 3) | .000 | 4) .000 |

Slope dx/da of Focus Cam at Telephoto End (194.0 mm) in Comparative Example I

| | | | | | | | | | | |
|---|---|---|---|---|---|---|---|---|---|---|
| R | .000 | ANG | .000 | 1) | .000 | 2) | .155 | 3) | .000 | 4) .000 |
| R | 10.000 | ANG | 3.212 | 1) | .000 | 2) | .334 | 3) | .000 | 4) .000 |
| R | 5.000 | ANG | 4.807 | 1) | .000 | 2) | .448 | 3) | .000 | 4) .000 |
| R | 3.000 | ANG | 6.197 | 1) | .000 | 2) | .548 | 3) | .000 | 4) .000 |
| R | 2.000 | ANG | 7.429 | 1) | .000 | 2) | .644 | 3) | .000 | 4) .000 |
| R | 1.500 | ANG | 8.366 | 1) | .000 | 2) | .696 | 3) | .000 | 4) .000 |
| R | 1.200 | ANG | 9.151 | 1) | .000 | 2) | .750 | 3) | .000 | 4) .000 |
| R | .950 | ANG | 10.000 | 1) | .000 | 2) | .800 | 3) | .000 | 4) .000 |

Conversion Coefficient $\gamma_a$ Associated With Direction of Rotation at Telephoto End (194.0 mm) in Comparative Example I

| | | | | | | | | | | |
|---|---|---|---|---|---|---|---|---|---|---|
| R | .000 | ANG | .000 | 1) | .000 | 2) | .669 | 3) | .000 | 4) .000 |
| R | 10.000 | ANG | 3.212 | 1) | .000 | 2) | 1.677 | 3) | .000 | 4) .000 |
| R | 5.000 | ANG | 4.807 | 1) | .000 | 2) | 2.495 | 3) | .000 | 4) .000 |
| R | 3.000 | ANG | 6.197 | 1) | .000 | 2) | 3.356 | 3) | .000 | 4) .000 |
| R | 2.000 | ANG | 7.429 | 1) | .000 | 2) | 4.290 | 3) | .000 | 4) .000 |
| R | 1.500 | ANG | 8.366 | 1) | .000 | 2) | 4.938 | 3) | .000 | 4) .000 |
| R | 1.200 | ANG | 9.151 | 1) | .006 | 2) | 5.592 | 3) | .000 | 4) .000 |
| R | .950 | ANG | 10.000 | 1) | .000 | 2) | 6.267 | 3) | .000 | 4) .000 |

Condition Corresponding Values: $\gamma_{xR}/\gamma_{xO} = 1.81$, $\gamma_{aR}/\gamma_{aO} = 9.37$ As can be seen from Tables 3, 4, and 5, the conversion coefficient $\gamma_x$ associated with the direction of the optical axis and the slope (dx/da) of the focus cam at the respective focal lengths increase as the photographing distance becomes closer to the closest distance. Especially, the slope (dx/da) of the focus cam changes largely. Therefore, as can be seen from these tables, the conversion coefficient $\gamma_a$ associated with the direction of rotation, which is defined as the product of $\gamma_x$ and (dx/da), further increases.

More specifically, in a zoom lens in which the conversion coefficient $\gamma_x$ associated with the amount x of movement, in the direction of the optical axis, of the focusing lens unit in a closest in-focus state is larger than that in an infinity in-focus state, i.e., which satisfies:

$$1.0 < \gamma_{xR}/\gamma_{xO}$$

when the focus cam which satisfies the following inequality, i.e., the focus cam has a shape having a larger slope (dx/da) at the closest corresponding position than that at the infinity corresponding position:

$$1.0 << (dx/da)_R/(dx/da)_O$$

the following inequality is satisfied:

$$1.0 < \gamma_{xR}/\gamma_{xO} << \gamma_{aR}/\gamma_{aO}$$

The rate of change, from the infinity in-focus value ($\gamma_{aO}$) to the closest in-focus value ($\gamma_{aR}$), of the conversion coefficient $\gamma_a$ associated with the angle a of rotation of the rotatable lens barrel undesirably becomes larger than the rate of change, from the infinity in-focus value ($\gamma_{xO}$) to the closest in-focus value ($\gamma_{xR}$), of the conversion coefficient $\gamma_x$ associated with the amount x of movement in the direction of the optical axis.

From Tables 3, 4, and 5 above, the rate of change of $\gamma_a$ is ×14.32 at the wide-angle end (F=28.8), ×14.06 at the middle position (F=85.0), and ×9.37 at the telephoto end (F=194.0).

As described above, when the conversion coefficient $\gamma$ changes in correspondence with the lens arrangement (e.g., focusing), as described in Japanese Patent Application Laid-Open No. 3-228006, a plurality of pairs of data of the conversion coefficient $\gamma$ and the correction coefficient $\epsilon$ must be stored in the storage means in units of a plurality of divided focus ranges. Therefore, when the rate of change of $\gamma_a$ is large ($\gamma_{aR}/\gamma_{aO} >> 1.0$), the number of divisions increases, and the storage capacity inevitably becomes large, resulting in an increase in cost. For example, when a change in $\gamma_a$ in a single focus range is divided under the condition defined by the following inequality:

$$\gamma_{max}/\gamma_{min} < 1.2$$

the number N of divisions is expressed by inequality (a) below:

$$N > \log(\gamma_{MAX}/\gamma_{MIN})/\log(1.2) \quad (a)$$

Therefore, the numbers $N_W$, $N_M$, and $N_T$ of divisions at the wide-angle end, middle position, and telephoto end have large values as follows:

$$N_W > 14.6 \quad N_M > 14.5 \quad N_T > 12.3$$

The formula K=$\gamma$(1+$\epsilon$·$\Delta$Bf) presented by Japanese Patent Application Laid-Open No. 62-170924 is rewritten to the conversion coefficient $K_a$ associated with the angle a of rotation of the rotatable lens barrel:

$$K_a = \gamma_a(1+\epsilon \cdot \Delta Bf)$$

Then, the following formula is defined by using a correction coefficient $\mu$ ($\epsilon$=−1/$\mu$):

$$K_a = \gamma_a(1 - \Delta Bf/\mu)$$

Tables 6, 7, and 8 below summarize the calculation results of the values of the conversion coefficient $K_a$ and the correction coefficient $\mu$ according to the comparative example I at the wide-angle end (F=28.8), middle position (F=85.0), and telephoto end (F=194.0) using the above formula.

In these tables, (R) is the object distance (m), (ANG) is the amount of rotation for focusing from the infinity corresponding position on the focus cam, (r) is the conversion coefficient $\gamma_a$ in the direction of rotation, (rs) is the conversion coefficient $K_a$, (bf) is the defocus amount (mm), and (l) is the correction coefficient μ. Each table has a matrix structure, and eight rows in the vertical direction indicated by (POS) represent the object positions (R=10.0, 5.0, 3.0, 2.0, 1.5, 1.2, and 0.95 mm), and four pairs (R, ANGLE) in the horizontal direction represent the lens arrangements of the focusing lens unit.

More specifically, the position of the focusing lens in the first pair in the upper two tables in each of Tables 6, 7, and 8, i.e., in the third and fourth columns is (R, ANGLE)=(0.0, 0.0), and it indicates that this position corresponds to the infinity corresponding position. Therefore, the third column (r) in the first table represents the value of the conversion coefficient $\gamma_a$ in the direction of rotation when the focusing lens unit is focused on an infinity object, and the fourth column (rs) represents the value of the conversion coefficient $K_a$ when the focusing lens unit is moved from an in-focus state on an infinity object to an in-focus state at the object distance in the second column. Furthermore, the third column (bf) in the second table represents the defocus amount ΔBf from a predetermined imaging position when the position of the focusing lens unit corresponds to the infinity corresponding position, and the object is located at an object distance in the second column, and the fourth column (l) represents the value of the correction coefficient μ when the focusing lens unit is moved from an in-focus state on an infinity object to an in-focus state at the object distance in the second column.

Similarly, the position of the focusing lens in the fourth pair in the lower two tables in each of Tables 6, 7, and 8, i.e., in the ninth and 10th columns is (R, ANGLE)=(0.95, 10.0), and it indicates that this position corresponds to the closest in-focus (R=0.95 m) corresponding position. Therefore, the ninth column (r) in the third table represents the value of the conversion coefficient $\gamma_a$ in the direction of rotation when the focusing lens unit is focused on a closest distance (R=0.95 m) object, and the 10th column (rs) represents the value of the conversion coefficient $K_a$ when the focusing lens unit is moved from an in-focus state on the closest distance (R=0.95 m) object to an in-focus state at the object distance in the second column. Furthermore, the ninth column (bf) in the fourth table represents the defocus amount ΔBf from a predetermined imaging position when the position of the focusing lens unit corresponds to the closest corresponding position, and the object is located at an object distance in the second column, and the 10th column (l) represents the value of the correction coefficient μ when the focusing lens unit is moved from an in-focus state on the closest distance (R=0.95 m) object to an in-focus state at the object distance in the second column.

From the above formulas, since the conversion coefficient in the direction of rotation is calculated by $K_a=\Delta Bf/\Delta a$ (where Δa: the amount of rotation for focusing), and the correction coefficient μ is calculated by $\mu=\Delta Bf/(1-K_a/\gamma_a)$, the value of the conversion coefficient $K_a$ (eighth row, fourth column in first table: 0.096) when the focusing lens unit is moved from an in-focus state on the infinity object to an in-focus state at the object distance (R=0.95 m) in Table 6 is calculated by $K_a$=0.96/10.0=0.096 using ΔBf=0.96 and Δa=10.0. On the other hand, the value of the correction coefficient μ (eighth row, fourth column in second table: −0.24) is calculated as μ=−0.24 using ΔBf=0.96, $K_a$=0.096, and $Y_a$=0.019.

TABLE 6

Conversion Coefficients $K_a$: (rs), $\gamma_a$: (r) Associated with Direction of Rotation and Correction Coefficient μ: (l) at Wide-angle End (28.8 mm) in Comparative Example I
F = 28.8 mm

| (R, ANGLE) = | | .000 | .000 | 10.000 | 3.203 | 5.000 | 4.807 | 3.000 | 6.197 |
|---|---|---|---|---|---|---|---|---|---|
| POS | R | r | rs | r | rs | r | rs | r | rs |
| 1 | .000 | .019 | .000 | | .026 | | .035 | | .045 |
| 2 | 10.000 | | .026 | .040 | .000 | | .052 | | .066 |
| 3 | 5.000 | | .035 | | .053 | .067 | .000 | | .082 |
| 4 | 3.000 | | .046 | | .067 | | .082 | .099 | .000 |
| 5 | 2.000 | | .058 | | .082 | | .100 | | .119 |
| 6 | 1.500 | | .070 | | .097 | | .116 | | .137 |
| 7 | 1.200 | | .082 | | .111 | | .131 | | .153 |
| 8 | .950 | | .096 | | .129 | | .151 | | .175 |
| POS | R | bf | l | bf | l | bf | l | bf | l |
| 1 | .000 | .00 | .00 | −.08 | −.24 | −.17 | −.35 | −.28 | −.51 |
| 2 | 10.000 | .08 | −.22 | .00 | −.08 | −.08 | −.39 | −.20 | −.59 |
| 3 | 5.000 | .17 | −.20 | .08 | −.27 | .00 | .00 | −.11 | −.66 |
| 4 | 3.000 | .28 | −.20 | .20 | −.30 | .11 | −.49 | .00 | .00 |
| 5 | 2.000 | .43 | −.21 | .35 | −.33 | .26 | −.53 | .15 | −.73 |
| 6 | 1.500 | .59 | −.22 | .50 | −.35 | .41 | −.56 | .30 | −.77 |
| 7 | 1.200 | .75 | −.23 | .66 | −.38 | .57 | −.59 | .45 | −.82 |
| 8 | .950 | .96 | −.24 | .87 | −.40 | .79 | −.62 | .67 | −.86 |
| (R, ANGLE) = | | 2.000 | 7.429 | 1.500 | 8.366 | 1.200 | 9.151 | .950 | 10.000 |
| POS | R | r | rs | r | rs | r | rs | r | rs |
| 1 | .000 | | .057 | | .067 | | .077 | | .090 |
| 2 | 10.000 | | .080 | | .094 | | .106 | | .121 |
| 3 | 5.000 | | .098 | | .113 | | .126 | | .143 |
| 4 | 3.000 | | .117 | | .134 | | .148 | | .167 |
| 5 | 2.000 | .140 | .000 | | .158 | | .172 | | .193 |
| 6 | 1.500 | | .159 | .176 | .000 | | .192 | | .215 |
| 7 | 1.200 | | .176 | | .194 | .213 | .000 | | .239 |
| 8 | .950 | | .200 | | .221 | | .242 | .272 | .000 |

TABLE 6-continued

Conversion Coefficients $K_a$: (rs), $\gamma_a$: (r) Associated with Direction of Rotation and
Correction Coefficient $\mu$: (l) at Wide-angle End (28.8 mm) in Comparative Example I
F = 28.8 mm

| POS | R | bf | l | bf | l | bf | l | bf | l |
|---|---|---|---|---|---|---|---|---|---|
| 1 | .000 | −.42 | −.71 | −.56 | −.91 | −.71 | −1.11 | −.90 | −1.35 |
| 2 | 10.000 | −.34 | −.80 | −.48 | −1.03 | −.63 | −1.25 | −.82 | −1.48 |
| 3 | 5.000 | −.26 | −.86 | −.40 | −1.12 | −.55 | −1.35 | −.74 | −1.57 |
| 4 | 3.000 | −.14 | −.89 | −.29 | −1.22 | −.44 | −1.45 | −.63 | −1.65 |
| 5 | 2.000 | .00 | .00 | −.15 | −1.40 | −.30 | −1.56 | −.50 | −1.70 |
| 6 | 1.500 | .15 | −1.09 | .00 | .00 | −.15 | −1.53 | −.35 | −1.69 |
| 7 | 1.200 | .30 | −1.18 | .15 | −1.49 | .00 | .00 | −.20 | −1.69 |
| 8 | .950 | .51 | −1.21 | .36 | −1.43 | .21 | −1.48 | .00 | .00 |

Condition Corresponding Values: $K_{aO}/\gamma_{aO}$ = 5.05, $K_{aR}/\gamma_{aR}$ = 0.33

TABLE 7

Conversion Coefficients $K_a$: (rs), $\gamma_a$: (r) Associated with Direction of Rotation and Correction
Coefficient $\mu$: (l) at Middle Position (85.0 mm) in Comparative Example I
F = 85.0 mm

| (R, ANGLE) = | .000 | .000 | 10.000 | 3.101 | 5.000 | 4.741 | 3.000 | 6.206 |
|---|---|---|---|---|---|---|---|---|
| POS | R | r | rs | r | rs | r | rs | r | rs |
| 1 | .000 | .142 | .000 |  | .229 |  | .294 |  | .366 |
| 2 | 10.000 |  | .236 | .349 | .000 |  | .431 |  | .519 |
| 3 | 5.000 |  | .313 |  | .444 | .527 | .000 |  | .638 |
| 4 | 3.000 |  | .406 |  | .558 |  | .664 | .800 | .000 |
| 5 | 2.000 |  | .520 |  | .700 |  | .828 |  | .979 |
| 6 | 1.500 |  | .631 |  | .835 |  | .979 |  | 1.142 |
| 7 | 1.200 |  | .741 |  | .967 |  | 1.125 |  | 1.298 |
| 8 | .950 |  | .886 |  | 1.140 |  | 1.314 |  | 1.499 |

| POS | R | bf | l | bf | l | bf | l | bf | l |
|---|---|---|---|---|---|---|---|---|---|
| 1 | .000 | .00 | .00 | −.71 | −2.06 | −1.39 | −3.16 | −2.27 | −4.20 |
| 2 | 10.000 | .73 | −1.11 | .00 | .00 | −.71 | −3.86 | −1.61 | −4.60 |
| 3 | 5.000 | 1.49 | −1.24 | .73 | −2.67 | .00 | .00 | −.93 | −4.61 |
| 4 | 3.000 | 2.52 | −1.36 | 1.73 | −2.90 | .97 | −3.75 | .00 | .00 |
| 5 | 2.000 | 3.87 | −1.46 | 3.04 | −3.03 | 2.24 | −3.94 | 1.22 | −5.44 |
| 6 | 1.500 | 5.29 | −1.54 | 4.41 | −3.17 | 3.57 | −4.17 | 2.49 | −5.82 |
| 7 | 1.200 | 6.78 | −1.61 | 5.86 | −3.31 | 4.96 | −4.38 | 3.83 | −6.14 |
| 8 | .950 | 8.86 | −1.69 | 7.87 | −3.47 | 6.91 | −4.63 | 5.69 | −6.51 |

| (R, ANGLE) = | 2.000 | 7.448 | 1.500 | 8.387 | 1.200 | 9.154 | .950 | 10.000 |
|---|---|---|---|---|---|---|---|---|
| POS | R | r | rs | r | rs | r | rs | r | rs |
| 1 | .000 |  | .446 |  | .515 |  | .576 |  | .646 |
| 2 | 10.000 |  | .619 |  | .704 |  | .776 |  | .859 |
| 3 | 5.000 |  | .756 |  | .851 |  | .931 |  | 1.021 |
| 4 | 3.000 |  | .931 |  | 1.034 |  | 1.120 |  | 1.214 |
| 5 | 2.000 | 1.120 | .000 |  | 1.229 |  | 1.319 |  | 1.418 |
| 6 | 1.500 |  | 1.291 | 1.407 | .000 |  | 1.499 |  | 1.601 |
| 7 | 1.200 |  | 1.454 |  | 1.574 | 1.669 | .000 |  | 1.774 |
| 8 | .950 |  | 1.664 |  | 1.789 |  | 1.889 | 1.994 | .000 |

| POS | R | bf | l | bf | l | bf | l | bf | l |
|---|---|---|---|---|---|---|---|---|---|
| 1 | .000 | −3.32 | −5.52 | −4.32 | −6.82 | −5.27 | −8.05 | −6.46 | −9.57 |
| 2 | 10.000 | −2.69 | −6.02 | −3.72 | −7.44 | −4.70 | −8.78 | −5.92 | −10.40 |
| 3 | 5.000 | −2.05 | −6.28 | −3.10 | −7.85 | −4.11 | −9.30 | −5.37 | −11.00 |
| 4 | 3.000 | −1.16 | −6.84 | −2.26 | −8.51 | −3.30 | −10.03 | −4.61 | −11.78 |
| 5 | 2.000 | .00 | .00 | −1.15 | −9.14 | −2.25 | −10.73 | −3.62 | −12.51 |
| 6 | 1.500 | 1.21 | −7.96 | .00 | .00 | −1.15 | −11.31 | −2.58 | −13.09 |
| 7 | 1.200 | 2.48 | −8.32 | 1.21 | −10.17 | .00 | .00 | −1.50 | −13.60 |
| 8 | .950 | 4.25 | −8.75 | 2.89 | −10.62 | 1.60 | −12.13 | .00 | .00 |

Condition Corresponding Values: $K_{aO}/\gamma_{aO}$ = 6.24, $K_{aR}/\gamma_{aR}$ = 0.32

TABLE 8

Conversion Coefficients $K_a$: (rs), $\gamma_a$: (r) Associated with Direction of Rotation and Correction Coefficient μ: (#) at Telephoto End (194.0 mm) in Comparative Example I F = 194.0 mm

| (R, ANGLE) = POS | R | .000 r | .000 rs | 10.000 r | 3.212 rs | 5.000 r | 4.807 rs | 3.000 r | 6.197 rs |
|---|---|---|---|---|---|---|---|---|---|
| 1 | .000 | .669 | .000 |  | 1.031 |  | 1.244 |  | 1.436 |
| 2 | 10.000 |  | 1.215 | 1.676 | .000 |  | 1.930 |  | 2.144 |
| 3 | 5.000 |  | 1.686 |  | 2.218 | 2.493 | .000 |  | 2.704 |
| 4 | 3.000 |  | 2.298 |  | 2.897 |  | 3.175 | 3.354 | .000 |
| 5 | 2.000 |  | 3.084 |  | 3.736 |  | 4.002 |  | 4.160 |
| 6 | 1.500 |  | 3.937 |  | 4.623 |  | 4.862 |  | 4.979 |
| 7 | 1.200 |  | 4.881 |  | 5.567 |  | 5.752 |  | 5.793 |
| 8 | .950 |  | 6.351 |  | 6.992 |  | 7.074 |  | 6.992 |

| POS | R | bf | 1 | bf | 1 | bf | 1 | bf | 1 |
|---|---|---|---|---|---|---|---|---|---|
| 1 | .000 | .00 | .00 | -3.31 | -8.60 | -5.98 | -11.93 | -8.90 | -15.57 |
| 2 | 10.000 | 3.90 | -4.79 | .00 | .00 | -3.08 | -13.65 | -6.40 | -17.74 |
| 3 | 5.000 | 8.11 | -5.34 | 3.54 | -10.95 | .00 | .00 | -3.76 | -19.40 |
| 4 | 3.000 | 14.24 | -5.85 | 8.65 | -11.88 | 4.41 | -16.11 | .00 | .00 |
| 5 | 2.000 | 22.91 | -6.35 | 15.76 | -12.82 | 10.49 | -17.33 | 5.13 | -21.34 |
| 6 | 1.500 | 32.94 | -6.75 | 23.83 | -13.55 | 17.30 | -18.20 | 10.80 | -22.29 |
| 7 | 1.200 | 44.67 | -7.10 | 33.06 | -14.25 | 24.99 | -19.11 | 17.11 | -23.54 |
| 8 | .950 | 63.51 | -7.48 | 47.46 | -14.97 | 36.73 | -19.99 | 26.59 | -24.52 |

| (R, ANGLE) = POS | R | 2.000 r | 7.429 rs | 1.500 r | 8.366 rs | 1.200 r | 9.151 rs | .950 r | 10.000 rs |
|---|---|---|---|---|---|---|---|---|---|
| 1 | .000 |  | 1.600 |  | 1.718 |  | 1.804 |  | 1.893 |
| 2 | 10.000 |  | 2.310 |  | 2.424 |  | 2.498 |  | 2.574 |
| 3 | 5.000 |  | 2.856 |  | 2.958 |  | 3.013 |  | 3.071 |
| 4 | 3.000 |  | 3.493 |  | 3.577 |  | 3.601 |  | 3.633 |
| 5 | 2.000 | 4.289 | .000 |  | 4.313 |  | 4.277 |  | 4.275 |
| 6 | 1.500 |  | 5.033 | 4.934 | .000 |  | 4.876 |  | 4.869 |
| 7 | 1.200 |  | 5.748 |  | 5.608 | 5.589 | .000 |  | 5.227 |
| 8 | .950 |  | 6.830 |  | 6.633 |  | 6.536 | 6.260 | .000 |

| POS | R | bf | 1 | bf | 1 | bf | 1 | bf | 1 |
|---|---|---|---|---|---|---|---|---|---|
| 1 | .000 | -11.89 | -18.96 | -14.37 | -22.05 | -16.51 | -24.38 | -18.93 | -27.14 |
| 2 | 10.000 | -9.74 | -21.12 | -12.49 | -24.56 | -14.83 | -26.83 | -17.47 | -29.66 |
| 3 | 5.000 | -7.49 | -22.43 | -10.53 | -26.29 | -13.09 | -28.40 | -15.95 | -31.30 |
| 4 | 3.000 | -4.31 | -23.22 | -7.76 | -28.21 | -10.64 | -29.91 | -13.82 | -32.93 |
| 5 | 2.000 | .00 | .00 | -4.04 | -32.10 | -7.36 | -31.37 | -10.99 | -34.66 |
| 6 | 1.500 | 4.71 | -27.17 | .00 | .00 | -3.83 | -30.02 | -7.96 | -35.79 |
| 7 | 1.200 | 9.90 | -29.09 | 4.40 | -32.20 | .00 | .00 | -4.69 | -40.03 |
| 8 | .950 | 17.56 | -29.64 | 10.84 | -31.46 | 5.55 | -32.72 | .00 | .00 |

Condition Corresponding Values: $K_{a0}/\gamma_{a0} = 9.49$, $K_{aR}/\gamma_{aR} = 0.30$ As can be seen from Tables 6, 7, and 8 above, when a change in conversion coefficient $K_a$: (rs) (e.g., the fourth column in the first table) and a change in correction coefficient μ: (l) (e.g., the fourth column in the second table) at a given lens arrangement (e.g., at the infinity in-focus arrangement) are considered, the conversion coefficient $K_a$ and the correction coefficient μ considerably change depending on the object positions. In particular, the conversion coefficient $K_a$ has a larger value at the closest object side than that at the infinity object side. Since the conversion coefficient $K_a$ in the direction of rotation is defined by $K_a = \Delta Bf/\Delta a$, the amount $\Delta a$ of rotation for focusing at the infinity object side becomes larger than that at the closest object side relative to the defocus amount $\Delta Bf$.

The calculation results of the rate of change of $K_a$ with respect to $\gamma_a$ at the infinity in-focus arrangement and the closest in-focus arrangement at the wide-angle end (F=28.8), middle position (F=85.0), and telephoto end (F=194.0) in the comparative example I are as follows.

| Comparative Example I | | |
|---|---|---|
|  | Infinity Arrangement $K_{a0}/\gamma_{a0}$ | Closest Arrangement $K_{aR}/\gamma_{aR}$ |
| Wide-angle End (F = 28.8) | 5.05 | 0.33 |
| Middle Position (F = 85.0) | 6.24 | 0.32 |
| Telephoto End (F = 194.0) | 9.49 | 0.30 |

As described above, in the comparative example I, since the change in conversion coefficient $K_a$ is large, the contribution of the correction term ($\Delta Bf/\mu$) in $K_a = \gamma_a(1-\Delta Bf/\mu)$ becomes large, and the value of the correction coefficient μ becomes close to that of the defocus amount $\Delta Bf$. In addition, the value of the correction coefficient μ largely changes depending on the object positions.

Therefore, as described in Japanese Patent Application Laid-Open No. 3-228006, under the condition that only a pair of a conversion coefficient $\gamma_a$ value and a correction coefficient μ value are set for a given lens arrangement range (e.g., an infinity in-focus arrangement range), if the correction coefficient μ which changes largely is represented by only one value, a large error is included in the value of the conversion coefficient $K_a$ which is calculated from the conversion coefficient $\gamma_a$ and the correction coefficient μ. Therefore, when the lens driving amount Δa for focusing is finally calculated from the defocus amount ΔBf using the conversion coefficient $K_a$, the lens driving amount includes an error, and an auto-focus operation cannot be accurately performed.

For example, upon calculation of the lens driving amount Δa for focusing with respect to a closest distance (R=0.95 m) object when the correction coefficient μ (which changes from −4.79 to −7.48 depending on the object distances) at the infinity in-focus arrangement at the telephoto end (F=194.0) is represented by the value (μ=−6.35) at the middle object distance (R=2.0 m), the lens driving amount Δa for focusing is calculated as Δa=8.63 by substituting ΔBf=63.51, $\gamma_a$=0.669, and μ=−6.35. The actual lens driving amount for focusing from the state of the infinity in-focus arrangement at the telephoto end (F=194.0) to the closest distance (R=0.95 m) object is Δa=10.0 from (R, ANGLE)=(0.95, 10.0) in the upper right portion of the third table in Table 8. Therefore, an error as large as −13.7% is produced between the actual value and the calculated value Δa=8.74 of the lens driving amount for focusing.

Similarly, when the lens driving amounts upon focusing from the infinity in-focus lens arrangement to the closest distance object and upon focusing from the closest in-focus lens arrangement to the infinity object at the wide-angle end, middle position, and telephoto end are calculated from Δa=ΔBf/[$\gamma_a$(1−ΔBf/μ)], and errors from the actual lens driving amounts are then calculated, the following large values are obtained.

| | Comparative Example I | |
|---|---|---|
| | Infinity Arrangement → Closest In-focus State | Closest Arrangement → Infinity In-focus State |
| Wide-angle End (F = 28.8) | −9.3% | −27.2% |
| Middle Position (F = 85.0) | −11.7% | −28.3% |

| | Comparative Example I | |
|---|---|---|
| | Infinity Arrangement → Closest In-focus State | Closest Arrangement → Infinity In-focus State |
| Telephoto End (F = 194.0) | −13.7% | −28.9% |

Note that the value of the correction coefficient μ upon focusing from the infinity in-focus lens arrangement to the closest distance object adopts a value at the object distance (R=2.0 m), and the value of the correction coefficient μ upon focusing from the closest in-focus lens arrangement to the infinity object adopts a value at the object distance (R=3.0 m).

Finally, Table 9 summarizes the amount (ANGLE DA) of rotation for focusing upon manual focusing using the focus cam (the middle table in Table 1) of the comparative example I, the amount DX (mm) of movement, in the direction of the optical axis, of the focusing lens unit corresponding to the amount of rotation for focusing, and a displacement amount Bf (mm) of the imaging point when the amount (DX) of movement in the direction of the optical axis is given.

The upper table in Table 9 summarizes the displacement amount (Bf) of the imaging point corresponding to the photographing distances (R=5.0, 3.0, 2.0, 1.5, 1.2, and 0.95 m) in the respective zooming states of the focal lengths (F=28.8, 35.0, 50.0, 85.0, 135.0, and 194.0 mm), and the middle table summarizes the values of the amount (ANGLE DA) of rotation for focusing required for attaining an optimal in-focus state with respect to the respective photographing distances. The lower table summarizes the amounts (DX) of movement, in the direction of the optical axis, of the respective lens units corresponding to the amount (ANGLE DA) of rotation for focusing in association with the focal lengths and the photographing distances. In the lower table, (F) is the focal length (mm) of the entire system, (R) is the photographing distance (m), and (DX) is the amount (mm) of movement, in the direction of the optical axis, of each of the first, second, third, and fourth lens units in turn from the right side (movement toward the object side is represented by a positive value).

TABLE 9

Displacement Amount Bf (mm) of Imaging Point and Amount DX (mm) of movement for focusing in Comparative Example I

| | | 0.95 m | 1.20 m | 1.50 m | 2.00 m | 3.00 m | 5.00 m |
|---|---|---|---|---|---|---|---|
| F | 28.800 Bf | .000 | .000 | .000 | .000 | .000 | .000 |
| F | 35.000 Bf | .000 | .004 | .003 | −.002 | −.001 | −.001 |
| F | 50.000 Bf | .000 | .014 | .023 | .007 | −.007 | −.009 |
| F | 85.000 Bf | .000 | .005 | .029 | .021 | .007 | −.035 |
| F | 135.000 Bf | .000 | −.068 | −.044 | −.067 | −.072 | −.069 |
| F | 194.000 Bf | .000 | .000 | .000 | .000 | .000 | .000 |
| | ANGLE DA | 10.000 | 9.151 | 8.366 | 7.429 | 6.197 | 4.807 |
| F | 28.800 DX | .000 | .536 | .000 | .000 | R | 0.95 m |
| F | 35.000 DX | .000 | .622 | .000 | .000 | R | 0.95 m |
| F | 50.000 DX | .000 | .855 | .000 | .000 | R | 0.95 m |
| F | 85.000 DX | .000 | 1.519 | .000 | .000 | R | 0.95 m |
| F | 135.000 DX | .000 | 2.800 | .000 | .000 | R | 0.95 m |
| F | 194.000 DX | .000 | 4.673 | .000 | .000 | R | 0.95 m |
| F | 28.800 DX | .000 | .419 | .000 | .000 | R | 1.20 m |

TABLE 9-continued

Displacement Amount Bf (mm) of Imaging Point and Amount DX (mm) of movement for focusing in Comparative Example I

| | | | | | | | | |
|---|---|---|---|---|---|---|---|---|
| F | 35.000 | DX | .000 | .485 | .000 | .000 | R | 1.20 m |
| F | 50.000 | DX | .000 | .669 | .000 | .000 | R | 1.20 m |
| F | 85.000 | DX | .000 | 1.214 | .000 | .000 | R | 1.20 m |
| F | 135.000 | DX | .000 | 2.319 | .000 | .000 | R | 1.20 m |
| F | 194.000 | DX | .000 | 4.008 | .000 | .000 | R | 1.20 m |
| F | 28.800 | DX | .000 | .332 | .000 | .000 | R | 1.50 m |
| F | 35.000 | DX | .000 | .385 | .000 | .000 | R | 1.50 m |
| F | 50.000 | DX | .000 | .530 | .000 | .000 | R | 1.50 m |
| F | 85.000 | DX | .000 | .975 | .000 | .000 | R | 1.50 m |
| F | 135.000 | DX | .000 | 1.919 | .000 | .000 | R | 1.50 m |
| F | 194.000 | DX | .000 | 3.445 | .000 | .000 | R | 1.50 m |
| F | 28.800 | DX | .000 | .247 | .000 | .000 | R | 2.00 m |
| F | 35.000 | DX | .000 | .289 | .000 | .000 | R | 2.00 m |
| F | 85.000 | DX | .000 | .738 | .000 | .000 | R | 2.00 m |
| F | 135.000 | DX | .000 | 1.501 | .000 | .000 | R | 2.00 m |
| F | 194.000 | DX | .000 | 2.813 | .000 | .000 | R | 2.00 m |
| F | 28.800 | DX | .000 | .163 | .000 | .000 | R | 3.00 m |
| F | 35.000 | DX | .000 | .191 | .000 | .000 | R | 3.00 m |
| F | 50.000 | DX | .000 | .269 | .000 | .000 | R | 3.00 m |
| F | 85.000 | DX | .000 | .499 | .000 | .000 | R | 3.00 m |
| F | 135.000 | DX | .000 | 1.050 | .000 | .000 | R | 3.00 m |
| F | 194.000 | DX | .000 | 2.082 | .000 | .000 | R | 3.00 m |
| F | 28.800 | DX | .000 | .097 | .000 | .000 | R | 5.00 m |
| F | 35.000 | DX | .000 | .114 | .000 | .000 | R | 5.00 m |
| F | 50.000 | DX | .000 | .162 | .000 | .000 | R | 5.00 m |
| F | 85.000 | DX | .000 | .310 | .000 | .000 | R | 5.00 m |
| F | 135.000 | DX | .000 | .659 | .000 | .000 | R | 5.00 m |
| F | 194.000 | DX | .000 | 1.387 | .000 | .000 | R | 5.00 m |

The rate of change of the conversion coefficient $\gamma_x$ with respect to the amount x of movement in the direction of the optical axis and the rate of change of the conversion coefficient $\gamma_a$ with respect to the angle a of rotation of the rotatable lens barrel will be examined below in association with a case in which the amount of rotation corresponding to the zooming from the wide-angle end to the telephoto end and the ratio of amounts of rotation ($a_F/a_Z$) with respect to the focusing from the infinity in-focus state to the closest in-focus state are set to be 1.0 in the fifth embodiment of the present invention, like in an embodiment of Japanese Patent Application Laid-open No. 5-142475 mentioned above. Note that the amount of rotation for zooming from the wide-angle end to the telephoto end and the amount of rotation for focusing are respectively re-set to be 10.0 for the purpose of a comparison with an embodiment of the present invention.

Table 10 below summarizes various paraxial data of an optical system and data for defining the shape of a focus cam in a case in which the ratio of the amounts of rotation ($a_F/a_Z$) is set to be 1.0 in the fifth embodiment of the present invention, like in the embodiment of Japanese Patent Application Laid-Open No. 5-142475 (said case will be hereinafter called the comparative example II).

The upper table in Table 10 summarizes the focal length data and principal point interval data of the respective lens units of the optical system corresponding to the comparative example II. In this table, F1, F2, F3, F4 and F5 are respectively the focal lengths of first, second, third and fourth lens units, and D1, D2, D3, and D4 are respectively the principal point interval between the first and second lens units, the principal point interval between the second and third lens units, the principal point interval between the third and fourth lens units, the principal point interval between the fourth and fifth lens units, and the principal point interval between the fourth lens unit and a predetermined imaging plane in six zooming states (focal lengths F=28.8 (1-POS), 35.0 (2-POS), 50.0 (3-POS), 70.0 (4-POS), 95.0 (5-POS), and 126.0 mm (6-POS)).

The middle table in Table 10 summarizes spline sample point data when the shape of the focus cam in the fourth lens unit which is used for focusing is expressed by a spline function associated with the angle a of rotation of a rotatable lens barrel and the amount x of movement in the direction of the optical axis. In this middle table, (1), (2), (3), (4) and (5) correspond to the first, second, third, fourth, and fifth lens units, respectively.

Furthermore, the lower table in Table 10 summarizes the infinity focusing positions (infinity corresponding positions) at the respective focal lengths (F=28.8, 35.0, 50.0, 70.0, 95.0, and 126.0 mm), and the amounts of rotation (amounts of rotation for focusing) upon focusing to respective photographing distances (R=5.0, 3.0, 2.0, 1.5, 1.0, and 0.8 m) using the focus cam. Since both the amount of rotation for zooming from the wide-angle end (F=28.8) to the telephoto end (F=126.0) and the amount of rotation for focusing from the infinity in-focus position to the closest in-focus position (R=0.80 m) are 10.0, the rotation amount ratio ($a_F/a_z$) of the amount of rotation for focusing to the amount of rotation for zooming is 1.0.

TABLE 10

| F = 28.8–126.0 Rotation Amount Ratio: $a_F/a_Z = 1.00$ | | | | | | | | |
|---|---|---|---|---|---|---|---|---|
| Focal Lengths and Principal Point Intervals of Lens Units of Comparative Example II | | | | | | | | |
| | | | 1-POS | 2-POS | 3-POS | 4-POS | 5-POS | 6-POS |
| | | F | 28.8000 | 35.0000 | 50.0000 | 70.0000 | 95.0000 | 126.0000 |
| F1 | 98.0000 | D1 | 9.3696 | 15.5678 | 26.0774 | 35.1343 | 42.9607 | 49.3378 |
| F2 | −20.2000 | D2 | 34.5121 | 30.5093 | 24.1872 | 19.0594 | 14.7856 | 10.6994 |
| F3 | 21.3000 | D3 | 8.9319 | 9.5307 | 10.6727 | 11.7442 | 12.4611 | 13.1911 |
| F4 | −19.6000 | D4 | 14.4820 | 13.8832 | 12.7412 | 11.6697 | 10.9528 | 10.2228 |
| F5 | 35.5000 | D5 | 49.8013 | 51.5975 | 55.0237 | 58.2383 | 61.1451 | 63.0195 |

Focus Cam Shape (Spline Interpolation Sample Point) of Comparative Example II

| | ANGLE | (1) | (2) | (3) | (4) | (5) |
|---|---|---|---|---|---|---|
| 1 | .0000 | .0000 | .0000 | .0000 | .0000 | .0000 |
| 2 | 4.2963 | .0000 | .0000 | .0000 | −.0524 | .0000 |
| 3 | 5.6678 | .0000 | .0000 | .0000 | −.0886 | .0000 |
| 4 | 6.8749 | .0000 | .0000 | .0000 | −.1351 | .0000 |
| 5 | 7.8043 | .0000 | .0000 | .0000 | −.1832 | .0000 |
| 6 | 9.1848 | .0000 | .0000 | .0000 | −.2845 | .0000 |
| 7 | 10.0000 | .0000 | .0000 | .0000 | −.3653 | .0000 |
| 8 | 14.2963 | .0000 | .0000 | .0000 | −1.2787 | .0000 |
| 9 | 15.6678 | .0000 | .0000 | .0000 | −1.9076 | .0000 |
| 10 | 16.8749 | .0000 | .0000 | .0000 | −2.7174 | .0000 |
| 11 | 17.8043 | .0000 | .0000 | .0000 | −3.5551 | .0000 |
| 12 | 19.1848 | .0000 | .0000 | .0000 | −5.3209 | .0000 |
| 13 | 20.0000 | .0000 | .0000 | .0000 | −6.7318 | .0000 |

Amount of Rotation for Zooming and Amount of Rotation for Focusing of Comparative Example II
Rotation Amount Ratio: $a_F/a_Z = 1.00$)

| Focal Length | Infinity Corresponding Position | Photographing Distance | Amount of Rotation for Focusing |
|---|---|---|---|
| 28.8 mm | .0000 | 5.00 m | 4.296 |
| 35.0 mm | 1.3838 | 3.00 m | 5.668 |
| 50.0 mm | 3.7931 | 2.00 m | 6.875 |
| 70.0 mm | 6.0270 | 1.50 m | 7.804 |
| 95.0 mm | 8.0868 | 1.00 m | 9.185 |
| 126.0 mm | 10.0000 | 0.80 m | 10.000 |
| Condition Corresponding Value (1) | | 1.31 | |
| Condition Corresponding Value (2) | | 17.44 | |
| Condition Corresponding Value (3) | | 1.00 | |
| Condition Corresponding Value (4) | | 14.24 (wide-angle end) 21.70 (telephoto end) | |
| Condition Corresponding Value (5) | | 4.76 (wide-angle end) 6.58 (telephoto end) | |
| Condition Corresponding Value (6) | | 0.34 (wide-angle end) 0.28 (telephoto end) | |

Table 11 below summarizes the numerical value data of the cams of the focusing lens unit in the comparative example II, which data are calculated by interpolation based on a spline function on the basis of the sample data of the focus cam summarized in the middle table in Table 10. In this table, (ANGLE) is the angle of rotation of the rotatable lens barrel, (4) is the amount (mm) of movement, in the direction of the optical axis, of the second lens unit, and (F) is the focal length (mm) of the entire system in an infinity in-focus state corresponding to the amount (ANGLE) of rotation.

TABLE 11

Cam Numerical Value Data of Focusing Lens Units in Comparative Example II

| Focus Cam numerical Value Data | | | Zoom Comparative Cam Numerical Value Data | | |
|---|---|---|---|---|---|
| ANGLE | (4) | F | ANGLE | (4) | F |
| .0000 | .0000 | 28.8000 | .0000 | .0000 | 28.8000 |
| .5000 | −.0039 | 30.8977 | .5000 | .4276 | 30.8977 |
| 1.0000 | −.0079 | 33.1447 | 1.0000 | .8636 | 33.1447 |
| 1.5000 | −.0124 | 35.5868 | 1.5000 | 1.3155 | 35.5868 |
| 2.0000 | −.0173 | 38.2569 | 2.0000 | 1.7855 | 38.2569 |
| 2.5000 | −.0231 | 41.1789 | 2.5000 | 2.2688 | 41.1789 |
| 3.0000 | −.0297 | 44.3685 | 3.0000 | 2.7579 | 44.3685 |
| 3.5000 | −.0374 | 47.8358 | 3.5000 | 3.2440 | 47.8358 |
| 4.0000 | −.0464 | 51.5859 | 4.0000 | 3.7188 | 51.5859 |

TABLE 11-continued

Cam Numerical Value Data of Focusing Lens Units in Comparative Example II

| Focus Cam numerical Value Data | | | Zoom Comparative Cam Numerical Value Data | | |
|---|---|---|---|---|---|
| ANGLE | (4) | F | ANGLE | (4) | F |
| 4.5000 | −.0569 | 55.6175 | 4.5000 | 4.1839 | 55.6175 |
| 5.0000 | −.0691 | 59.9543 | 5.0000 | 4.6556 | 59.9543 |
| 5.5000 | −.0833 | 64.6457 | 5.5000 | 5.1530 | 64.6457 |
| 6.0000 | −.0998 | 69.7157 | 6.0000 | 5.6946 | 69.7157 |
| 6.5000 | −.1189 | 75.1502 | 6.5000 | 6.2879 | 75.1502 |
| 7.0000 | −.1408 | 80.9450 | 7.0000 | 6.8895 | 80.9450 |
| 7.5000 | −.1660 | 87.1351 | 7.5000 | 7.4492 | 87.1351 |
| 8.0000 | −.1951 | 93.7913 | 8.0000 | 7.9384 | 93.7913 |
| 8.5000 | −.2291 | 101.0094 | 8.5000 | 8.3526 | 101.0094 |
| 9.0000 | −.2684 | 108.8867 | 9.0000 | 8.7143 | 108.8867 |
| 9.5000 | −.3139 | 117.4149 | 9.5000 | 9.0402 | 117.4149 |
| 10.0000 | −.3653 | 126.0000 | 10.0000 | 9.3243 | 126.0000 |
| 10.5000 | −.4227 | .0000 | | | |
| 11.0000 | −.4879 | .0000 | | | |
| 11.5000 | −.5633 | .0000 | | | |
| 12.0000 | −.6511 | .0000 | | | |
| 12.5000 | −.7536 | .0000 | | | |
| 13.0000 | −.8731 | .0000 | | | |
| 13.5000 | −1.0119 | .0000 | | | |
| 14.0000 | −1.1724 | .0000 | | | |
| 14.5000 | −1.3569 | .0000 | | | |
| 15.0000 | −1.5693 | .0000 | | | |
| 15.5000 | −1.8160 | .0000 | | | |
| 16.0000 | −2.1031 | .0000 | | | |
| 16.5000 | −2.4356 | .0000 | | | |
| 17.0000 | −2.8180 | .0000 | | | |
| 17.5000 | −3.2565 | .0000 | | | |
| 18.0000 | −3.7613 | .0000 | | | |
| 18.5000 | −4.3476 | .0000 | | | |
| 19.0000 | −5.0362 | .0000 | | | |
| 19.5000 | −5.8441 | .0000 | | | |
| 20.0000 | −6.7318 | .0000 | | | |

The left table in Table 11 summarizes the numerical value data of the focus cam in the comparative example II, and the right table in Table 11 summarizes the numerical value data of the zoom compensation cam of the comparative example II. A value obtained by synthesizing the amount (4) of movement in the direction of the optical axis in the numerical value data of the focus cam and the amount (4) of movement in the direction of the optical axis in the numerical value data of the zoom compensation cam in a range from the amount of rotation (ANGLE=0.0) to the amount of rotation (ANGLE=10.0) agrees with the movement locus of the fourth lens unit calculated using the paraxial data in the upper table in Table 10.

Tables 12, 13, and 14 below summarize the amount DX (mm) of movement for focusing, in the direction of the optical axis, of the focusing lens unit, the imaging magnifications $\beta_k$ of the respective lens units, the conversion coefficient $\gamma_x$ associated with the direction of the optical axis, the slope (dx/da) of the focus cam, and the conversion coefficient $\gamma_a$ associated with the direction of rotation at the wide-angle end (F=28.8), the middle position (F=70.0), and the telephoto end (F=126.0), respectively. In these tables, (R) on the left side is the photographing distance (m), (ANG) is the amount of rotation on the focus cam upon focusing to the respective photographing distances, and 1), 2), 3), 4), and 5) on the right side respectively represent the first, second, third, fourth, and fifth lens units. Also, in these tables, the first table summarizes the amount DX (mm) of movement for focusing in the direction of the optical axis upon focusing to the respective photographing distances (R=10.0, 5.0, 3.0, 2.0, 1.5, 1.0 and 0.8 m) (note that movement toward the object side is positive). The second table summarizes the imaging magnifications $\beta_k$ of the respective lens units in an in-focus state at the respective photographing distances (R=10.0, 5.0, 3.0, 2.0, 1.5, 1.0, and 0.8 m). The third table summarizes the conversion coefficient $\gamma_x$ associated with the direction of the optical axis of the focusing lens unit in an in-focus state at the respective photographing distances (R=10.0, 5.0, 3.0, 2.0, 1.5, 1.0, and 0.8 m). Furthermore, the fourth table summarizes the slope (dx/da) of the focus cam at the positions, on the focus cam, corresponding to an in-focus state at the respective photographing distances (R=10.0, 5.0, 3.0, 2.0, 1.5, 1.0, and 0.8 m), and the fifth table summarizes the conversion coefficient $\gamma_a$ associated with the direction of rotation of the focusing lens unit in an in-focus state at the respective photographing distances (R=10.0, 5.0, 3.0, 2.0, 1.5, 1.0, and 0.8 m).

TABLE 12

Amount DX (mm) of Movement for Focusing in Direction of Optical Axis at Wide-angle End (28.8 mm) in Comparative Example II

| R | .000 | ANG | .000 | 1) | .000 | 2) | .000 | 3) | .000 | 4) | .000 | 5) | .000 |
|---|---|---|---|---|---|---|---|---|---|---|---|---|---|
| R | 10.000 | ANG | 2.729 | 1) | .000 | 2) | .000 | 3) | .000 | 4) | −.026 | 5) | .000 |
| R | 5.000 | ANG | 4.296 | 1) | .000 | 2) | .000 | 3) | .000 | 4) | −.052 | 5) | .000 |
| R | 3.000 | ANG | 5.668 | 1) | .000 | 2) | .000 | 3) | .000 | 4) | −.089 | 5) | .000 |
| R | 2.000 | ANG | 6.875 | 1) | .000 | 2) | .000 | 3) | .000 | 4) | −.135 | 5) | .000 |
| R | 1.500 | ANG | 7.804 | 1) | .000 | 2) | .000 | 3) | .000 | 4) | −.183 | 5) | .000 |
| R | 1.000 | ANG | 9.185 | 1) | .000 | 2) | .000 | 3) | .000 | 4) | −.284 | 5) | .000 |
| R | .800 | ANG | 10.000 | 1) | .000 | 2) | .000 | 3) | .000 | 4) | −.365 | 5) | .000 |

Imaging Magnification $\beta_k$ of Lens Units at Wide-angle End (28.8 mm) in Comparative Example II

| R | .000 | ANG | .000 | 1) | .000 | 2) | −.295 | 3) | −.541 | 4) | −4.568 | 5) | −.403 |
|---|---|---|---|---|---|---|---|---|---|---|---|---|---|
| R | 10.000 | ANG | 2.729 | 1) | −.010 | 2) | −.291 | 3) | −.542 | 4) | −4.570 | 5) | −.403 |
| R | 5.000 | ANG | 4.296 | 1) | −.020 | 2) | −.287 | 3) | −.543 | 4) | −4.571 | 5) | −.403 |
| R | 3.000 | ANG | 5.668 | 1) | −.035 | 2) | −.281 | 3) | −.545 | 4) | −4.573 | 5) | −.403 |
| R | 2.000 | ANG | 6.875 | 1) | −.055 | 2) | −.274 | 3) | −.547 | 4) | −4.575 | 5) | −.403 |
| R | 1.500 | ANG | 7.804 | 1) | −.076 | 2) | −.266 | 3) | −.549 | 4) | −4.578 | 5) | −.403 |
| R | 1.000 | ANG | 9.185 | 1) | −.125 | 2) | −.250 | 3) | −.554 | 4) | −4.583 | 5) | −.403 |
| R | .800 | ANG | 10.000 | 1) | −.168 | 2) | −.238 | 3) | −.557 | 4) | −4.587 | 5) | −.403 |

Conversion Coefficient $\gamma_x$ Associated With Direction of Optical Axis at Wide-angle End (28.8 mm) in Comparative Example II

| R | .000 | ANG | .000 | 1) | .000 | 2) | .000 | 3) | .000 | 4) | −3.225 | 5) | .000 |
|---|---|---|---|---|---|---|---|---|---|---|---|---|---|
| R | 10.000 | ANG | 2.729 | 1) | .000 | 2) | .000 | 3) | .000 | 4) | −3.227 | 5) | .000 |

TABLE 12-continued

| | | | | | | | | | | | | |
|---|---|---|---|---|---|---|---|---|---|---|---|---|
| R | 5.000 | ANG | 4.296 | 1) | .000 | 2) | .000 | 3) | .000 | 4) −3.229 | 5) | .000 |
| R | 3.000 | ANG | 5.668 | 1) | .000 | 2) | .000 | 3) | .000 | 4) −3.231 | 5) | .000 |
| R | 2.000 | ANG | 6.875 | 1) | .000 | 2) | .000 | 3) | .000 | 4) −3.235 | 5) | .000 |
| R | 1.500 | ANG | 7.804 | 1) | .000 | 2) | .000 | 3) | .000 | 4) −3.239 | 5) | .000 |
| R | 1.000 | ANG | 9.185 | 1) | .000 | 2) | .000 | 3) | .000 | 4) −3.246 | 5) | .000 |
| R | .800 | ANG | 10.000 | 1) | .000 | 2) | .000 | 3) | .000 | 4) −3.252 | 5) | .000 |
| Slope dx/da of Focus Cam at Wide-angle End (28.8 mm) in Comparative Example II ||||||||||||
| R | .000 | ANG | .000 | 1) | .000 | 2) | .000 | 3) | .000 | 4) −.008 | 5) | .000 |
| R | 10.000 | ANG | 2.729 | 1) | .000 | 2) | .000 | 3) | .000 | 4) −.013 | 5) | .000 |
| R | 5.000 | ANG | 4.296 | 1) | .000 | 2) | .000 | 3) | .000 | 4) −.021 | 5) | .000 |
| R | 3.000 | ANG | 5.668 | 1) | .000 | 2) | .000 | 3) | .000 | 4) −.032 | 5) | .000 |
| R | 2.000 | ANG | 6.875 | 1) | .000 | 2) | .000 | 3) | .000 | 4) −.045 | 5) | .000 |
| R | 1.500 | ANG | 7.804 | 1) | .000 | 2) | .000 | 3) | .000 | 4) −.059 | 5) | .000 |
| R | 1.000 | ANG | 9.185 | 1) | .000 | 2) | .000 | 3) | .000 | 4) −.089 | 5) | .000 |
| R | .800 | ANG | 10.000 | 1) | .000 | 2) | .000 | 3) | .000 | 4) −.109 | 5) | .000 |
| Conversion Coefficient $\gamma_a$ Associated With Direction of Rotation at Wide-angle End (28.8 mm) in Comparative Example II ||||||||||||
| R | .000 | ANG | .000 | 1) | .000 | 2) | .000 | 3) | .000 | 4) .025 | 5) | .000 |
| R | 10.000 | ANG | 2.729 | 1) | .000 | 2) | .000 | 3) | .000 | 4) .042 | 5) | .000 |
| R | 5.000 | ANG | 4.296 | 1) | .000 | 2) | .000 | 3) | .000 | 4) .069 | 5) | .000 |
| R | 3.000 | ANG | 5.668 | 1) | .000 | 2) | .000 | 3) | .000 | 4) .104 | 5) | .000 |
| R | 2.000 | ANG | 6.875 | 1) | .000 | 2) | .000 | 3) | .000 | 4) .146 | 5) | .000 |
| R | 1.500 | ANG | 7.804 | 1) | .000 | 2) | .000 | 3) | .000 | 4) .192 | 5) | .000 |
| R | 1.000 | ANG | 9.185 | 1) | .000 | 2) | .000 | 3) | .000 | 4) .290 | 5) | .000 |
| R | .800 | ANG | 10.000 | 1) | .000 | 2) | .000 | 3) | .000 | 4) .353 | 5) | .000 |

Condition Corresponding Values: $\gamma_{xR}/\gamma_{xO} = \gamma_{aR}/\gamma_{aO} = 14.24$

TABLE 13

| | | | | | | | | | | | | |
|---|---|---|---|---|---|---|---|---|---|---|---|---|
| Amount DX (mm) of Movement for Focusing in Direction of Optical Axis at Middle Position (70.0 mm) in Comparative Example II ||||||||||||
| R | .000 | ANG | .000 | 1) | .000 | 2) | .000 | 3) | .000 | 4) .000 | 5) | .000 |
| R | 10.000 | ANG | 2.704 | 1) | .000 | 2) | .000 | 3) | .000 | 4) −.146 | 5) | .000 |
| R | 5.000 | ANG | 4.237 | 1) | .000 | 2) | .000 | 3) | .000 | 4) −.294 | 5) | .000 |
| R | 3.000 | ANG | 5.671 | 1) | .000 | 2) | .000 | 3) | .000 | 4) −.496 | 5) | .000 |
| R | 2.000 | ANG | 6.903 | 1) | .000 | 2) | .000 | 3) | .000 | 4) −.754 | 5) | .000 |
| R | 1.500 | ANG | 7.822 | 1) | .000 | 2) | .000 | 3) | .000 | 4) −1.021 | 5) | .000 |
| R | 1.000 | ANG | 9.204 | 1) | .000 | 2) | .000 | 3) | .000 | 4) −1.578 | 5) | .000 |
| R | .800 | ANG | 10.000 | 1) | .000 | 2) | .000 | 3) | .000 | 4) −2.019 | 5) | .000 |
| Imaging Magnification $\beta_K$ of Lens Lens Units at Middle Position (70.0 mm) in Comparative Example II ||||||||||||
| R | .000 | ANG | .000 | 1) | .000 | 2) | −.473 | 3) | −.774 | 4) −3.044 | 5) | −.641 |
| R | 10.000 | ANG | 2.704 | 1) | −.010 | 2) | −.463 | 3) | −.780 | 4) −3.051 | 5) | −.641 |
| R | 5.000 | ANG | 4.237 | 1) | −.021 | 2) | −.452 | 3) | −.786 | 4) −3.059 | 5) | −.641 |
| R | 3.000 | ANG | 5.671 | 1) | −.035 | 2) | −.438 | 3) | −.795 | 4) −3.069 | 5) | −.641 |
| R | 2.000 | ANG | 6.903 | 1) | −.055 | 2) | −.420 | 3) | −.806 | 4) −3.082 | 5) | −.641 |
| R | 1.500 | ANG | 7.822 | 1) | −.077 | 2) | −.402 | 3) | −.817 | 4) −3.096 | 5) | −.641 |
| R | 1.000 | ANG | 9.204 | 1) | −.128 | 2) | −.366 | 3) | −.840 | 4) −3.124 | 5) | −.641 |
| R | .800 | ANG | 10.000 | 1) | −.173 | 2) | −.339 | 3) | −.859 | 4) −3.147 | 5) | −.641 |
| Conversion Coefficient $\gamma_x$ Associated With Direction of Optical Axis at Middle Position (70.0 mm) in Comparative Example II ||||||||||||
| R | .000 | ANG | .000 | 1) | .000 | 2) | .000 | 3) | .000 | 4) −3.390 | 5) | .000 |
| R | 10.000 | ANG | 2.704 | 1) | .000 | 2) | .000 | 3) | .000 | 4) −3.409 | 5) | .000 |
| R | 5.000 | ANG | 4.237 | 1) | .000 | 2) | .000 | 3) | .000 | 4) −3.428 | 5) | .000 |
| R | 3.000 | ANG | 5.671 | 1) | .000 | 2) | .000 | 3) | .000 | 4) −3.454 | 5) | .000 |
| R | 2.000 | ANG | 6.903 | 1) | .000 | 2) | .000 | 3) | .000 | 4) −3.487 | 5) | .000 |
| R | 1.500 | ANG | 7.822 | 1) | .000 | 2) | .000 | 3) | .000 | 4) −3.521 | 5) | .000 |
| R | 1.000 | ANG | 9.204 | 1) | .000 | 2) | .000 | 3) | .000 | 4) −3.594 | 5) | .000 |
| R | .800 | ANG | 10.000 | 1) | .000 | 2) | .000 | 3) | .000 | 4) −3.652 | 5) | .000 |
| Slope dx/da of Focus Cam at Middle Position (70.0 mm) in Comparative Example II ||||||||||||
| R | .000 | ANG | .000 | 1) | .000 | 2) | .000 | 3) | .000 | 4) −.036 | 5) | .000 |
| R | 10.000 | ANG | 2.704 | 1) | .000 | 2) | .000 | 3) | .000 | 4) −.078 | 5) | .000 |
| R | 5.000 | ANG | 4.237 | 1) | .000 | 2) | .000 | 3) | .000 | 4) −.115 | 5) | .000 |
| R | 3.000 | ANG | 5.671 | 1) | .000 | 2) | .000 | 3) | .000 | 4) −.173 | 5) | .000 |
| R | 2.000 | ANG | 6.903 | 1) | .000 | 2) | .000 | 3) | .000 | 4) −.252 | 5) | .000 |
| R | 1.500 | ANG | 7.822 | 1) | .000 | 2) | .000 | 3) | .000 | 4) −.330 | 5) | .000 |
| R | 1.000 | ANG | 9.204 | 1) | .000 | 2) | .000 | 3) | .000 | 4) −.490 | 5) | .000 |
| R | .800 | ANG | 10.000 | 1) | .000 | 2) | .000 | 3) | .000 | 4) −.623 | 5) | .000 |

TABLE 13-continued

Conversion Coefficient $\gamma_a$ Associated With Direction of Rotation at Middle Position (70.0 mm) in Comparative Example II

| R | | ANG | | 1) | | 2) | | 3) | | 4) | | 5) | |
|---|---|---|---|---|---|---|---|---|---|---|---|---|---|
| R | .000 | ANG | .000 | 1) | .000 | 2) | .000 | 3) | .000 | 4) | .122 | 5) | .000 |
| R | 10.000 | ANG | 2.704 | 1) | .000 | 2) | .000 | 3) | .000 | 4) | .267 | 5) | .000 |
| R | 5.000 | ANG | 4.237 | 1) | .000 | 2) | .000 | 3) | .000 | 4) | .394 | 5) | .000 |
| R | 3.000 | ANG | 5.671 | 1) | .000 | 2) | .000 | 3) | .000 | 4) | .596 | 5) | .000 |
| R | 2.000 | ANG | 6.903 | 1) | .000 | 2) | .000 | 3) | .000 | 4) | .879 | 5) | .000 |
| R | 1.500 | ANG | 7.822 | 1) | .000 | 2) | .000 | 3) | .000 | 4) | 1.162 | 5) | .000 |
| R | 1.000 | ANG | 9.204 | 1) | .000 | 2) | .000 | 3) | .000 | 4) | 1.761 | 5) | .000 |
| R | .800 | ANG | 10.000 | 1) | .000 | 2) | .000 | 3) | .000 | 4) | 2.275 | 5) | .000 |

Condition Corresponding Values: $\gamma_{aR}/\gamma_{x0} = 1.08$, $\gamma_{aR}/\gamma_{a0} = 18.73$

TABLE 14

Amount DX (mm) of Movement for Focusing in Direction of Optical Axis at Telephoto End (126.0 mm) in Comparative Example II

| R | .000 | ANG | .000 | 1) | .000 | 2) | .000 | 3) | .000 | 4) | .000 | 5) | .000 |
|---|---|---|---|---|---|---|---|---|---|---|---|---|---|
| R | 10.000 | ANG | 2.777 | 1) | .000 | 2) | .000 | 3) | .000 | 4) | -.452 | 5) | .000 |
| R | 5.000 | ANG | 4.296 | 1) | .000 | 2) | .000 | 3) | .000 | 4) | -.913 | 5) | .000 |
| R | 3.000 | ANG | 5.668 | 1) | .000 | 2) | .000 | 3) | .000 | 4) | -1.542 | 5) | .000 |
| R | 2.000 | ANG | 6.875 | 1) | .000 | 2) | .000 | 3) | .000 | 4) | -2.352 | 5) | .000 |
| R | 1.500 | ANG | 7.804 | 1) | .000 | 2) | .000 | 3) | .000 | 4) | -3.190 | 5) | .000 |
| R | 1.000 | ANG | 9.185 | 1) | .000 | 2) | .000 | 3) | .000 | 4) | -4.956 | 5) | .000 |
| R | .800 | ANG | 10.000 | 1) | .000 | 2) | .000 | 3) | .000 | 4) | -6.366 | 5) | .000 |

Imaging Magnification $\beta_K$ of Lens Units at Telephoto End (126.0 mm) in Comparative Example II

| R | .000 | ANG | .000 | 1) | -.000 | 2) | -.710 | 3) | -.890 | 4) | -2.626 | 5) | -.775 |
|---|---|---|---|---|---|---|---|---|---|---|---|---|---|
| R | 10.000 | ANG | 2.777 | 1) | -.010 | 2) | -.686 | 3) | -.908 | 4) | -2.649 | 5) | -.775 |
| R | 5.000 | ANG | 4.296 | 1) | -.021 | 2) | -.663 | 3) | -.927 | 4) | -2.673 | 5) | -.775 |
| R | 3.000 | ANG | 5.668 | 1) | -.036 | 2) | -.632 | 3) | -.952 | 4) | -2.705 | 5) | -.775 |
| R | 2.000 | ANG | 6.875 | 1) | -.056 | 2) | -.595 | 3) | -.985 | 4) | -2.746 | 5) | -.775 |
| R | 1.500 | ANG | 7.804 | 1) | -.078 | 2) | -.559 | 3) | -1.019 | 4) | -2.789 | 5) | -.775 |
| R | 1.000 | ANG | 9.185 | 1) | -.130 | 2) | -.491 | 3) | -1.092 | 4) | -2.879 | 5) | -.775 |
| R | .800 | ANG | 10.000 | 1) | -.176 | 2) | -.442 | 3) | -1.150 | 4) | -2.951 | 5) | -.775 |

Conversion Coefficient $\gamma_x$ Associated With Direction of Optical Axis at Telephoto End (126.0 mm) in Comparative Example II

| R | .000 | ANG | .000 | 1) | .000 | 2) | .000 | 3) | .000 | 4) | -3.543 | 5) | .000 |
|---|---|---|---|---|---|---|---|---|---|---|---|---|---|
| R | 10.000 | ANG | 2.777 | 1) | .000 | 2) | .000 | 3) | .000 | 4) | -3.617 | 5) | .000 |
| R | 5.000 | ANG | 4.296 | 1) | .000 | 2) | .000 | 3) | .000 | 4) | -3.692 | 5) | .000 |
| R | 3.000 | ANG | 5.668 | 1) | .000 | 2) | .000 | 3) | .000 | 4) | -3.795 | 5) | .000 |
| R | 2.000 | ANG | 6.875 | 1) | .000 | 2) | .000 | 3) | .000 | 4) | -3.931 | 5) | .000 |
| R | 1.500 | ANG | 7.804 | 1) | .000 | 2) | .000 | 3) | .000 | 4) | -4.073 | 5) | .000 |
| R | 1.000 | ANG | 9.185 | 1) | .000 | 2) | .000 | 3) | .000 | 4) | -4.380 | 5) | .000 |
| R | .800 | ANG | 10.000 | 1) | .000 | 2) | .000 | 3) | .000 | 4) | -4.632 | 5) | .000 |

Slope dx/da of Focus Cam at Telephoto End (126.0 mm) in Comparative Example II

| R | .000 | ANG | .000 | 1) | .000 | 2) | .000 | 3) | .000 | 4) | -.109 | 5) | .000 |
|---|---|---|---|---|---|---|---|---|---|---|---|---|---|
| R | 10.000 | ANG | 2.777 | 1) | .000 | 2) | .000 | 3) | .000 | 4) | -.241 | 5) | .000 |
| R | 5.000 | ANG | 4.296 | 1) | .000 | 2) | .000 | 3) | .000 | 4) | -.373 | 5) | .000 |
| R | 3.000 | ANG | 5.668 | 1) | .000 | 2) | .000 | 3) | .000 | 4) | -.560 | 5) | .000 |
| R | 2.000 | ANG | 6.875 | 1) | .000 | 2) | .000 | 3) | .000 | 4) | -.791 | 5) | .000 |
| R | 1.500 | ANG | 7.804 | 1) | .000 | 2) | .000 | 3) | .000 | 4) | -1.024 | 5) | .000 |
| R | 1.000 | ANG | 9.185 | 1) | .000 | 2) | .000 | 3) | .000 | 4) | -1.588 | 5) | .000 |
| R | .800 | ANG | 10.000 | 1) | .000 | 2) | .000 | 3) | .000 | 4) | -1.802 | 5) | .000 |

Conversion Coefficient $\gamma_a$ Associated With Direction of Rotation at Telephoto End (126.0 mm) in Comparative Example II

| R | .000 | ANG | .000 | 1) | .090 | 2) | .000 | 3) | .000 | 4) | .385 | 5) | .000 |
|---|---|---|---|---|---|---|---|---|---|---|---|---|---|
| R | 10.000 | ANG | 2.777 | 1) | .000 | 2) | .000 | 3) | .000 | 4) | .871 | 5) | .000 |
| R | 5.000 | ANG | 4.296 | 1) | .000 | 2) | .000 | 3) | .000 | 4) | 1.378 | 5) | .000 |
| R | 3.000 | ANG | 5.668 | 1) | .000 | 2) | .000 | 3) | .000 | 4) | 2.124 | 5) | .000 |
| R | 2.000 | ANG | 6.875 | 1) | .000 | 2) | .000 | 3) | .000 | 4) | 3.107 | 5) | .000 |
| R | 1.500 | ANG | 7.804 | 1) | .000 | 2) | .000 | 3) | .000 | 4) | 4.172 | 5) | .000 |
| R | 1.000 | ANG | 9.185 | 1) | .000 | 2) | .000 | 3) | .000 | 4) | 6.955 | 5) | .000 |
| R | .800 | ANG | 10.000 | 1) | .000 | 2) | .000 | 3) | .000 | 4) | 8.348 | 5) | .000 |

Condition Corresponding Values: $\gamma_{aR}/\gamma_{x0} = 1.31$, $\gamma_{aR}/\gamma_{a0} = 21.70$ As can be seen from Tables 12, 13, and 14, the conversion coefficient $\gamma_x$ associated with the direction of the optical axis and the slope (dx/da) of the focus cam at the respective focal lengths increase as the photographing distance becomes closer to the closest distance. Especially, the slope (dx/da) of the focus cam changes largely. Therefore, as can be seen from these tables, the conversion coefficient $\gamma_a$ associated with the direction of rotation, which is defined as the product of $\gamma_x$ and (dx/da), further increases.

More specifically, in a zoom lens in which the conversion coefficient $\gamma_x$ associated with the amount x of movement, in the direction of the optical axis, of the focusing lens unit in a closest in-focus state is larger than that in an infinity in-focus state, i.e., which satisfies:

$$1.0 < \gamma_{xR}/\gamma_{xO}$$

when the focus cam which satisfies the following inequality, i.e., the focus cam has a shape having a larger slope (dx/da) at the closest corresponding position than that at the infinity corresponding position:

$$1.0 << (dx/da)_R/(dx/da)_O$$

the following inequality is satisfied:

$$1.0 < \gamma_{xR}/\gamma_{xO} << \gamma_{aR}/\gamma_{aO}$$

The rate of change, from the infinity in-focus value ($\gamma_{aO}$) to the closest in-focus value ($\gamma_{aR}$), of the conversion coefficient $\gamma_a$ associated with the angle a of rotation of the rotatable lens barrel undesirably becomes larger than the rate of change, from the infinity in-focus value ($\gamma_{xO}$) to the closest in-focus value ($\gamma_{xR}$), of the conversion coefficient $\gamma_x$ associated with the amount x of movement in the direction of the optical axis.

From Tables 12, 13, and 14 above, the rate of change of $\gamma_a$ is ×14.24 at the wide-angle end (F=28.8), ×18.73 at the middle position (F=70.0), and ×21.70 at the telephoto end (F=126.0).

As described above, when the conversion coefficient $\gamma$ changes in correspondence with the lens arrangement (e.g., focusing), as described in Japanese Patent Application Laid-Open No. 3-228006, a plurality of pairs of data of the conversion coefficient $\gamma$ and the correction coefficient $\epsilon$ must be stored in the storage means in units of a plurality of divided focus ranges. Therefore, when the rate of change of $\gamma_a$ is large ($\gamma_{aR}/\gamma_{aO} >> 1.0$), the number of divisions increases, and the storage capacity inevitably becomes large, resulting in an increase in cost. For example, when a change in $\gamma_a$ in a single focus range is divided under the condition defined by the following inequality:

$$\gamma_{max}/\gamma_{min} < 1.2$$

the number N of divisions is expressed by inequality (a) below:

$$N > \log(\gamma_{MAX}/\gamma_{MIN})/\log(1.2)$$

Therefore, the numbers $N_W$, $N_M$, and $N_T$ of divisions at the wide-angle end, middle position, and telephoto end have large values as follows:

$$N_W > 14.6 \quad N_M > 16.1 \quad N_T > 16.9$$

The formula K=$\gamma$(1+$\epsilon$·$\Delta$Bf) presented by Japanese Patent Application Laid-Open No. 62-170924 is rewritten to the conversion coefficient $K_a$ associated with the angle a of rotation of the rotatable lens barrel:

$$K_a = \gamma_a(1+\epsilon \cdot \Delta Bf)$$

Then, the following formula is defined by using a correction coefficient $\mu$ ($\epsilon = -1/\mu$):

$$K_a = \gamma_a(1-\Delta Bf/\mu)$$

Tables 15, 16, and 17 below summarize the calculation results of the values of the conversion coefficient $K_a$ and the correction coefficient $\mu$ according to the comparative example II at the wide-angle end (F=28.8), middle position (F=70.0), and telephoto end (F=126.0) using the above formula.

In these tables, (R) is the object distance (m), (ANG) is the amount of rotation for focusing from the infinity corresponding position on the focus cam, (r) is the conversion coefficient $\gamma_a$ in the direction of rotation, (rs) is the conversion coefficient $K_a$, (bf) is the defocus amount (mm), and (l) is the correction coefficient $\mu$. Each table has a matrix structure, and eight rows in the vertical direction indicated by (POS) represent the object positions (R=10.0, 5.0, 3.0, 2.0, 1.5, 1.0, and 0.8 mm), and four pairs (R, ANGLE) in the horizontal direction represent the lens arrangements of the focusing lens unit.

More specifically, the position of the focusing lens in the first pair in the upper two tables in each of Tables 15, 16, and 17, i.e., in the third and fourth columns is (R, ANGLE)=(0.0, 0.0), and it indicates that this position corresponds to the infinity corresponding position. Therefore, the third column (r) in the first table represents the value of the conversion coefficient $\gamma_a$ in the direction of rotation when the focusing lens unit is focused on an infinity object, and the fourth column (rs) represents the value of the conversion coefficient $K_a$ when the focusing lens unit is moved from an in-focus state on an infinity object to an in-focus state at the object distance in the second column. Furthermore, the third column (bf) in the second table represents the defocus amount $\Delta$Bf from a predetermined imaging position when the position of the focusing lens unit corresponds to the infinity corresponding position, and an object is located at an object distance in the second column, and the fourth column (l) represents the value of the correction coefficient $\mu$ when the focusing lens unit is moved from an in-focus state on an infinity object to an in-focus state at the object distance in the second column.

Similarly, the position of the focusing lens in the fourth pair in the lower two tables in each of Tables 15, 16, and 17, i.e., in the ninth and tenth columns is (R, ANGLE)=(0.80, 10.0), and it indicates that this position corresponds to the closest in-focus (R=0.80 m) corresponding position. Therefore, the ninth column (r) in the third table represents the value of the conversion coefficient $\gamma_a$ in the direction of rotation when the focusing lens unit is focused on a closest distance (R=0.80 m) object, and the tenth column (rs) represents the value of the conversion coefficient $K_a$ when the focusing lens unit is moved from an in-focus state on the closest distance (R=0.80 m) object to an in-focus state at the object distance in the second column. Furthermore, the ninth column (bf) in the fourth table represents the defocus amount $\Delta$Bf from a predetermined imaging position when the position of the focusing lens unit corresponds to the closest corresponding position, and the object is located at an object distance in the second column, and the tenth column (l) represents the value of the correction coefficient $\mu$ when the focusing lens unit is moved from an in-focus state on the closest distance (R=0.80 m) object to an in-focus state at the object distance in the second column.

From the above formulas, since the conversion coefficient in the direction of rotation is calculated by $K_a = \Delta Bf/\Delta a$ (where $\Delta a$: the amount of rotation for focusing), and the correction coefficient $\mu$ is calculated by $\mu = \Delta Bf/(1-K_a/\gamma_a)$, the value of the conversion coefficient $K_a$ (eighth row, fourth column in first table: 0.118) when the focusing lens unit is moved from an in-focus state on the infinity object to an in-focus state at the object distance (R=0.80 m) in Table 15 is calculated by $K_a = 1.18/10.0 = 0.118$ using $\Delta Bf = 1.18$ and $\Delta a = 10.0$. On the other hand, the value of the correction coefficient $\mu$ (eighth row, fourth column in second table: −0.31) is calculated as $\mu = -0.31$ using $\Delta Bf = 1.18$, $K_a = 0.118$, and $\gamma_a = 0.025$.

TABLE 15

Conversion Coefficients $K_a$: (rs), $\gamma_a$: (r) Associated with Direction of Rotation and Correction Coefficient $\mu$; (l) at Wide-angle End (28.8 mm) in Comparative Example II
F = 28.8 mm

| (R, ANGLE) = | .000 | .000 | 10.000 | 2.729 | 5.000 | 4.296 | 3.000 | 5.668 |
|---|---|---|---|---|---|---|---|---|
| POS | R | r | rs | r | rs | r | rs | r | rs |
| 1 | .000 | .025 | .000 | | .031 | | .039 | | .050 |
| 2 | 10.000 | | .031 | .042 | .000 | | .055 | | .069 |
| 3 | 5.000 | | .039 | | .055 | .069 | .000 | | .085 |
| 4 | 3.000 | | .050 | | .069 | | .085 | .104 | .000 |
| 5 | 2.000 | | .063 | | .085 | | .104 | | .125 |
| 6 | 1.500 | | .076 | | .100 | | .120 | | .143 |
| 7 | 1.000 | | .100 | | .129 | | .153 | | .180 |
| 8 | .800 | | .118 | | .151 | | .177 | | .207 |

| POS | R | bf | l | bf | l | bf | l | bf | l |
|---|---|---|---|---|---|---|---|---|---|
| 1 | .000 | .00 | .00 | −.08 | −.30 | −.17 | −.40 | −.29 | −.56 |
| 2 | 10.000 | .08 | −.35 | .00 | .00 | −.09 | −.42 | −.20 | −.60 |
| 3 | 5.000 | .17 | −.29 | .09 | −.30 | .00 | .00 | −.12 | −.64 |
| 4 | 3.000 | .29 | −.28 | .20 | −.33 | .12 | −.48 | .00 | .00 |
| 5 | 2.000 | .44 | −.28 | .35 | −.35 | .27 | −.52 | .15 | −.77 |
| 6 | 1.500 | .59 | −.29 | .51 | −.37 | .42 | −.56 | .31 | −.82 |
| 7 | 1.000 | .92 | −.30 | .84 | −.41 | .75 | −.61 | .63 | −.87 |
| 8 | .800 | 1.18 | 31 | 1.10 | −.43 | 1.01 | −.64 | .90 | −.91 |

| (R, ANGLE) = | 2.000 | 6.875 | 1.500 | 7.804 | 1.000 | 9.185 | .800 | 10.000 |
|---|---|---|---|---|---|---|---|---|
| POS | R | r | rs | r | rs | r | rs | r | rs |
| 1 | .000 | | .064 | | .076 | | .100 | | .119 |
| 2 | 10.000 | | .085 | | .100 | | .130 | | .152 |
| 3 | 5.000 | | .104 | | .121 | | .154 | | .178 |
| 4 | 3.000 | | .125 | | .143 | | .181 | | .207 |
| 5 | 2.000 | .146 | .000 | | .168 | | .210 | | .239 |
| 6 | 1.500 | | .167 | .192 | .000 | | .238 | | .269 |
| 7 | 1.000 | | .209 | | .238 | .290 | .000 | | .322 |
| 8 | .800 | | .239 | | .269 | | .322 | .353 | .000 |

| POS | R | bf | l | bf | l | bf | l | bf | l |
|---|---|---|---|---|---|---|---|---|---|
| 1 | .000 | −.44 | −.77 | −.59 | −.98 | −.92 | −1.41 | −1.19 | −1.79 |
| 2 | 10.000 | −.35 | −.84 | −.51 | −1.07 | −.84 | −1.52 | −1.10 | −1.93 |
| 3 | 5.000 | −.27 | −.91 | −.42 | −1.14 | −.75 | −1.61 | −1.02 | −2.05 |
| 4 | 3.000 | −.15 | −1.01 | −.31 | −1.21 | −.64 | −1.69 | −.90 | −2.18 |
| 5 | 2.000 | .00 | .00 | −.16 | −1.24 | −.48 | −1.76 | −.75 | −2.32 |
| 6 | 1.500 | .16 | −1.08 | .00 | .00 | −.33 | −1.85 | −.59 | −2.50 |
| 7 | 1.000 | .48 | −1.13 | .33 | −1.37 | .00 | .00 | −.26 | −3.02 |
| 8 | .800 | .75 | −1.19 | .59 | −1.47 | .26 | −2.35 | .00 | .00 |

Condition Corresponding Values: $K_{a0}/\gamma_{a0} = 4.76$, $K_{aR}/\gamma_{aR} = 0.34$

TABLE 16

Conversion Coefficients $K_a$: (rs), $\gamma_a$: (r) Associated with Direction of Rotation and Correction Coefficient $\mu$; (l) at Wide-angle End (70.0 mm) in Comparative Example II
F = 70.0 mm

| (R, ANGLE) = | .000 | .000 | 10.000 | 2.704 | 5.000 | 4.237 | 3.000 | 5.671 |
|---|---|---|---|---|---|---|---|---|
| POS | R | r | rs | r | rs | r | rs | r | rs |
| 1 | .000 | .122 | .000 | | .183 | | .237 | | .300 |
| 2 | 10.000 | | .183 | .267 | .000 | | .331 | | .405 |
| 3 | 5.000 | | .236 | | .330 | .394 | .000 | | .484 |
| 4 | 3.000 | | .298 | | .404 | | .483 | .596 | .000 |
| 5 | 2.000 | | .374 | | .498 | | .596 | | .728 |
| 6 | 1.500 | | .448 | | .589 | | .702 | | .849 |
| 7 | 1.000 | | .593 | | .765 | | .902 | | 1.074 |
| 8 | .800 | | .702 | | .897 | | 1.050 | | 1.242 |

| POS | R | bf | l | bf | l | bf | l | bf | l |
|---|---|---|---|---|---|---|---|---|---|
| 1 | .000 | .00 | .00 | −.50 | −1.58 | −1.00 | −2.52 | −1.70 | −3.42 |
| 2 | 10.000 | .50 | −.98 | .00 | .00 | −.51 | −3.16 | −1.20 | −3.76 |
| 3 | 5.000 | 1.00 | −1.06 | .51 | −2.13 | .00 | .00 | −.69 | −3.70 |
| 4 | 3.000 | 1.69 | −1.16 | 1.20 | −2.34 | .69 | −3.06 | .00 | .00 |
| 5 | 2.000 | 2.58 | −1.24 | 2.09 | −2.41 | 1.59 | −3.10 | .90 | −4.05 |

TABLE 16-continued

Conversion Coefficients $K_a$: (rs), $\gamma_a$: (r) Associated with Direction of Rotation and Correction Coefficient μ; (l) at Wide-angle End (70.0 mm) in Comparative Example II
F = 70.0 mm

| | | | | | | | | | |
|---|---|---|---|---|---|---|---|---|---|
| 6 | 1.500 | 3.51 | −1.30 | 3.02 | −2.50 | 2.52 | −3.22 | 1.83 | −4.30 |
| 7 | 1.000 | 5.46 | −1.41 | 4.97 | −2.66 | 4.48 | −3.48 | 3.80 | −4.73 |
| 8 | .800 | 7.02 | −1.47 | 6.54 | −2.77 | 6.05 | −3.64 | 5.37 | −4.96 |

| (R, ANGLE) = | 2.000 | 6.875 | 1.500 | 7.804 | 1.000 | 9.185 | .800 | 10.000 |
|---|---|---|---|---|---|---|---|---|
| POS | R | r | rs | r | rs | r | rs | r | rs |
| 1 | .000 | | .377 | | .452 | | .600 | | .711 |
| 2 | 10.000 | | .501 | | .594 | | .773 | | .907 |
| 3 | 5.000 | | .598 | | .706 | | .909 | | 1.060 |
| 4 | 3.000 | | .730 | | .853 | | 1.081. | | 1.251 |
| 5 | 2.000 | .879 | .000 | | 1.016 | | 1.269 | | 1.458 |
| 6 | 1.500 | | 1.014 | 1.162 | .000 | | 1.435 | | 1.644 |
| 7 | 1.000 | | 1.263 | | 1.432 | 1.762 | .000 | | 2.008 |
| 8 | .800 | | 1.450 | | 1.639 | | 2.007 | 2.275 | .000 |

| POS | R | bf | l | bf | l | bf | l | bf | l |
|---|---|---|---|---|---|---|---|---|---|
| 1 | .000 | −2.60 | −4.55 | −3.54 | −5.79 | −5.52 | −8.38 | −7.11 | −10.35 |
| 2 | 10.00.0 | −2.10 | −4.89 | −3.04 | −6.22 | −5.03 | −8.96 | −6.62 | −11.00 |
| 3 | 5.000 | −1.59 | −4.99 | −2.53 | −6.45 | −4.52 | −9.33 | −6.11 | −11.44 |
| 4 | 3.000 | −.90 | −5.29 | −1.83 | −6.89 | −3.82 | −9.89 | −5.41 | −12.02 |
| 5 | 2.000 | .00 | .00 | −.93 | −7.43 | −2.92 | −10.42 | +4.51 | −12.57 |
| 6 | 1.500 | .93 | −6.07 | .00 | .00 | −1.98 | −10.70 | −3.58 | −12.91 |
| 7 | 1.000 | 2.91 | −6.66 | 1.98 | −8.54 | .00 | .00 | −1.60 | −13.61 |
| 8 | .800 | 4.49 | −6.91 | 3.57 | −8.70 | 1.60 | −11.50 | .00 | .00 |

Condition Corresponding Values: $K_{a0}/\gamma_{a0} = 5.78$, $K_{aR}/\gamma_{aR} = 0.31$

TABLE 17

Conversion Coefficients $K_a$: (rs), $\gamma_a$: (r) Associated with Direction of Rotation and Correction Coefficient μ; (l) at Wide-angle End (126.0 mm) in Comparative Example II
F = 126.0 mm

| (R, ANGLE) = | .000 | .000 | 10.000 | 2.704 | 5.000 | 4.237 | 3.000 | 5.671 |
|---|---|---|---|---|---|---|---|---|
| POS | R | r | rs | r | rs | r | rs | r | rs |
| 1 | .000 | .385 | .000 | | .584 | | .771 | | .999 |
| 2 | 10.000 | | .582 | .871 | .000 | | 1.110 | | 1.398 |
| 3 | 5.000 | | .765 | | 1.107 | 1.379 | .000 | | 1.717 |
| 4 | 3.000 | | .991 | | 1.392 | | 1.714 | 2.125 | .000 |
| 5 | 2.000 | | 1.264 | | 1.738 | | 2.121 | | 2.592 |
| 6 | 1.500 | | 1.533 | | 2.075 | | 2.509 | | 3.035 |
| 7 | 1.000 | | 2.090 | | 2.772 | | 3.317 | | 3.976 |
| 8 | .800 | | 2.531 | | 3.322 | | 3.953 | | 4.715 |

| POS | R | bf | l | bf | l | bf | l | bf | l |
|---|---|---|---|---|---|---|---|---|---|
| 1 | .000 | .00 | .00 | −1.62 | −4.93 | −3.31 | −7.51 | −5.66 | −10.69 |
| 2 | 10.000 | 1.62 | −3.16 | .00 | .00 | −1.69 | −8.66 | −4.04 | −11.81 |
| 3 | 5.000 | 3.29 | −3.33 | 1.68 | −6.19 | .00 | .00 | −2.35 | −12.25 |
| 4 | 3.000 | 5.62 | −3.57 | 4.02 | −6.72 | 2.35 | −9.66 | .00 | .00 |
| 5 | 2.000 | 8.69 | −3.81 | 7.12 | −7.15 | 5.47 | −10.16 | 3.13 | −14.24 |
| 6 | 1.500 | 11.96 | −4.01 | 10.43 | −7.54 | 8.80 | −10.74 | 6.48 | −15.15 |
| 7 | 1.000 | 19.19 | −4.33 | 17.76 | −8.13 | 16.22 | −11.53 | 13.98 | −16.06 |
| 8 | .800 | 25.31 | −4.54 | 23.99 | −8.52 | 22.55 | −12.08 | 20.43 | −16.76 |

| (R, ANGLE) = | 2.000 | 6.875 | 1.500 | 7.804 | 1.000 | 9.185 | .800 | 10.000 |
|---|---|---|---|---|---|---|---|---|
| POS | R | r | rs | r | rs | r | rs | r | rs |
| 1 | .000 | | 1.272 | | 1.533 | | 2.034 | | 2.379 |
| 2 | 10.000 | | 1.742 | | 2.066 | | 2.683 | | 3.103 |
| 3 | 5.000 | | 2.119 | | 2.491 | | 3.200 | | 3.676 |
| 4 | 3.000 | | 2.587 | | 3.008 | | 3.825 | | 4.367 |
| 5 | 2.000 | 3.107 | .000 | | 3.590 | | 4.551 | | 5.172 |
| 6 | 1.500 | | 3.616 | 4.178 | .000 | | 5.298 | | 5.989 |
| 7 | 1.000 | | 4.726 | | 5.467 | 6.953 | .000 | | 7.616 |
| 8 | .800 | | 5.586 | | 6.435 | | 7.943 | 8.360 | .000 |

| POS | R | bf | l | bf | l | bf | l | bf | l |
|---|---|---|---|---|---|---|---|---|---|
| 1 | .000 | −8.75 | −14.81 | −11.97 | −18.90 | −18.68 | −26.40 | −23.79 | −33.26 |

TABLE 17-continued

Conversion Coefficients $K_a$: (rs), $\gamma_a$: (r) Associated with Direction of Rotation and Correction Coefficient μ; (l) at Wide-angle End (126.0 mm) in Comparative Example II
F = 126.0 mm

| 2 | 10.000 | −7.14 | −16.25 | −10.39 | −20.55 | −17.19 | −28.00 | −22.41 | −35.64 |
|---|---|---|---|---|---|---|---|---|---|
| 3 | 5.000 | −5.46 | −17.19 | −8.74 | −21.64 | −15.64 | −28.97 | −20.96 | −37.42 |
| 4 | 3.000 | −3.12 | −18.64 | −6.43 | −22.95 | −13.45 | −29.91 | −18.92 | −39.62 |
| 5 | 2.000 | .00 | .00 | −3.34 | −23.74 | −10.51 | −30.43 | −16.16 | −42.38 |
| 6 | 1.500 | 3.36 | −20.51 | .00 | .00 | −7.31 | −30.73 | −13.15 | −46.37 |
| 7 | 1.000 | 10.92 | −20.95 | 7.55 | −24.46 | .00 | .00 | −6.21 | −69.71 |
| 8 | .800 | 17.46 | −21.88 | 14.13 | −26.15 | 6.48 | −45.45 | .00 | .00 |

Condition Corresponding Values: $K_{ao}/\gamma_{ao}$ = 6.58, $K_{aR}/\gamma_{aR}$ = 0.28

As can be seen from Tables 15, 16, and 17 above, when a change in conversion coefficient $K_a$: (rs) (e.g., the fourth column in the first table) and a change in correction coefficient μ: (l) (e.g., the fourth column in the second table) at a given lens arrangement (e.g., at the infinity in-focus arrangement) are considered, the conversion coefficient $K_a$ and the correction coefficient μ considerably change depending on the object positions. In particular, the conversion coefficient $K_a$ has a larger value at the closest object side than that at the infinity object side. Since the conversion coefficient $K_a$ in the direction of rotation is defined by $K_a = \Delta Bf/\Delta a$, the amount Δa of rotation for focusing at the infinity object side becomes larger than that at the closest object side relative to the defocus amount ΔBf.

The calculation results of the rate of change of $K_a$ with respect to $\gamma_a$ at the infinity in-focus arrangement and the closest in-focus arrangement at the wide-angle end (F=28.8), middle position (F=70.0), and telephoto end (F=126.0) in the comparative example II are as follows.

| Comparative Example II | | |
|---|---|---|
| | Infinity Arrangement $K_{ao}/\gamma_{ao}$ | Closest Arrangement $K_{aR}/\gamma_{aR}$ |
| Wide-angle End (F = 28.8) | 4.76 | 0.34 |
| Middle Position (F = 70.0) | 5.78 | 0.31 |
| Telephoto End (F = 126.0) | 6.58 | 0.28 |

As described above, in the comparative example II, since the change in conversion coefficient $K_a$ is large, the contribution of the correction term (Δf/μ) in $K_a = \gamma_a(1-\Delta Bf/\mu)$ becomes larger, and the value of the correction coefficient μ becomes close to that of the defocus amount ΔBf. In addition, the value of the correction coefficient μ largely changes depending on the object positions.

Therefore, as described in Japanese Patent Application Laid-Open No. 3-228006, under the condition that only a pair of a conversion coefficient $\gamma_a$ value and a correction coefficient γ value are set for a given lens arrangement range (e.g., an infinity in-focus arrangement range), if the correction coefficient γ which changes largely is represented by only one value, a large error is included in the value of the conversion coefficient $K_a$ which is calculated from the conversion coefficient $\gamma_a$ and the correction coefficient γ. Therefore, when the lens driving amount γa for focusing is finally calculated from the defocus amount ΔBf using the conversion coefficient $K_a$, the lens driving amount includes an error, and an auto-focus operation cannot be accurately performed.

For example, upon calculation of the lens driving amount Δa for focusing with respect to a closest distance (R=0.80 m) object when the correction coefficient μ (which changes from −3.16 to −4.54 depending on the object distances) at the infinity in-focus arrangement at the telephoto end (F=126.0) is represented by the value (μ=−3.81) at the middle object distance (R=2.0 m), the lens driving amount Δa for focusing is calculated as Δa=8.59 by substituting ΔBf=25.31, $\gamma_a$=0.385, and μ=−3.81. The actual lens driving amount for focusing from the state of the infinity in-focus arrangement at the telephoto end (F=126.0) to the closest distance (R=0.80 m) object is Δa=10.0 from (R, ANGLE)= (0.80, 10.0) in the upper right portion of the third table in Table 17. Therefore, an error as large as −14.1% is produced between the actual value and the calculated value Δa=8.59 of the lens driving amount for focusing.

Similarly, when the lens driving amounts upon focusing from the infinity in-focus lens arrangement to the closest distance object and upon focusing from the closest in-focus lens arrangement to the infinity object at the wide-angle end, middle position, and telephoto end are calculated from Δa=ΔBf/[$\gamma_a$(1−ΔBf/μ)], and errors from the actual lens driving amounts are then calculated, the following large values are obtained.

| Comparative Example II | | |
|---|---|---|
| | Infinity Arrangement → Closest In-focus State | Closest Arrangement → Infinity In-focus State |
| Wide-angle End (F = 28.8) | −8.7% | −26.3% |
| Middle Position (F = 70.0) | −13.2% | −23.4% |
| Telephoto End (F = 126.0) | −14.1% | −28.7% |

Note that the value of the correction coefficient μ upon focusing from the infinity in-focus lens arrangement to the closest distance object adopts a value at the object distance (R=2.0 m), and the value of the correction coefficient μ upon focusing from the closest in-focus lens arrangement to the infinity object adopts a value at the object distance (R=3.0 m).

Finally Table 18 summarizes the amount (ANGLE DA) of rotation for focusing upon manual focusing using the focus cam (the middle table in Table 10) of the comparative example II, the amount DX (mm) of movement, in the direction of the optical axis, of the focusing lens unit corresponding to the amount of rotation for focusing, and the displacement amount Bf (mm) of the imaging point when the amount (DX) of movement in the direction of the optical axis is given.

The upper table in Table 18 summarizes the displacement amount (Bf) of the imaging point corresponding to the photographing distances (R=5.0, 3.0, 2.0, 1.5, 1.0, and 0.80 m) in the respective zooming states of the focal lengths (F=28.8, 35.0, 50.0, 70.0, 95.0, and 126.0 mm), and the middle table summarizes the values of the amount (ANGLE DA) of rotation for focusing required for attaining an optimal in-focus state with respect to the respective photographing distances. The lower table summarizes the amounts (DX) of movement, in the direction of the optical axis, of the respective lens units corresponding to the amount (ANGLE DA) of rotation for focusing in association with the focal lengths and the photographing distances. In the lower table, (F) is the focal length (mm) of the entire system, (R) is the photographing distance (m), and (DX) is the amount (mm) of movement, in the direction of the optical axis, of each of the first, second, third, fourth, and fifth lens units in turn from the right side (movement toward the object side is represented by a positive value).

can suppress the storage capacity by reducing the number of data of the conversion coefficient $\gamma_a$ and correction coefficient $\mu$ to be stored in the storage means, can eliminate an error upon calculation of the lens driving amount $\Delta a$ for focusing from the defocus amount $\Delta Bf$ using the conversion coefficient $K_a$, and can achieve accurate auto-focusing, without increasing the size of a barrel mechanism.

According to the present invention, in a zoom lens system in which the movement locus of a focusing lens unit is defined by synthesizing a focus cam and a zoom compensation cam so as to achieve an in-focus state by a substantially constant amount of rotation for an identical object distance independently of a zooming state upon expression of a predetermined movement locus for zooming by the amount of movement, in the direction of the optical axis, of lens units, and the angle of rotation of a rotatable lens barrel,

TABLE 18

Displacement Amount Bf (mm) of Imaging Point and Amount DX (mm) of movement for focusing in Comparative Example II

|   |            | 0.80 m | 1.00 m | 1.50 m | 2.00 m | 3.00 m |   | 5.00 m |
|---|------------|--------|--------|--------|--------|--------|---|--------|
| F | 28.800 Bf  | .000   | .000   | .000   | .000   | .000   |   | .000   |
| F | 35.000 Bf  | .000   | −.013  | −.017  | −.009  | −.007  |   | −.003  |
| F | 50.000 Bf  | .000   | .012   | −.006  | −.020  | −.027  |   | −.015  |
| F | 70.000 Bf  | .000   | .035   | .021   | .024   | .002   |   | −.023  |
| F | 95.000 Bf  | .000   | .034   | .041   | .050   | .023   |   | .015   |
| F | 126.000 Bf | .000   | .000   | .000   | .000   | .000   |   | .000   |
|   | ANGLE DA   | 10.000 | 9.185  | 7.804  | 6.875  | 5.668  |   | 4.296  |
| F | 28.800 DX  | .000   | .000   | .000   | −.365  | .000   | R | 0.80 m |
| F | 35.000 DX  | .000   | .000   | .000   | −.533  | .000   | R | 0.80 m |
| F | 50.000 DX  | .000   | .000   | .000   | −1.061 | .000   | R | 0.80 m |
| F | 70.000 DX  | .000   | .000   | .000   | −2.019 | .000   | R | 0.80 m |
| F | 95.000 DX  | .000   | .000   | .000   | −3.656 | .000   | R | 0.80 m |
| F | 126.000 DX | .000   | .000   | .000   | −6.366 | .000   | R | 0.80 m |
| F | 28.000 DX  | .000   | .000   | .000   | −.284  | .000   | R | 1.00 m |
| F | 35.000 DX  | .000   | .000   | .000   | −.420  | .000   | R | 1.00 m |
| F | 50.000 DX  | .000   | .000   | .000   | −.825  | .000   | R | 1.00 m |
| F | 70.000 DX  | .000   | .000   | .000   | −1.568 | .000   | R | 1.00 m |
| F | 95.000 DX  | .000   | .000   | .000   | −2.848 | .000   | R | 1.00 m |
| F | 126.000 DX | .000   | .000   | .000   | −4.956 | .000   | R | 1.00 m |
| F | 28.800 DX  | .000   | .000   | .000   | −.183  | .000   | R | 1.50 m |
| F | 35.000 DX  | .000   | .000   | .000   | −.273  | .000   | R | 1.50 m |
| F | 50.000 DX  | .000   | .000   | .000   | −.537  | .000   | R | 1.50 m |
| F | 70.000 DX  | .000   | .000   | .000   | −1.015 | .000   | R | 1.50 m |
| F | 95.000 DX  | .000   | .000   | .000   | −1.836 | .000   | R | 1.50 m |
| F | 126.000 DX | .000   | .000   | .000   | −3.190 | .000   | R | 1.50 m |
| F | 28.800 DX  | .000   | .000   | .000   | −.135  | .000   | R | 2.00 m |
| F | 35.000 DX  | .000   | .000   | .000   | −.201  | .000   | R | 2.00 m |
| F | 50.000 DX  | .000   | .000   | .000   | −.401  | .000   | R | 2.00 m |
| F | 70.000 DX  | .000   | .000   | .000   | −.747  | .000   | R | 2.00 m |
| F | 95.000 DX  | .000   | .000   | .000   | −1.351 | .000   | R | 2.00 m |
| F | 126.000 DX | .000   | .000   | .000   | −2.352 | .000   | R | 2.00 m |
| F | 28.800 DX  | .000   | .000   | .000   | −.089  | .000   | R | 3.00 m |
| F | 35.000 DX  | .000   | .000   | .000   | −.132  | .000   | R | 3.00 m |
| F | 50.000 DX  | .000   | .000   | .000   | −.268  | .000   | R | 3.00 m |
| F | 70.000 DX  | .000   | .000   | .000   | −.495  | .000   | R | 3.00 m |
| F | 95.000 DX  | .000   | .000   | .000   | −.890  | .000   | R | 3.00 m |
| F | 126.000 DX | .000   | .000   | .000   | −1.542 | .000   | R | 3.00 m |
| F | 28.800 DX  | .000   | .000   | .000   | −.052  | .000   | R | 5.00 m |
| F | 35.000 DX  | .000   | .000   | .000   | −.078  | .000   | R | 5.00 m |
| F | 50.000 DX  | .000   | .000   | .000   | −.158  | .000   | R | 5.00 m |
| F | 70.000 DX  | .000   | .000   | .000   | −.301  | .000   | R | 5.00 m |
| F | 95.000 DX  | .000   | .000   | .000   | −.528  | .000   | R | 5.00 m |
| F | 126.000 DX | .000   | .000   | .000   | −.913  | .000   | R | 5.00 m |

SUMMARY OF THE INVENTION

It is, therefore, an object of the present invention to provide a zoom lens which can suppress changes in conversion coefficient $\gamma_a$ and correction coefficient $\mu$ above even when the focus cam is used for achieving manual focusing, when the ratios (dBf/dx) of the amount dBf of infinitesimal movement of the imaging plane to the amount dx of infinitesimal movement, in the direction of the optical axis, of the focusing lens unit at the infinity and closest in-focus points are respectively represented by $\gamma_{x0}$ and $\gamma_{xR}$, the amounts of movement, in the direction of the optical axis, of the focusing lens unit required for focusing from the infinity position to the closest distance position at the wide-angle end and the telephoto end are respectively represented by $\Delta x_{WR}$ and $\Delta x_{TR}$, and the amount of rotation of the focusing lens unit on the focus cam corresponding to zooming from the wide-angle end to the telephoto end and the amount of rotation corresponding to focusing from the infinity in-focus state to the closest in-focus state are respectively represented by $a_Z$ and $a_F$, the zoom lens satisfies conditional formulas (1), (2), and (3) below at least at the telephoto end:

$$1.00 < \gamma_{xR}/\gamma_{xO} \tag{1}$$

$$4.50 < \Delta x_{TR}/\Delta x_{WR} < 10.00 \tag{2}$$

$$-1.00 < a_F/a_z < -0.60 \tag{3}$$

On the other hand, when the ratios (dBf/da) of the amount dBf of infinitesimal movement of the imaging plane with respect to the angle da of infinitesimal rotation of the focusing lens unit on the focus cam at the infinity and closest in-focus points are respectively represented by $\gamma_{aO}$ and $\gamma_{aR}$, the zoom lens satisfies the following formula at least at the wide-angle end and the telephoto end:

$$0.13 < \gamma_{aR}/\gamma_{aO} < 0.80$$

Furthermore, when the conversion coefficients $K_a$, which are used when the focusing lens unit are located at the lens arrangements corresponding to the infinity and closest in-focus states and are expressed by $K_a = \Delta Bf/\Delta a$, are respectively represented by $K_{aO}$ and $K_{aR}$, the zoom lens satisfies the following formulas at least at the wide-angle end and the telephoto end:

$$0.50 < K_{aO}/\gamma_{aO} < 1.30$$

$$0.80 < K_{aR}/\gamma_{aR} < 1.80$$

where

ΔBf: the defocus amount between the imaging position of an object at an arbitrary position and a predetermined imaging point position Δa: the angle of rotation of the focusing lens unit on the focus cam required for attaining an in-focus state on the object As in the above-mentioned first aspect of the present invention, in the third aspect of the present invention, since the above-mentioned conditional formulas are satisfied, even when the focus cam is used to achieve so-called manual focusing, changes in conversion coefficient $\gamma_a$ and correction coefficient μ required for realizing accurate auto-focusing can be reduced, without a barrel mechanism in an increased size. For this reason, the number of data of the conversion coefficient $\gamma_a$ and correction coefficient μ to be stored in the storage means can be reduced. Furthermore, since the change in correction coefficient μ is small, an error upon calculation of the lens driving amount Δa for focusing from the defocus amount ΔBf using the conversion coefficient $K_a$ is small, and accurate auto-focusing can be realized.

As described above, when the zoom lens system is constituted by n lens units, and its k-th lens unit is used as a focusing lens unit, the conversion coefficient $\gamma_x$ associated with the direction of the optical axis of the focusing lens unit (the ratio dBf/dx of the amount dBf of infinitesimal movement of the imaging plane to the amount dx of infinitesimal movement in the direction of the optical axis) is expressed using the imaging magnifications β of the respective lens units as follows:

$$\gamma_x = (1-\beta_k^2)\beta_{k+1}^2\beta_{k+2}^2 \cdots \beta_n^2$$

Therefore, the rate of change, from the infinity in-focus value ($\gamma_{xO}$) to the closest in-focus value ($\gamma_{xR}$), of the conversion coefficient $\gamma_x$ associated with the direction of the optical axis can be expressed using the imaging magnifications $\beta_{Ok}$ and $\beta_{Rk}$ of the focusing lens unit at the infinity and closest in-focus points as follows:

$$\gamma_{xR}/\gamma_{xO} = (1-\beta_{Rk}^2)/(1-\beta_{Ok}^2)$$

On the other hand, the conversion coefficient $\gamma_a$ associated with the direction of rotation of the focusing lens unit (the ratio dBf/da of the amount dBf of infinitesimal movement of the imaging plane to the angle da of infinitesimal rotation) can be expressed by:

$$\gamma_a = \gamma_x \cdot (dx/da)$$

where dx/da is the slope of the focus cam. For this reason, the rate of change, from the infinity in-focus value ($\gamma_{aO}$) to the closest in-focus value ($\gamma_{aR}$), of the conversion coefficient $\gamma_a$ associated with the direction of rotation of the focusing lens unit can be expressed using slopes $(dx/da)_O$ and $(dx/da)_R$ at the infinity and closest corresponding positions on the focus cam as follows:

$$\gamma_{aR}/\gamma_{aO} = (\gamma_{xR}/\gamma_{xO}) \cdot ((dx/da)_R/(dx/da)_O)$$

Therefore, like in the present invention, in the zoom lens system in which the value of the conversion coefficient $\gamma_x$ associated with the amount x of movement, in the direction of the optical axis, of the focusing lens unit in the closest in-focus state becomes larger than that in the infinity in-focus state ($1.0 < \gamma_{xR}/\gamma_{xO}$), the ratio of the amount $a_F$ of rotation of the focusing lens unit on the focus cam corresponding to focusing from the infinity in-focus state to the closest in-focus state and the amount $a_z$ of rotation corresponding to zooming from the wide-angle end to the telephoto end is set to be negative ($a_F/a_z < 0$), so that the focus cam can have a shape in which the slope (dx/da) at the closest corresponding position becomes smaller than that at the infinity corresponding position ($0 < (dx/da)_R/(dx/da)_O < 1.0$), thereby reducing the change in conversion coefficient $\gamma_a$ associated with the direction of rotation.

More specifically, since the rate of change ($\gamma_{aR}/\gamma_{aO}$), from the infinity in-focus value ($\gamma_{aO}$) to the closest in-focus value ($\gamma_{aR}$), of the conversion coefficient $\gamma_a$ associated with the direction of rotation is expressed as a product of the rate of change ($\gamma_{xR}/\gamma_{xO}$) of the conversion ratio $\gamma_x$ associated with the direction of the optical axis and the slope ratio (dx/da) $_R/(dx/da)_O$ of the focus cam, as described above, the final rate of change ($\gamma_{aR}/\gamma_{aO}$) of the conversion coefficient $\gamma_a$ associated with the direction of rotation can be compressed by adopting an arrangement in which the two changes cancel out each other.

According to the present invention, in a zoom lens in which the conversion coefficients $\gamma_{xO}$, $\gamma_{xR}$ associated with the amount x of movement, in the direction of the optical axis, of the focusing lens unit at the infinity and closest in-focus points at the telephoto end satisfies conditional formula (1):

$$1.00 < \gamma_{xR}/\gamma_{xO} \tag{1}$$

and the amounts $\Delta x_{WR}$ and $\Delta x_{TR}$ of movement, in the direction of the optical axis, of the focusing lens unit required for focusing from the infinity position to the closest distance position at the wide-angle end and the telephoto end satisfies conditional formula (2):

$$4.50 < \Delta x_{TR}/\Delta x_{WR} < 10.00 \quad (2)$$

the ratio of the amount $a_F$ of rotation of the focusing lens unit on the focus cam corresponding to focusing from the infinity in-focus state to the closest in-focus state to the amount $a_Z$ of rotation corresponding to zooming from the wide-angle end to the telephoto end is set to satisfy conditional formula (3):

$$-1.00 < a_F/a_Z < -0.60 \quad (3)$$

Under these conditions, the final rate of change ($\gamma_{aR}/\gamma_{aO}$) of the conversion coefficient $\gamma_a$ associated with the direction of rotation can be set to be a small value which satisfies conditional formula (4) below:

$$0.13 < \gamma_{aR}/\gamma_{aO} < 0.80 \quad (4)$$

As described above, since the change in conversion coefficient $\gamma_a$ can be reduced as compared to that in the conventional system, the number of data of the conversion coefficient $\gamma_a$ and the correction coefficient $\mu$ to be stored in the storage means can be reduced.

For example, upon division of the focus range like in formula (a) ($N > \log(\gamma_{MAX}/\gamma_{MIN})/\log(1.2)$) above, the following relation is satisfied:

$$1.2 < \log(\gamma_{MAX}/\gamma_{MIN})/\log(1.2) < 11.2$$

and the number of divisions can be smaller than in the conventional system. Therefore, cost can be reduced in terms of the storage capacity. Furthermore, as will be described later in the following description of the embodiments, since the changes in conversion coefficient $K_a$ and correction coefficient $\mu$ are smaller than those in the conventional system, an error obtained upon calculation of the lens driving amount $\Delta a$ for focusing from the defocus amount $\Delta Bf$ using the conversion coefficient $K_a$ is small, and an accurate auto-focusing operation can be realized.

The conditional formulas of the present invention will be explained below.

Conditional formula (1) is associated with the focusing lens unit in the zoom lens according to the present invention. When $\gamma_{xR}/\gamma_{xO}$ is smaller than the lower limit of conditional formula (1) ($\gamma_{xR}/\gamma_{xO} < 1.0$), the conversion coefficient $\gamma_x$ associated with the direction of the optical axis in the closest in-focus state becomes smaller than that in the infinity in-focus state. For this reason, when the focus cam ($0 < (dx/da)_R/(dx/da)_O < 1.0$) according to the present invention is used, the rate of change of the conversion coefficient $\gamma_a$ associated with the direction of rotation, which rate is expressed as a product of the rate of change ($\gamma_{xR}/\gamma_{xO}$) of the conversion coefficient $\gamma_x$ associated with the direction of the optical axis and the slope ratio (($dx/da)_R/(dx/da)_O$) of the focus cam, becomes excessively smaller than 1.0 ($\gamma_{aR}/\gamma_{aO} << 1.0$), and changes in $\gamma_a$ become large. As a result, the number of data of the conversion coefficient $\gamma_a$ and the correction coefficient $\mu$ to be stored in the storage means increases. In addition, since the changes in conversion coefficient $K_a$ and correction coefficient $\mu$ become large, the error obtained upon calculation of the lens driving amount $\Delta a$ from the defocus amount $\Delta Bf$ is large, and an accurate auto-focusing operation cannot be performed.

Conditional formula (2) is associated with the ratio between the amounts of movement, in the direction of the optical axis, of the focusing lens unit required for focusing from the infinity position to the closest distance position at the wide-angle end and the telephoto end. As will be described later in the description of the embodiments, this ratio is an amount which is associated with the ratio of the slope $(dx/da)_R$ at the closest corresponding position to the slope $(dx/da)_O$ at the infinity corresponding position on the focus cam. As the ratio between the two amounts of movement becomes smaller, changes in slope on the focus cam become smaller. On the contrary, as the ratio between the two amounts of movement becomes larger, changes in slope on the focus cam become larger. Therefore, when the ratio is smaller than the lower limit of conditional formula (2), changes in conversion coefficient $\gamma_a$ associated with the direction of rotation become small. However, in the zoom lens of the present invention, which satisfies conditional formula (1), the optimal ratio of the amount $a_F$ of rotation of the focusing lens unit on the focus cam corresponding to focusing from the infinity in-focus state to the closest in-focus state to the amount $a_z$ of rotation corresponding to zooming from the wide-angle end to the telephoto end falls outside a range defined by conditional formula (3). On the other hand, when the ratio exceeds the upper limit of conditional formula (2), and if said ratio of the amount of rotation is set in the conditional formula (3), since changes in slope on the focus cam become too large as compared to those in conversion coefficient $\gamma_x$ associated with the direction of the optical axis, changes in conversion coefficient $\gamma_a$ associated with the direction of rotation become large, and the number of data of the conversion coefficient $\gamma_a$ and the correction coefficient $\mu$ to be stored in the storage means increases. In addition, an accurate auto-focusing operation cannot be performed.

Conditional formula (3) defines an appropriate ratio of the amount $a_F$ of rotation of the focusing lens unit on the focus cam corresponding to focusing from the infinity in-focus state to the closest in-focus state to the amount $a_z$ of rotation corresponding to zooming from the wide-angle end to the telephoto end. When the ratio is smaller than the lower limit of conditional formula (3), the slope $(dx/da)$ of the focus cam considerably decreases at the closest corresponding position as compared to the slope at the infinity corresponding position, and they have a ratio:

$$0 < (dx/da)_R/(dx/da)_O << 1.0$$

For this reason, the rate of change of the conversion coefficient $\gamma_a$ associated with the direction of rotation, which rate is expressed as a product of the rate of change ($\gamma_{xR}/\gamma_{xO}$) of the conversion coefficient $\gamma_x$ associated with the direction of the optical axis and the slope ratio (($dx/da)_R/(dx/da)_O$) of the focus cam, becomes excessively smaller than 1.0 ($\gamma_{aR}/\gamma_{aO} << 1.0$), and changes in $\gamma_a$ become large. As a result, the number of data of the conversion coefficient $\gamma_a$ and the correction coefficient $\mu$ to be stored in the storage means increases. In addition, since changes in $\mu$ are large, an error obtained upon calculation of the lens driving amount $\Delta a$ from the defocus amount $\Delta Bf$ is large, and an accurate auto-focusing operation cannot be performed.

On the contrary, when the ratio exceeds the upper limit of conditional formula (3), since the rate of change ($\gamma_{aR}/\gamma_{aO}$) of the conversion coefficient $\gamma_a$ becomes closer to 1.0, changes in $\gamma_a$ become small, and the number of data of the conversion coefficient $\gamma_a$ and the correction coefficient $\mu$ to be stored in the storage means can be reduced. However, the slope $(dx/da)_O$ of the focus cam at the infinity corresponding position at the telephoto end becomes large. Therefore, it is required to increase the diameter of a cam barrel corresponding to the focus cam in order to effect a smooth focusing operation by reducing the slope angle of the cam in the barrel mechanism. Thus, it becomes impossible to maintain the barrel to be small.

Conditional formula (4) is a condition associated with the number of data of the conversion coefficient $\gamma_a$ and the correction coefficient $\mu$ to be stored in the storage means, i.e., the number of divisions of the focus range. When $\gamma_{aR}/\gamma_{aO}$ is smaller than the lower limit of conditional formula (4), the rate of change ($\gamma_{aR}/\gamma_{aO}$) of the conversion coefficient $\gamma_a$ becomes excessively smaller than 1.0, and changes in $\gamma_a$ become large. As a result, since the number of data of the conversion coefficient $\gamma_a$ and the correction coefficient $\mu$ to be stored in the storage means increases, a storage means with a large storage capacity is required, resulting in an increase in cost.

On the contrary, when $\gamma_{aR}/\gamma_{aO}$ exceeds the upper limit of conditional formula (4), since the rate of change ($\gamma_{aR}/\gamma_{aO}$) of the conversion coefficient $\gamma_a$ becomes closer to 1.0, changes in $\gamma_a$ become small, and the number of data of the conversion coefficient $\gamma_a$ and the correction coefficient $\mu$ to be stored in the storage means can be reduced. However, since the conversion coefficient $\gamma_a$ must have a considerably large value, the sensitivity (dBf/da) associated with the movement in the direction of rotation becomes strict, and a change in imaging point caused by a slight error factor in the direction of rotation becomes large, thus disturbing accurate auto-focusing.

Furthermore, in order to attain accurate auto-focusing while lowering the sensitivity (dBf/da) associated with the movement in the direction of rotation, the upper and lower limits of conditional formula (4) are preferably set as follows:

$$0.16 < \gamma_{aR}/\gamma_{aO} < 0.70$$

In order to obtain a zoom lens which can perform auto-focusing more accurately, when the conversion coefficients $K_a$ ($=\Delta Bf/\Delta a$) used when the focusing lens unit is located at the lens arrangements corresponding to the infinity in-focus state and the closest in-focus state are respectively represented by $K_{aO}$ and $K_{aR}$, the zoom lens preferably satisfies conditional formulas (5) and (6) below at least at the wide-angle end and the telephoto end:

$$0.50 < K_{aO}/\gamma_{aO} < 1.30 \quad (5)$$

$$0.80 < K_{aR}/\gamma_{aR} < 1.80 \quad (6)$$

Conditional formula (5) defines the rate of change of the conversion coefficient $K_a$ in the direction of rotation upon a change in object position when the focusing lens unit corresponds to an arrangement in the infinity in-focus state. When the rate is smaller than the lower limit of conditional formula (5), the change in conversion coefficient $K_{aO}$ upon a change in object position becomes too small as compared to the conversion coefficient $\gamma_{aO}$ as the sensitivity associated with the movement in the direction of rotation of the focusing lens unit at the infinity in-focus point. Therefore, for example, when the conversion coefficient $K_{aO}$ which changes upon a change in object position is expressed by a pair of a conversion coefficient $\gamma_{aO}$ value and a correction coefficient $\mu_{aO}$ value on the basis of the relationship $K_{aO}=\gamma_{aO}(1-\Delta Bf/\mu_{aO})$, a large error is produced in the value of the conversion coefficient $K_{aO}$ calculated from the conversion coefficient $\gamma_{aO}$ and the correction coefficient $\mu_{aO}$, thus disturbing accurate auto-focusing.

On the contrary, when the rate exceeds the upper limit of conditional formula (5), the change in conversion coefficient $K_{aO}$ in the direction of rotation upon a change in object position becomes large as compared to the conversion coefficient $\gamma_{aO}$ in the direction of rotation of the focusing lens unit at the infinity in-focus point. For this reason, when the conversion coefficient $K_{aO}$ which changes upon a change in object position is expressed by a pair of a conversion coefficient $\gamma_{aO}$ value and a correction coefficient $\mu_{aO}$ value, a large error is produced in the value of the conversion coefficient $K_{aO}$ calculated from the conversion coefficient $\gamma_{aO}$ and the correction coefficient $\mu_{aO}$.

In order to achieve auto-focusing more accurately, the upper and lower limits of conditional formula (5) are preferably set as follows:

$$0.60 < K_{aO}/\gamma_{aO} < 1.15$$

Similarly, when the conversion coefficient $K_{aO}$ changes from ($K_{aO}/\gamma_{aO}<1$) to ($K_{aO}/\gamma_{aO}>1$) upon a change in object position when the focusing lens unit corresponds to an arrangement in the infinity in-focus state, the sign of the correction coefficient $\mu_{aO}$ changes before and after ($K_{aO}/\gamma_{aO}=1$). As a result, when the conversion coefficient $K_{aO}$ is expressed by a pair of a conversion coefficient $\gamma_{aO}$ value and a correction coefficient $\mu_{aO}$ value, a large error is produced in the value of the conversion coefficient $K_{aO}$ calculated from the conversion coefficient $\gamma_{aO}$ and the correction coefficient $\mu_{aO}$. Therefore, the conversion coefficient $K_{aO}$ does not preferably change too much after it exceeds ($K_{aO}/\gamma_{aO}=1$).

Therefore, even when the conversion coefficient $K_{aO}$ changes from ($K_{aO}/\gamma_{aO}<1$) to ($K_{aO}/\gamma_{aO}>1$), the zoom lens preferably satisfies the following conditional formula:

$$0.60 < K_{aO}/\gamma_{aO} < 1.15$$

Conditional formula (6) defines the rate of change of the conversion coefficient $K_a$ in the direction of rotation upon a change in object position when the focusing lens unit corresponds to an arrangement in the closest in-focus position. When the rate exceeds the upper limit of conditional formula (6), the change in conversion coefficient $K_{aR}$ in the direction of rotation upon a change in object position becomes too large as compared to the conversion coefficient $\gamma_{aR}$ as the sensitivity associated with the movement in the direction of rotation of the focusing lens unit at the closest in-focus point. Therefore, for example, when the conversion coefficient $K_{aR}$ which changes upon a change in object position is expressed by a pair of a conversion coefficient $\gamma_{aR}$ value and a correction coefficient $\mu_{aR}$ value on the basis of the relationship $K_{aR}=\gamma_{aR}(1-\Delta Bf/\mu_{aR})$, a large error is produced in the value of the conversion coefficient $K_{aR}$ calculated from the conversion coefficient $\gamma_{aR}$ R and the correction coefficient $\mu_{aR}$, thus disturbing accurate auto-focusing.

On the contrary, when the rate is smaller than the lower limit of conditional formula (6), the change in conversion coefficient $K_{aR}$ in the direction of rotation upon a change in object position becomes small as compared to the conversion coefficient $\gamma_{aR}$ in the direction of rotation of the focusing lens unit at the closest in-focus point. For this reason, when the conversion coefficient $K_{aR}$ which changes upon a change in object position is expressed by a pair of a conversion coefficient $\gamma_{aR}$ value and a correction coefficient $\mu_{aR}$ value, a large error is produced in the value of the conversion coefficient $K_{aR}$ calculated from the conversion coefficient $\gamma_{aR}$ and the correction coefficient $\mu_{aR}$.

In order to achieve auto-focusing more accurately, the upper and lower limits of conditional formula (6) are preferably set as follows:

$$0.90 < K_{aR}/\gamma_{aR} < 1.70$$

Similarly, when the conversion coefficient $K_{aR}$ changes from ($K_{aR}/\gamma_{aR}<1$) to ($K_{aR}/\gamma_{aR}>1$) upon a change in object position when the focusing lens unit corresponds to an arrangement in the closest in-focus state, the sign of the correction coefficient $\mu_{aR}$ changes before and after $(K_{aR}/\gamma_{aR}=1)$. As a result, when the conversion coefficient $K_{aR}$ is expressed by a pair of a conversion coefficient $\gamma_{aR}$ value and a correction coefficient $\mu_{aR}$ value, a large error is produced in the value of the conversion coefficient $K_{aR}$ calculated from the conversion coefficient $\gamma_{aR}$ and the correction coefficient $\mu_{aR}$. Therefore, the conversion coefficient $K_{aR}$ preferably does not change too much after it exceeds $(K_{aR}/\gamma_{aR}=1)$.

Therefore, even when the conversion coefficient $K_{aR}$ changes from $(K_{aR}/\gamma_{aR}<1)$ to $(K_{aR}/\gamma_{aR}>1)$, the zoom lens preferably satisfies the following conditional formula:

$$0.90 < K_{aR}/\gamma_{aR} < 1.70$$

According to the present invention, in a zoom lens system in which the movement locus of a focusing lens unit is defined by synthesizing a focus cam and a zoom compensation cam so as to achieve an in-focus state by a substantially constant amount of rotation for an identical object distance independently of a zooming state upon expression of a predetermined movement locus for zooming by the amount of movement, in the direction of the optical axis, of lens units, and the angle of rotation of a rotatable lens barrel, when the ratios (dBf/dx) of the amount dBf of infinitesimal movement of the imaging plane to the amount dx of infinitesimal movement, in the direction of the optical axis, of the focusing lens unit at the infinity and closest in-focus points are respectively represented by $\gamma_{xO}$ and $\gamma_{xR}$, the amounts of movement, in the direction of the optical axis, of the focusing lens unit required for focusing from the infinity position to the closest distance position at the wide-angle end and the telephoto end are respectively represented by $\Delta x_{WR}$ and $\Delta x_{TR}$, and the amount of rotation of the focusing lens unit on the focus cam corresponding to zooming from the wide-angle end to the telephoto end and the amount of rotation corresponding to focusing from the infinity in-focus state to the closest in-focus state are respectively represented by $a_Z$ and $a_F$, the zoom lens satisfies conditional formulas (7), (8), and (9) below at least at the telephoto end:

$$1.00 < \gamma_{xR}/\gamma_{xO} \tag{7}$$

$$10.00 < \Delta x_{TR}/\Delta x_{WR} < 30.00 \tag{8}$$

$$-1.00 < a_F/a_Z < -0.50 \tag{9}$$

On the other hand, when the ratios (dBf/da) of the amount dBf of infinitesimal movement of the imaging plane with respect to the angle da of infinitesimal rotation of the focusing lens unit on the focus cam at the infinity and closest in-focus points are respectively represented by $\gamma_{aO}$ and $\gamma_{aR}$, the zoom lens satisfies the following formula at least at the wide-angle end and the telephoto end:

$$0.08 < \gamma_{aR}/\gamma_{aO} < 0.70$$

Furthermore, when the conversion coefficients $K_a$ which are used when the focusing lens unit are located at the lens arrangements corresponding to the infinity and closest in-focus states and are expressed by $K_a = \Delta Bf/\Delta a$, are respectively represented by $K_{aO}$ and $K_{aR}$, the zoom lens satisfies the following formulas at least at the wide-angle end and the telephoto end:

$$0.35 < K_{aO}/\gamma_{aO} < 1.00$$

$$1.00 < K_{aR}/\gamma_{aR} < 3.00$$

where $\Delta Bf$: the defocus amount between the imaging position of an object at an arbitrary position and a predetermined imaging point position $\Delta a$: the angle of rotation of the focusing lens unit on the focus cam required for attaining an in-focus state on the object According to the present invention, in a zoom lens in which the conversion coefficients $\gamma_{xO}$, $\gamma_{xR}$ associated with the amount x of movement, in the direction of the optical axis, of the focusing lens unit at the infinity and closest in-focus points at the telephoto end satisfies conditional formula (7):

$$1.00 < \gamma_{xR}/\gamma_{xO} \tag{7}$$

and the amounts $\Delta x_{WR}$ and $\Delta x_{TR}$ of movement, in the direction of the optical axis, of the focusing lens unit required for focusing from the infinity position to the closest distance position at the wide-angle end and the telephoto end satisfies conditional formula (8):

$$10.00 < \Delta x_{TR}/\Delta x_{WR} < 30.00 \tag{8}$$

the ratio of the amount $a_F$ of rotation of the focusing lens unit on the focus cam corresponding to focusing from the infinity in-focus state to the closest in-focus state to the amount $a_Z$ of rotation corresponding to zooming from the wide-angle end to the telephoto end is set to satisfy conditional formula (9):

$$-1.00 < a_F/a_Z < -0.50 \tag{9}$$

Under these conditions, the final rate of change $(\gamma_{aR}/\gamma_{aO})$ of the conversion coefficient $\gamma_a$ associated with the direction of rotation can be set to be a small value which satisfies conditional formula (10) below:

$$0.08 < \gamma_{aR}/\gamma_{aO} < 0.70 \tag{10}$$

As described above, since the change in conversion coefficient $\gamma_a$ can be reduced as compared to that in the conventional system, the number of data of the conversion coefficient $\gamma_a$ and the correction coefficient $\mu$ to be stored in the storage means can be reduced.

For example, upon division of the focus range like in formula (a) $(N > \log(\gamma_{MAX}/\gamma_{MIN})/\log(1.2))$ above, the following relation is satisfied:

$$2.0 < \log(\gamma_{MAX}/\gamma_{MIN})/\log(1.2) < 13.9$$

and the number of divisions can be smaller than in the conventional system. Therefore, cost can be reduced in terms of the storage capacity. Furthermore, as will be described later in the following description of the embodiments, since the changes in conversion coefficient $K_a$ and correction coefficient $\mu$ are smaller than those in the conventional system, an error obtained upon calculation of the lens driving amount $\Delta a$ for focusing from the defocus amount $\Delta Bf$ using the conversion coefficient $K_a$ is small, and an accurate auto-focusing operation can be realized.

The conditional formulas of the present invention will be explained below.

Conditional formula (7) is associated with the focusing lens unit in the zoom lens according to the present invention. When $\gamma_{xR}/\gamma_{xO}$ is smaller than the lower limit of conditional formula (1) $(\gamma_{xR}/\gamma_{xO} < 1.0)$, the conversion coefficient $\gamma_x$ associated with the direction of the optical axis in the closest in-focus state becomes smaller than that in the infinity in-focus state. For this reason, when the focus cam $(0<(dx/da)_R/(dx/da)_O<1.0)$ according to the present invention is used, the rate of change of the conversion coefficient $\gamma_a$ associated with the direction of rotation, which rate is expressed as a product of the rate of change $(\gamma_{xR}/\gamma_{xO})$ of the conversion coefficient $\gamma_x$ associated with the direction of the optical axis and the slope ratio $((dx/da)_R/(dx/da)_O)$ of the focus cam, becomes excessively smaller than 1.0 $(\gamma_{aR}/\gamma_{aO}<<1.0)$, and changes in $\gamma_a$ become large. As a result, the number of data of the conversion coefficient $\gamma_a$ and the correction coefficient μ to be stored in the storage means increases. In addition, since the changes in conversion coefficient $K_a$ and correction coefficient μ become large, the error obtained upon calculation of the lens driving amount Δa from the defocus amount ΔBf is large, and an accurate auto-focusing operation cannot be performed.

Conditional formula (8) is associated with the ratio between the amounts of movement, in the direction of the optical axis, of the focusing lens unit required for focusing from the infinity position to the closest distance position at the wide-angle end and the telephoto end. As will be described later in the description of the embodiments, this ratio is an amount which is associated with the ratio of the slope $(dx/da)_R$ at the closest corresponding position to the slope $(dx/da)_O$ at the infinity corresponding position on the focus cam. As the ratio between the two amounts of movement becomes smaller, changes in slope on the focus cam become smaller. On the contrary, as the ratio between the two amounts of movement becomes larger, changes in slope on the focus cam become larger. Therefore, when the ratio is smaller than the lower limit of conditional formula (8), changes in conversion coefficient $\gamma_a$ associated with the direction of rotation become small. However, in the zoom lens of the present invention, which satisfies conditional formula (7), the optimal ratio of the amount $a_F$ of rotation of the focusing lens unit on the focus cam corresponding to focusing from the infinity in-focus state to the closest in-focus state to the amount $a_Z$ of rotation corresponding to zooming from the wide-angle end to the telephoto end falls outside a range defined by conditional formula (9). On the other hand, when the ratio exceeds the upper limit of conditional formula (8), and if said ratio of the amount of rotation is set in the conditional formula (9), since changes in slope on the focus cam become too large as compared to those in conversion coefficient $\gamma_x$ associated with the direction of the optical axis, changes in conversion coefficient $\gamma_a$ associated with the direction of rotation become very large, and the number of data of the conversion coefficient $\gamma_a$ and the correction coefficient μ to be stored in the storage means increases largely. In addition, an accurate auto-focusing operation cannot be performed. Therefore, it is more preferable to set the upper limit of the conditional formula (9) to be 20.0.

Conditional formula (9) defines an appropriate ratio of the amount $a_F$ of rotation of the focusing lens unit on the focus cam corresponding to focusing from the infinity in-focus state to the closest in-focus state to the amount $a_Z$ of rotation corresponding to zooming from the wide-angle end to the telephoto end. When the ratio is smaller than the lower limit of conditional formula (9), the slope (dx/da) of the focus cam considerably decreases at the closest corresponding position as compared to the slope at the infinity corresponding position, and they have a ratio:

$$0<(dx/da)_R/(dx/da)_O<<1.0$$

For this reason, the rate of change of the conversion coefficient $\gamma_a$ associated with the direction of rotation, which rate is expressed as a product of the rate of change $(\gamma_{xR}/\gamma_{xO})$ of the conversion coefficient $\gamma_x$ associated with the direction of the optical axis and the slope ratio $((dx/da)_R/(dx/da)_O)$ of the focus cam, becomes excessively smaller than 1.0 $(\gamma_{aR}/\gamma_{aO}<<1.0)$, and changes in $\gamma_a$ become large. As a result, the number of data of the conversion coefficient $\gamma_a$ and the correction coefficient μ to be stored in the storage means increases. In addition, since changes in μ are large, an error obtained upon calculation of the lens driving amount Δa from the defocus amount ΔBf is large, and an accurate auto-focusing operation cannot be performed. Therefore, it is more preferable to set the lower limit of conditional formula (9) to −0.90.

On the contrary, when the ratio exceeds the upper limit of conditional formula (9), since the rate of change $(\gamma_{aR}/\gamma_{aO})$ of the conversion coefficient $\gamma_a$ becomes closer to 1.0, changes in $\gamma_a$ become small, and the number of data of the conversion coefficient $\gamma_a$ and the correction coefficient μ to be stored in the storage means can be reduced. However, the slope $(dx/da)_O$ of the focus cam at the infinity corresponding position at the telephoto end becomes large. Therefore, it is required to largely increase the diameter of a cam barrel corresponding to the focus cam in order to effect a smooth focusing operation by reducing the slope angle of the cam in the barrel mechanism. Thus, it becomes impossible to maintain the barrel to be small.

Conditional formula (10) is a condition associated with the number of data of the conversion coefficient $\gamma_a$ and the correction coefficient μ to be stored in the storage means, i.e., the number of divisions of the focus range. When $\gamma_{aR}/\gamma_{aO}$ is smaller than the lower limit of conditional formula (10), the rate of change $(\gamma_{aR}R/\gamma_{aO})$ of the conversion coefficient $\gamma_a$ becomes excessively smaller than 1.0, and changes in $\gamma_a$ become large. As a result, since the number of data of the conversion coefficient $\gamma_a$ and the correction coefficient μ to be stored in the storage means increases, a storage means with a very large storage capacity is required, resulting in a large increase in cost.

On the contrary, when $\gamma_{aR}/\gamma_{aO}$ exceeds the upper limit of conditional formula (10), since the rate of change $(\gamma_{aR}/\gamma_{aO})$ of the conversion coefficient $\gamma_a$ becomes closer to 1.0, changes in $\gamma_a$ become small, and the number of data of the conversion coefficient $\gamma_a$ and the correction coefficient μ to be stored in the storage means can be reduced. However, since the conversion coefficient $\gamma_a$ must have an extremely large value, the sensitivity (dBf/da) associated with the movement in the direction of rotation becomes very strict, and a change in imaging point caused by a slight error factor in the direction of rotation becomes large, thus disturbing accurate auto-focusing.

Furthermore, in order to attain accurate auto-focusing while lowering the sensitivity (dBf/da) associated with the movement in the direction of rotation, the upper and lower limits of conditional formula (10) are preferably set as follows:

$$0.10<\gamma_{aR}/\gamma_{aO}<0.50$$

In order to obtain a zoom lens which can perform auto-focusing more accurately, when the conversion coefficients $K_a$ (=ΔBf/Δa) used when the focusing lens unit is located at the lens arrangements corresponding to the infinity in-focus state and the closest in-focus state are respectively represented by $K_{aO}$ and $K_{aR}$, the zoom lens preferably satisfies conditional formulas (11) and (12) below at least at the wide-angle end and the telephoto end:

$$0.35<K_{aO}/\gamma_{aO}<1.00 \qquad (11)$$

$1.00 < K_{aR}/\gamma_{aR} < 3.00$ (12)

Conditional formula (11) defines the rate of change of the conversion coefficient $K_a$ in the direction of rotation upon a change in object position when the focusing lens unit corresponds to an arrangement in the infinity in-focus state. When the rate is smaller than the lower limit of conditional formula (11), the change in conversion coefficient $K_{aO}$ upon a change in object position becomes too small as compared to the conversion coefficient $\gamma_{aO}$ as the sensitivity associated with the movement in the direction of rotation of the focusing lens unit at the infinity in-focus point. Therefore, for example, when the conversion coefficient $K_{aO}$ which changes upon a change in object position is expressed by a pair of a conversion coefficient $\gamma_{aO}$ value and a correction coefficient $\mu_{aO}$ value on the basis of the relationship $K_{aO} = \gamma_{aO}(1 - \Delta Bf/\mu_{aO})$, a large error is produced in the value of the conversion coefficient $K_{aO}$ calculated from the conversion coefficient $\gamma_{aO}$ and the correction coefficient $\mu_{aO}$, thus disturbing accurate auto-focusing. Therefore, it is more preferable to set the lower limit of conditional formula (11) to be 0.45.

On the contrary, when the rate exceeds the upper limit of conditional formula (11), the conversion coefficient $K_{aO}$ changes from $(K_{aO}/\gamma_{aO} < 1)$ to $(K_{aO}/\gamma_{aO} > 1)$ upon a change in object position and, the sign of the correction coefficient $\mu_{aO}$ changes before and after $(K_{aO}/\gamma_{aO} = 1)$. As a result, when the conversion coefficient $K_{aO}$ is expressed by a pair of a conversion coefficient $\gamma_{aO}$ value and a correction coefficient $\mu_{aO}$ value, a large error is produced in the value of the conversion coefficient $K_{aO}$ calculated from the conversion coefficient $\gamma_{aO}$ and the correction coefficient $\mu_{aO}$.

Conditional formula (12) defines the rate of change of the conversion coefficient $K_a$ in the direction of rotation upon a change in object position when the focusing lens unit corresponds to an arrangement in the closest in-focus position. When the rate exceeds the upper limit of conditional formula (12), the change in conversion coefficient $K_{aR}$ in the direction of rotation upon a change in object position becomes too large as compared to the conversion coefficient $\gamma_{aR}$ as the sensitivity associated with the movement in the direction of rotation of the focusing lens unit at the closest in-focus point. Therefore, for example, when the conversion coefficient $K_{aR}$ which changes upon a change in object position is expressed by a pair of a conversion coefficient $\gamma_{aR}$ value and a correction coefficient $\mu_{aR}$ value on the basis of the relationship $K_{aR} = \gamma_{aR}(1 - \Delta Bf/\mu_{aR})$, a large error is produced in the value of the conversion coefficient $K_{aR}$ calculated from the conversion coefficient $\gamma_{aR}$ and the correction coefficient $\mu_{aR}$, thus disturbing accurate auto-focusing. Therefore, it is further preferable to set the upper limit of conditional formula (12) to be 2.50.

On the contrary, when the rate is smaller than the lower limit of conditional formula (12), the conversion coefficient $K_{aO}$ changes from $(K_{aO}/\gamma_{aO} < 1)$ to $(K_{aO}/\gamma_{aO} > 1)$ upon a change in object position, and the sign of the correction coefficient $\mu_{aR}$ changes before and after $(K_{aO}/\gamma_{aO} = 1)$. As a result, when the conversion coefficient $K_{aO}$ is expressed by a pair of a conversion coefficient $\gamma_{aO}$ value and a correction coefficient $\mu_{aO}$ value, a large error is produced in the value of the conversion coefficient $K_{aO}$ calculated from the conversion coefficient $\gamma_{aO}$ and the correction coefficient $\mu_{aO}$.

DETAILED DESCRIPTION OF THE PREFERRED EMBODIMENTS

Figure 1:
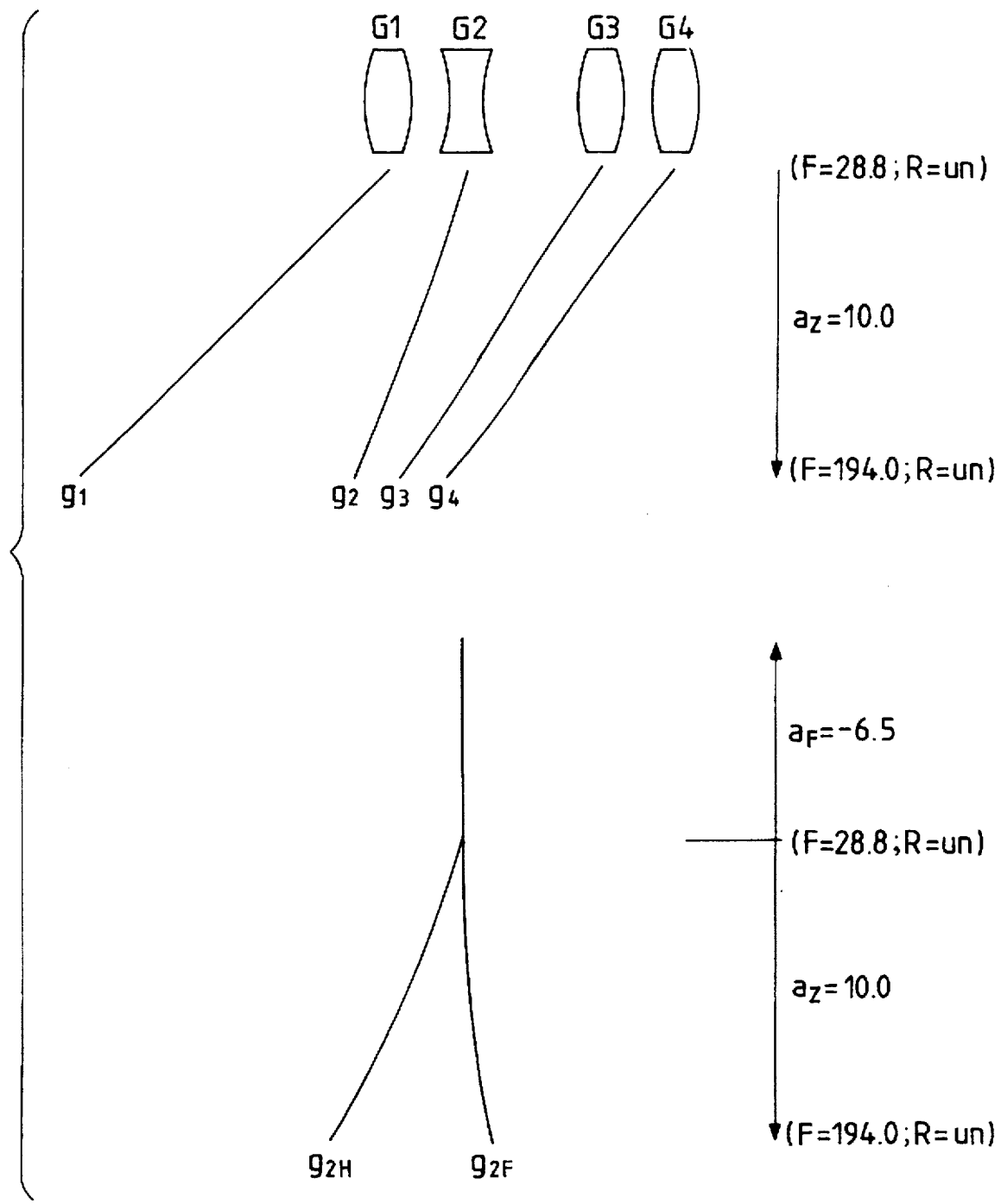
FIG. 1 is a view showing the movement loci for zooming of a zoom lens, the shapes of a focus cam and a zoom compensation cam of a second lens unit in the zoom lens according to the first embodiment of the present invention.

The present invention will be described in detail hereinafter with reference to its embodiments.

[First Embodiment]

A zoom lens of the first embodiment is a zoom lens which has a four-unit arrangement, i.e., positive, negative, positive, and positive lens units, and attains focusing by a negative second lens unit. In this zoom lens, the rotation amount ratio $(a_F/a_Z)$ of the rotation amount for focusing from the infinity in-focus position to the closest in-focus position (R=0.95 m) to the amount of rotation for zooming from the wide-angle end (F=28.8) to the telephoto end (F=194.0) is set to be −0.65.

Table 19 below summarizes various paraxial data of an optical system and data for defining the shape of a focus cam according to the first embodiment.

The upper table in Table 19 summarizes the focal length data, and the principal point interval data of the respective lens units of the optical system corresponding to the first embodiment.

In this table, F1, F2, F3 and F4 are respectively the focal lengths of first, second, third and fourth lens units, and D1, D2, D3, and D4 are respectively the principal point interval between the first and second lens units, the principal point interval between the second and third lens units, the principal point interval between the third and fourth lens units, and the principal point interval between the fourth lens unit and a predetermined imaging plane in six zooming states (F=28.8 (1-POS), 35.0 (2-POS), 50.0 (3-POS), 85.0 (4-POS), 135.0 (5-POS), and 194.0 mm (6-POS)).

The middle table in Table 19 summarizes spline sample data when the shape (a curve $g_{2F}$ in FIG. 1B) of the focus cam in the second lens unit of the first embodiment, which is used for focusing, is expressed by the above-mentioned spline function associated with the angle a of rotation of a rotatable lens barrel and the amount x of movement in the direction of the optical axis. In this middle table, (1), (2), (3), and (4) correspond to the first, second, third, and fourth lens units, respectively.

Furthermore, the lower table in Table 19 summarizes the infinity focusing positions (infinity corresponding positions) at the respective focal lengths (F=28.8, 35.0, 50.0, 85.0, 135.0, and 194.0 mm), and the amounts of rotation (amounts of rotation for focusing) upon focusing to respective photographing distances (R=5.0, 3.0, 2.0, 1.5, 1.2, and 0.95 m) using the focus cam of the first embodiment. In the lower table in Table 19, since the amount of rotation for zooming from the wide-angle end (F=28.8) to the telephoto end (F=194.0) is set to be 10.0, and the amount of rotation for focusing from the infinity in-focus position to the closest in-focus position (R=0.95 m) is set to be −6.5, the rotation amount ratio $(a_F/a_Z)$ of the amount of rotation for focusing to the amount of rotation for zooming in the first embodiment is −0.65.

TABLE 19

First Embodiment F = 28.8–194.0 (Rotation Amount Ratio: $a_F/a_Z = -0.65$)

Focal lengths and Principal Point Intervals of Lens Units of First Embodiment

|    |          |    | 1-POS   | 2-POS   | 3-POS   | 4-POS   | 5-POS    | 6-POS    |
|----|----------|----|---------|---------|---------|---------|----------|----------|
|    |          | F  | 28.8000 | 35.0000 | 50.0000 | 85.0000 | 135.0000 | 194.0000 |
| F1 | 85.0000  | D1 | 11.5063 | 15.6399 | 23.6055 | 35.1974 | 44.4737  | 50.4202  |
| F2 | –14.7000 | D2 | 25.8069 | 23.2088 | 19.3898 | 14.8844 | 11.1724  | 7.8560   |
| F3 | 43.5000  | D3 | 8.0000  | 7.3138  | 5.7748  | 3.8464  | 2.8540   | 2.0039   |
| F4 | 61.0000  | D4 | 59.7035 | 64.5166 | 73.5311 | 86.9840 | 97.2356  | 104.6041 |

Focus Cam Shape (Spline Interpolation Sample Point) Corresponding to First Embodiment

|    | ANGLE     | (1)   | (2)     | (3)   | (4)   |
|----|-----------|-------|---------|-------|-------|
| 1  | –10.0000  | .0000 | .6790   | .0000 | .0000 |
| 2  | –6.5000   | .0000 | .5362   | .0000 | .0000 |
| 3  | –4.4106   | .0000 | .4194   | .0000 | .0000 |
| 4  | –3.2026   | .0000 | .3325   | .0000 | .0000 |
| 5  | –2.2078   | .0000 | .2472   | .0000 | .0000 |
| 6  | –1.3640   | .0000 | .1633   | .0000 | .0000 |
| 7  | –.7750    | .0000 | .0973   | .0000 | .0000 |
| 8  | .0000     | .0000 | .0000   | .0000 | .0000 |
| 9  | 3.5000    | .0000 | –.6351  | .0000 | .0000 |
| 10 | 5.5894    | .0000 | –1.3003 | .0000 | .0000 |
| 11 | 6.7974    | .0000 | –1.8632 | .0000 | .0000 |
| 12 | 7.7922    | .0000 | –2.4953 | .0000 | .0000 |
| 13 | 8.6360    | .0000 | –3.2268 | .0000 | .0000 |
| 14 | 9.2250    | .0000 | –3.9212 | .0000 | .0000 |
| 15 | 10.0000   | .0000 | –5.3084 | .0000 | .0000 |
| 16 | 10.5000   | .0000 | –6.7600 | .0000 | .0000 |

Amount of Rotation for Zooming and Amount of Rotation for Focusing of First Embodiment
Rotation Amount Ratio: $a_F/a_Z = -0.65$)

| Focal Length | Infinity Corresponding Position | Photographing Distance | Amount of Rotation for Focusing |
|---|---|---|---|
| 28.8 mm | .0000 | 5.00 m | –.775 |
| 35.0 mm | .9456 | 3.00 m | –1.364 |
| 50.0 mm | 2.8915 | 2.00 m | –2.208 |
| 85.0 mm | 5.9442 | 1.50 m | –3.203 |
| 135.0 mm | 8.5249 | 1.20 m | –4.411 |
| 194.0 mm | 10.0000 | 0.95 m | –6.500 |
| Condition Corresponding Value (1) | | 1.81 | |
| Condition Corresponding Value (2) | | 8.72 | |
| Condition Corresponding Value (3) | | –0.65 | |
| Condition Corresponding Value (4) | | 0.37 (wide-angle end) 0.18 (telephoto end) | |
| Condition Corresponding Value (5) | | 0.65 (wide-angle end) 0.91 (telephoto end) | |
| Condition Corresponding Value (6) | | 1.65 (wide-angle end) 1.48 (telephoto end) | |

Table 20 below summarizes the numerical value data of the cams of the focusing lens unit in the first embodiment, which data are calculated by interpolation based on a spline function on the basis of the sample data of the focus cam summarized in the middle table in Table 19. In this table, (ANGLE) is the angle of rotation of the rotatable lens barrel, (2) is the amount (mm) of movement, in the direction of the optical axis, of the second lens unit, and (F) is the focal length (mm) of the entire system in an infinity in-focus state corresponding to the amount (ANGLE) of rotation.

TABLE 20

Cam Numerical Value Data of Focusing Lens Unit in First Embodiment

| Focus Cam Numerical Value Data | | | Zoom Compensation Cam Numerical Value Data | | |
|---|---|---|---|---|---|
| ANGLE | (2) | F | ANGLE | (2) | F |
| –6.5000 | .5362 | .0000 | | | |
| –6.0000 | .5114 | .0000 | | | |
| –5.5000 | .4848 | .0000 | | | |
| –5.0000 | .4561 | .0000 | | | |
| –4.5000 | .4252 | .0000 | | | |
| –4.0000 | .3917 | .0000 | | | |

TABLE 20-continued

Cam Numerical Value Data of Focusing Lens Unit in First Embodiment

| Focus Cam Numerical Value Data | | | Zoom Compensation Cam Numerical Value Data | | |
|---|---|---|---|---|---|
| ANGLE | (2) | F | ANGLE | (2) | F |
| −3.5000 | .3555 | .0000 | | | |
| −3.0000 | .3162 | .0000 | | | |
| −2.5000 | .2736 | .0000 | | | |
| −2.0000 | .2276 | .0000 | | | |
| −1.5000 | .1777 | .0000 | | | |
| −1.0000 | .1234 | .0000 | | | |
| −.5000 | .0641 | .0000 | | | |
| .0000 | .0000 | 28.8000 | .0000 | .0000 | 28.8000 |
| .5000 | −.0685 | 32.0242 | .5000 | .8742 | 32.0242 |
| 1.0000 | −.1423 | 35.3710 | 1.0000 | 1.7614 | 35.3710 |
| 1.5000 | −.2226 | 38.8814 | 1.5000 | 2.7015 | 38.8814 |
| 2.0000 | −.3108 | 42.6132 | 2.0000 | 3.7069 | 42.6132 |
| 2.5000 | −.4081 | 46.6255 | 2.5000 | 4.7830 | 46.6255 |
| 3.0000 | −.5158 | 50.9755 | 3.0000 | 5.9325 | 50.9755 |
| 3.5000 | −.6351 | 55.7062 | 3.5000 | 7.1512 | 55.7062 |
| 4.0000 | −.7675 | 60.8343 | 4.0000 | 8.4253 | 60.8343 |
| 4.5000 | −.9151 | 66.3964 | 4.5000 | 9.7444 | 66.3964 |
| 5.0000 | −1.0802 | 72.4133 | 5.0000 | 11.0933 | 72.4133 |
| 5.5000 | −1.2650 | 78.8805 | 5.5000 | 12.4518 | 78.8805 |
| 6.0000 | −1.4722 | 85.7983 | 6.0000 | 13.8029 | 85.7983 |
| 6.5000 | −1.7073 | 93.3264 | 6.5000 | 15.1571 | 93.3264 |
| 7.0000 | −1.9772 | 101.7016 | 7.0000 | 16.5280 | 101.7016 |
| 7.5000 | −2.2895 | 111.1184 | 7.5000 | 17.9167 | 111.1184 |
| 8.0000 | −2.6536 | 121.7895 | 8.0000 | 19.3243 | 121.7895 |
| 8.5000 | −3.0906 | 134.3107 | 8.5000 | 20.7909 | 134.3107 |
| 9.0000 | −3.6350 | 149.5900 | 9.0000 | 22.3728 | 149.5900 |
| 9.5000 | −4.3168 | 168.0630 | 9.5000 | 24.0881 | 168.0630 |
| 10.0000 | −5.3084 | 194.0000 | 10.0000 | 26.2620 | 194.0000 |

The left table in Table 20 summarizes the numerical value data of the focus cam of the first embodiment, and the right table in Table 20 summarizes the numerical value data of the zoom compensation cam of this embodiment. A value obtained by synthesizing the amounts (2) of movement in the direction of the optical axis in the numerical value data of the focus cam and the zoom compensation cam in the range from the amount of rotation (ANGLE=0.0) to the amount of rotation (ANGLE =10.0) coincides with the movement locus (a curve $g_2$ in FIG. 1) of the second lens unit calculated using the paraxial data in the upper table in Table 19.

Therefore, the zoom compensation cam (a curve $g_{2H}$ in FIG. 1) is determined by subtracting the focus cam (the curve $g_2$ in FIG. 1) from the movement locus (the curve $g_2$ in FIG. 1) upon zooming of the second lens unit determined by the paraxial data in the upper table in Table 19.

Figure 2:
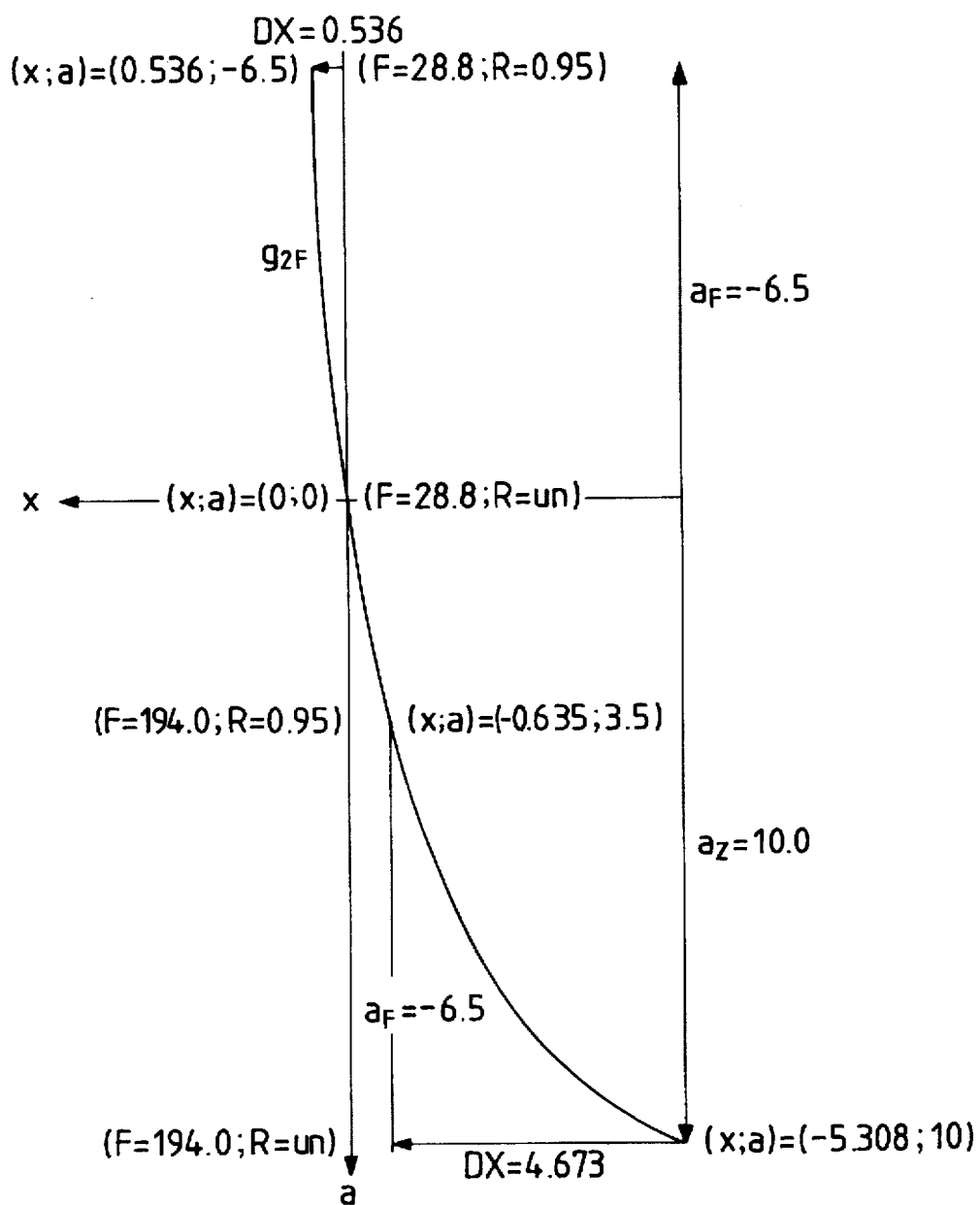
FIG. 2 is a view for explaining the shape of the focus cam in the zoom lens according to the first embodiment of the present invention.

FIG. 1 and FIG. 2 will be briefly described below.

FIG. 1 shows the paraxial arrangement and the movement loci upon zooming of the zoom lens according to the first embodiment, and FIG. 1 shows the shapes of the focus cam and the zoom compensation cam of the second lens unit of this embodiment. Referring to FIG. 1, G1, G2, G3, and G4 respectively represent the first, second, third, and fourth lens units, and $g_1$, $g_2$, $g_3$, and $g_4$ respectively represent the movement loci upon zooming of the first, second, third, and fourth lens units. In addition, $g_{2F}$ and $g_{2H}$ respectively represent the shapes of the focus cam and the zoom compensation cam of the second lens unit. As described above, a shape obtained by synthesizing the focus cam $g_{2F}$ and the zoom compensation cam $g_{2H}$ of the second lens unit coincides with the movement locus $g_2$ of the second lens unit.

FIG. 2 is a view for explaining the shape of the focus cam $_{2F}$ of the first embodiment. Referring to FIG. 2, (F=28.8; R=un) and (F=28.8; R=0.95) respectively represent the in-focus positions at the infinity and the closest distance (R=0.95 m) at the wide-angle end, and coordinate positions (x; a) on the focus cam are respectively (x; a)=(0; 0) and (x; a)=(0.536; −6.5). On the other hand, (F=194; R=un) and (F=194; R=0.95) respectively represent the in-focus positions at the infinity and the closest distance (R=0.95 m) at the telephoto end, and coordinate positions (x; a) on the focus cam are respectively (x; a)=(−5.308; 10) and (x; a)=(−0.635; 3.5).

Upon zooming from the wide-angle end to the telephoto end, the second lens unit moves on the focus cam $g_{2F}$ from the coordinate position (0; 0) to the coordinate position (−5.308; 10) for an infinity object, and from the coordinate position (0.536; −6.5) to the coordinate position (−0.635; 3.5) for a closest distance object. Therefore, the second lens unit moves by 10.0 in the direction of rotation (the direction of an axis a) in both the cases. On the other hand, upon focusing from the infinity arrangement to the closest distance object, the second lens unit moves on the focus cam $g_{2F}$ from the coordinate position (0; 0) to the coordinate position (0.536, −6.5) at the wide-angle end, and from the coordinate position (−5.308; 10) to the coordinate position (−0.635; 3.5) at the telephoto end. Therefore, the second lens unit moves by −6.5 in the direction of rotation (the direction of the axis a) at these ends. In contrast to this, in the direction of the optical axis (the direction of an axis x), the second lens unit moves by 0.536 at the wide-angle end, and by 4.673 at the telephoto end.

Since the shape of the focus cam $g_{2F}$ is determined by interpolating the coordinates (F=28.8; R=0.95), (F=28.8; R=un), (F=194; R=0.95), and (F=194; R=un) by the spline function, the change in slope (dx/da) of the focus cam $g_{2F}$ becomes larger as the absolute value of the x-coordinate of (F=28.8; R=0.95) is smaller or as the absolute value of the x-coordinate of (F=194; R=un) is larger. More specifically, as the ratio ($\Delta x_{TR}/\Delta x_{WR}$) between the amounts $\Delta X_{XR}$ and $\Delta X_{WR}$ of movement, in the direction of the optical axis, of the focusing lens unit required for focusing from the infinity position to the closest distance position at the wide-angle end or telephoto end is larger, the change in slope (dx/da) of the focus cam becomes larger.

Tables 21, 22, and 23 below summarize the amount DX (mm) of movement for focusing, in the direction of the optical axis, of the focusing lens unit, the imaging magnifications $\beta_K$ of the respective lens units, the conversion coefficient $\gamma_x$ associated with the direction of the optical axis, the slope (dx/da) of the focus cam, and the conversion coefficient $\gamma_a$ associated with the direction of rotation at the wide-angle end (F=28.8), the middle position (F=85.0), and the telephoto end (F=194.0) according to the first embodiment, respectively. In these tables, (R) on the left side is the photographing distance (m), (ANG) is the amount of rotation on the focus cam upon focusing to the respective photographing distances, and 1), 2), 3), and 4) on the right side respectively represent the first, second, third, and fourth lens units. Also, in these tables, the first table summarizes the amount DX (mm) of movement for focusing in the direction of the optical axis upon focusing to the respective photographing distances (R=10.0, 5.0, 3.0, 2.0, 1.5, 1.2, and 0.95 m) (note that movement toward the object side is positive). The second table summarizes the imaging magnifications $\beta_K$ of the respective lens units in an in-focus state at the respective photographing distances (R=10.0, 5.0, 3.0, 2.0, 1.5, 1.2, and 0.95 m). The third table summarizes the conversion coefficient $\gamma_x$ associated with the direction of the optical axis of the focusing lens unit in an in-focus state at the respective photographing distances (R=10.0, 5.0, 3.0, 2.0, 1.5, 1.2, and 0.95 m). Furthermore, the fourth table summarizes the slope (dx/da) of the focus cam at the positions, on the focus cam, corresponding to an in-focus state at the respective photographing distances (R=10.0, 5.0, 3.0, 2.0, 1.5, 1.2, and 0.95 m), and the fifth table summarizes the conversion coefficient $\gamma_a$ associated with the direction of rotation of the focusing lens unit in an in-focus state at the respective photographing distances (R=10.0, 5.0, 3.0, 2.0, 1.5, 1.2, and 0.95 m).

TABLE 21

Amount DX (mm) of Movement for Focusing in Direction of Optical Axis at Wide-angle End (28.8 mm) in First Embodiment

| R | .000 | ANG | .000 | 1) | .000 | 2) | .000 | 3) | .000 | 4) | .000 |
|---|---|---|---|---|---|---|---|---|---|---|---|
| R | 10.000 | ANG | -.374 | 1) | .000 | 2) | .048 | 3) | .000 | 4) | .000 |
| R | 5.000 | ANG | -.775 | 1) | .000 | 2) | .097 | 3) | .000 | 4) | .000 |
| R | 3.000 | ANG | -1.364 | 1) | .000 | 2) | .163 | 3) | .000 | 4) | .000 |
| R | 2.000 | ANG | -2.208 | 1) | .000 | 2) | .247 | 3) | .000 | 4) | .000 |
| R | 1.500 | ANG | -3.203 | 1) | .000 | 2) | .332 | 3) | .000 | 4) | .000 |
| R | 1.200 | ANG | -4.411 | 1) | .000 | 2) | .419 | 3) | .000 | 4) | .000 |
| R | .950 | ANG | -6.500 | 1) | .000 | 2) | .536 | 3) | .000 | 4) | .000 |

Imaging Magnification $\beta_K$ of Lens Units at Wide-angle End (28.8 mm) in First Embodiment

| R | .000 | ANG | .000 | 1) | .000 | 2) | -.250 | 3) | -63.758 | 4) | .021 |
|---|---|---|---|---|---|---|---|---|---|---|---|
| R | 10.000 | ANG | -.374 | 1) | -.009 | 2) | -.247 | 3) | -63.758 | 4) | .021 |
| R | 5.000 | ANG | -.775 | 1) | -.018 | 2) | -.243 | 3) | -63.758 | 4) | .021 |
| R | 3.000 | ANG | -1.364 | 1) | -.030 | 2) | -.239 | 3) | -63.758 | 4) | .021 |
| R | 2.000 | ANG | -2.208 | 1) | -.047 | 2) | -.233 | 3) | -63.758 | 4) | .021 |
| R | 1.500 | ANG | -3.203 | 1) | -.065 | 2) | -.227 | 3) | -63.758 | 4) | .021 |
| R | 1.200 | ANG | -4.411 | 1) | -.084 | 2) | -.221 | 3) | -63.758 | 4) | .021 |
| R | .950 | ANG | -6.500 | 1) | -.112 | 2) | -.214 | 3) | -63.758 | 4) | .021 |

Conversion Coefficient $\gamma_x$ Associated With Direction of Optical Axis at Wide-angle End (28.8 mm) in First Embodiment

| R | .000 | ANG | .000 | 1) | .000 | 2) | 1.722 | 3) | .000 | 4) | .000 |
|---|---|---|---|---|---|---|---|---|---|---|---|
| R | 10.000 | ANG | -.374 | 1) | .000 | 2) | 1.725 | 3) | .000 | 4) | .000 |
| R | 5.000 | ANG | -.775 | 1) | .000 | 2) | 1.728 | 3) | .000 | 4) | .000 |
| R | 3.000 | ANG | -1.364 | 1) | .000 | 2) | 1.732 | 3) | .000 | 4) | .000 |
| R | 2.000 | ANG | -2.208 | 1) | .000 | 2) | 1.737 | 3) | .000 | 4) | .000 |
| R | 1.500 | ANG | -3.203 | 1) | .000 | 2) | 1.741 | 3) | .000 | 4) | .000 |
| R | 1.200 | ANG | -4.411 | 1) | .000 | 2) | 1.746 | 3) | .000 | 4) | .000 |
| R | .950 | ANG | -6.500 | 1) | .000 | 2) | 1.753 | 3) | .000 | 4) | .000 |

Slope dx/da of Focus Cam at Wide-angle End (28.8 mm) in First Embodiment

| R | .000 | ANG | .000 | 1) | .000 | 2) | -.132 | 3) | .000 | 4) | .000 |
|---|---|---|---|---|---|---|---|---|---|---|---|
| R | 10.000 | ANG | -.374 | 1) | .000 | 2) | -.126 | 3) | .000 | 4) | .000 |
| R | 5.000 | ANG | -.775 | 1) | .000 | 2) | -.118 | 3) | .000 | 4) | .000 |
| R | 3.000 | ANG | -1.364 | 1) | .000 | 2) | -.106 | 3) | .000 | 4) | .000 |
| R | 2.000 | ANG | -2.208 | 1) | .000 | 2) | -.093 | 3) | .000 | 4) | .000 |
| R | 1.500 | ANG | -3.203 | 1) | .000 | 2) | -.079 | 3) | .000 | 4) | .000 |
| R | 1.200 | ANG | -4.411 | 1) | .000 | 2) | -.065 | 3) | .000 | 4) | .000 |
| R | .950 | ANG | -6.500 | 1) | .0u0 | 2) | -.048 | 3) | .000 | 4) | .000 |

Conversion Coefficient $\gamma_a$ Associated With Direction of Rotation at Wide-angle End (28.8 mm) in First Embodiment

| R | .000 | ANG | .000 | 1) | .000 | 2) | -.228 | 3) | .000 | 4) | .000 |
|---|---|---|---|---|---|---|---|---|---|---|---|
| R | 10.000 | ANG | -.374 | 1) | .000 | 2) | -.217 | 3) | .000 | 4) | .000 |
| R | 5.000 | ANG | -.775 | 1) | .000 | 2) | -.204 | 3) | .000 | 4) | .000 |
| R | 3.000 | ANG | -1.364 | 1) | .000 | 2) | -.184 | 3) | .000 | 4) | .000 |
| R | 2.000 | ANG | -2.208 | 1) | .000 | 2) | -.161 | 3) | .000 | 4) | .000 |
| R | 1.500 | ANG | -3.203 | 1) | .000 | 2) | -.138 | 3) | .000 | 4) | .000 |
| R | 1.200 | ANG | -4.411 | 1) | .000 | 2) | -.114 | 3) | .000 | 4) | .000 |
| R | .950 | ANG | -6.500 | 1) | .000 | 2) | -.084 | 3) | .000 | 4) | .000 |

Condition Corresponding Values: $\gamma_{aR}/\gamma_{a0} = 1.02$, $\gamma_{aR}/\gamma_{a0} = 0.37$

TABLE 22

Amount DX (mm) of Movement for Focusing in Direction of Optical Axis at Middle Position (85.0 mm) in First Embodiment

| R | .000 | ANG | .000 | 1) | .000 | 2) | .000 | 3) | .000 | 4) | .000 |
|---|---|---|---|---|---|---|---|---|---|---|---|
| R | 10.000 | ANG | -.367 | 1) | .000 | 2) | .152 | 3) | .000 | 4) | .000 |
| R | 5.000 | ANG | -.762 | 1) | .000 | 2) | .303 | 3) | .000 | 4) | .000 |
| R | 3.000 | ANG | -1.341 | 1) | .000 | 2) | .500 | 3) | .000 | 4) | .000 |
| R | 2.000 | ANG | -2.173 | 1) | .000 | 2) | .743 | 3) | .000 | 4) | .000 |
| R | 1.500 | ANG | -3.164 | 1) | .000 | 2) | .981 | 3) | .000 | 4) | .000 |
| R | 1.200 | ANG | -4.384 | 1) | .000 | 2) | 1.215 | 3) | .000 | 4) | .000 |
| R | .950 | ANG | -6.500 | 1) | .000 | 2) | 1.519 | 3) | .000 | 4) | .000 |

TABLE 22-continued

Imaging Magnification $\beta_K$ of Lens Units at Middle Position (85.0 mm) in First Embodiment

| | | | | | | | | | | | |
|---|---|---|---|---|---|---|---|---|---|---|---|
| R | .000 | ANG | .000 | 1) | .000 | 2) | −.419 | 3) | 5.606 | 4) | −.426 |
| R | 10.000 | ANG | −.367 | 1) | −.009 | 2) | −.408 | 3) | 5.606 | 4) | −.426 |
| R | 5.000 | ANG | −.762 | 1) | −.018 | 2) | −.398 | 3) | 5.606 | 4) | −.426 |
| R | 3.000 | ANG | −1.341 | 1) | −.031 | 2) | −.385 | 3) | 5.606 | 4) | −.426 |
| R | 2.000 | ANG | −2.173 | 1) | −.048 | 2) | −.368 | 3) | 5.606 | 4) | −.426 |
| R | 1.500 | ANG | −3.164 | 1) | −.067 | 2) | −.352 | 3) | 5.606 | 4) | −.426 |
| R | 1.200 | ANG | −4.384 | 1) | −.087 | 2) | −.336 | 3) | 5.606 | 4) | −.426 |
| R | .950 | ANG | −6.500 | 1) | −.117 | 2) | −.315 | 3) | 5.606 | 4) | −.426 |

Conversion Coefficient $\gamma_x$ Associated With Direction of Optical Axis at Middle Position (85.0 mm) in First Embodiment

| | | | | | | | | | | | |
|---|---|---|---|---|---|---|---|---|---|---|---|
| R | .000 | ANG | .000 | 1) | .000 | 2) | 4.702 | 3) | .000 | 4) | .000 |
| R | 10.000 | ANG | −.367 | 1) | .000 | 2) | 4.751 | 3) | .000 | 4) | .000 |
| R | 5.000 | ANG | −.762 | 1) | .000 | 2) | 4.798 | 3) | .000 | 4) | .000 |
| R | 3.000 | ANG | −1.341 | 1) | .000 | 2) | 4.858 | 3) | .000 | 4) | .000 |
| R | 2.000 | ANG | −2.173 | 1) | .000 | 2) | 4.929 | 3) | .000 | 4) | .000 |
| R | 1.500 | ANG | −3.164 | 1) | .000 | 2) | 4.995 | 3) | .000 | 4) | .000 |
| R | 1.200 | ANG | −4.384 | 1) | .000 | 2) | 5.058 | 3) | .000 | 4) | .000 |
| R | .950 | ANG | −6.500 | 1) | .000 | 2) | 5.135 | 3) | .000 | 4) | .000 |

Slope dx/da of Focus Cam at Middle Position (85.0 mm) in First Embodiment

| | | | | | | | | | | | |
|---|---|---|---|---|---|---|---|---|---|---|---|
| R | .000 | ANG | .000 | 1) | .000 | 2) | −.434 | 3) | .000 | 4) | .000 |
| R | 10.000 | ANG | −.367 | 1) | .000 | 2) | −.398 | 3) | .000 | 4) | .000 |
| R | 5.000 | ANG | −.762 | 1) | .000 | 2) | −.364 | 3) | .000 | 4) | .000 |
| R | 3.000 | ANG | −1.341 | 1) | .000 | 2) | −.319 | 3) | .000 | 4) | .000 |
| R | 2.000 | ANG | −2.173 | 1) | .000 | 2) | −.266 | 3) | .000 | 4) | .000 |
| R | 1.500 | ANG | −3.164 | 1) | .000 | 2) | −.217 | 3) | .000 | 4) | .000 |
| R | 1.200 | ANG | −4.384 | 1) | .000 | 2) | −.170 | 3) | .000 | 4) | .000 |
| R | .950 | ANG | −6.500 | 1) | .000 | 2) | −.123 | 3) | .000 | 4) | .000 |

Conversion Coefficient $\gamma_a$ Associated With Direction of Rotation at Middle Position (85.0 mm) in First Embodiment

| | | | | | | | | | | | |
|---|---|---|---|---|---|---|---|---|---|---|---|
| R | .000 | ANG | .000 | 1) | .000 | 2) | −2.040 | 3) | .000 | 4) | .000 |
| R | 10.000 | ANG | −.367 | 1) | .000 | 2) | −1.889 | 3) | .000 | 4) | .000 |
| R | 5.000 | ANG | −.762 | 1) | .000 | 2) | −1.745 | 3) | .000 | 4) | .000 |
| R | 3.000 | ANG | −1.341 | 1) | .000 | 2) | −1.551 | 3) | .000 | 4) | .000 |
| R | 2.000 | ANG | −2.173 | 1) | .000 | 2) | −1.310 | 3) | .000 | 4) | .000 |
| R | 1.500 | ANG | −3.164 | 1) | .000 | 2) | −1.082 | 3) | .000 | 4) | |
| R | 1.200 | ANG | −4.384 | 1) | .000 | 2) | −.860 | 3) | .000 | 4) | .000 |
| R | .950 | ANG | −6.500 | 1) | .000 | 2) | −.629 | 3) | .000 | 4) | .000 |

Condition Corresponding Values: $\gamma_{xR}/\gamma_{x0} = 1.09$, $\gamma_{aR}/\gamma_{a0} = 0.31$

TABLE 23

Amount DX (mm) of Movement for Focusing in Direction of Optical Axis at Telephoto End (194.0 mm) in First Embodiment

| | | | | | | | | | | | |
|---|---|---|---|---|---|---|---|---|---|---|---|
| R | .000 | ANG | .000 | 1) | .000 | 2) | .000 | 3) | .000 | 4) | .000 |
| R | 10.000 | ANG | −.364 | 1) | .000 | 2) | .766 | 3) | .000 | 4) | .000 |
| R | 5.000 | ANG | −.775 | 1) | .000 | 2) | 1.387 | 3) | .000 | 4) | .000 |
| R | 3.000 | ANG | −1.364 | 1) | .000 | 2) | 2.082 | 3) | .000 | 4) | .000 |
| R | 2.000 | ANG | −2.208 | 1) | .000 | 2) | 2.813 | 3) | .000 | 4) | .000 |
| R | 1.500 | ANG | −3.203 | 1) | .000 | 2) | 3.445 | 3) | .000 | 4) | .000 |
| R | 1.200 | ANG | −4.411 | 1) | .000 | 2) | 4.008 | 3) | .000 | 4) | .000 |
| R | .950 | ANG | −6.500 | 1) | .000 | 2) | 4.673 | 3) | .000 | 4) | .000 |

Imaging Magnification $\beta_K$ of Lens Units at Telephoto End (194.0 mm) in First Embodiment

| | | | | | | | | | | | |
|---|---|---|---|---|---|---|---|---|---|---|---|
| R | .000 | ANG | .000 | 1) | .000 | 2) | −.739 | 3) | 4.318 | 4) | −.715 |
| R | 10.000 | ANG | −.364 | 1) | −.009 | 2) | −.687 | 3) | 4.318 | 4) | −.715 |
| R | 5.000 | ANG | −.775 | 1) | −.018 | 2) | −.645 | 3) | 4.318 | 4) | −.715 |
| R | 3.000 | ANG | −1.364 | 1) | −.031 | 2) | −.598 | 3) | 4.318 | 4) | −.715 |
| R | 2.000 | ANG | −2.208 | 1) | −.049 | 2) | −.548 | 3) | 4.318 | 4) | −.715 |
| R | 1.500 | ANG | −3.203 | 1) | −.068 | 2) | −.505 | 3) | 4.318 | 4) | −.715 |
| R | 1.200 | ANG | −4.411 | 1) | −.089 | 2) | −.467 | 3) | 4.318 | 4) | −.715 |
| R | .950 | ANG | −6.500 | 1) | −.121 | 2) | −.422 | 3) | 4.318 | 4) | −.715 |

Conversion Coefficient $\gamma_x$ Associated With Direction of Optical Axis at Telephoto End (194.0 mm) in First Embodiment

| | | | | | | | | | | | |
|---|---|---|---|---|---|---|---|---|---|---|---|
| R | .000 | ANG | .000 | 1) | .000 | 2) | 4.318 | 3) | .000 | 4) | .000 |
| R | 10.000 | ANG | −.364 | 1) | .000 | 2) | 5.026 | 3) | .000 | 4) | .000 |
| R | 5.000 | ANG | −.775 | 1) | .000 | 2) | 5.563 | 3) | .000 | 4) | .000 |
| R | 3.000 | ANG | −1.364 | 1) | .000 | 2) | 6.122 | 3) | .000 | 4) | .000 |

TABLE 23-continued

| R | 2.000 | ANG | -2.208 | 1) | .000 | 2) | 6.665 | 3) | .000 | 4) | .000 |
|---|---|---|---|---|---|---|---|---|---|---|---|
| R | 1.500 | ANG | -3.203 | 1) | .000 | 2) | 7.097 | 3) | .000 | 4) | .000 |
| R | 1.200 | ANG | -4.411 | 1) | .000 | 2) | 7.451 | 3) | .000 | 4) | .000 |
| R | .950 | ANG | -6.500 | 1) | .000 | 2) | 7.834 | 3) | .000 | 4) | .000 |
| Slope dx/da of Focus Cam at Telephoto End (194.0 mm) in First Embodiment | | | | | | | | | | | |
| R | .000 | ANG | .000 | 1) | .000 | 2) | -2.494 | 3) | .000 | 4) | .000 |
| R | 10.000 | ANG | -.364 | 1) | .000 | 2) | -1.763 | 3) | .000 | 4) | .000 |
| R | 5.000 | ANG | -.775 | 1) | .000 | 2) | -1.332 | 3) | .000 | 4) | .000 |
| R | 3.000 | ANG | -1.364 | 1) | .000 | 2) | -1.032 | 3) | .000 | 4) | .000 |
| R | 2.000 | ANG | -2.208 | 1) | .000 | 2) | -.736 | 3) | .000 | 4) | .000 |
| R | 1.500 | ANG | -3.203 | 1) | .000 | 2) | -.546 | 3) | .000 | 4) | .000 |
| R | 1.200 | ANG | -4.411 | 1) | .000 | 2) | -.399 | 3) | .000 | 4) | .000 |
| R | .950 | ANG | -6.500 | 1) | .000 | 2) | -.251 | 3) | .000 | 4) | .000 |
| Conversion Coefficient $\gamma_a$ Associated With Direction of Rotation at Telephoto End (194.0 mm) in First Embodiment | | | | | | | | | | | |
| R | .000 | ANG | .000 | 1) | .000 | 2) | -10.769 | 3) | .000 | 4) | .000 |
| R | 10.000 | ANG | -.364 | 1) | .000 | 2) | -8.863 | 3) | .000 | 4) | .000 |
| R | 5.000 | ANG | -.775 | 1) | .000 | 2) | -7.412 | 3) | .000 | 4) | .000 |
| R | 3.000 | ANG | -1.364 | 1) | .000 | 2) | -6.321 | 3) | .000 | 4) | .000 |
| R | 2.000 | ANG | -2.208 | 1) | .000 | 2) | -4.908 | 3) | .000 | 4) | .000 |
| R | 1.500 | ANG | -3.203 | 1) | .000 | 2) | -3.877 | 3) | .000 | 4) | .000 |
| R | 1.200 | ANG | -4.411 | 1) | .000 | 2) | -2.971 | 3) | .000 | 4) | .000 |
| R | .950 | ANG | -6.500 | 1) | .000 | 2) | -1.968 | 3) | .000 | 4) | .000 |

Condition Corresponding Values: $\gamma_{xR}/\gamma_{xo} = 1.81$, $\gamma_{aR}/\gamma_{ao} = 0.18$ As can be seen from Tables 21, 22, and 23, at each focal length, the conversion coefficient $\gamma_x$ associated with the direction of the optical axis increases but the value of the slope (dx/da) of the focus cam decreases as the photographing distance becomes closer to the closest distance. Therefore, as can be seen from these tables, the value of the conversion coefficient $\gamma_a$ associated with the direction of rotation, which is defined as the product of the conversion coefficient $\gamma_x$ and the slope (dx/da) of the focus cam, decreases as the photographing distance becomes closer to the closest distance by the influence of the slope (dx/da) of the focus cam, contrary to a case in which the rotation amount ratio ($a_F/a_Z$) is set to be 1.0, as in the embodiment of Japanese Patent Application Laid-open No. 5-142475.

From Tables 21, 22, and 23, the rate of change, from the infinity in-focus position to the closest in-focus position, of the conversion coefficient $\gamma_a$ associated with the direction of rotation is ×0.37 at the wide-angle end (F=28.8), ×0.31 at the middle position (F=85.0), and ×0.18 at the telephoto end (F=194.0). When the number N of divisions of the focus range upon a change in conversion coefficient $\gamma_a$ in the first embodiment is calculated using formula (a), and is compared with that a case in which the rotation amount ratio ($a_F/a_Z$) is set to be 1.0, as in the embodiment of Japanese Patent Application Laid-Open No. 5-142475, the numbers $N_W$, $N_M$, and $N_T$ of divisions at the wide-angle end, middle position, and telephoto end respectively have the following values: when the rotation amount ratio ($a_F/a_Z$) is set to be 1.0.

$N_W > 14.6$ $N_M > 14.5$ $N_T > 12.3$

First Embodiment $N_W > 5.5$ $N_M > 6.5$ $N_T > 9.3$

Therefore, as can be understood from a comparison with the case in which the ratio of amounts of rotation ($a_F/a_Z$) is set to be 1.0, as in the embodiment of Japanese Patent Application Laid-Open No. 5-142475, the numbers N of divisions become small.

As described above, in the zoom lens of the first embodiment, since the rate of change, from the infinity in-focus position to the closest in-focus position, of the conversion coefficient $\gamma_a$ associated with the direction of rotation becomes much smaller than that in a case in which the ratio ($a_F/a_Z$) of amounts of rotation is set to be 1.0, as in the embodiment of Japanese Patent Application Laid-Open NO. 5-142475, the number of data of the conversion coefficient $\mu_a$ and the correction coefficient $\mu$ can be reduced, and the storage capacity can be suppressed.

Tables 24, 25, and 26 summarize the calculation results of the conversion coefficient $K_a$ and the correction coefficient $\mu$ at the wide-angle end (F=28.8), middle position (F=85.0), and telephoto end (F=194.0) according to the first embodiment. In these tables, (R) is the object distance (m), (ANG) is the amount of rotation for focusing from the infinity corresponding position on the focus cam, (r) is the conversion coefficient $\gamma_a$ in the direction of rotation, (rs) is the conversion coefficient $K_a$, (bf) is the defocus amount (mm), and (l) is the correction coefficient $\mu$. Each table has a matrix structure, and eight rows in the vertical direction indicated by (POS) represent the object positions (R=10.0, 5.0, 3.0, 2.0, 1.5, 1.2, and 0.95 mm), and four pairs (R, ANGLE) in the horizontal direction represent the lens arrangements of the focusing lens unit.

More specifically, the position of the focusing lens in the first pair in the upper two tables in each of Tables 24, 25, and 26, i.e., in the third and fourth columns is (R, ANGLE)=(0.0, 0.0), and it indicates that this position corresponds to the infinity corresponding position. Therefore, the third column (r) in the first table represents the value of the conversion coefficient $\gamma_a$ in the direction of rotation when the focusing lens unit is focused on an infinity object, and the fourth column (rs) represents the value of the conversion coefficient $K_a$ when the focusing lens unit is moved from an in-focus state on an infinity object to an in-focus state at the object distance in the second column. Furthermore, the third column (bf) in the second table represents the defocus amount $\Delta Bf$ from a predetermined imaging position when the position of the focusing lens unit corresponds to the infinity corresponding position, and an object is located at an object distance in the second column, and the fourth column (l) represents the value of the correction coefficient $\mu$ when the focusing lens unit is moved from an in-focus state on an infinity object to an in-focus state at the object distance in the second column.

Similarly, the position of the focusing lens in the fourth pair in the lower two tables in each of Tables 15, 16, and 17, i.e., in the ninth and tenth columns is (R, ANGLE)=(0.95, −6.5), and it indicates that this position corresponds to the closest in-focus (R=0.95 m) corresponding position. Therefore, the ninth column (r) in the third table represents the value of the conversion coefficient $\gamma_a$ in the direction of rotation when the focusing lens unit is focused on a closest distance (R=0.95 m) object, and the tenth column (rs) represents the value of the conversion coefficient $K_a$ when the focusing lens unit is moved from an in-focus state on the closest distance (R=0.95 m) object to an in-focus state at the object distance in the second column. Furthermore, the ninth column (bf) in the fourth table represents the defocus amount ΔBf from a predetermined imaging position when the position of the focusing lens unit corresponds to the closest corresponding position, and the object is located at an object distance in the second column, and the tenth column (l) represents the value of the correction coefficient μ when the focusing lens unit is moved from an in-focus state on the closest distance (R=0.95 m) object to an in-focus state at the object distance in the second column.

As described above, since the conversion coefficient in the direction of rotation is calculated by $K_a=\Delta Bf/\Delta a$ (where Δa: the amount of rotation for focusing), and the correction coefficient μ is calculated by $\mu=\Delta Bf/(1-K_a/\gamma_a)$, the value of the conversion coefficient $K_a$ (eight row, fourth column in first table: (−0.148) when the focusing lens unit is moved from an in-focus state on the infinity object to an in-focus state at the object distance (R=0.95 m) in Table 24 is calculated by $K_a=0.96/−6.5=−0.148$ using ΔBf=0.96 and Δa =−6.5. On the other hand, the value of the correction coefficient μ (eight row, fourth column in second table: 2.75) is calculated as μ=2.75 using ΔBf=0.96, $K_a$=−0.148, and $\gamma_a$=−0.228.

TABLE 24

Conversion Coefficients $K_a$: (rs), $\gamma_a$: (r) Associated with Direction of Rotation and Correction Coefficient μ: (l) at Wide-angle End (28.8 mm) of First Embodiment
F = 28.8 mm

| (R, ANGLE) = | .000 | .000 | 10.000 | −.374 | 5.000 | −.775 | 3.000 | −1.364 |
|---|---|---|---|---|---|---|---|---|
| POS R | r | rs | r | rs | r | rs | r | rs |
| 1 .000 | −.228 | .000 | | −.222 | | −.215 | | −.205 |
| 2 10.000 | | −.224 | −.217 | .000 | | −.210 | | −.199 |
| 3 5.000 | | −.218 | | −.211 | −.204 | .000 | | −.193 |
| 4 3.000 | | −.209 | | −.202 | | −.195 | −.184 | .000 |
| 5 2.000 | | −.197 | | −.190 | | −.183 | | −.173 |
| 6 1.500 | | −.184 | | −.177 | | −.171 | | −.161 |
| 7 1.200 | | −.169 | | −.163 | | −.157 | | −.149 |
| 8 .950 | | −.148 | | −.143 | | −.137 | | −.129 |

| POS | R | bf | l | bf | l | bf | l | bf | l |
|---|---|---|---|---|---|---|---|---|---|
| 1 | .000 | .00 | .00 | −.08 | 3.72 | −.17 | 2.99 | −.28 | 2.52 |
| 2 | 10.000 | .08 | 4.18 | .00 | .00 | −.08 | 2.76 | −.20 | 2.42 |
| 3 | 5.000 | .17 | 3.79 | .08 | 3.12 | .00 | .00 | −.11 | 2.38 |
| 4 | 3.000 | .28 | 3.39 | .20 | 2.87 | .11 | 2.53 | .00 | .00 |
| 5 | 2.000 | .43 | 3.15 | .35 | 2.77 | .26 | 2.54 | .15 | 2.42 |
| 6 | 1.500 | .59 | 3.01 | .50 | 2.72 | .41 | 2.53 | .30 | 2.40 |
| 7 | 1.200 | .75 | 2.90 | .66 | 2.65 | .57 | 2.48 | .45 | 2.33 |
| 8 | .950 | .96 | 2.75 | .87 | 2.55 | .79 | 2.40 | .67 | 2.24 |

| (R, ANGLE) = | 2.000 | −2.208 | 1.500 | −3.203 | 1.200 | −4.411 | .950 | −6.500 |
|---|---|---|---|---|---|---|---|---|
| POS R | r | rs | r | rs | r | rs | r | rs |
| 1 .000 | | −.191 | | −.176 | | −.161 | | −.139 |
| 2 10.000 | | −.185 | | −.171 | | −.156 | | −.134 |
| 3 5.000 | | −.179 | | −.166 | | −.151 | | −.130 |
| 4 3.000 | | −.171 | | −.158 | | −.144 | | −.124 |
| 5 2.000 | −.161 | .000 | | −.148 | | −.135 | | −.115 |
| 6 1.500 | | −.150 | −.138 | .000 | | −.125 | | −.107 |
| 7 1.200 | | −.138 | | −.126 | −.114 | .000 | | −.097 |
| 8 .950 | | −.120 | | −.109 | | −.099 | −.084 | .000 |

| POS | R | bf | l | bf | l | bf | l | bf | l |
|---|---|---|---|---|---|---|---|---|---|
| 1 | .000 | −.42 | 2.28 | −.56 | 2.02 | −.71 | 1.72 | −.90 | 1.39 |
| 2 | 10.000 | −.34 | 2.25 | −.48 | 2.00 | −.63 | 1.70 | −.82 | 1.38 |
| 3 | 5.000 | −.26 | 2.24 | −.40 | 1.99 | −.55 | 1.69 | −.74 | 1.37 |
| 4 | 3.000 | −.14 | 2.24 | −.29 | 1.97 | −.44 | 1.66 | −.63 | 1.36 |
| 5 | 2.000 | .00 | .00 | −.15 | 1.91 | −.30 | 1.62 | −.50 | 1.34 |
| 6 | 1.500 | .15 | 2.18 | .00 | .00 | −.15 | 1.57 | −.35 | 1.32 |
| 7 | 1.200 | .30 | 2.09 | .15 | 1.81 | .00 | .00 | −.20 | 1.32 |
| 8 | .950 | .51 | 2.00 | .36 | 1.75 | .21 | 1.53 | .00 | .00 |

Condition Corresponding Values: $K_{ao}/\gamma_{ao}$ = 0.65, $K_{aR}/\gamma_{aR}$ = 1.65

TABLE 25

Conversion Coefficients $K_a$: (rs), $\gamma_a$: (r) Associated with Direction of Rotation and Correction Coefficient $\mu$: (l) at Middle Position (85.0 mm) of First Embodiment
F = 85.0 mm

| (R, ANGLE) = | .000 | .000 | 10.000 | −.367 | 5.000 | −.762 | 3.000 | −1.341 |
|---|---|---|---|---|---|---|---|---|
| POS | R | r | rs | r | rs | r | rs | r | rs |
| 1 | .000 | −2.040 | .000 |  | −1.932 |  | −1.830 |  | −1.695 |
| 2 | 10.000 |  | −1.994 | −1.888 | .000 |  | −1.789 |  | −1.656 |
| 3 | 5.000 |  | −1.948 |  | −1.845 | −1.745 | .000 |  | −1.613 |
| 4 | 3.000 |  | −1.880 |  | −1.779 |  | −1.681 | −1.551 | .000 |
| 5 | 2.000 |  | −1.783 |  | −1.685 |  | −1.589 |  | −1.463 |
| 6 | 1.500 |  | −1.673 |  | −1.579 |  | −1.487 |  | −1.367 |
| 7 | 1.200 |  | −1.547 |  | −1.458 |  | −1.371 |  | −1.258 |
| 8 | .950 |  | −1.364 |  | −1.283 |  | −1.204 |  | −1.103 |

| POS | R | bf | l | bf | l | bf | l | bf | l |
|---|---|---|---|---|---|---|---|---|---|
| 1 | .000 | .00 | .00 | −.71 | 30.55 | −1.39 | 28.77 | −2.27 | 24.40 |
| 2 | 10.000 | .73 | 32.17 | .00 | .00 | −.71 | 28.19 | −1.61 | 23.81 |
| 3 | 5.000 | 1.49 | 32.70 | .73 | 32.06 | .00 | .00 | −.93 | 23.15 |
| 4 | 3.000 | 2.52 | 32.07 | 1.73 | 30.01 | .97 | 26.33 | .00 | .00 |
| 5 | 2.000 | 3.87 | 30.69 | 3.04 | 28.23 | 2.24 | 25.02 | 1.22 | 21.51 |
| 6 | 1.500 | 5.29 | 29.39 | 4.41 | 26.93 | 3.57 | 24.11 | 2.49 | 21.01 |
| 7 | 1.209 | 6.78 | 28.07 | 5.86 | 25.69 | 4.96 | 23.15 | 3.83 | 20.26 |
| 8 | .950 | 8.86 | 26.72 | 7.87 | 24.52 | 6.91 | 22.28 | 5.69 | 19.69 |

| (R, ANGLE) = | 2.000 | −2.173 | 1.500 | −3.164 | 1.200 | −4.384 | .950 | −6.500 |
|---|---|---|---|---|---|---|---|---|
| POS | R | r | rs | r | rs | r | rs | r | rs |
| 1 | .000 |  | −1.529 |  | −1.365 |  | −1.203 |  | −.995 |
| 2 | 10.000 |  | −1.491 |  | −1.330 |  | −1.170 |  | −.966 |
| 3 | 5.000 |  | −1.451 |  | −1.292 |  | −1.135 |  | −.936 |
| 4 | 3.000 |  | −1.392 |  | −1.238 |  | −1.085 |  | −.893 |
| 5 | 2.000 | −1.310 | .000 |  | −1.164 |  | −1.017 |  | −.836 |
| 6 | 1.500 |  | −1.222 | −1.082 | .000 |  | −.943 |  | −.774 |
| 7 | 1.200 |  | −1.122 |  | −.989 | −.860 | .000 |  | −.709 |
| 8 | .950 |  | −.981 |  | −.865 |  | −.755 | −.629 | .000 |

| POS | R | bf | l | bf | l | bf | l | bf | l |
|---|---|---|---|---|---|---|---|---|---|
| 1 | .000 | −3.32 | 19.86 | −4.32 | 16.47 | −5.27 | 13.23 | −6.46 | 11.13 |
| 2 | 10.000 | −2.69 | 19.45 | −3.72 | 16.21 | −4.70 | 13.04 | −5.92 | 11.06 |
| 3 | 5.000 | −2.05 | 19.03 | −3.10 | 15.96 | −4.11 | 12.86 | −5.37 | 11.01 |
| 4 | 3.000 | −1.16 | 18.54 | −2.26 | 15.65 | −3.30 | 12.62 | −4.61 | 10.98 |
| 5 | 2.000 | .00 | .00 | −1.15 | 15.21 | −2.25 | 12.29 | −3.62 | 11.00 |
| 6 | 1.500 | 1.21 | 18.15 | .00 | .00 | −1.15 | 11.96 | −2.58 | 11.20 |
| 7 | 1.200 | 2.48 | 17.28 | 1.21 | 14.14 | .00 | .00 | −1.50 | 11.76 |
| 8 | .950 | 4.25 | 16.93 | 2.89 | 14.41 | 1.60 | 13.13 | .00 | .00 |

Condition Corresponding Values: $K_{ao}/\gamma_{ao} = 0.67$, $K_{aR}/\gamma_{aR} = 1.58$

TABLE 26

Conversion Coefficients $K_a$: (rs), $\gamma_a$: (r) Associated with Direction of Rotation and Correction Coefficient $\mu$: (l) at Telephoto End (194.0 mm) of First Embodiment
F = 194.0 mm

| (R, ANGLE) = | .000 | .000 | 10.000 | −.364 | 5.000 | −.775 | 3.000 | −1.364 |
|---|---|---|---|---|---|---|---|---|
| POS | R | r | rs | r | rs | r | rs | r | rs |
| 1 | .000 | −10.773 | .000 |  | −9.087 |  | −7.713 |  | −6.525 |
| 2 | 10.000 |  | −10.709 | −8.864 | .000 |  | −7.498 |  | −6.402 |
| 3 | 5.000 |  | −10.460 |  | −8.614 | −7.414 | .000 |  | −6.382 |
| 4 | 3.000 |  | −10.442 |  | −8.650 |  | −7.494 | −6.325 | .000 |
| 5 | 2.000 |  | −10.378 |  | −8.548 |  | −7.324 |  | −6.075 |
| 6 | 1.500 |  | −10.286 |  | −8.395 |  | −7.128 |  | −5.874 |
| 7 | 1.200 |  | −10.127 |  | −8.171 |  | −6.873 |  | −5.617 |
| 8 | .950 |  | −9.771 |  | −7.736 |  | −6.416 |  | −5.177 |

| POS | R | bf | l | bf | l | bf | l | bf | l |
|---|---|---|---|---|---|---|---|---|---|
| 1 | .000 | .00 | .00 | −3.31 | 131.41 | −5.98 | 148.50 | −8.90 | 281.64 |
| 2 | 10.000 | 3.90 | 656.67 | .00 | .00 | −3.08 | 273.04 | −6.40 | 526.44 |
| 3 | 5.000 | 8.11 | 278.71 | 3.54 | 125.86 | .00 | .00 | −3.76 | 419.92 |
| 4 | 3.000 | 14.24 | 463.41 | 8.65 | 358.25 | 4.41 | −412.24 | .00 | .00 |
| 5 | 2.000 | 22.91 | 625.46 | 15.76 | 442.35 | 10.49 | 858.42 | 5.13 | 129.63 |

TABLE 26-continued

Conversion Coefficients $K_a$: (rs), $\gamma_a$: (r) Associated with Direction of Rotation and Correction Coefficient μ: (l) at Telephoto End (194.0 mm) of First Embodiment
F = 194.0 mm

| 6 | 1.500 | 32.94 | 727.96 | 23.83 | 450.74 | 17.30 | 448.54 | 10.80 | 151.32 |
|---|---|---|---|---|---|---|---|---|---|
| 7 | 1.200 | 44.67 | 745.50 | 33.06 | 423.26 | 24.99 | 342.21 | 17.11 | 152.80 |
| 8 | .950 | 63.51 | 683.20 | 47.46 | 373.00 | 36.73 | 272.88 | 26.59 | 146.51 |

| (R, ANGLE) = | | 2.000 | −2.208 | 1.500 | −3.203 | 1.200 | −4.411 | .950 | −6.500 |
|---|---|---|---|---|---|---|---|---|---|
| POS | R | r | rs | r | rs | r | rs | r | rs |
| 1 | .000 | | −5.384 | | −4.488 | | −3.743 | | −2.913 |
| 2 | 10.000 | | −5.285 | | −4.402 | | −3.666 | | −2.847 |
| 3 | 5.000 | | −5.228 | | −4.336 | | −3.600 | | −2.785 |
| 4 | 3.000 | | −5.102 | | −4.219 | | −3.491 | | −2.690 |
| 5 | 2.000 | −4.907 | .000 | | −4.060 | | −3.343 | | −2.561 |
| 6 | 1.500 | | −4.738 | −3.876 | .000 | | −3.169 | | −2.413 |
| 7 | 1.200 | | −4.493 | | −3.645 | −2.969 | .000 | | −2.246 |
| 8 | .950 | | −4.091 | | −3.288 | | −2.656 | −1.967 | .000 |

| POS | R | bf | l | bf | l | bf | l | bf | l |
|---|---|---|---|---|---|---|---|---|---|
| 1 | .000 | −11.89 | 122.19 | −14.37 | 90.97 | −16.51 | 63.35 | −18.93 | 39.37 |
| 2 | 10.000 | −9.74 | 126.26 | −12.49 | 92.01 | −14.83 | 63.20 | −17.47 | 39.04 |
| 3 | 5.000 | −7.49 | 114.37 | −10.53 | 88.60 | −13.09 | 61.65 | −15.95 | 38.32 |
| 4 | 3.000 | −4.31 | 107.94 | −7.76 | 87.53 | −10.64 | 60.51 | −13.82 | 37.56 |
| 5 | 2.000 | .00 | .00 | −4.04 | 84.82 | −7.36 | 58.59 | −10.99 | 36.41 |
| 6 | 1.500 | 4.71 | 137.55 | .00 | .00 | −3.83 | 56.96 | −7.96 | 35.09 |
| 7 | 1.200 | 9.90 | 117.35 | 4.40 | 73.94 | .00 | .00 | −4.69 | 33.10 |
| 8 | .950 | 17.56 | 105.60 | 10.84 | 71.42 | 5.55 | 52.59 | .00 | .00 |

Condition Corresponding Values: $K_{a0}/\gamma_{a0} = 0.91$  $K_{aR}/\gamma_{aR} = 1.48$ As can be seen from Tables 24, 25, and 26 above, when a change in conversion coefficient $K_a$: (rs) (e.g., the fourth column in the first table) at a given lens arrangement (e.g., at the infinity in-focus arrangement) is considered, the rate of change becomes small as compared to the change in $K_a$ (Tables 6, 7, and 8) in a case in which the ratio $(a_F/a_Z)$ of amounts of rotation is set to be 1.0, as in the previously-discussed embodiment of Japanese Patent Application Laid-Open No. 5-142475 examined previously.

More specifically, the amount Δa of rotation for focusing in the first embodiment at the infinity object side becomes relatively smaller than that at the closest object side, as compared to a case in which the ratio $(a_F/a_Z)$ of amounts of rotation is set to be 1.0, as in the embodiment of Japanese Patent Application Laid-Open No. 5-142475. In fact, when the ratio between the amount of rotation for focusing upon focusing to the closest distance and the amount of rotation for focusing upon focusing to the object distance (R=5.0 m) is calculated in Tables 1 and 19, 4.807/10.0=0.481 when the ratio $(a_F/a_Z)$ of amounts of rotation is set to be 1.0, while −0.775/−6.5=0.119 in the first embodiment. As described above, when the focus cam with the arrangement of the present invention is used, since the amount Δa of rotation for focusing becomes relatively smaller at the infinity object side, the conversion coefficient $K_a$ becomes relatively large at the infinity object side, and consequently, the change in conversion coefficient $K_a$ in the direction of rotation can be reduced as compared to the conventional system.

The calculation results of the rate of change of $K_a$ with respect to $\gamma_a$ at the infinity in-focus arrangement and the closest in-focus arrangement at the wide-angle end (F=28.8), middle position (F=85.0), and telephoto end (F=194.0) in the case in which the ratio $(a_F/a_Z)$ of amounts of rotation is set to be 1.0, as in the embodiment of Japanese Patent Application Laid-Open No. 5-142475 and in the first embodiment of the present invention is which said ratio $(a_F/a_Z)$ is set to be −0.65 are as follows.

| When the ratio $(a_F/a_Z)$ is set to be 1.0 | | |
|---|---|---|
| | Infinity Arrangement $K_{a0}/\gamma_{a0}$ | Closest Arrangement $K_{aR}/\gamma_{aR}$ |
| Wide-angle End (F = 28.8) | 5.05 | 0.33 |
| Middle Position (F = 85.0) | 6.24 | 0.32 |
| Telephoto End (F = 194.0) First Embodiment | 9.49 | 0.30 |
| Wide-angle End (F = 28.8) | 0.65 | 1.65 |
| Middle Position (F = 85.0) | 0.67 | 1.58 |
| Telephoto End (F = 194.0) | 0.91 | 1.48 |

As described above, according to the present invention, since the rate of change of $K_a$ with respect to $\gamma_a$ is small as compared to the conventional system, and the contribution of the correction term (ΔBf/μ) in $K_a = \gamma_a(1-\Delta Bf/\mu)$ can be reduced, the value of the correction coefficient μ can be set to be large as compared to the defocus amount ΔBf, and at the same time, the change in correction coefficient μ can be decreased.

Therefore, even when only a pair of a conversion coefficient $\gamma_a$ value and a correction coefficient μ value are set for a given lens arrangement large, an error in the conversion coefficient $K_a$ calculated using $\gamma_a$ and μ or in the actual lens driving amount Δa for focusing can be eliminated.

Next, in the case in which the ratio $(a_F/a_Z)$ of amounts of rotation is set to 1.0, as in the embodiment of Japanese Patent Application Laid-Open No. 5-142475 and the first embodiment of the present invention in which the ratio $(a_F/a_Z)$ is set to −0.65, when the lens driving amounts upon focusing from the infinity in-focus lens arrangement to the closest distance object and upon focusing from the closest in-focus lens arrangement to the infinity object at the wide-angle end (F=28.8), middle position (F=85.0), and telephoto end (F=194.0) are calculated from $\Delta a=\Delta Bf/[\gamma_a(1-\Delta Bf/\mu)]$, and errors from the actual lens driving amounts are then calculated, the following values are obtained. Note that the value of the correction coefficient µ upon focusing from the infinity in-focus lens arrangement to the closest distance object adopts a value at the object distance (POS-5), and the value of the correction coefficient µ upon focusing from the closest in-focus lens arrangement to the infinity object adopts a value at the object distance (POS-4).

| When the ratio ($a_p/a_z$) of amounts of rotation is set to 1.0 | | |
|---|---|---|
| | Infinity Arrangement → Closest In-focus State | Closest Arrangement → Infinity In-focus State |
| Wide-angle End (F = 28.8) | −9.3% | −27.2% |
| Middle Position (F = 85.0) | −11.7% | −28.3% |
| Telephoto End (F = 194.0) First Embodiment | −13.7% | −28.9% |
| Wide-angle End (F = 28.8) | −6.8% | −0.8% |
| Middle Position (F = 85.0) | −6.1% | −0.5% |
| Telephoto End (F = 194.0) | 1.0% | −1.6% |

As described above, even when only a pair of a conversion coefficient $\gamma_a$ value and a correction coefficient µ value are set for a given lens arrangement range, an error between the conversion coefficient $K_a$ calculated from $\gamma_a$ and µ and the lens driving amount Δa for focusing becomes small as compared to the conventional system, and focusing can be realized with higher accuracy.

Next, an examination will be made as to whether not only accurate auto-focusing but also so-called manual focusing can be attained in the zoom lens of the first embodiment.

Table 27 summarizes the amount (ANGLE DA) of rotation for focusing upon manual focusing using the focus cam (the middle table in Table 19) of the first embodiment, the amount DX (mm) of movement, in the direction of the optical axis, of the focusing lens unit corresponding to the amount of rotation for focusing, and the displacement amount Bf (mm) of the imaging point when the amount (DX) of movement in the direction of the optical axis is given.

The upper table in Table 27 summarizes the displacement amount (Bf) of the imaging point corresponding to the photographing distances (R=5.0, 3.0, 2.0, 1.5, 1.2, and 0.95 m) in the respective zooming states of the focal lengths (F=28.8, 35.0, 50.0, 85.0, 135.0, and 194.0 mm), and the middle table summarizes the values of the amount (ANGLE DA) of rotation for focusing required for attaining an optimal in-focus state with respect to the respective photographing distances (R=5.0, 3.0, 2.0, 1.5, 1.2, and 0.95 m). Note that the amounts of rotation for focusing, which have values for eliminating any displacement of the imaging point at the wide-angle end and the telephoto end, are selected. The lower table summarizes the amounts (DX) of movement, in the direction of the optical axis, of the respective lens units corresponding to the amount (ANGLE DA) of rotation for focusing in association with the photographing distances (R=5.0, 3.0, 2.0, 1.5, 1.2, and 0.95 m) in the respective zooming states with the focal lengths (F=28.8, 35.0, 50.0, 85.0, 135.0, and 194.0 mm). In the lower table, (F) is the focal length (mm) of the entire system, (R) is the photographing distance (m), and (DX) is the amount (mm) of movement, in the direction of the optical axis, of each of the first, second, third, and fourth lens units in turn from the right side. Note that the amount of movement in the direction of the optical axis toward the object side is represented by a positive value.

TABLE 27

Displacement Amount Bf (mm) of Imaging Point and Amount DX (mm) of movement for focusing in First Embodiment

| | | 0.95 m | 1.20 m | 1.50 m | 2.00 m | 3.00 m | 5.00 m |
|---|---|---|---|---|---|---|---|
| F | 28.800 Bf | .000 | .000 | .000 | .000 | .000 | .000 |
| F | 35.000 Bf | .000 | .001 | .002 | .003 | .006 | .006 |
| F | 50.000 Bf | .000 | .007 | .016 | .015 | .007 | .002 |
| F | 85.000 Bf | .000 | −.023 | −.042 | −.046 | −.035 | −.022 |
| F | 135.000 Bf | .000 | −.043 | −.038 | −.042 | −.027 | −.019 |
| F | 194.000 Bf | .000 | .000 | .000 | .000 | .000 | .000 |
| | ANGLE DA | −6.500 | −4.411 | −3.203 | −2.208 | −1.364 | −.775 |
| F | 28.800 DX | .000 | .536 | .000 | .000 | R | 0.95 m |
| F | 35.000 DX | .000 | .622 | .000 | .000 | R | 0.95 m |
| F | 50.000 DX | .000 | .855 | .000 | .000 | R | 0.95 m |
| F | 85.000 DX | .000 | 1.519 | .000 | .000 | R | 0.95 m |
| F | 135.000 DX | .000 | 2.800 | .000 | .000 | R | 0.95 m |
| F | 194.000 DX | .000 | 4.673 | .000 | .000 | R | 0.95 m |
| F | 28.800 DX | .000 | .419 | .000 | .000 | R | 1.20 m |
| F | 35.000 DX | .000 | .487 | .000 | .000 | R | 1.20 m |
| F | 50.000 DX | .000 | .671 | .000 | .000 | R | 1.20 m |
| F | 85.000 DX | .000 | 1.220 | .000 | .000 | R | 1.20 m |
| F | 135.000 DX | .000 | 2.315 | .000 | .000 | R | 1.20 m |
| F | 194.000 DX | .000 | 4.008 | .000 | .000 | R | 1.20 m |
| F | 28.800 DX | .000 | .332 | .000 | .000 | R | 1.50 m |
| F | 35.000 DX | .000 | .386 | .000 | .000 | R | 1.50 m |
| F | 50.000 DX | .000 | .532 | .000 | .000 | R | 1.50 m |
| F | 85.000 DX | .000 | .989 | .000 | .000 | R | 1.50 m |
| F | 135.000 DX | .000 | 1.918 | .000 | .000 | R | 1.50 m |

TABLE 27-continued

Displacement Amount Bf (mm) of Imaging Point and Amount DX (mm) of movement for focusing in First Embodiment

| F | 194.000 DX | .000 | 3.445 | .000 | .000 | R | 1.50 m |
|---|---|---|---|---|---|---|---|
| F | 28.800 DX | .000 | .247 | .000 | .000 | R | 2.00 m |
| F | 35.000 DX | .000 | .286 | .000 | .000 | R | 2.00 m |
| F | 50.000 DX | .000 | .397 | .000 | .000 | R | 2.00 m |
| F | 85.000 DX | .000 | .752 | .000 | .000 | R | 2.00 m |
| F | 135.000 DX | .000 | 1.497 | .000 | .000 | R | 2.00 m |
| F | 194.000 DX | .000 | 2.813 | .000 | .000 | R | 2.00 m |
| F | 28.800 DX | .000 | .163 | .000 | .000 | R | 3.00 m |
| F | 35.000 DX | .000 | .188 | .000 | .000 | R | 3.00 m |
| F | 50.000 DX | .000 | .264 | .000 | .000 | R | 3.00 m |
| F | 85.000 DX | .000 | .507 | .000 | .000 | R | 3.00 m |
| F | 135.000 DX | .000 | 1.042 | .000 | .000 | R | 3.00 m |
| F | 194.000 DX | .000 | 2.082 | .000 | .000 | R | 3.00 m |
| F | 28.800 DX | .000 | .097 | .000 | .000 | R | 5.00 m |
| F | 35.000 DX | .000 | .111 | .000 | .000 | R | 5.00 m |
| F | 50.000 DX | .000 | .159 | .000 | .000 | R | 5.00 m |
| F | 85.000 DX | .000 | .307 | .000 | .000 | R | 5.00 m |
| F | 135.000 DX | .000 | .651 | .000 | .000 | R | 5.00 m |
| F | 194.000 DX | .000 | 1.387 | .000 | .000 | R | 5.00 m |

As can be seen from Table 27, so-called manual focusing can be attained since the displacement amounts of the imaging point at the respective focal lengths and photographing distances are very small, and fall within the depth of focus independently of the zooming state and photographing distance.

[Second Embodiment]

The second embodiment is directed to a zoom lens which has a five-unit arrangement, i.e., positive, negative, positive, and positive lens units, and attains focusing by a negative second lens unit. In this zoom lens, the rotation amount ratio ($a_F/a_Z$) of the rotation amount for focusing from the infinity in-focus position to the closest in-focus position (R=0.8 m) to the amount of rotation for zooming from the wide-angle end (F=28.8) to the telephoto end (F=131.0) is set to be −0.75.

Table 28 below summarizes various paraxial data of an optical system and data for defining the shape of a focus cam according to the second embodiment.

The upper table in Table 28 summarizes the focal lengths and principal point interval data of the respective lens units of the optical system corresponding to the second embodiment in association with six zooming states (focal length F=28.8 (1-POS), 35.0 (2-POS), 50.0 (3-POS), 70.0 (4-POS), 105.0 (5-POS) and 131.0 mm (6-POS)).

The middle table in Table 28 summarizes spline sample data when the shape of the focus cam in the second lens unit of the second embodiment, which is used for focusing, is expressed by a spline function associated with the angle a of rotation of a rotatable lens barrel and the amount x of movement in the direction of the optical axis. In this middle table, (1), (2), (3), (4), and (5) correspond to the first, second, third, fourth, and fifth lens units, respectively.

Furthermore, the lower table in Table 28 summarizes the infinity focusing positions (infinity corresponding positions) at the respective focal lengths (F=28.8, 35.0, 50.0, 70.0, 105.0, and 131.0 mm), and the amounts of rotation (amounts of rotation for focusing) upon focusing to respective photographing distances (R=5.0, 3.0, 2.0, 1.5, 1.0, and 0.8 m) using the focus cam of the second embodiment. In this table, since the amount of rotation for zooming from the wide-angle end (F=28.8) to the telephoto end (F=131.0) is set to be 10.0, and the amount of rotation for focusing from the infinity in-focus position to the closest in-focus position (R=0.8 m) is set to be −7.5, the rotation amount ratio ($a_F/a_Z$) of the amount of rotation for focusing to the amount of rotation for zooming in the second embodiment is −0.75.

TABLE 28

Second Embodiment F = 28.8 to 131.0 (Rotation Amount Ratio: $a_F/a_Z$ = −0.75)

Focal lengths and Principal Point Intervals of Lens Units of Second Embodiment

|   |   |   | 1-POS | 2-POS | 3-POS | 4-POS | 5-POS | 6-POS |
|---|---|---|---|---|---|---|---|---|
|   |   | F | 28.8000 | 35.0000 | 50.0000 | 70.0000 | 105.0000 | 131.0000 |
| F1 | 77.2000 | D1 | 10.3313 | 15.1893 | 23.5104 | 30.7072 | 38.5116 | 42.3545 |
| F2 | −14.7000 | D2 | 27.6049 | 24.9667 | 20.7775 | 17.3207 | 13.3359 | 11.0136 |
| F3 | 21.3000 | D3 | 6.0146 | 7.0237 | 8.9018 | 10.6018 | 12.3379 | 13.0291 |
| F4 | −37.0000 | D4 | 9.0353 | 8.0262 | 6.1481 | 4.4481 | 2.7120 | 2.0208 |
| F5 | 60.0000 | D5 | 50.6898 | 52.5061 | 55.8867 | 58.9468 | 62.0719 | 63.3160 |

Focus Cam Shape (Spline Interpolation Sample Point) Corresponding to Second Embodiment

|   | ANGLE | (1) | (2) | (3) | (4) | (5) |
|---|---|---|---|---|---|---|
| 1 | −10.0000 | .0000 | .8070 | .0000 | .0000 | .0000 |
| 2 | −7.5000 | .0000 | .6835 | .0000 | .0000 | .0000 |
| 3 | −5.1843 | .0000 | .5397 | .0000 | .0000 | .0000 |

TABLE 28-continued

Second Embodiment F = 28.8 to 131.0 (Rotation Amount Ratio: $a_F/a_Z = -0.75$)

| | | | | | | |
|---|---|---|---|---|---|---|
| 4 | −2.9523 | .0000 | .3538 | .0000 | .0000 | .0000 |
| 5 | −2.0697 | .0000 | .2632 | .0000 | .0000 | .0000 |
| 6 | −1.2981 | .0000 | .1740 | .0000 | .0000 | .0000 |
| 7 | −.7436 | .0000 | .1038 | .0000 | .0000 | .0000 |
| 8 | −.0000 | .0000 | .0000 | .0000 | .0000 | .0000 |
| 9 | 2.5000 | .0000 | −.4452 | .0000 | .0000 | .0000 |
| 10 | 4.8157 | .0000 | −1.0711 | .0000 | .0000 | .0000 |
| 11 | 7.0477 | .0000 | −2.0300 | .0000 | .0000 | .0000 |
| 12 | 7.9303 | .0000 | −2.5880 | .0000 | .0000 | .0000 |
| 13 | 8.7019 | .0000 | −3.2255 | .0000 | .0000 | .0000 |
| 14 | 9.2564 | .0000 | −3.8190 | .0000 | .0000 | .0000 |
| 15 | 10.0000 | .0000 | −4.9504 | .0000 | .0000 | .0000 |
| 16 | 11.0000 | .0000 | −7.4500 | .0000 | .0000 | .0000 |

Amount of Rotation for Zooming and Amount of Rotation for Focusing of Second Embodiment
Rotation Amount Ratio: $a_F/a_Z = -0.75$)

| Focal length | Infinity Correspond- ing Position | Photograph- ing Distance | Amount of Rotation for Focusing |
|---|---|---|---|
| 28.8 mm | .0000 | 5.00 m | −.744 |
| 35.0 mm | 1.4190 | 3.00 m | −1.298 |
| 50.0 mm | 3.9887 | 2.00 m | −2.070 |
| 70.0 mm | 6.3656 | 1.50 m | −2.952 |
| 105.0 mm | 8.9103 | 1.00 m | −5.184 |
| 131.0 mm | 10.0000 | 0.80 m | −7.500 |
| Condition Corresponding Value (1) | | 1.76 | |
| Condition Corresponding Value (2) | | 6.59 | |
| Condition Corresponding Value (3) | | −0.75 | |
| Condition Corresponding Value (4) | | 0.38 (wide-angle end) | |
| | | 0.19 (telephoto end) | |
| Condition Corresponding Value (5) | | 0.65 (wide-angle end) | |
| | | 0.79 (telephoto end) | |
| Condition Corresponding Value (6) | | 1.59 (wide-angle end) | |
| | | 1.52 (telephoto end) | |

Table 29 below summarizes the numerical value data of the cams of the focusing lens unit in the second embodiment, which data are calculated by interpolation based on a spline function on the basis of the sample data of the focus cam summarized in the middle table in Table 28. Note that the meanings of the reference symbols in Table 29 are the same as those in the first embodiment.

TABLE 29

Cam Numerical Value Data of Focusing Lens Unit in Second Embodiment

| Focus Cam Numerical Value Data | | | Zoom Compensation Cam Numerical Value Data | | |
|---|---|---|---|---|---|
| ANGLE | (2) | F | ANGLE | (2) | F |
| −7.5000 | .6835 | .0000 | | | |
| −7.0000 | .6557 | .0000 | | | |
| −6.5000 | .6263 | .0000 | | | |
| −6.0000 | .5951 | .0000 | | | |
| −5.5000 | .5618 | .0000 | | | |
| −5.0000 | .5264 | .0000 | | | |
| −4.5000 | .4885 | .0000 | | | |
| −4.0000 | .4480 | .0000 | | | |
| −3.5000 | .4047 | .0000 | | | |
| −3.0000 | .3584 | .0000 | | | |
| −2.5000 | .3088 | .0000 | | | |
| −2.0000 | .2555 | .0000 | | | |
| −1.5000 | .1983 | .0000 | | | |
| −1.0000 | .1370 | .0000 | | | |
| −.5000 | .0710 | .0000 | | | |
| .0000 | .0000 | 28.8000 | .0000 | .0000 | 28.8000 |

TABLE 29-continued

Cam Numerical Value Data of Focusing Lens Unit in Second Embodiment

| Focus Cam Numerical Value Data | | | Zoom Compensation Cam Numerical Value Data | | |
|---|---|---|---|---|---|
| ANGLE | (2) | F | ANGLE | (2) | F |
| .5000 | −.0759 | 30.8560 | .5000 | .2539 | 30.8560 |
| 1.0000 | −.1573 | 33.0458 | 1.0000 | −.4569 | 33.0458 |
| 1.5000 | −.2454 | 35.3916 | 1.5000 | −.6163 | 35.3916 |
| 2.0000 | −.3410 | 37.9133 | 2.0000 | −.7276 | 37.9133 |
| 2.5000 | −.4452 | 40.6272 | 2.5000 | −.8018 | 40.6272 |
| 3.0000 | −.5589 | 43.5482 | 3.0000 | −.8388 | 43.5482 |
| 3.5000 | −.6834 | 46.6939 | 3.5000 | −.8415 | 46.6939 |
| 4.0000 | −.8198 | 50.0790 | 4.0000 | −.8129 | 50.0790 |
| 4.5000 | −.9694 | 53.7142 | 4.5000 | −.7562 | 53.7142 |
| 5.0000 | −1.1334 | 57.6059 | 5.0000 | −.6746 | 57.6059 |
| 5.5000 | −1.3144 | 61.7941 | 5.5000 | −.5712 | 61.7941 |
| 6.0000 | −1.5167 | 66.3669 | 6.0000 | −.4479 | 66.3669 |
| 6.5000 | −1.7450 | 71.4029 | 6.5000 | −.3068 | 71.4029 |
| 7.0000 | −2.0036 | 76.9473 | 7.0000 | −.1503 | 76.9473 |
| 7.5000 | −2.2981 | 83.0582 | 7.5000 | .0186 | 83.0582 |
| 8.0000 | −2.6387 | 89.9025 | 8.0000 | .1978 | 89.9025 |
| 8.5000 | −3.0406 | 97.6869 | 8.5000 | .3859 | 97.6869 |
| 9.0000 | −3.5275 | 106.7265 | 9.0000 | .5812 | 106.7265 |
| 9.5000 | −4.1299 | 117.3403 | 9.5000 | .7803 | 117.3403 |
| 10.0000 | −4.9504 | 131.0000 | 10.0000 | .9852 | 131.0000 |

The left table in Table 29 summarizes the numerical value data of the focus cam of the second embodiment, and the right table in Table 29 summarizes the numerical value data of the zoom compensation cam of this embodiment. A value obtained by synthesizing the amounts (2) of movement in the direction of the optical axis in the numerical value data of the focus cam and the zoom compensation cam in the range from the amount of rotation (ANGLE=0.0) to the amount of rotation (ANGLE=10.0) coincides with the movement locus of the second lens unit calculated using the paraxial data in the upper table in Table 28.

Tables 30, 31, and 32 below summarize the amount DX (mm) of movement for focusing, in the direction of the optical axis, of the focusing lens unit, the imaging magnifications $\beta_K$ of the respective lens units, the conversion coefficient $\gamma_x$ associated with the direction of the optical axis, the slope (dx/da) of the focus cam, and the conversion coefficient $\gamma_a$ associated with the direction of rotation at the wide-angle end (F=28.8), the middle position (F=70.0), and the telephoto end (F=131.0) according to the second embodiment, respectively. The arrangements of the respective tables and the meanings of the reference symbols are the same as those in the first embodiment.

TABLE 30

Amount DX (mm) of Movement for Focusing in Direction of Optical Axis at Wide-angle End (28.8 mm) in Second Embodiment

| R | .000 | ANG | .000 | 1) | .000 | 2) | .000 | 3) | .000 | 4) | .000 | 5) | .000 |
|---|---|---|---|---|---|---|---|---|---|---|---|---|---|
| R | 10.000 | ANG | −.360 | 1) | .000 | 2) | .052 | 3) | .000 | 4) | .000 | 5) | .000 |
| R | 5.000 | ANG | −.744 | 1) | .000 | 2) | .104 | 3) | .000 | 4) | .000 | 5) | .000 |
| R | 3.000 | ANG | −1.298 | 1) | .000 | 2) | .174 | 3) | .000 | 4) | .000 | 5) | .000 |
| R | 2.000 | ANG | −2.070 | 1) | .000 | 2) | .263 | 3) | .000 | 4) | .000 | 5) | .000 |
| R | 1.500 | ANG | −2.952 | 1) | .000 | 2) | .354 | 3) | .000 | 4) | .000 | 5) | .000 |
| R | 1.000 | ANG | −5.184 | 1) | .000 | 2) | .540 | 3) | .000 | 4) | .000 | 5) | .000 |
| R | .800 | ANG | −7.500 | 1) | .000 | 2) | .684 | 3) | .000 | 4) | .000 | 5) | .000 |

Imaging Magnification $\beta_K$ of Lens Units at Wide-angle End (28.8 mm) in Second Embodiment

| R | .000 | ANG | .000 | 1) | .000 | 2) | −.282 | 3) | −.847 | 4) | 10.073 | 5) | .155 |
|---|---|---|---|---|---|---|---|---|---|---|---|---|---|
| R | 10.000 | ANG | −.360 | 1) | −.008 | 2) | −.278 | 3) | −.847 | 4) | 10.073 | 5) | .155 |
| R | 5.000 | ANG | −.744 | 1) | −.016 | 2) | −.275 | 3) | −.847 | 4) | 10.073 | 5) | .155 |
| R | 3.000 | ANG | −1.298 | 1) | −.027 | 2) | −.270 | 3) | −.847 | 4) | 10.073 | 5) | .155 |
| R | 2.000 | ANG | −2.070 | 1) | −.042 | 2) | −.264 | 3) | −.847 | 4) | 10.073 | 5) | .155 |
| R | 1.500 | ANG | −2.952 | 1) | −.059 | 2) | −.258 | 3) | −.847 | 4) | 10.073 | 5) | .155 |
| R | 1.000 | ANG | −5.184 | 1) | −.094 | 2) | −.245 | 3) | −.847 | 4) | 10.073 | 5) | .155 |
| R | .800 | ANG | −7.500 | 1) | −.125 | 2) | −.235 | 3) | −.847 | 4) | 10.073 | 5) | .155 |

Conversion Coefficient $\gamma_x$ Associated With Direction of Optical Axis at Wide-angle End (28.8 mm) in Second Embodiment

| R | .000 | ANG | .000 | 1) | .000 | 2) | 1.614 | 3) | .000 | 4) | .000 | 5) | .000 |
|---|---|---|---|---|---|---|---|---|---|---|---|---|---|
| R | 10.000 | ANG | −.360 | 1) | .000 | 2) | 1.617 | 3) | .000 | 4) | .000 | 5) | .000 |
| R | 5.000 | ANG | −.744 | 1) | .000 | 2) | 1.621 | 3) | .000 | 4) | .000 | 5) | .000 |
| R | 3.000 | ANG | −1.298 | 1) | .000 | 2) | 1.625 | 3) | .000 | 4) | .000 | 5) | .000 |
| R | 2.000 | ANG | −2.070 | 1) | .000 | 2) | 1.631 | 3) | .000 | 4) | .000 | 5) | .000 |
| R | 1.500 | ANG | −2.952 | 1) | .000 | 2) | 1.636 | 3) | .000 | 4) | .000 | 5) | .000 |
| R | 1.000 | ANG | −5.184 | 1) | .000 | 2) | 1.648 | 3) | .000 | 4) | .000 | 5) | .000 |
| R | .800 | ANG | −7.500 | 1) | .000 | 2) | 1.656 | 3) | .000 | 4) | .000 | 5) | .000 |

Slope dx/da of Focus Cam at Wide-angle End (28.8 mm) in Second Embodiment

| R | .000 | ANG | .000 | 1) | .000 | 2) | −.147 | 3) | .000 | 4) | .000 | 5) | .000 |
|---|---|---|---|---|---|---|---|---|---|---|---|---|---|
| R | 10.000 | ANG | −.360 | 1) | .000 | 2) | −.140 | 3) | .000 | 4) | .000 | 5) | .000 |
| R | 5.000 | ANG | −.744 | 1) | .000 | 2) | −.132 | 3) | .000 | 4) | .000 | 5) | .000 |
| R | 3.000 | ANG | −1.298 | 1) | .000 | 2) | −.122 | 3) | .000 | 4) | .000 | 5) | .000 |
| R | 2.000 | ANG | −2.070 | 1) | .000 | 2) | −.109 | 3) | .000 | 4) | .000 | 5) | .000 |
| R | 1.500 | ANG | −2.952 | 1) | .000 | 2) | −.096 | 3) | .000 | 4) | .000 | 5) | .000 |
| R | 1.000 | ANG | −5.184 | 1) | .000 | 2) | −.071 | 3) | .000 | 4) | .000 | 5) | .000 |
| R | .800 | ANG | −7.500 | 1) | .000 | 2) | −.054 | 3) | .000 | 4) | .000 | 5) | .000 |

Conversion Coefficient $\gamma_a$ Associated With Direction of Rotation at Wide-angle End (28.8 mm) in Second Embodiment

| R | .000 | ANG | .000 | 1) | .000 | 2) | −.237 | 3) | .000 | 4) | .000 | 5) | .000 |
|---|---|---|---|---|---|---|---|---|---|---|---|---|---|
| R | 10.000 | ANG | −.360 | 1) | .000 | 2) | −.226 | 3) | .000 | 4) | .000 | 5) | .000 |
| R | 5.000 | ANG | −.744 | 1) | .000 | 2) | −.214 | 3) | .000 | 4) | .000 | 5) | .000 |
| R | 3.000 | ANG | −1.298 | 1) | .000 | 2) | −.198 | 3) | .000 | 4) | .000 | 5) | .000 |
| R | 2.000 | ANG | −2.070 | 1) | .000 | 2) | −.178 | 3) | .000 | 4) | .000 | 5) | .000 |
| R | 1.500 | ANG | −2.952 | 1) | .000 | 2) | −.158 | 3) | .000 | 4) | .000 | 5) | .000 |
| R | 1.000 | ANG | −5.184 | 1) | .000 | 2) | −.118 | 3) | .000 | 4) | .000 | 5) | .000 |
| R | .800 | ANG | −7.500 | 1) | .000 | 2) | −.090 | 3) | .000 | 4) | .000 | 5) | .000 |

Condition Corresponding Values: $\gamma_{xR}/\gamma_{x0} = 1.03$, $\gamma_{aR}/\gamma_{a0} = 0.38$

TABLE 31

Amount DX (mm) of Movement for Focusing in Direction of Optical Axis at Middle Position (70.0 mm) in Second Embodiment

| R | .000 | ANG | .000 | 1) | .000 | 2) | .000 | 3) | .000 | 4) | .000 | 5) | .000 |
|---|---|---|---|---|---|---|---|---|---|---|---|---|---|
| R | 10.000 | ANG | −.357 | 1) | .000 | 2) | .160 | 3) | .000 | 4) | .000 | 5) | .000 |

TABLE 31-continued

| | | | | | | | | | | | |
|---|---|---|---|---|---|---|---|---|---|---|---|
| R | 5.000 | ANG | −.740 | 1) | .000 | 2) | .318 | 3) .000 | 4) .000 | 5) | .000 |
| R | 3.000 | ANG | −1.295 | 1) | .000 | 2) | .523 | 3) .000 | 4) .000 | 5) | .000 |
| R | 2.000 | ANG | −2.068 | 1) | .000 | 2) | .774 | 3) .000 | 4) .000 | 5) | .000 |
| R | 1.500 | ANG | −2.945 | 1) | .000 | 2) | 1.018 | 3) .000 | 4) .000 | 5) | .000 |
| R | 1.000 | ANG | −5.176 | 1) | .000 | 2) | 1.491 | 3) .000 | 4) .000 | 5) | .000 |
| R | .800 | ANG | −7.500 | 1) | .000 | 2) | 1.835 | 3) .000 | 4) .000 | 5) | .000 |

Imaging Magnification $\beta_K$ of Lens Units at Middle Position (70.0 mm) in Second Embodiment

| | | | | | | | | | | | |
|---|---|---|---|---|---|---|---|---|---|---|---|
| R | .000 | ANG | .000 | 1) | .000 | 2) | −.462 | 3) 1.216 | 4) 91.883 | 5) | .018 |
| R | 10.000 | ANG | −.357 | 1) | −.008 | 2) | −.451 | 3) 1.216 | 4) 91.883 | 5) | .018 |
| R | 5.000 | ANG | −.740 | 1) | −.016 | 2) | −.441 | 3) 1.216 | 4) 91.883 | 5) | .018 |
| R | 3.000 | ANG | −1.295 | 1) | −.028 | 2) | −.427 | 3) 1.216 | 4) 91.883 | 5) | .018 |
| R | 2.000 | ANG | −2.068 | 1) | −.043 | 2) | −.410 | 3) 1.216 | 4) 91.883 | 5) | .018 |
| R | 1.500 | ANG | −2.945 | 1) | −.059 | 2) | −.393 | 3) 1.216 | 4) 91.883 | 5) | .018 |
| R | 1.000 | ANG | −5.176 | 1) | −.096 | 2) | −.361 | 3) 1.216 | 4) 91.883 | 5) | .018 |
| R | .800 | ANG | −7.500 | 1) | −.129 | 2) | −.338 | 3) 1.216 | 4) 91.883 | 5) | .018 |

Conversion Coefficient $\gamma_x$ Associated With Direction of Optical Axis at Middle Position (70.0 mm) in Second Embodiment

| | | | | | | | | | | | |
|---|---|---|---|---|---|---|---|---|---|---|---|
| R | .000 | ANG | .000 | 1) | .000 | 2) | 3.024 | 3) .000 | 4) .000 | 5) | .000 |
| R | 10.000 | ANG | −.357 | 1) | .000 | 2) | 3.062 | 3) .000 | 4) .000 | 5) | .000 |
| R | 5.000 | ANG | −.740 | 1) | .000 | 2) | 3.099 | 3) .000 | 4) .000 | 5) | .000 |
| R | 3.000 | ANG | −1.295 | 1) | .000 | 2) | 3.145 | 3) .000 | 4) .000 | 5) | .000 |
| R | 2.000 | ANG | −2.068 | 1) | .000 | 2) | 3.200 | 3) .000 | 4) .000 | 5) | .000 |
| R | 1.500 | ANG | −2.945 | 1) | .000 | 2) | 3.251 | 3) .000 | 4) .000 | 5) | .000 |
| R | 1.000 | ANG | −5.176 | 1) | .000 | 2) | 3.345 | 3) .000 | 4) .000 | 5) | .000 |
| R | .800 | ANG | −7.500 | 1) | .000 | 2) | 3.408 | 3) .000 | 4) .000 | 5) | .000 |

Slope dx/da of Focus Cam at Middle Position (70.0 mm) in Second Embodiment

| | | | | | | | | | | | |
|---|---|---|---|---|---|---|---|---|---|---|---|
| R | .000 | ANG | .000 | 1) | .000 | 2) | −.469 | 3) .000 | 4) .000 | 5) | .000 |
| R | 10.000 | ANG | −.357 | 1) | .000 | 2) | −.430 | 3) .000 | 4) .000 | 5) | .000 |
| R | 5.000 | ANG | −.740 | 1) | .000 | 2) | −.393 | 3) .000 | 4) .000 | 5) | .000 |
| R | 3.000 | ANG | −1.295 | 1) | .000 | 2) | −.348 | 3) .000 | 4) .000 | 5) | .000 |
| R | 2.000 | ANG | −2.068 | 1) | .000 | 2) | −.302 | 3) .000 | 4) .000 | 5) | .000 |
| R | 1.500 | ANG | −2.945 | 1) | .000 | 2) | −.257 | 3) .000 | 4) .000 | 5) | .000 |
| R | 1.000 | ANG | −5.176 | 1) | .000 | 2) | −.174 | 3) .000 | 4) .000 | 5) | .000 |
| R | .800 | ANG | −7.500 | 1) | .000 | 2) | −.125 | 3) .000 | 4) .000 | 5) | .000 |

Conversion Coefficient $\gamma_a$ Associated With Direction of Rotation at Middle Position (70.0 mm) in Second Embodiment

| | | | | | | | | | | | |
|---|---|---|---|---|---|---|---|---|---|---|---|
| R | .000 | ANG | .000 | 1) | .000 | 2) | −1.419 | 3) .000 | 4) .000 | 5) | .000 |
| R | 10.000 | ANG | −.357 | 1) | .000 | 2) | −1.317 | 3) .000 | 4) .000 | 5) | .000 |
| R | 5.000 | ANG | −.740 | 1) | .000 | 2) | −1.217 | 3) .000 | 4) .000 | 5) | .000 |
| R | 3.000 | ANG | −1.295 | 1) | .000 | 2) | −1.096 | 3) .000 | 4) .000 | 5) | .000 |
| R | 2.000 | ANG | −2.068 | 1) | .000 | 2) | −.966 | 3) .000 | 4) .000 | 5) | .000 |
| R | 1.500 | ANG | −2.945 | 1) | .000 | 2) | −.835 | 3) .000 | 4) .000 | 5) | .000 |
| R | 1.000 | ANG | −5.176 | 1) | .000 | 2) | −.583 | 3) .000 | 4) .000 | 5) | .000 |
| R | .800 | ANG | −7.500 | 1) | .000 | 2) | −.424 | 3) .000 | 4) .000 | 5) | .000 |

Condition Corresponding Values: $\gamma_{xR}/\gamma_{x0} = 1.13$, $\gamma_{aR}/\gamma_{a0} = 0.30$

TABLE 32

Amount DX (mm) of Movement for Focusing in Direction of Optical Axis at Telephoto End (131.0 mm) in Second Embodiment

| | | | | | | | | | | | |
|---|---|---|---|---|---|---|---|---|---|---|---|
| R | .000 | ANG | .000 | 1) | .000 | 2) | .000 | 3) .000 | 4) .000 | 5) | .000 |
| R | 10.000 | ANG | −.356 | 1) | .000 | 2) | .614 | 3) .000 | 4) .000 | 5) | .000 |
| R | 5.000 | ANG | −.744 | 1) | .000 | 2) | 1.131 | 3) .000 | 4) .000 | 5) | .000 |
| R | 3.000 | ANG | −1.298 | 1) | .000 | 2) | 1.725 | 3) .000 | 4) .000 | 5) | .000 |
| R | 2.000 | ANG | −2.070 | 1) | .000 | 2) | 2.362 | 3) .000 | 4) .000 | 5) | .000 |
| R | 1.500 | ANG | −2.952 | 1) | .000 | 2) | 2.920 | 3) .000 | 4) .000 | 5) | .000 |
| R | 1.000 | ANG | −5.184 | 1) | .000 | 2) | 3.879 | 3) .000 | 4) .000 | 5) | .000 |
| R | .800 | ANG | −7.500 | 1) | .000 | 2) | 4.505 | 3) .000 | 4) .000 | 5) | .000 |

Imaging Magnification $\beta_K$ of Lens Units at Telephoto End (131.0 mm) in Second Embodiment

| | | | | | | | | | | | |
|---|---|---|---|---|---|---|---|---|---|---|---|
| R | .000 | ANG | .000 | 1) | .000 | 2) | −.730 | 3) −1.407 | 4) −29.909 | 5) | −.055 |
| R | 10.000 | ANG | −.356 | 1) | −.008 | 2) | −.688 | 3) −1.407 | 4) −29.909 | 5) | −.055 |
| R | 5.000 | ANG | −.744 | 1) | −.016 | 2) | −.653 | 3) −1.407 | 4) −29.909 | 5) | −.055 |
| R | 3.000 | ANG | −1.298 | 1) | −.028 | 2) | −.612 | 3) −1.407 | 4) −29.909 | 5) | −.055 |
| R | 2.000 | ANG | −2.070 | 1) | −.043 | 2) | −.569 | 3) −1.407 | 4) −29.909 | 5) | −.055 |
| R | 1.500 | ANG | −2.952 | 1) | −.060 | 2) | −.531 | 3) −1.407 | 4) −29.909 | 5) | −.055 |
| R | 1.000 | ANG | −5.184 | 1) | −.098 | 2) | −.466 | 3) −1.407 | 4) −29.909 | 5) | −.055 |
| R | .800 | ANG | −7.500 | 1) | −.131 | 2) | −.423 | 3) −1.407 | 4) −29.909 | 5) | −.055 |

TABLE 32-continued

Conversion Coefficient $\gamma_x$ Associated With Direction of Optical Axis at Telephoto End (131.0 mm) in Second Embodiment

| R | .000   | ANG | .000   | 1) | .000 | 2) | 2.528 | 3) | .000 | 4) | .000 | 5) | .000 |
|---|--------|-----|--------|----|------|----|-------|----|------|----|------|----|------|
| R | 10.000 | ANG | -.356  | 1) | .000 | 2) | 2.848 | 3) | .000 | 4) | .000 | 5) | .000 |
| R | 5.000  | ANG | -.744  | 1) | .000 | 2) | 3.104 | 3) | .000 | 4) | .000 | 5) | .000 |
| R | 3.000  | ANG | -1.298 | 1) | .000 | 2) | 3.380 | 3) | .000 | 4) | .000 | 5) | .000 |
| R | 2.000  | ANG | -2.070 | 1) | .000 | 2) | 3.657 | 3) | .000 | 4) | .000 | 5) | .000 |
| R | 1.500  | ANG | -2.952 | 1) | .000 | 2) | 3.883 | 3) | .000 | 4) | .000 | 5) | .000 |
| R | 1.000  | ANG | -5.184 | 1) | .000 | 2) | 4.235 | 3) | .000 | 4) | .000 | 5) | .000 |
| R | .800   | ANG | -7.500 | 1) | .000 | 2) | 4.439 | 3) | .000 | 4) | .000 | 5) | .000 |

Slope dx/da of Focus Cam at Telephoto End (131.0 mm) in Second Embodiment

| R | .000   | ANG | .000   | 1) | .000 | 2) | -1.975 | 3) | .000 | 4) | .000 | 5) | .000 |
|---|--------|-----|--------|----|------|----|--------|----|------|----|------|----|------|
| R | 10.000 | ANG | -.356  | 1) | .000 | 2) | -1.505 | 3) | .000 | 4) | .000 | 5) | .000 |
| R | 5.000  | ANG | -.744  | 1) | .000 | 2) | -1.200 | 3) | .000 | 4) | .000 | 5) | .000 |
| R | 3.000  | ANG | -1.298 | 1) | .000 | 2) | -.953  | 3) | .000 | 4) | .000 | 5) | .000 |
| R | 2.000  | ANG | -2.070 | 1) | .000 | 2) | -.719  | 3) | .000 | 4) | .000 | 5) | .000 |
| R | 1.500  | ANG | -2.952 | 1) | .000 | 2) | -.557  | 3) | .000 | 4) | .000 | 5) | .000 |
| R | 1.000  | ANG | -5.184 | 1) | .000 | 2) | -.332  | 3) | .000 | 4) | .000 | 5) | .000 |
| R | .800   | ANG | -7.500 | 1) | .000 | 2) | -.218  | 3) | .000 | 4) | .000 | 5) | .000 |

Conversion Coefficient $\gamma_a$ Associated With Direction of Rotation at Telephoto End (131.0 mm) in Second Embodiment

| R | .000   | ANG | .000   | 1) | .000 | 2) | -4.993 | 3) | .000 | 4) | .000 | 5) | .000 |
|---|--------|-----|--------|----|------|----|--------|----|------|----|------|----|------|
| R | 10.000 | ANG | -.356  | 1) | .000 | 2) | -4.288 | 3) | .000 | 4) | .000 | 5) | .000 |
| R | 5.000  | ANG | -.744  | 1) | .000 | 2) | -3.724 | 3) | .000 | 4) | .000 | 5) | .000 |
| R | 3.000  | ANG | -1.298 | 1) | .000 | 2) | -3.221 | 3) | .000 | 4) | .000 | 5) | .000 |
| R | 2.000  | ANG | -2.070 | 1) | .000 | 2) | -2.631 | 3) | .000 | 4) | .000 | 5) | .000 |
| R | 1.500  | ANG | -2.952 | 1) | .000 | 2) | -2.164 | 3) | .000 | 4) | .000 | 5) | .000 |
| R | 1.000  | ANG | -5.184 | 1) | .000 | 2) | -1.405 | 3) | .000 | 4) | .000 | 5) | .000 |
| R | .800   | ANG | -7.500 | 1) | .000 | 2) | -.966  | 3) | .000 | 4) | .000 | 5) | .000 |

Condition Corresponding Values: $\gamma_{xR}/\gamma_{x0} = 1.76$, $\gamma_{aR}/\gamma_{a0} = 0.19$ As can be seen from Tables 30, 31, and 32, at each focal length, the conversion coefficient $\gamma_x$ associated with the direction of the optical axis increases but the value of the slope (dx/da) of the focus cam decreases as the photographing distance becomes closer to the closest distance. Therefore, as can be seen from these tables, the value of the conversion coefficient $\gamma_a$ associated with the direction of rotation, which is defined as the product of the conversion coefficient $\gamma_x$ and the slope (dx/da) of the focus cam, decreases as the photographing distance becomes closer to the closest distance by the influence of the slope (dx/da) of the focus cam, contrary to the case in which the rotation amount ratio ($a_F/a_Z$) is set to be 1.0, as in the embodiment of Japanese Patent Application Laid-Open No. 5-142475.

From Tables 30, 31, and 32, the rate of change, from the infinity in-focus position to the closest in-focus position, of the conversion coefficient $\gamma_a$ associated with the direction of rotation is ×0.38 at the wide-angle end (F=28.8), ×0.30 at the middle position (F=70.0), and ×0.19 at the telephoto end (F=131.0). When the number N of divisions of the focus range upon a change in conversion coefficient $\gamma_a$ in the second embodiment is calculated using formula (a), and is compared with that in the case in which the rotation amount ratio ($a_F/a_Z$) is set to be 1.0, as in the embodiment of Japanese Patent Application Laid-Open No. 5-142475, the numbers $N_W$, $N_M$, and $N_T$ of divisions at the wide-angle end, middle position, and telephoto end respectively have the following values: When the rotation amount ratio ($a_F/a_Z$) is set to be 1.0

$N_W > 13.0 N_M > 12.6 N_T > 10.7$

Second Embodiment $N_W > 5.3 N_M > 6.6 N_T > 9.0$

Therefore, it can be seen that the values of the numbers N of divisions become small, compared to the case in which the rotation amount ratio ($a_F/a_Z$) is set to be 1.0, as in the embodiment of Japanese Patent Application Laid-Open No. 5-142475.

As described above, in the second embodiment as well, since the rate of change of the conversion coefficient $\gamma_a$ associated with the direction of rotation is smaller than that in the case in which the rotation amount ratio ($a_F/a_Z$) is set to be 1.0, as in the embodiment of Japanese Patent Application Laid-Open No. 5-142475, the number of data of the conversion coefficient $\gamma_a$ and the correction coefficient μ can be reduced, and the storage capacity can be suppressed.

Tables 33, 34, and 35 summarize the calculation results of the conversion coefficient $K_a$ and the correction coefficient μ at the wide-angle end (F=28.8), middle position (F=70.0), and telephoto end (F=131.0) according to the second embodiment.

The arrangements of the tables and reference symbols are the same as those in the first embodiment. The position of the focusing lens in the first pair in the upper two tables in each of Tables 33, 34, and 35, i.e., in the third and fourth columns is (R, ANGLE)=(0.0, 0.0), and it indicates that this position corresponds to the infinity corresponding position. Similarly, the position of the focusing lens in the fourth pair in the lower two tables in each of Tables 33, 34, and 35, i.e., in the ninth and 10th columns is (R, ANGLE)=(0.8, -7.5), and it indicates that this position corresponds to the closest in-focus (R=0.8 m) corresponding position.

TABLE 33

Conversion Coefficients $K_a$: (rs), $\gamma_a$: (r) Associated with Direction of Rotation and Correction Coefficient $\mu$: (l) at Wide-angle End (28.8 mm) of Second Embodiment
F = 28.8 mm

| (R, ANGLE) = | .000 | .000 | 10.000 | −.360 | 5.000 | −.744 | 3.000 | −1.298 |
|---|---|---|---|---|---|---|---|---|
| POS | R | r | rs | r | rs | r | rs | r | rs |
| 1 | .000 | −.237 | .000 | | −.231 | | −.224 | | −.215 |
| 2 | 10.000 | | −.232 | −.226 | .000 | | −.219 | | −.210 |
| 3 | 5.000 | | −.227 | | −.221 | −.214 | .000 | | −.205 |
| 4 | 3.000 | | −.219 | | −.213 | | −.207 | −.198 | .000 |
| 5 | 2.000 | | −.210 | | −.204 | | −.197 | | −.189 |
| 6 | 1.500 | | −.199 | | −.193 | | −.187 | | −.179 |
| 7 | 1.000 | | −.176 | | −.170 | | −.165 | | −.157 |
| 8 | .800 | | −.155 | | −.151 | | −.146 | | −.139 |

| POS | R | bf | l | bf | l | bf | l | bf | l |
|---|---|---|---|---|---|---|---|---|---|
| 1 | .000 | .00 | .00 | −.08 | 4.03 | −.17 | 3.50 | −.28 | 3.26 |
| 2 | 10.000 | .08 | 4.39 | .00 | .00 | −.08 | 3.31 | −.20 | 3.22 |
| 3 | 5.000 | .17 | 4.15 | .08 | 3.66 | .00 | .00 | −.11 | 3.26 |
| 4 | 3.000 | .28 | 3.91 | .20 | 3.50 | .11 | 3.29 | .00 | .00 |
| 5 | 2.000 | .43 | 3.80 | .35 | 3.50 | .26 | 3.36 | .15 | 3.27 |
| 6 | 1.500 | .59 | 3.69 | .50 | 3.44 | .41 | 3.30 | .30 | 3.13 |
| 7 | 1.000 | .91 | 3.52 | .82 | 3.32 | .73 | 3.18 | .61 | 3.00 |
| 8 | .800 | 1.17 | 3.40 | 1.08 | 3.22 | .98 | 3.09 | .86 | 2.90 |

| (R, ANGLE) = | 2.000 | −2.070 | 1.500 | −2.952 | 1.000 | −5.184 | .800 | −7.500 |
|---|---|---|---|---|---|---|---|---|
| POS | R | r | rs | r | rs | r | rs | r | rs |
| 1 | .000 | | −.203 | | .191 | | −.164 | | −.143 |
| 2 | 10.000 | | −.198 | | .186 | | −.160 | | −.139 |
| 3 | 5.000 | | −.193 | | .182 | | −.156 | | −.136 |
| 4 | 3.000 | | −.187 | | .175 | | −.151 | | −.131 |
| 5 | 2.000 | −.178 | .000 | | .167 | | −.143 | | −.124 |
| 6 | 1.500 | | −.169 | −.158 | .000 | | −.135 | | −.117 |
| 7 | 1.000 | | −.148 | | .138 | −.118 | .000 | | −.102 |
| 8 | .800 | | −.131 | | .122 | | −.103 | −.090 | .000 |

| POS | R | bf | l | bf | l | bf | l | bf | l |
|---|---|---|---|---|---|---|---|---|---|
| 1 | .000 | −.42 | 3.01 | −.56 | 2.71 | −.85 | 2.16 | −1.07 | 1.80 |
| 2 | 10.000 | −.34 | 2.99 | −.48 | 2.69 | −.77 | 2.14 | −1.00 | 1.79 |
| 3 | 5.000 | −.26 | 2.98 | −.40 | 2.67 | −.69 | 2.13 | −.92 | 1.78 |
| 4 | 3.000 | −.14 | 2.90 | −.29 | 2.62 | −.59 | 2.11 | −.81 | 1.77 |
| 5 | 2.000 | .00 | .00 | −.15 | 2.59 | −.45 | 2.08 | −.67 | 1.75 |
| 6 | 1.500 | .15 | 2.79 | .00 | .00 | −.30 | 2.04 | −.53 | 1.74 |
| 7 | 1.000 | .46 | 2.73 | .31 | 2.50 | .00 | .00 | −.24 | 1.75 |
| 8 | .800 | .71 | 2.65 | .55 | 2.43 | .24 | 1.97 | .00 | .00 |

Condition Corresponding Values: $K_{aO}/\gamma_{aO} = 0.65$, $K_{aR}/\gamma_{aR} = 1.59$

TABLE 34

Conversion Coefficients $K_a$: (rs), $\gamma_a$: (r) Associated with Direction of Rotation and Correction Coefficient $\mu$: (l) at Middle Position (70.0 mm) of Second Embodiment
F = 70.0 mm

| (R, ANGLE) = | .000 | .000 | 10.000 | −.357 | 5.000 | −.740 | 3.000 | −1.295 |
|---|---|---|---|---|---|---|---|---|
| POS | R | r | rs | r | rs | r | rs | r | rs |
| 1 | .000 | −1.419 | .000 | | −1.347 | | −1.277 | | −1.189 |
| 2 | 10.000 | | −1.388 | −1.317 | .000 | | −1.248 | | −1.161 |
| 3 | 5.000 | | −1.354 | | −1.285 | −1.217 | .000 | | −1.133 |
| 4 | 3.000 | | −1.309 | | −1.241 | | −1.177 | −1.096 | .000 |
| 5 | 2.000 | | −1.254 | | −1.190 | | −1.129 | | −1.053 |
| 6 | 1.500 | | −1.197 | | −1.136 | | −1.078 | | −1.005 |
| 7 | 1.000 | | −1.064 | | −1.008 | | −.955 | | −.888 |
| 8 | .800 | | −.947 | | .896 | | −.849 | | −.788 |

| POS | R | bf | l | bf | l | bf | l | bf | l |
|---|---|---|---|---|---|---|---|---|---|
| 1 | .000 | .00 | .00 | −.48 | 20.92 | −.95 | 19.20 | −1.54 | 18.17 |
| 2 | 10.000 | .50 | 22.58 | .00 | .00 | −.48 | 19.08 | −1.09 | 18.29 |
| 3 | 5.000 | 1.00 | 22.11 | .49 | 20.04 | .00 | .00 | −.63 | 18.59 |
| 4 | 3.000 | 1.70 | 21.91 | 1.16 | 20.27 | .65 | 19.45 | .00 | .00 |
| 5 | 2.000 | 2.59 | 22.31 | 2.03 | 21.04 | 1.50 | 20.52 | .81 | 20.85 |

TABLE 34-continued

Conversion Coefficients $K_a$: (rs), $\gamma_a$: (r) Associated with Direction of Rotation and Correction Coefficient $\mu$: (l) at Middle Position (70.0 mm) of Second Embodiment
F = 70.0 mm

| 6 | 1.500 | 3.52 | 22.57 | 2.94 | 21.39 | 2.38 | 20.72 | 1.66 | 20.05 |
|---|---|---|---|---|---|---|---|---|---|
| 7 | 1.000 | 5.50 | 21.99 | 4.86 | 20.72 | 4.24 | 19.68 | 3.45 | 18.22 |
| 8 | .800 | 7.10 | 21.34 | 6.40 | 20.06 | 5.74 | 18.93 | 4.89 | 17.38 |

| (R, ANGLE) = | | 2.000 | −2.068 | 1.500 | −2.945 | 1.000 | −5.176 | .800 | −7.500 |
|---|---|---|---|---|---|---|---|---|---|
| POS | R | r | rs | r | rs | r | rs | r | rs |
| 1 | .000 | | −1.087 | | −.992 | | −.808 | | −.675 |
| 2 | 10.000 | | −1.063 | | −.970 | | −.789 | | −.658 |
| 3 | 5.000 | | −1.038 | | −.948 | | −.770 | | −.642 |
| 4 | 3.000 | | −1.006 | | −.918 | | −.744 | | −.619 |
| 5 | 2.000 | −.966 | .000 | | −.879 | | −.709 | | −.588 |
| 6 | 1.500 | | −.919 | −.834 | .000 | | −.670 | | −.556 |
| 7 | 1.000 | | −.809 | | −.731 | −.583 | .000 | | −.484 |
| 8 | .800 | | −.715 | | −.645 | | −.516 | −.424 | .000 |

| POS | R | bf | l | bf | l | bf | l | bf | l |
|---|---|---|---|---|---|---|---|---|---|
| 1 | .000 | −2.25 | 17.89 | −2.92 | 15.43 | −4.18 | 10.86 | −5.06 | 8.59 |
| 2 | 10.000 | −1.82 | 18.16 | −2.51 | 15.44 | −3.80 | 10.78 | −4.70 | 8.54 |
| 3 | 5.000 | −1.38 | 18.52 | −2.09 | 15.40 | −3.41 | 10.68 | −4.34 | 8.48 |
| 4 | 3.000 | −.78 | 18.86 | −1.51 | 15.14 | −2.89 | 10.49 | −3.84 | 8.39 |
| 5 | 2.000 | .00 | .00 | −.77 | 14.43 | −2.20 | 10.24 | −3.20 | 8.28 |
| 6 | 1.500 | .81 | 16.70 | .00 | .00 | −1.50 | 10.03 | −2.53 | 8.19 |
| 7 | 1.000 | 2.51 | 15.43 | 1.63 | 13.16 | .00 | .00 | −1.13 | 8.00 |
| 8 | .800 | 3.88 | 14.96 | 2.94 | 12.98 | 1.20 | 10.34 | .00 | .00 |

Condition Corresponding Values: $K_{a0}/\gamma_{a0} = 0.67$, $K_{aR}/\gamma_{aR} = 1.59$

TABLE 35

Conversion Coefficients $K_a$: (rs), $\gamma_a$: (r) Associated with Direction of Rotation and Correction Coefficient $\mu$: (l) at Telephoto End (131.0 mm) of Second Embodiment
F = 131.0 mm

| (R, ANGLE) = | | .000 | .000 | 10.000 | −.356 | 5.000 | −.744 | 3.000 | −1.298 |
|---|---|---|---|---|---|---|---|---|---|
| POS | R | r | rs | r | rs | r | rs | r | rs |
| 1 | .000 | −4.996 | .000 | | −4.383 | | −3.869 | | −3.374 |
| 2 | 10.000 | | −4.934 | −4.290 | .000 | | −3.781 | | −3.312 |
| 3 | 5.000 | | −4.829 | | −4.189 | −3.722 | .000 | | −3.275 |
| 4 | 3.000 | | −4.757 | | −4.140 | | −3.694 | −3.222 | .000 |
| 5 | 2.000 | | −4.660 | | −4.050 | | −3.597 | | −3.113 |
| 6 | 1.500 | | −4.544 | | −3.936 | | −3.482 | | −3.002 |
| 7 | 1.000 | | −4.248 | | −3.648 | | −3.201 | | −2.739 |
| 8 | .800 | | −3.951 | | −3.365 | | −2.934 | | −2.494 |

| POS | R | bf | l | bf | l | bf | l | bf | l |
|---|---|---|---|---|---|---|---|---|---|
| 1 | .000 | .00 | .00 | −1.56 | 72.38 | −2.88 | 72.51 | −4.38 | 93.08 |
| 2 | 10.000 | 1.75 | 139.72 | .00 | .00 | −1.47 | 92.40 | −3.12 | 112.40 |
| 3 | 5.000 | 3.59 | 107.18 | 1.63 | 68.79 | .00 | .00 | −1.82 | 110.37 |
| 4 | 3.000 | 6.17 | 128.81 | 3.90 | 111.67 | 2.05 | 272.56 | .00 | .00 |
| 5 | 2.000 | 9.65 | 143.36 | 6.94 | 123.86 | 4.77 | 142.31 | 2.40 | 71.10 |
| 6 | 1.500 | 13.42 | 148.20 | 10.22 | 123.71 | 7.69 | 119.21 | 4.97 | 72.57 |
| 7 | 1.000 | 22.02 | 147.09 | 17.61 | 117.64 | 14.22 | 101.69 | 10.64 | 70.93 |
| 8 | .800 | 29.63 | 141.55 | 24.04 | 111.52 | 19.82 | 93.70 | 15.47 | 68.41 |

| (R, ANGLE) = | | 2.000 | −2.070 | 1.500 | −2.952 | 1.000 | −5.184 | .800 | −7.500 |
|---|---|---|---|---|---|---|---|---|---|
| POS | R | r | rs | r | rs | r | rs | r | rs |
| 1 | .000 | | −2.885 | | −2.485 | | −1.854 | | −1.472 |
| 2 | 10.000 | | −2.833 | | −2.439 | | −1.817 | | −1.440 |
| 3 | 5.000 | | −2.793 | | −2.399 | | −1.781 | | −1.410 |
| 4 | 3.000 | | −2.729 | | −2.338 | | −1.729 | | −1.365 |
| 5 | 2.000 | −2.631 | .000 | | −2.252 | | −1.659 | | −1.306 |
| 6 | 1.500 | | −2.533 | −2.163 | .000 | | −1.583 | | −1.242 |
| 7 | 1.000 | | −2.294 | | −1.944 | −1.405 | .000 | | −1.098 |
| 8 | .800 | | −2.076 | | −1.749 | | −1.258 | −.966 | .000 |

TABLE 35-continued

Conversion Coefficients $K_a$: (rs), $\gamma_a$: (r) Associated with Direction of Rotation and Correction Coefficient μ: (l) at Telephoto End (131.0 mm) of Second Embodiment
F = 131.0 mm

| POS | R | bf | l | bf | l | bf | l | bf | l |
|---|---|---|---|---|---|---|---|---|---|
| 1 | .000 | −5.97 | 61.81 | −7.34 | 49.17 | −9.61 | 30.11 | −11.04 | 21.07 |
| 2 | 10.000 | −4.86 | 63.05 | −6.33 | 49.46 | −8.77 | 29.96 | −10.29 | 20.94 |
| 3 | 5.000 | −3.70 | 59.96 | −5.30 | 48.38 | −7.91 | 29.57 | −9.52 | 20.73 |
| 4 | 3.000 | −2.11 | 56.51 | −3.87 | 47.66 | −6.72 | 29.14 | −8.47 | 20.47 |
| 5 | 2.000 | .00 | .00 | −1.99 | 47.94 | −5.17 | 28.63 | −7.09 | 20.14 |
| 6 | 1.500 | 2.24 | 59.82 | .00 | .00 | −3.53 | 27.94 | −5.65 | 19.75 |
| 7 | 1.000 | 7.14 | 55.80 | 4.34 | 42.89 | .00 | .00 | −2.54 | 18.54 |
| 8 | .800 | 11.27 | 53.40 | 7.96 | 41.63 | 2.91 | 27.69 | .00 | .00 |

Condition Corresponding Values: $K_{ao}/\gamma_{ao} = 0.79$, $K_{aR}/\gamma_{aR} = 1.52$ The calculation results of the rate of change of $K_a$ with respect to $\gamma_a$ at the infinity in-focus arrangement and the closest in-focus arrangement at the wide-angle end, middle position, and telephoto end in the case in which the rotation amount ratio $(a_F/a_Z)$ is set to be 1.0, as in the embodiment of Japanese Patent Application Laid-Open No. 5-142475 and in the second embodiment of the present invention in which said ratio $(a_F/a_Z)$ is set to be −0.75 are as follows.

When the rotation amount ratio $(a_F/a_Z)$ is set to be 1.0

| | Infinity Arrangement $K_{ao}/\gamma_{ao}$ | Closest Arrangement $K_{aR}/\gamma_{aR}$ |
|---|---|---|
| Wide-angle End (F = 28.8) | 4.18 | 0.36 |
| Middle Position (F = 70.0) | 5.00 | 0.36 |
| Telephoto End (F = 131.0) Second Embodiment | 6.51 | 0.35 |
| Wide-angle End (F = 28.8) | 0.65 | 1.59 |
| Middle Position (F = 70.0) | 0.67 | 1.59 |
| Telephoto End (F = 131.0) | 0.79 | 1.52 |

As described above, in the third embodiment as well, since the rate of change of $K_a$ with respect to $\gamma_a$ is small as compared to the conventional system, the contribution of the correction term $(\Delta Bf/\mu)$ in $K_a=\gamma_a(1-\Delta Bf/\mu)$ can be reduced. For this reason, an error of the conversion coefficient $K_a$ calculated based on $\gamma_a$ and μ or an error from the actual lens driving amount Δa obtained when only one pair of a conversion coefficient $\gamma_a$ value and a correction coefficient μ value are set can be reduced.

Next, in the case in which the rotation amount ratio $(a_F/a_Z)$ is set to be 1.0, as in the embodiment of Japanese Patent Application Laid-Open No. 5-142475 and the second embodiment of the present invention in which said ratio $(a_F/a_Z)$ is set to be −0.75, when the lens driving amounts upon focusing from the infinity in-focus lens arrangement to the closest distance object and upon focusing from the closest in-focus lens arrangement to the infinity object at the wide-angle end, middle position, and telephoto end are calculated from $\Delta a=\Delta Bf/[\gamma_a(1-\Delta Bf/\mu)]$, and errors from the actual lens driving amounts are then calculated, the following values are obtained. Note that the value of the correction coefficient μ upon focusing from the infinity in-focus lens arrangement to the closest distance object adopts a value at the object distance (POS-5), and the value of the correction coefficient μ upon focusing from the closest in-focus lens arrangement to the infinity object adopts a value at the object distance (POS-4).

When the rotation amount ratio $(a_F/a_Z)$ is set to be 1.0

| | Infinity Arrangement → Closest In-focus State | Closest Arrangement → Infinity In-focus State |
|---|---|---|
| Wide-angle End (F = 28.8) | −8.1% | −21.4% |
| Middle Position (F = 70.0) | −13.3% | −21.9% |
| Telephoto End (F = 131.0) Second Embodiment | −15.8% | −22.7% |
| Wide-angle End (F = 28.8) | −4.9% | −1.2% |
| Middle Position (F = 70.0) | −2.1% | −0.7% |
| Telephoto End (F = 131.0) | −0.3% | −1.0% |

As described above, in the second embodiment as well, even when only a pair of a conversion coefficient $\gamma_a$ value and a correction coefficient μ value are set for a given lens arrangement range, an error between the conversion coefficient $K_a$ calculated from $\gamma_a$ and μ and the lens driving amount Δa for focusing becomes small as compared to the conventional system, and focusing can be realized with higher accuracy.

Table 36 summarizes the amount (ANGLE DA) of rotation for focusing upon manual focusing using the focus cam (the middle table in Table 28) of the second embodiment, the amount DX (mm) of movement, in the direction of the optical axis, of the focusing lens unit corresponding to the amount of rotation for focusing, and the displacement amount Bf (mm) of the imaging point when the amount (DX) of movement in the direction of the optical axis is given.

Note that the arrangement of the table and reference symbols are the same as those in the first embodiment. The upper table in Table 36 summarizes the displacement amount (Bf) of the imaging point corresponding to the photographing distances (R=5.0, 3.0, 2.0, 1.5, 1.0, and 0.8 m) in the respective zooming states of the focal lengths (F=28.8, 35.0, 50.0, 70.0, 105.0, and 131.0 mm), and the middle table summarizes the values of the amount (ANGLE DA) of rotation for focusing required for attaining an optimal in-focus state with respect to the respective photographing distances. The lower table summarizes the amounts (DX) of movement, in the direction of the optical axis, of the respective lens units corresponding to the amount (ANGLE DA) of rotation for focusing in association with the focal lengths and photographing distances.

of the optical system corresponding to the third embodiment

TABLE 36

Displacement Amount Bf (mm) of Imaging Point and Amount DX (mm) of movement for focusing in Second Embodiment

|   |          |    | 0.80 m | 1.00 m | 1.50 m | 2.00 m | 3.00 m | 5.00 m |
|---|----------|----|--------|--------|--------|--------|--------|--------|
| F | 28.800   | Bf | .000   | .000   | .000   | .000   | .000   | ta .000 |
| F | 35.000   | Bf | .000   | .000   | .002   | .003   | .003   | .002   |
| F | 50.000   | Bf | .000   | .001   | .001   | −.002  | −.004  | −.003  |
| F | 70.000   | Bf | .000   | −.005  | −.006  | −.002  | −.003  | −.005  |
| F | 105.000  | Bf | .000   | −.011  | −.020  | −.017  | −.018  | −.016  |
| F | 131.000  | Bf | .000   | .000   | .000   | .000   | .000   | .000   |

| ANGLE DA | −7.500 | −5.184 | −2.952 | −2.070 | −1.298 | −.744 |

|   |            | 0.80 m | 1.00 m | 1.50 m | 2.00 m | 3.00 m |   |        |
|---|------------|--------|--------|--------|--------|--------|---|--------|
| F | 28.800 DX  | .000   | .684   | .000   | .000   | .000   | R | 0.80 m |
| F | 35.000 DX  | .000   | .831   | .000   | .000   | .000   | R | 0.80 m |
| F | 50.000 DX  | .000   | 1.222  | .000   | .000   | .000   | R | 0.80 m |
| F | 70.000 DX  | .000   | 1.835  | .000   | .000   | .000   | R | 0.80 m |
| F | 105.000 DX | .000   | 3.204  | .000   | .000   | .000   | R | 0.80 m |
| F | 131.000 DX | .000   | 4.505  | .000   | .000   | .000   | r | 0.80 m |
| F | 28.800 DX  | .000   | .540   | .000   | .000   | .000   | R | 1.00 m |
| F | 35.000 DX  | .000   | .659   | .000   | .000   | .000   | R | 1.00 m |
| F | 50.000 DX  | .000   | .978   | .000   | .000   | .000   | R | 1.00 m |
| F | 70.000 DX  | .000   | 1.492  | .000   | .000   | .000   | R | 1.00 m |
| F | 105.000 DX | .000   | 2.689  | .000   | .000   | .000   | R | 1.00 m |
| F | 131.000 DX | .000   | 3.879  | .000   | .000   | .000   | R | 1.00 m |
| F | 28.800 DX  | .000   | .354   | .000   | .000   | .000   | R | 1.50 m |
| F | 35.000 DX  | .000   | .433   | .000   | .000   | .000   | R | 1.50 m |
| F | 50.000 DX  | .000   | .653   | .000   | .000   | .000   | R | 1.50 m |
| F | 70.000 DX  | .000   | 1.020  | .000   | .000   | .000   | R | 1.50 m |
| F | 105.000 DX | .000   | 1.934  | .000   | .000   | .000   | R | 1.50 m |
| F | 131.000 DX | .000   | 2.920  | .000   | .000   | .000   | R | 1.50 m |
| F | 28.800 DX  | .000   | .263   | .000   | .000   | .000   | R | 2.00 m |
| F | 35.000 DX  | .000   | .322   | .000   | .000   | .000   | R | 2.00 m |
| F | 50.000 DX  | .000   | .492   | .000   | .000   | .000   | R | 2.00 m |
| F | 70.000 DX  | .000   | .774   | .000   | .000   | .000   | R | 2.00 m |
| F | 105.000 DX | .000   | 1.515  | .000   | .000   | .000   | R | 2.00 m |
| F | 131.000 DX | .000   | 2.362  | .000   | .000   | .000   | R | 2.00 m |
| F | 28.800 DX  | .000   | .174   | .000   | .000   | .000   | R | 3.00 m |
| F | 35.000 DX  | .000   | .213   | .000   | .000   | .000   | R | 3.00 m |
| F | 50.000 DX  | .000   | .329   | .000   | .000   | .000   | R | 3.00 m |
| F | 70.000 DX  | .000   | .524   | .000   | .000   | .000   | R | 3.00 m |
| F | 105.000 DX | .000   | 1.063  | .000   | .000   | .000   | R | 3.00 m |
| F | 131.000 DX | .000   | 1.725  | .000   | .000   | .000   | R | 3.00 m |
| F | 28.800 DX  | .000   | .104   | .000   | .000   | .000   | R | 5.00 m |
| F | 35.000 DX  | .000   | .127   | .000   | .000   | .000   | R | 5.00 m |
| F | 50.000 DX  | .000   | .198   | .000   | .000   | .000   | R | 5.00 m |
| F | 70.000 DX  | .000   | .319   | .000   | .000   | .000   | R | 5.00 m |
| F | 105.000 DX | .000   | .668   | .000   | .000   | .000   | R | 5.00 m |
| F | 131.000 DX | .000   | 1.131  | .000   | .000   | .000   | R | 5.00 m |

As can be seen from Table 36, in the zoom lens of the second embodiment, so-called manual focusing can be attained since the displacement amounts of the imaging point at the respective focal lengths and photographing distances are very small, and fall within the depth of focus independently of the zooming state and photographing distance.

[Third Embodiment]

The third embodiment is directed to a zoom lens which has a four-unit arrangement, i.e., positive, negative, positive, and positive lens units, and attains focusing by a negative second lens unit. In this zoom lens, the rotation amount ratio ($a_F/a_Z$) of the rotation amount for focusing from the infinity in-focus position to the closest in-focus position (R=0.8 m) to the amount of rotation for zooming from the wide-angle end (F=36.0) to the telephoto end (F=131.0) is set to be −0.85.

Table 37 below summarizes various paraxial data of an optical system and data for defining the shape of a focus cam according to the third embodiment.

The upper table in Table 37 summarizes the focal lengths and principal point interval data of the respective lens units in association with six zooming states (focal length F=36.0 (1-POS), 50.0 (2-POS), 70.0 (3-POS), 85.0 (4-POS), 105.0 (5-POS), and 131.0 mm (6-POS)).

The middle table in Table 37 summarizes spline sample data when the shape of the focus cam in the second lens unit of the third embodiment, which is used for focusing, is expressed by a spline function associated with the angle a of rotation of a rotatable lens barrel and the amount x of movement in the direction of the optical axis. In this middle table, (1), (2), (3), and (4) correspond to the first, second, third, and fourth lens units, respectively.

Furthermore, the lower table in Table 37 summarizes the infinity focusing positions (infinity corresponding positions) at the respective focal lengths (F=36.0, 50.0, 70.0, 85.0, 105.0, and 131.0 mm), and the amounts of rotation (amounts of rotation for focusing) upon focusing to respective photographing distances (R=5.0, 3.0, 2.0, 1.5, 1.0, and 0.8 m) using the focus cam of the third embodiment. In this table, since the amount of rotation for zooming from the wide-angle end (F=36.0) to the telephoto end (F=131.0) is set to be 10.0, and the amount of rotation for focusing from the infinity in-focus position to the closest in-focus position ($R=0.8$ m) is set to be $-8.5$, the rotation amount ratio ($a_F/a_Z$) of the amount of rotation for focusing to the amount of rotation for zooming in the third embodiment is $-0.85$.

TABLE 37

Third Embodiment F = 36.0 to 131.0 (Rotation Amount Ratio: $a_F/a_Z = -0.85$)

Focal lengths and Principal Point Intervals of Lens Units of Third Embodiment

|  |  |  | 1-POS | 2-POS | 3-POS | 4-POS | 5-POS | 6-POS |
|---|---|---|---|---|---|---|---|---|
|  |  | F | 36.0000 | 50.0000 | 70.0000 | 85.0000 | 105.0000 | 131.0000 |
| F1 | 73.0000 | D1 | 10.4075 | 17.8050 | 24.9191 | 28.6662 | 32.4300 | 36.0004 |
| F2 | −16.6000 | D2 | 25.6151 | 21.3295 | 17.3824 | 15.1421 | 12.6290 | 9.7969 |
| F3 | 42.0000 | D3 | 10.0000 | 9.2923 | 8.2560 | 7.6919 | 7.2951 | 7.2634 |
| F4 | 80.0000 | D4 | 63.8473 | 70.6899 | 77.4519 | 81.1930 | 85.0439 | 88.8003 |

Focus Cam Shape (Spline Interpolation Sample Point) Corresponding to Third Embodiment

|  | ANGLE | (1) | (2) | (3) | (4) |
|---|---|---|---|---|---|
| 1 | −10.0000 | .0000 | 1.1480 | .0000 | .0000 |
| 2 | −8.5000 | .0000 | 1.0414 | .0000 | .0000 |
| 3 | −5.9359 | .0000 | .8252 | .0000 | .0000 |
| 4 | −3.4109 | .0000 | .5436 | .0000 | .0000 |
| 5 | −2.3987 | .0000 | .4054 | .0000 | .0000 |
| 6 | −1.5068 | .0000 | .2688 | .0000 | .0000 |
| 7 | −.8645 | .0000 | .1606 | .0000 | .0000 |
| 8 | .0000 | .0000 | .0000 | .0000 | .0000 |
| 9 | 1.5000 | .0000 | −.3253 | .0000 | .0000 |
| 10 | 4.0641 | .0000 | −1.0736 | .0000 | .0000 |
| 11 | 6.5891 | .0000 | −2.2211 | .0000 | .0000 |
| 12 | 7.6013 | .0000 | −2.8951 | .0000 | .0000 |
| 13 | 8.4932 | .0000 | −3.6785 | .0000 | .0000 |
| 14 | 9.1355 | .0000 | −4.4302 | .0000 | .0000 |
| 15 | 10.0000 | .0000 | −6.0011 | .0000 | .0000 |
| 16 | 11.0000 | .0000 | −9.5000 | .0000 | .0000 |

Amount of Rotation for Zooming and Amount of Rotation for Focusing of Third Embodiment
Rotation Amount Ratio: $a_F/a_Z = -0.85$)

| Focal Length | Infinity Corresponding Position | Photographing Distance | Amount of Rotation for Focusing |
|---|---|---|---|
| 36.0 mm | .0000 | 5.00 m | .865 |
| 50.0 mm | 2.9527 | 3.00 m | −1.507 |
| 70.0 mm | 5.9439 | 2.00 m | −2.399 |
| 85.0 mm | 7.4823 | 1.50 m | −3.411 |
| 105.0 mm | 8.9096 | 1.00 m | −5.936 |
| 131.0 mm | 10.0000 | 0.80 m | −8.500 |
| Condition Corresponding Value (1) |  | 2.30 |  |
| Condition Corresponding Value (2) |  | 5.45 |  |
| Condition Corresponding Value (3) |  | −0.85 |  |
| Condition Corresponding Value (4) |  | 0.40 (wide-angle end) 0.21 (telephoto end) |  |
| Condition Corresponding Value (5) |  | 0.68 (wide-angle end) 0.80 (telephoto end) |  |
| Condition Corresponding Value (6) |  | 1.52 (wide-angle end) 1.43 (telephoto end) |  |

Table 38 below summarizes the numerical value data of the cams of the focusing lens unit in the third embodiment, which data are calculated by interpolation based on a spline function on the basis of the sample data of the focus cam summarized in the middle table in Table 37. Note that the meanings of the reference symbols in Table 38 are the same as those in the first embodiment.

TABLE 38

Cam Numerical Value Data of Focusing Lens Unit in Third Embodiment

| Focus Cam Numerical Value Data | | | Zoom Compensation Cam Numerical Value Data | | |
|---|---|---|---|---|---|
| ANGLE | (2) | F | ANGLE | (2) | F |
| −8.5000 | 1.0414 | .0000 |  |  |  |
| −8.0000 | 1.0035 | .0000 |  |  |  |

TABLE 38-continued

Cam Numerical Value Data of Focusing Lens Unit in Third Embodiment

| Focus Cam Numerical Value Data | | | Zoom Compensation Cam Numerical Value Data | | |
|---|---|---|---|---|---|
| ANGLE | (2) | F | ANGLE | (2) | F |
| −7.5000 | .9637 | .0000 | | | |
| −7.0000 | .9219 | .0000 | | | |
| −6.5000 | .8779 | .0000 | | | |
| −6.0000 | .8314 | .0000 | | | |
| −5.5000 | .7823 | .0000 | | | |
| −5.0000 | .7303 | .0000 | | | |
| −4.5000 | .6752 | .0000 | | | |
| −4.0000 | .6168 | .0000 | | | |
| −3.5000 | .5550 | .0000 | | | |
| −3.0000 | .4895 | .0000 | | | |
| −2.5000 | .4200 | .0000 | | | |
| −2.0000 | .3462 | .0000 | | | |
| −1.5000 | .2677 | .0000 | | | |
| −1.0000 | .1842 | .0000 | | | |
| −.5000 | .0951 | .0000 | | | |
| .0000 | .0000 | 36.0000 | .0000 | .0000 | 36.0000 |
| .5000 | −.1013 | 38.1000 | .5000 | .4231 | 38.1000 |
| 1.0000 | −.2095 | 40.2980 | 1.0000 | .8495 | 40.2980 |
| 1.5000 | −.3253 | 42.6028 | 1.5000 | 1.2799 | 42.6028 |
| 2.0000 | −.4495 | 45.0229 | 2.0000 | 1.7151 | 45.0229 |
| 2.5000 | −.5832 | 47.5713 | 2.5000 | 2.1565 | 47.5713 |
| 3.0000 | −.7273 | 50.2608 | 3.0000 | 2.6053 | 50.2608 |
| 3.5000 | −.8829 | 53.1017 | 3.5000 | 3.0625 | 53.1017 |
| 4.0000 | −1.0511 | 56.1044 | 4.0000 | 3.5285 | 56.1044 |
| 4.5000 | −1.2331 | 59.2847 | 4.5000 | 4.0048 | 59.2847 |
| 5.0000 | −1.4322 | 62.6993 | 5.0000 | 4.4979 | 62.6993 |
| 5.5000 | −1.6521 | 66.4118 | 5.5000 | 5.0141 | 66.4118 |
| 6.0000 | −1.8965 | 70.4744 | 6.0000 | 5.5582 | 70.4744 |
| 6.5000 | −2.1693 | 74.9275 | 6.5000 | 6.1332 | 74.9275 |
| 7.0000 | −2.4745 | 79.8072 | 7.0000 | 6.7425 | 79.8072 |
| 7.5000 | −2.8196 | 85.2003 | 7.5000 | 7.3952 | 85.2003 |
| 8.0000 | −3.2152 | 91.2332 | 8.0000 | 8.1044 | 91.2332 |
| 8.5000 | −3.6854 | 98.2632 | 8.5000 | 8.9050 | 98.2632 |
| 9.0000 | −4.2566 | 106.6077 | 9.0000 | 9.8265 | 106.6077 |
| 9.5000 | −4.9586 | 116.5539 | 9.5000 | 10.8970 | 116.5539 |
| 10.0000 | −6.0011 | 131.0000 | 10.0000 | 12.3994 | 131.0000 |

The left table in Table 38 summarizes the numerical value data of the focus cam of the third embodiment, and the right table in Table 38 summarizes the numerical value data of the zoom compensation cam of this embodiment. A value obtained by synthesizing the amounts (2) of movement in the direction of the optical axis in the numerical value data of the focus cam and the zoom compensation cam in the range from the amount of rotation (ANGLE=0.0) to the amount of rotation (ANGLE=10.0) coincides with the movement locus of the second lens unit calculated using the paraxial data in the upper table in Table 37.

Tables 39, 40, and 41 below summarize the amount DX (mm) of movement for focusing, in the direction of the optical axis, of the focusing lens unit, the imaging magnifications $\beta_K$ of the respective lens units, the conversion coefficient $\gamma_x$ associated with the direction of the optical axis, the slope (dx/da) of the focus cam, and the conversion coefficient $\gamma_a$ associated with the direction of rotation at the wide-angle end (F=36.0), the middle position (F=70.0), and the telephoto end (F=131.0) according to the third embodiment, respectively. The arrangements of the respective tables and the meanings of the reference symbols are the same as those in the first embodiment.

TABLE 39

Amount DX (mm) of Movement for Focusing in Direction of Optical Axis at Wide-angle End (36.0 mm) in Third Embodiment

| R | .000 | ANG | .000 | 1) | .000 | 2) | .000 | 3) | .000 | 4) | .000 |
|---|---|---|---|---|---|---|---|---|---|---|---|
| R | 10.000 | ANG | −.419 | 1) | .000 | 2) | .080 | 3) | .000 | 4) | .000 |
| R | 5.000 | ANG | −.865 | 1) | .000 | 2) | .161 | 3) | .000 | 4) | .000 |
| R | 3.000 | ANG | −1.507 | 1) | .000 | 2) | .269 | 3) | .000 | 4) | .000 |
| R | 2.000 | ANG | −2.399 | 1) | .000 | 2) | .405 | 3) | .000 | 4) | .000 |
| R | 1.500 | ANG | −3.411 | 1) | .000 | 2) | .544 | 3) | .000 | 4) | .000 |
| R | 1.000 | ANG | −5.936 | 1) | .000 | 2) | .825 | 3) | .000 | 4) | .000 |
| R | .800 | ANG | −8.500 | 1) | .000 | 2) | 1.041 | 3) | .000 | 4) | .000 |

Imaging Magnification $\beta_K$ of Lens Units at Wide-angle End (36.0 mm) in Third Embodiment

| R | .000 | ANG | .000 | 1) | .000 | 2) | −.361 | 3) | −6.767 | 4) | .202 |
|---|---|---|---|---|---|---|---|---|---|---|---|
| R | 10.000 | ANG | −.419 | 1) | −.007 | 2) | −.356 | 3) | −6.767 | 4) | .202 |
| R | 5.000 | ANG | −.865 | 1) | −.015 | 2) | −.351 | 3) | −6.767 | 4) | .202 |
| R | 3.000 | ANG | −1.507 | 1) | −.026 | 2) | −.345 | 3) | −6.767 | 4) | .202 |
| R | 2.000 | ANG | −2.399 | 1) | −.040 | 2) | −.337 | 3) | −6.767 | 4) | .202 |
| R | 1.500 | ANG | −3.411 | 1) | −.055 | 2) | −.328 | 3) | −6.767 | 4) | .202 |
| R | 1.000 | ANG | −5.936 | 1) | −.089 | 2) | −.311 | 3) | −6.767 | 4) | .202 |
| R | .800 | ANG | −8.500 | 1) | −.118 | 2) | −.298 | 3) | −6.767 | 4) | .202 |

Conversion Coefficient $\gamma_x$ Associated With Direction of Optical Axis at Wide-angle End (36.0 mm) in Third Embodiment

| R | .000 | ANG | .000 | 1) | .000 | 2) | 1.624 | 3) | .000 | 4) | .000 |
|---|---|---|---|---|---|---|---|---|---|---|---|
| R | 10.000 | ANG | −.419 | 1) | .000 | 2) | 1.630 | 3) | .000 | 4) | .000 |
| R | 5.000 | ANG | −.865 | 1) | .000 | 2) | 1.637 | 3) | .000 | 4) | .000 |
| R | 3.000 | ANG | −1.507 | 1) | .000 | 2) | 1.645 | 3) | .000 | 4) | .000 |
| R | 2.000 | ANG | −2.399 | 1) | .000 | 2) | 1.655 | 3) | .000 | 4) | .000 |
| R | 1.500 | ANG | −3.411 | 1) | .000 | 2) | 1.666 | 3) | .000 | 4) | .000 |
| R | 1.000 | ANG | −5.936 | 1) | .000 | 2) | 1.686 | 3) | .000 | 4) | .000 |

TABLE 39-continued

R .800 ANG -8.500 1) .000 2) 1.701 3) .000 4) .000

Slope dx/da of Focus Cam at Wide-angle End (36.0 mm) in Third Embodiment

| | | | | | | | | | | |
|---|---|---|---|---|---|---|---|---|---|---|
| R | .000 | ANG | .000 | 1) | .000 | 2) | -.196 | 3) | .000 | 4) .000 |
| R | 10.000 | ANG | -.419 | 1) | .000 | 2) | -.186 | 3) | .000 | 4) .000 |
| R | 5.000 | ANG | -.865 | 1) | .000 | 2) | -.176 | 3) | .000 | 4) .000 |
| R | 3.000 | ANG | -1.507 | 1) | .000 | 2) | -.162 | 3) | .000 | 4) .000 |
| R | 2.000 | ANG | -2.399 | 1) | .000 | 2) | -.145 | 3) | .000 | 4) .000 |
| R | 1.500 | ANG | -3.411 | 1) | .000 | 2) | -.129 | 3) | .000 | 4) .000 |
| R | 1.000 | ANG | -5.936 | 1) | .000 | 2) | -.096 | 3) | .000 | 4) .000 |
| R | .800 | ANG | -8.500 | 1) | .000 | 2) | -.074 | 3) | .000 | 4) .000 |

Conversion Coefficient $\gamma_a$ Associated With Direction of Rotation at Wide-angle End (36.0 mm) in Third Embodiment

| | | | | | | | | | | |
|---|---|---|---|---|---|---|---|---|---|---|
| R | .000 | ANG | .000 | 1) | .000 | 2) | -.319 | 3) | .090 | 4) .000 |
| R | 10.000 | ANG | -.419 | 1) | .000 | 2) | -.303 | 3) | .000 | 4) .000 |
| R | 5.000 | ANG | -.865 | 1) | .000 | 2) | -.287 | 3) | .000 | 4) .000 |
| R | 3.000 | ANG | -1.507 | 1) | .000 | 2) | -.266 | 3) | .000 | 4) .000 |
| R | 2.000 | ANG | -2.399 | 1) | .000 | 2) | -.240 | 3) | .000 | 4) .000 |
| R | 1.500 | ANG | -3.411 | 1) | .000 | 2) | -.214 | 3) | .000 | 4) .000 |
| R | 1.000 | ANG | -5.936 | 1) | .000 | 2) | -.162 | 3) | .000 | 4) .000 |
| R | .800 | ANG | -8.500 | 1) | .000 | 2) | -.126 | 3) | .000 | 4) .000 |

Condition Corresponding Values: $\gamma_{xR}/\gamma_{x0} = 1.05$, $\gamma_{aR}/\gamma_{a0} = 0.40$

TABLE 40

Amount DX (mm) of Movement for Focusing in Direction of Optical Axis at Middle Position (70.0 mm) in Third Embodiment

| | | | | | | | | | | |
|---|---|---|---|---|---|---|---|---|---|---|
| R | .000 | ANG | .000 | 1) | .000 | 2) | .000 | 3) | .000 | 4) .000 |
| R | 10.000 | ANG | -.416 | 1) | .000 | 2) | .203 | 3) | .000 | 4) .000 |
| R | 5.000 | ANG | -.862 | 1) | .000 | 2) | .401 | 3) | .000 | 4) .000 |
| R | 3.000 | ANG | -1.508 | 1) | .000 | 2) | .659 | 3) | .000 | 4) .000 |
| R | 2.000 | ANG | -2.406 | 1) | .000 | 2) | .972 | 3) | .000 | 4) .000 |
| R | 1.500 | ANG | -3.419 | 1) | .000 | 2) | 1.278 | 3) | .000 | 4) .000 |
| R | 1.000 | ANG | -5.942 | 1) | .000 | 2) | 1.867 | 3) | .000 | 4) .000 |
| R | .800 | ANG | -8.500 | 1) | .000 | 2) | 2.296 | 3) | .000 | 4) .000 |

Imaging Magnification $\beta_K$ of Lens Units at Middle Position (70.0 mm) in Third Embodiment

| | | | | | | | | | | |
|---|---|---|---|---|---|---|---|---|---|---|
| R | .000 | ANG | .000 | 1) | .000 | 2) | -.527 | 3) | -57.094 | 4) .032 |
| R | 10.000 | ANG | -.416 | 1) | -.007 | 2) | -.515 | 3) | -57.094 | 4) .032 |
| R | 5.000 | ANG | -.862 | 1) | -.015 | 2) | -.503 | 3) | -57.094 | 4) .032 |
| R | 3.000 | ANG | -1.508 | 1) | -.026 | 2) | -.488 | 3) | -57.094 | 4) .032 |
| R | 2.000 | ANG | -2.406 | 1) | -.041 | 2) | -.469 | 3) | -57.094 | 4) .032 |
| R | 1.500 | ANG | -3.419 | 1) | -.056 | 2) | -.450 | 3) | -57.094 | 4) .032 |
| R | 1.000 | ANG | -5.942 | 1) | -.091 | 2) | -.415 | 3) | -57.094 | 4) .032 |
| R | .800 | ANG | -8.500 | 1) | -.122 | 2) | -.389 | 3) | -57.094 | 4) .032 |

Conversion Coefficient $\gamma_x$ Associated With Direction of Optical Axis at Middle Position (70.0 mm) in Third Embodiment

| | | | | | | | | | | |
|---|---|---|---|---|---|---|---|---|---|---|
| R | .000 | ANG | .000 | 1) | .000 | 2) | 2.387 | 3) | .000 | 4) .000 |
| R | 10.000 | ANG | -.416 | 1) | .000 | 2) | 2.430 | 3) | .000 | 4) .000 |
| R | 5.000 | ANG | -.862 | 1) | .000 | 2) | 2.470 | 3) | .000 | 4) .000 |
| R | 3.000 | ANG | -1.508 | 1) | .000 | 2) | 2.521 | 3) | .000 | 4) .000 |
| R | 2.000 | ANG | -2.406 | 1) | .000 | 2) | 2.580 | 3) | .000 | 4) .000 |
| R | 1.500 | ANG | -3.419 | 1) | .000 | 2) | 2.636 | 3) | .000 | 4) .000 |
| R | 1.000 | ANG | -5.942 | 1) | .000 | 2) | 2.738 | 3) | .000 | 4) .000 |
| R | .800 | ANG | -8.500 | 1) | .000 | 2) | 2.807 | 3) | .000 | 4) .000 |

Slope dx/da of Focus Cam at Middle Position (70.0 mm) in Third Embodiment

| | | | | | | | | | | |
|---|---|---|---|---|---|---|---|---|---|---|
| R | .000 | ANG | .000 | 1) | .000 | 2) | -.510 | 3) | .000 | 4) .000 |
| R | 10.000 | ANG | -.416 | 1) | .000 | 2) | -.466 | 3) | .000 | 4) .000 |
| R | 5.000 | ANG | -.862 | 1) | .000 | 2) | -.425 | 3) | .000 | 4) .000 |
| R | 3.000 | ANG | -1.508 | 1) | .000 | 2) | -.376 | 3) | .000 | 4) .000 |
| R | 2.000 | ANG | -2.406 | 1) | .000 | 2) | -.325 | 3) | .000 | 4) .000 |
| R | 1.500 | ANG | -3.419 | 1) | .000 | 2) | -.278 | 3) | .000 | 4) .000 |
| R | 1.000 | ANG | -5.942 | 1) | .000 | 2) | -.196 | 3) | .000 | 4) .000 |
| R | .800 | ANG | -8.500 | 1) | .000 | 2) | -.142 | 3) | .000 | 4) .000 |

Conversion Coefficient $\gamma_a$ Associated With Direction of Rotation at Middle Position (70.0 mm) in Third Embodiment

| | | | | | | | | | | |
|---|---|---|---|---|---|---|---|---|---|---|
| R | .000 | ANG | .000 | 1) | .000 | 2) | -1.217 | 3) | .000 | 4) .000 |
| R | 10.000 | ANG | -.416 | 1) | .000 | 2) | -1.132 | 3) | .000 | 4) .000 |
| R | 5.000 | ANG | -.862 | 1) | .000 | 2) | -1.049 | 3) | .000 | 4) .000 |
| R | 3.000 | ANG | -1.508 | 1) | .000 | 2) | -.947 | 3) | .000 | 4) .000 |

TABLE 40-continued

| R | 2.000 | ANG | -2.406 | 1) | .000 | 2) | -.840 | 3) | .000 | 4) | .000 |
| R | 1.500 | ANG | -3.419 | 1) | .000 | 2) | -.734 | 3) | .000 | 4) | .000 |
| R | 1.000 | ANG | -5.942 | 1) | .000 | 2) | -.537 | 3) | .000 | 4) | .000 |
| R | .800 | ANG | -8.500 | 1) | .000 | 2) | -.399 | 3) | .000 | 4) | .000 |

Condition Corresponding Values: $\gamma_{xR}/\gamma_{x0} = 1.18$, $\gamma_{aR}/\gamma_{a0} = 0.33$

TABLE 41

Amount DX (mm) of Movement for Focusing in Direction of Optical Axis at Telephoto End (131.0 mm) in Third Embodiment

| R | .000 | ANG | .000 | 1) | .000 | 2) | .000 | 3) | .000 | 4) | .000 |
| R | 10.000 | ANG | -.407 | 1) | .000 | 2) | .884 | 3) | .000 | 4) | .000 |
| R | 5.000 | ANG | -.865 | 1) | .000 | 2) | 1.571 | 3) | .000 | 4) | .000 |
| R | 3.000 | ANG | -1.507 | 1) | .000 | 2) | 2.323 | 3) | .000 | 4) | .000 |
| R | 2.000 | ANG | -2.399 | 1) | .000 | 2) | 3.106 | 3) | .000 | 4) | .000 |
| R | 1.500 | ANG | -3.411 | 1) | .000 | 2) | 3.780 | 3) | .000 | 4) | .000 |
| R | 1.000 | ANG | -5.936 | 1) | .000 | 2) | 4.928 | 3) | .000 | 4) | .000 |
| R | .800 | ANG | -8.500 | 1) | .000 | 2) | 5.676 | 3) | .000 | 4) | .000 |

Imaging Magnification $\beta_K$ of Lens Units at Telephoto End (131.0 mm) in Third Embodiment

| R | .000 | ANG | .000 | 1) | .000 | 2) | -.814 | 3) | 20.047 | 4) | -.110 |
| R | 10.000 | ANG | -.407 | 1) | -.007 | 2) | -.760 | 3) | 20.047 | 4) | -.110 |
| R | 5.000 | ANG | -.865 | 1) | -.015 | 2) | -.719 | 3) | 20.047 | 4) | -.110 |
| R | 3.000 | ANG | -1.507 | 1) | -.026 | 2) | -.674 | 3) | 20.047 | 4) | -.110 |
| R | 2.000 | ANG | -2.399 | 1) | -.041 | 2) | -.627 | 3) | 20.047 | 4) | -.110 |
| R | 1.500 | ANG | -3.411 | 1) | -.057 | 2) | -.586 | 3) | 20.047 | 4) | -.110 |
| R | 1.000 | ANG | -5.936 | 1) | -.093 | 2) | -.517 | 3) | 20.047 | 4) | -.110 |
| R | .800 | ANG | -8.500 | 1) | -.125 | 2) | -.472 | 3) | 20.047 | 4) | -.110 |

Conversion Coefficient $\gamma_x$ Associated With Direction of Optical Axis at Telephoto End (131.0 mm) in Third Embodiment

| R | .000 | ANG | .000 | 1) | .000 | 2) | 1.643 | 3) | .000 | 4) | .000 |
| R | 10.000 | ANG | -.407 | 1) | .000 | 2) | 2.051 | 3) | .000 | 4) | .000 |
| R | 5.000 | ANG | -.865 | 1) | .000 | 2) | 2.348 | 3) | .000 | 4) | .000 |
| R | 3.000 | ANG | -1.507 | 1) | .000 | 2) | 2.655 | 3) | .000 | 4) | .000 |
| R | 2.000 | ANG | -2.399 | 1) | .000 | 2) | 2.954 | 3) | .000 | 4) | .000 |
| R | 1.500 | ANG | -3.411 | 1) | .000 | 2) | 3.193 | 3) | .000 | 4) | .000 |
| R | 1.000 | ANG | -5.936 | 1) | .000 | 2) | 3.564 | 3) | .000 | 4) | .000 |
| R | .800 | ANG | -8.500 | 1) | .000 | 2) | 3.781 | 3) | .000 | 4) | .000 |

Slope dx/da of Focus Cam at Telephoto End (131.0 mm) in Third Embodiment

| R | .000 | ANG | .000 | 1) | .000 | 2) | -2.632 | 3) | .000 | 4) | .000 |
| R | 10.000 | ANG | -.407 | 1) | .000 | 2) | -1.779 | 3) | .000 | 4) | .000 |
| R | 5.000 | ANG | -.865 | 1) | .000 | 2) | -1.312 | 3) | .000 | 4) | .000 |
| R | 3.000 | ANG | -1.507 | 1) | .000 | 2) | -1.033 | 3) | .000 | 4) | .000 |
| R | 2.000 | ANG | -2.399 | 1) | .000 | 2) | -.756 | 3) | .000 | 4) | .000 |
| R | 1.500 | ANG | -3.411 | 1) | .000 | 2) | -.588 | 3) | .000 | 4) | .000 |
| R | 1.000 | ANG | -5.936 | 1) | .000 | 2) | -.353 | 3) | .000 | 4) | .000 |
| R | .800 | ANG | -8.500 | 1) | .000 | 2) | -.240 | 3) | .000 | 4) | .000 |

Conversion Coefficient $\gamma_a$ Associated With Direction of Rotation at Telephoto End (131.0 mm) in Third Embodiment

| R | .000 | ANG | .000 | 1) | .000 | 2) | -4.324 | 3) | .000 | 4) | .000 |
| R | 10.000 | ANG | -.407 | 1) | .000 | 2) | -3.647 | 3) | .000 | 4) | .000 |
| R | 5.000 | ANG | -.865 | 1) | .000 | 2) | -3.081 | 3) | .000 | 4) | .000 |
| R | 3.000 | ANG | -1.507 | 1) | .000 | 2) | -2.742 | 3) | .000 | 4) | .000 |
| R | 2.000 | ANG | -2.399 | 1) | .000 | 2) | -2.233 | 3) | .000 | 4) | .000 |
| R | 1.500 | ANG | -3.411 | 1) | .000 | 2) | -1.877 | 3) | .000 | 4) | .000 |
| R | 1.000 | ANG | -5.936 | 1) | .000 | 2) | -1.258 | 3) | .000 | 4) | .000 |
| R | .800 | ANG | -8.500 | 1) | .000 | 2) | -.906 | 3) | .000 | 4) | .000 |

Condition Corresponding Values: $\gamma_{xR}/\gamma_{x0} = 2.30$, $\gamma_{aR}/\gamma_{a0} = 0.21$ As can be seen from Tables 39, 40, and 41, at each focal length, the conversion coefficient $\gamma_x$ associated with the direction of the optical axis increases but the value of the slope (dx/da) of the focus cam decreases as the photographing distance becomes closer to the closest distance. Therefore, as can be seen from these tables, the value of the conversion coefficient $\gamma_a$ associated with the direction of rotation, which is defined as the product of the conversion coefficient $\gamma_x$ and the slope (dx/da) of the focus cam, decreases as the photographing distance becomes closer to the closest distance by the influence of the slope (dx/da) of the focus cam, contrary to the case in which the rotation amount ratio ($a_F/a_Z$) is set to be 1.0, as in the embodiment of Japanese Patent Application Laid-Open No. 5-142475. From Tables 39, 40, and 41, the rate of change, from the infinity in-focus position to the closest in-focus position, of the conversion coefficient $\gamma_a$ associated with the direction of rotation is ×0.40 at the wide-angle end (F=36.0), ×0.33 at the middle position (F=70.0), and ×0.21 at the telephoto end (F=131.0). When the number N of divisions of the focus range upon a change in conversion coefficient $\gamma_a$ in the fourth embodiment is calculated using formula (a), and is compared with that in the case in which the rotation amount ratio ($a_F/a_Z$) is set to be 1.0, as in the embodiment of Japanese Patent Application Laid-Open No. 5-142475, the numbers $N_W$, $N_M$, and $N_T$ of divisions at the wide-angle end, middle position, and telephoto end respectively have the following values:

When the rotation amount ratio ($a_F/a_Z$) is set to be 1.0

$N_W>12.4$  $N_M>12.6$  $N_T>10.8$

Third Embodiment $N_W>5.1$  $N_M>6.1$  $N_T>8.6$

Therefore, it can be seen that the numbers of divisions become small, compared to those in the case in which the rotation amount ratio ($a_F/a_Z$) is set to be 1.0, as in the embodiment of Japanese Patent Application Laid-Open No. 5-142475.

As described above, in the third embodiment as well, since the rate of change of the conversion coefficient $\gamma_a$ associated with the direction of rotation is smaller than that in the case in which the rotation amount ratio ($a_F/a_Z$) is set to be 1.0, like in the embodiment of Japanese Patent Application Laid-Open No. 5-142475, the number of data of the conversion coefficient $\gamma_a$ and the correction coefficient $\mu$ can be reduced, and the storage capacity can be suppressed.

Tables 42, 43, and 44 summarize the calculation results of the conversion coefficient $K_a$ and the correction coefficient $\mu$ at the wide-angle end (F=36.0), middle position (F=70.0), and telephoto end (F=131.0) according to the third embodiment. The arrangements of the tables and reference symbols are the same as those in the first embodiment. The position of the focusing lens in the first pair in the upper two tables in each of Tables 42, 43, and 44, i.e., in the third and fourth columns is (R, ANGLE)=(0.0, 0.0), and it indicates that this position corresponds to the infinity corresponding position. Similarly, the position of the focusing lens in the fourth pair in the lower two tables in each of Tables 42, 43, and 44, i.e., in the ninth and tenth columns is (R, ANGLE)=(0.8, -8.5), and it indicates that this position corresponds to the closest in-focus (R=0.8 m) corresponding position.

TABLE 42

Conversion Coefficients $K_a$: (rs), $\gamma_a$: (r) Associated with Direction of Rotation and Correction Coefficient $\mu$: (l) at Wide-angle End (36.0 mm) of Third Embodiment
F = 36.0 mm

| (R, ANGLE) = | .000 | .000 | 10.000 | -.419 | 5.000 | -.865 | 3.000 | -1.507 |
|---|---|---|---|---|---|---|---|---|
| POS  R | r | rs | r | rs | r | rs | r | rs |
| 1   .000 | -.319 | .000 |  | -.309 |  | -.300 |  | -.287 |
| 2   10.000 |  | -.312 | -.303 | .000 |  | -.294 |  | -.281 |
| 3   5.000 |  | -.306 |  | -.297 | -.287 | .000 |  | -.275 |
| 4   3.000 |  | -.296 |  | -.287 |  | -.278 | -.266 | .000 |
| 5   2.000 |  | -.284 |  | -.275 |  | -.267 |  | -.255 |
| 6   1.500 |  | -.271 |  | -.263 |  | -.254 |  | -.243 |
| 7   1.000 |  | -.242 |  | -.235 |  | -.227 |  | -.217 |
| 8   .800 |  | -.217 |  | -.210 |  | -.203 |  | -.194 |

| POS | R | bf | l | bf | l | bf | l | bf | l |
|---|---|---|---|---|---|---|---|---|---|
| 1 | .000 | .00 | .00 | -.13 | 6.41 | -.26 | 5.91 | -.43 | 5.51 |
| 2 | 10.000 | .13 | 6.83 | .00 | .00 | -.13 | 5.75 | -.31 | 5.45 |
| 3 | 5.000 | .26 | 6.65 | .13 | 6.16 | .00 | .00 | -.18 | 5.44 |
| 4 | 3.000 | .45 | 6.45 | .31 | 6.01 | .18 | 5.69 | .00 | .00 |
| 5 | 2.000 | .68 | 6.32 | .55 | 5.95 | .41 | 5.69 | .23 | 5.42 |
| 6 | 1.500 | .92 | 6.22 | .79 | 5.89 | .65 | 5.64 | .46 | 5.34 |
| 7 | 1.000 | 1.44 | 6.00 | 1.29 | 5.71 | 1.15 | 5.47 | .96 | 5.16 |
| 8 | .800 | 1.85 | 5.82 | 1.70 | 5.55 | 1.55 | 5.31 | 1.36 | 5.00 |

| (R, ANGLE) = | 2.000 | -2.399 | 1.500 | -3.411 | 1.000 | -5.936 | 800 | -8.500 |
|---|---|---|---|---|---|---|---|---|
| POS  R | r | rs | r | rs | r | rs | r | rs |
| 1   .000 |  | -.270 |  | -.254 |  | -.219 |  | -.192 |
| 2   10.000 |  | -.265 |  | -.248 |  | -.214 |  | -.187 |
| 3   5.000 |  | -.259 |  | -.243 |  | -.209 |  | -.183 |
| 4   3.000 |  | -.251 |  | -.235 |  | -.202 |  | -.177 |
| 5   2.000 | -.240 | .000 |  | -.225 |  | -.193 |  | -.169 |
| 6   1.500 |  | -.229 | -.214 | .000 |  | -.184 |  | -.160 |
| 7   1.000 |  | -.203 |  | -.190 | -.162 | .000 |  | -.141 |
| 8   .800 |  | -.182 |  | -.170 |  | -.145 | -.126 | .000 |

| POS | R | bf | l | bf | l | bf | l | bf | l |
|---|---|---|---|---|---|---|---|---|---|
| 1 | .000 | -.65 | 5.11 | -.87 | 4.69 | -1.30 | 3.72 | -1.63 | 3.16 |
| 2 | 10.000 | -.52 | 5.07 | -.74 | 4.67 | -1.18 | 3.69 | -1.51 | 3.14 |
| 3 | 5.000 | -.40 | 5.05 | -.62 | 4.65 | -4.06 | 3.67 | -1.40 | 3.13 |
| 4 | 3.000 | -.22 | 5.01 | -.45 | 4.61 | -.90 | 3.63 | -1.24 | 3.11 |
| 5 | 2.000 | .00 | .00 | -.23 | 4.58 | -.68 | 3.57 | -1.03 | 3.09 |
| 6 | 1.500 | .23 | 4.92 | .00 | .00 | -.46 | 3.51 | -.51 | 3.07 |
| 7 | 1.000 | .72 | 4.73 | .48 | 4.27 | .00 | .00 | -.36 | 3.14 |
| 8 | .800 | 1.11 | 4.59 | .86 | 4.16 | .37 | 3.41 | .00 | .00 |

Condition Corresponding Values: $K_{aO}/\gamma_{aO} = 0.68$, $K_{aR}/\gamma_{aR} = 1.52$

TABLE 43

Converison Coefficients $K_A$: (rs), $\gamma_A$: (r) Associated with Direction of Rotation and Correction Coefficient $\mu$: (l) at Middle Position (70.0 mm) of Third Embodiment
F = 70.0 mm

| (R, ANGLE) = | .000 | .000 | 10.000 | −.416 | 5.000 | −.862 | 3.000 | −1.508 |
|---|---|---|---|---|---|---|---|---|
| POS | R | r | rs | r | rs | r | rs | r | rs |
| 1 | .000 | −1.217 | .000 |  | −1.156 |  | −1.097 |  | −1.021 |
| 2 | 10.000 |  | −1.192 | −1.131 | .000 |  | −1.073 |  | −.999 |
| 3 | 5.000 |  | −1.166 |  | −1.106 | −1.049 | .000 |  | −.977 |
| 4 | 3.000 |  | −1.129 |  | −1.071 |  | −1.016 | −.947 | .000 |
| 5 | 2.000 |  | −1.085 |  | −1.030 |  | −.978 |  | −.913 |
| 6 | 1.500 |  | −1.041 |  | −.988 |  | −.938 |  | −.877 |
| 7 | 1.000 |  | −.940 |  | −.892 |  | −.847 |  | −.790 |
| 8 | .800 |  | −.851 |  | −.807 |  | −.766 |  | −.713 |

| POS | R | bf | l | bf | l | bf | l | bf | l |
|---|---|---|---|---|---|---|---|---|---|
| 1 | .000 | .00 | .00 | −.48 | 22.24 | −.95 | 20.78 | −1.54 | 19.68 |
| 2 | 10.000 | .50 | 24.26 | .00 | .00 | −.48 | 20.47 | −1.09 | 19.78 |
| 3 | 5.000 | 1.00 | 23.94 | .49 | 22.26 | .00 | .00 | −.63 | 20.21 |
| 4 | 3.000 | 1.70 | 23.67 | 1.17 | 22.08 | .66 | 20.89 | .00 | .00 |
| 5 | 2.000 | 2.61 | 24.13 | 2.05 | 22.88 | 1.51 | 22.21 | .82 | 22.79 |
| 6 | 1.500 | 3.56 | 24.62 | 2.97 | 23.47 | 2.40 | 22.79 | 1.67 | 22.47 |
| 7 | 1.000 | 5.59 | 24.59 | 4.93 | 23.35 | 4.30 | 22.35 | 3.50 | 21.08 |
| 8 | .800 | 7.24 | 24.10 | 6.53 | 22.81 | 5.85 | 21.66 | 4.98 | 20.16 |

| (R, ANGLE) = | 2.000 | −2.406 | 1.500 | −3.419 | 1.000 | −5.942 | .800 | −8.500 |
|---|---|---|---|---|---|---|---|---|
| POS | R | r | rs | r | rs | r | rs | r | rs |
| 1 | .000 |  | −.935 |  | −.856 |  | −.707 |  | −.599 |
| 2 | 10.000 |  | −.916 |  | −.839 |  | −.692 |  | −.586 |
| 3 | 5.000 |  | −.896 |  | −.821 |  | −.677 |  | −.573 |
| 4 | 3.000 |  | −.870 |  | −.798 |  | −.657 |  | −.555 |
| 5 | 2.000 | −.840 | .000 |  | −.768 |  | −.630 |  | −.532 |
| 6 | 1.500 |  | −.804 | −.734 | .000 |  | −.601 |  | −.506 |
| 7 | 1.000 |  | −.722 |  | −.658 | −.537 | .000 |  | −.450 |
| 8 | .800 |  | −.651 |  | −.591 |  | −.480 | −.399 | .000 |

| POS | R | bf | l | bf | l | bf | l | bf | l |
|---|---|---|---|---|---|---|---|---|---|
| 1 | .000 | −2.25 | 19.72 | −2.93 | 17.58 | −4.20 | 13.32 | −5.09 | 10.17 |
| 2 | 10.000 | −1.82 | 20.08 | −2.52 | 17.68 | −3.82 | 13.29 | −4.74 | 10.11 |
| 3 | 5.000 | −1.38 | 20.62 | −2.10 | 17.76 | −3.44 | 13.23 | −4.38 | 10.04 |
| 4 | 3.000 | −.78 | 21.31 | −1.52 | 17.62 | −2.91 | 13.10 | −3.88 | 9.92 |
| 5 | 2.000 | .00 | .00 | −.78 | 16.93 | −2.23 | 12.88 | −3.24 | 9.75 |
| 6 | 1.500 | .81 | 19.42 | .00 | .00 | −1.52 | 12.75 | −2.57 | 9.57 |
| 7 | 1.000 | 2.55 | 18.30 | 1.66 | 15.95 | .00 | .00 | −1.15 | 9.08 |
| 8 | .800 | 3.97 | 17.62 | 3.00 | 15.44 | 1.23 | 11.49 | .00 | .00 |

Condition Corresponding Values: $K_{aO}/\gamma_{aO} = 0.70$, $K_{aR}/\gamma_{aR} = 1.50$

TABLE 44

Converison Coefficients $K_A$: (rs), $\gamma_A$: (r) Associated with Direction of Rotation and Correction Coefficient $\mu$: (l) at Telephoto End (131.0 mm) of Third Embodiment
F = 131.0 mm

| (R, ANGLE) = | .000 | .000 | 10.000 | −.407 | 5.000 | −.865 | 3.000 | −1.507 |
|---|---|---|---|---|---|---|---|---|
| POS | R | r | rs | r | rs | r | rs | r | rs |
| 1 | .000 | −4.321 | .000 |  | −3.765 |  | −3.255 |  | −2.839 |
| 2 | 10.000 |  | −4.308 | −3.649 | .000 |  | −3.138 |  | −2.773 |
| 3 | 5.000 |  | −4.152 |  | −3.496 | −3.080 | .000 |  | −2.764 |
| 4 | 3.000 |  | −4.096 |  | −3.491 |  | −3.121 | −2.741 | .000 |
| 5 | 2.000 |  | 4.018 |  | −3.428 |  | −3.043 |  | −2.635 |
| 6 | 1.500 |  | −3.929 |  | −3.346 |  | −2.956 |  | −2.553 |
| 7 | 1.000 |  | −3.703 |  | −3.132 |  | −2.745 |  | −2.356 |
| 8 | .800 |  | −3.477 |  | −2.919 |  | −2.544 |  | −2.171 |

| POS | R | bf | l | bf | l | bf | l | bf | l |
|---|---|---|---|---|---|---|---|---|---|
| 1 | .000 | .00 | .00 | −1.53 | 48.23 | −2.81 | 49.46 | −4.28 | 119.60 |
| 2 | 10.000 | 1.75 | 572.58 | .00 | .00 | −1.43 | 77.03 | 3.05 | 257.36 |
| 3 | 5.000 | 3.59 | 91.70 | 1.60 | 38.08 | .00 | .00 | −1.77 | 212.10 |
| 4 | 3.000 | 6.17 | 118.29 | 3.84 | 88.33 | 2.00 | −152.43 | .00 | .00 |
| 5 | 2.000 | 9.64 | 137.16 | 6.83 | 112.61 | 4.67 | 386.10 | 2.35 | 61.08 |

TABLE 44-continued

Converison Coefficients $K_a$: (rs), $\gamma_a$: (r) Associated with Direction of Rotation and Correction Coefficient μ: (l) at Telephoto End (131.0 mm) of Third Embodiment F = 131.0 mm

| 6 | 1.500 | 13.40 | 147.45 | 10.05 | 120.80 | 7.53 | 187.07 | 4.86 | 71.08 |
|---|---|---|---|---|---|---|---|---|---|
| 7 | 1.000 | 21.98 | 153.73 | 17.31 | 122.07 | 13.92 | 128.09 | 10.44 | 74.42 |
| 8 | .800 | 29.56 | 151.27 | 23.63 | 118.12 | 19.42 | 111.54 | 15.19 | 73.11 |

| (R, ANGLE) = | 2.000 | | -2.399 | 1.500 | -3.411 | 1.000 | -5.936 | .800 | -8.500 |
|---|---|---|---|---|---|---|---|---|---|
| POS | R | r | rs | r | rs | r | rs | r | rs |
| 1 | .000 | | -2.436 | | -2.113 | | -1.606 | | -1.298 |
| 2 | 10.000 | | -2.388 | | -2.073 | | -1.576 | | -1.273 |
| 3 | 5.000 | | -2.366 | | -2.048 | | -1.551 | | -1.250 |
| 4 | 3.000 | | -2.315 | | -2.001 | | -1.511 | | -1.216 |
| 5 | 2.000 | -2.232 | .000 | | -1.938 | | -1.458 | | -1.170 |
| 6 | 1.500 | | -2.171 | -1.877 | .000 | | -1.400 | | -1.120 |
| 7 | 1.000 | | -1.991 | | -1.704 | -1.258 | .000 | | -1.007 |
| 8 | .800 | | -1.825 | | -1.555 | | -1.146 | -.906 | .000 |

| POS | R | bf | l | bf | l | bf | l | bf | l |
|---|---|---|---|---|---|---|---|---|---|
| 1 | .000 | -5.84 | 63.88 | -7.21 | 57.34 | -9.53 | 34.47 | -11.03 | 25.55 |
| 2 | 10.000 | -4.76 | 67.97 | -6.23 | 59.58 | -8.71 | 34.51 | -10.30 | 25.49 |
| 3 | 5.000 | -3.63 | 60.51 | -5.21 | 57.33 | -7.86 | 33.81 | -9.54 | 25.18 |
| 4 | 3.000 | -2.06 | 55.43 | -3.81 | 57.76 | -6.69 | 33.28 | -8.50 | 24.92 |
| 5 | 2.000 | .00 | .00 | -1.96 | 60.83 | -5.16 | 32.47 | -7.14 | 24.56 |
| 6 | 1.500 | 2.20 | 80.09 | .00 | .00 | -3.53 | 31.39 | -5.70 | 24.18 |
| 7 | 1.000 | 7.04 | 65.19 | 4.30 | 46.70 | .00 | .00 | -2.58 | 23.32 |
| 8 | .800 | 11.13 | 61.04 | 7.91 | 46.13 | 2.94 | 33.11 | .00 | .00 |

Condition Corresponding Values: $K_{ao}/\gamma_{ao} = 0.80$, $K_{aR}/\gamma_{aR} = 1.43$ The calculation results of the rate of change of $K_a$ with respect to $\gamma_a$ at the infinity in-focus arrangement and the closest in-focus arrangement at the wide-angle end, middle position, and telephoto end in the case in which the rotation amount ratio $(a_F/a_Z)$ is set to be 1.0, as in the embodiment of Japanese Patent Application Laid-Open No. 5-142475 and in the third embodiment of the present invention in which said ratio $(a_F/a_Z)$ is set to be -0.85 are as follows.

| When the rotation amount ratio $(a_F/a_Z)$ is set to be 1.0 | | |
|---|---|---|
| | Infinity Arrangement $K_{ao}/\gamma_{ao}$ | Closest Arrangement $K_{aR}/\gamma_{aR}$ |
| Wide-angle End (F = 28.8) | 3.94 | 0.36 |
| Middle Position (F = 70.0) | 5.21 | 0.37 |
| Telephoto End (F = 131.0) Third Embodiment | 6.78 | 0.35 |
| Wide-angle End (F = 28.8) | 0.68 | 1.52 |
| Middle Position (F = 70.0) | 0.70 | 1.50 |
| Telephoto End (F = 131.0) | 0.80 | 1.43 |

As described above, in the third embodiment as well, since the rate of change of $K_a$ with respect to $\gamma_a$ is small as compared to the conventional system, the contribution of the correction term $(\Delta Bf/\mu)$ in $K_a=\gamma_a(1-\Delta Bf/\mu)$ can be reduced. For this reason, an error of the conversion coefficient $K_a$ calculated based on $\gamma_a$ and μ or an error from the actual lens driving amount Δa obtained when only one pair of a conversion coefficient $\gamma_a$ value and a correction coefficient μ value are set can be reduced.

Next, in the case in which the rotation amount ratio $(a_F/a_Z)$ is set to be 1.0, as in the embodiment of Japanese Patent Application Laid-Open No. 5-142475 and the third embodiment of the present invention in which said ratio $(a_F/a_Z)$ is set to be -0.85, when the lens driving amounts upon focusing from the infinity in-focus lens arrangement to the closest distance object and upon focusing from the closest in-focus lens arrangement to the infinity object at the wide-angle end, middle position, and telephoto end are calculated from $\Delta a=\Delta Bf/[\gamma_a(1-\Delta Bf/\mu)]$, and errors from the actual lens driving amounts are then calculated, the following values are obtained. Note that the value of the correction coefficient μ upon focusing from the infinity in-focus lens arrangement to the closest distance object adopts a value at the object distance (POS-5), and the value of the correction coefficient μ upon focusing from the closest in-focus lens arrangement to the infinity object adopts a value at the object distance (POS-4).

| When the rotation amount ratio $(a_F/a_Z)$ is set to be 1.0 | | |
|---|---|---|
| | Infinity Arrangement → Closest In-focus State | Closest Arrangement → Infinity In-focus State |
| Wide-angle End (F = 36.0) | -8.5% | -20.9% |
| Middle Position (F = 70.0) | -14.1% | -23.8% |
| Telephoto End (F = 131.0) Third Embodiment | -17.8% | -23.3% |
| Wide-angle End (F = 36.0) | -3.5% | -0.1% |
| Middle Position (F = 70.0) | -0.0% | -0.8% |
| Telephoto End (F = 131.0) | 2.6% | -0.7% |

As described above, in the third embodiment as well, even when only a pair of a conversion coefficient $\gamma_a$ value and a correction coefficient μ value are set for a given lens arrangement range, an error between the conversion coefficient $K_a$ calculated from $\gamma_a$ and μ and the lens driving amount Δa for focusing becomes small as compared to the conventional system, and focusing can be realized with higher accuracy.

Table 45 summarizes the amount (ANGLE DA) of rotation for focusing upon manual focusing using the focus cam (the middle table in Table 37) of the third embodiment, the amount DX (mm) of movement, in the direction of the optical axis, of the focusing lens unit corresponding to the amount of rotation for focusing, and the displacement amount Bf (mm) of the imaging point when the amount (DX) of movement in the direction of the optical axis is given.

Note that the arrangement of the table and reference symbols are the same as those in the first embodiment. The upper table in Table 45 summarizes the displacement amount (Bf) of the imaging point corresponding to the photographing distances (R=5.0, 3.0, 2.0, 1.5, 1.0, and 0.8 m) in the respective zooming states of the focal lengths (F=36.0, 50.0, 70.0, 85.0, 105.0, and 131.0 mm), and the middle table summarizes the values of the amount (ANGLE DA) of rotation for focusing required for attaining an optimal in-focus state with respect to the respective photographing distances. The lower table summarizes the amounts (DX) of movement, in the direction of the optical axis, of the respective lens units corresponding to the amount (ANGLE DA) of rotation for focusing in association with the focal lengths and photographing distances.

TABLE 45

Displacement Amount Bf (mm) of Imaging Point and Amount DX (mm) of movement for focusing in Third Embodiment

|   | 0.80 m | 1.00 m | 1.50 m | 2.00 m | 3.00 m | 5.00 m |
|---|---|---|---|---|---|---|
| 36.000 Bf | .000 | .000 | .000 | .000 | .000 | .000 |
| 50.000 Bf | .000 | −.001 | .000 | .001 | .001 | .001 |
| 70.000 Bf | .000 | .003 | .006 | .006 | .001 | −.003 |
| 85.000 Bf | .000 | .002 | −.001 | −.011 | −.010 | −.004 |
| 105.000 Bf | .000 | −.001 | −.018 | −.012 | −.012 | −.019 |
| 131.000 Bf | .000 | .000 | .000 | .000 | .000 | .000 |

| ANGLE DA | −8.500 | −5.936 | −3.411 | −2.399 | −1.507 | −.865 |
|---|---|---|---|---|---|---|

| | | | | | | |
|---|---|---|---|---|---|---|
| F | 36.000 DX | .000 | 1.041 | .000 | .000 R | 0.80 m |
| F | 50.000 DX | .000 | 1.500 | .000 | .000 R | 0.80 m |
| F | 70.000 DX | .000 | 2.296 | .000 | .000 R | 0.80 m |
| F | 85.000 DX | .000 | 2.994 | .000 | .000 R | 0.80 m |
| F | 105.000 DX | .000 | 4.063 | .000 | .000 R | 0.80 m |
| F | 131.000 DX | .000 | 5.676 | .000 | .000 R | 0.80 m |
| F | 36.000 DX | .000 | .825 | .000 | .000 R | 1.00 m |
| F | 50.000 DX | .000 | 1.200 | .000 | .000 R | 1.00 m |
| F | 70.000 DX | .000 | 1.866 | .000 | .000 R | 1.00 m |
| F | 85.000 DX | .000 | 2.470 | .000 | .000 R | 1.00 m |
| F | 105.000 DX | .000 | 3.426 | .000 | .000 R | 1.00 m |
| F | 131.000 DX | .000 | 4.928 | .000 | .000 R | 1.00 m |
| F | 36.000 DX | .000 | .544 | .000 | .000 R | 1.50 m |
| F | 50.000 DX | .000 | .801 | .000 | .000 R | 1.50 m |
| F | 70.000 DX | .000 | 1.275 | .000 | .000 R | 1.50 m |
| F | 85.000 DX | .000 | 1.730 | .000 | .000 R | 1.50 m |
| F | 105.000 DX | .000 | 2.494 | .000 | .000 R | 1.50 m |
| F | 131.000 DX | .000 | 3.780 | .000 | .000 R | 1.50 m |
| F | 36.000 DX | .000 | .405 | .000 | .000 R | 2.00 m |
| F | 50.000 DX | .000 | .601 | .000 | .000 R | 2.00 m |
| F | 70.000 DX | .000 | .970 | .000 | .000 R | 2.00 m |
| F | 85.000 DX | .000 | 1.339 | .000 | .000 R | 2.00 m |
| F | 105.000 DX | .000 | 1.970 | .000 | .000 R | 2.00 m |
| F | 131.000 DX | .000 | 3.106 | .000 | .000 R | 2.00 m |
| F | 36.000 DX | .000 | .269 | .000 | .000 R | 3.00 m |
| F | 50.000 DX | .000 | .401 | .000 | .000 R | 3.00 m |
| F | 70.000 DX | .000 | .658 | .000 | .000 R | 3.00 m |
| F | 85.000 DX | .000 | .923 | .000 | .000 R | 3.00 m |
| F | 105.000 DX | .000 | 1.396 | .000 | .000 R | 3.00 m |
| F | 131.000 DX | .000 | 2.323 | .000 | .000 R | 3.00 m |
| F | 36.000 DX | .000 | .161 | .000 | .000 R | 5.00 m |
| F | 50.000 DX | .000 | .241 | .000 | .000 R | 5.00 m |

TABLE 45-continued

Displacement Amount Bf (mm) of Imaging Point and Amount DX (mm) of movement for focusing in Third Embodiment

| | | | | | | |
|---|---|---|---|---|---|---|
| F | 70.000 DX | .000 | .402 | .000 | .000 R | 5.00 m |
| F | 85.000 DX | .000 | .569 | .000 | .000 R | 5.00 m |
| F | 105.000 DX | .000 | .891 | .000 | .000 R | 5.00 m |
| F | 131.000 DX | .000 | 1.571 | .000 | .000 R | 5.00 m |

As can be seen from Table 45, in the zoom lens of the third embodiment, so-called manual focusing can be attained since the displacement amounts of the imaging point at the respective focal lengths and photographing distances are very small, and fall within the depth of focus independently of the zooming state and photographing distance.

[Fourth Embodiment]

The fourth embodiment is directed to a zoom lens which has a five-unit arrangement, i.e., positive, negative, positive, negative and positive lens units, and attains focusing by a negative second lens unit. In this zoom lens, the rotation amount ratio ($a_F/a_Z$) of the rotation amount for focusing from the infinity in-focus position to the closest in-focus position (R=0.5 m) to the amount of rotation for zooming from the wide-angle end (F=28.8) to the telephoto end (F=103.0) is set to be −0.90.

Table 46 below summarizes various paraxial data of an optical system and data for defining the shape of a focus cam according to the fourth embodiment.

The upper table in Table 46 summarizes the focal lengths and principal point interval data of the respective lens units of the optical system corresponding to the fourth embodiment in association with six zooming states (focal length F=28.8 (1-POS), 35.0 (2-POS), 50.0 (3-POS), 70.0 (4-POS), 85.0 (5-POS), and 103.0 mm (6-POS)).

The middle table in Table 46 summarizes spline sample data when the shape of the focus cam in the second lens unit of the fourth embodiment, which is used for focusing, is expressed by the above-mentioned spline function associated with the angle a of rotation of a rotatable lens barrel and the amount x of movement in the direction of the optical axis. In this middle table, (1), (2), (3), and (4) correspond to the first, second, third, and fourth lens units, respectively.

Furthermore, the lower table in Table 46 summarizes the infinity focusing positions (infinity corresponding positions) at the respective focal lengths (focal length F=28.8, 35.0, 50.0, 70.0, 85.0, and 103.0 mm), and the amounts of rotation (amounts of rotation for focusing) upon focusing to respective photographing distances (R=5.0, 3.0, 2.0, 1.0, 0.7, and 0.5 m) using the focus cam of the fourth embodiment. In this table, since the amount of rotation for zooming from the wide-angle end (F=28.8) to the telephoto end (F=103.0) is set to be 10.0, and the amount of rotation for focusing from the infinity in-focus position to the closest in-focus position (R=0.5 m) is set to be −9.0, the rotation amount ratio ($a_F/a_Z$) of the amount of rotation for focusing to the amount of rotation for zooming in the fourth embodiment is −0.90.

TABLE 46

Fourth Embodiment F = 28.8 to 103.0 (Rotation Amount Ratio: $a_F/a_Z = -0.90$)
Focal lengths and Principal Point Intervals of Lens Units of Fourth Embodiment

|     |          |     | 1-POS   | 2-POS   | 3-POS   | 4-POS   | 5-POS   | 6-POS    |
|-----|----------|-----|---------|---------|---------|---------|---------|----------|
|     |          | F   | 28.8000 | 35.0000 | 50.0000 | 70.0000 | 85.0000 | 103.0000 |
| F1  | 70.5000  | D1  | 9.3252  | 13.0113 | 20.5346 | 28.4581 | 32.6851 | 36.5544  |
| F2  | -13.4000 | D2  | 18.3082 | 16.1329 | 13.0216 | 10.6580 | 9.2279  | 7.6539   |
| F3  | 32.9000  | D3  | 14.6453 | 13.3678 | 10.4573 | 8.4188  | 7.8210  | 7.5173   |
| F4  | 56.4000  | D4  | 49.9916 | 54.4242 | 61.6013 | 65.7605 | 67.3873 | 68.3296  |

Focus Cam Shape (Spline Interpolation Sample Point) Corresponding to Fourth Embodiment

|    | ANGLE     | (1)   | (2)     | (3)   | (4)   |
|----|-----------|-------|---------|-------|-------|
| 1  | -10.0000  | .0000 | .9890   | .0000 | .0000 |
| 2  | -9.0000   | .0000 | .9281   | .0000 | .0000 |
| 3  | -5.2174   | .0000 | .6450   | .0000 | .0000 |
| 4  | -3.2226   | .0000 | .4427   | .0000 | .0000 |
| 5  | -1.4215   | .0000 | .2166   | .0000 | .0000 |
| 6  | -.9122    | .0000 | .1434   | .0000 | .0000 |
| 7  | -.5316    | .0000 | .0856   | .0000 | .0000 |
| 8  | .0000     | .0000 | .0000   | .0000 | .0000 |
| 9  | 1.0000    | .0000 | -.1755  | .0000 | .0000 |
| 10 | 4.7826    | .0000 | -1.1178 | .0000 | .0000 |
| 11 | 6.7774    | .0000 | -1.9212 | .0000 | .0000 |
| 12 | 8.5785    | .0000 | -3.0359 | .0000 | .0000 |
| 13 | 9.0878    | .0000 | -3.4750 | .0000 | .0000 |
| 14 | 9.4684    | .0000 | -3.8631 | .0000 | .0000 |
| 15 | 10.0000   | .0000 | -4.5317 | .0000 | .0000 |
| 16 | 11.0000   | .0000 | -6.2650 | .0000 | .0000 |

Amount of Rotation for Zooming and Amount of Rotation for Focusing of Fourth Embodiment
Rotation Amount Ratio: $a_F/a_Z = -0.90$

| Focal Length | Infinity Corresponding Position | Photographing Distance | Amount of Rotation for Focusing |
|---|---|---|---|
| 28.8 mm | .0000 | 5.00 m | -.532 |
| 35.0 mm | 1.3907 | 3.00 m | -.912 |
| 50.0 mm | 4.2613 | 2.00 m | -1.421 |
| 70.0 mm | 7.2647 | 1.00 m | -3.223 |
| 85.0 mm | 8.7737 | 0.70 m | -5.217 |
| 103.0 mm | 10.0000 | 0.50 m | -9.000 |
| Condition Corresponding Value (1) | | 1.55 | |
| Condition Corresponding Value (2) | | 4.69 | |
| Condition Corresponding Value (3) | | -0.90 | |
| Condition Corresponding Value (4) | | 0.39 (wide-angle end) 0.20 (telephoto end) | |
| Condition Corresponding Value (5) | | 0.68 (wide-angle end) 0.82 (telephoto end) | |
| Condition Corresponding Value (6) | | 1.51 (wide-angle end) 1.48 (telephoto end) | |

Table 47 below summarizes the numerical value data of the cams of the focusing lens unit in the fourth embodiment, which data are calculated by interpolation based on a spline function on the basis of the sample data of the focus cam summarized in the middle table in Table 46. Note that the meanings of the reference symbols in Table 47 are the same as those in the first embodiment.

TABLE 47

Cam Numerical Value Data of Focusing Lens Unit in Fourth Embodiment

| Focus Cam Numerical Value Data | | | Zoom Compensation Cam Numerical Value Data | | |
|---|---|---|---|---|---|
| ANGLE | (2) | F | ANGLE | (2) | F |
| -9.0000 | .9281 | .0000 | | | |
| -8.5000 | .8963 | .0000 | | | |
| -8.0000 | .8630 | .0000 | | | |
| -7.5000 | .8282 | .0000 | | | |
| -7.0000 | .7917 | .0000 | | | |
| -6.5000 | .7533 | .0000 | | | |
| -6.0000 | .7219 | .0000 | | | |
| -5.5000 | .6702 | .0000 | | | |

TABLE 47-continued

Cam Numerical Value Data of Focusing Lens Unit in Fourth Embodiment

| Focus Cam Numerical Value Data | | | Zoom Compensation Cam Numerical Value Data | | |
|---|---|---|---|---|---|
| ANGLE | (2) | F | ANGLE | (2) | F |
| -5.0000 | .6250 | .0000 | | | |
| -4.5000 | .5773 | .0000 | | | |
| -4.000 | .5269 | .0000 | | | |
| -3.5000 | .4736 | .0000 | | | |
| -3.0000 | .4173 | .0000 | | | |
| -2.5000 | .3577 | .0000 | | | |
| -2.0000 | .2945 | .0000 | | | |
| -1.5000 | .2275 | .0000 | | | |
| -1.0000 | .1564 | .0000 | | | |
| -.5000 | .0806 | .0000 | | | |
| .0000 | .0000 | 28.8000 | .0000 | .0000 | 28.8000 |
| .5000 | -.0853 | 30.9500 | .5000 | .4528 | 30.9500 |
| 1.0000 | -.1755 | 33.1892 | 1.0000 | .8955 | 33.1892 |
| 1.5000 | -.2715 | 35.5168 | 1.5000 | 1.3212 | 35.5168 |
| 2.0000 | -.3742 | 37.9389 | 2.0000 | 1.7245 | 37.9389 |
| 2.5000 | -.4847 | 40.4555 | 2.5000 | 2.0975 | 40.4555 |
| 3.0000 | -.6040 | 43.0624 | 3.0000 | 2.4333 | 43.0624 |
| 3.5000 | -.7333 | 45.7538 | 3.5000 | 2.7268 | 45.7538 |
| 4.0000 | -.8736 | 48.5235 | 4.0000 | 2.9752 | 48.5235 |
| 4.5000 | -1.0260 | 51.3658 | 4.5000 | 3.1782 | 51.3658 |
| 5.0000 | -1.1915 | 54.2940 | 5.0000 | 3.3456 | 54.2940 |
| 5.5000 | -1.3722 | 57.3528 | 5.5000 | 3.4940 | 57.3528 |
| 6.0000 | -1.5706 | 60.6006 | 6.0000 | 3.6376 | 60.6006 |
| 6.5000 | -1.7897 | 64.0869 | 6.5000 | 3.7892 | 64.0869 |
| 7.0000 | -2.0324 | 67.8574 | 7.0000 | 3.9608 | 67.8574 |
| 7.5000 | -2.3045 | 72.0128 | 7.5000 | 4.1657 | 72.0128 |
| 8.0000 | -2.6153 | 76.6717 | 8.0000 | 4.3908 | 76.6717 |
| 8.5000 | -2.9745 | 81.8893 | 8.5000 | 4.5944 | 81.8893 |
| 9.0000 | -3.3935 | 87.7449 | 9.0000 | 4.7514 | 87.7449 |
| 9.5000 | -3.8981 | 94.5847 | 9.5000 | 4.8913 | 94.5847 |
| 10.0000 | -4.5317 | 103.0000 | 10.0000 | 5.0874 | 103.0000 |

The left table in Table 47 summarizes the numerical value data of the focus cam of the fourth embodiment, and the right table in Table 47 summarizes the numerical value data of the zoom compensation cam of this embodiment. A value obtained by synthesizing the amounts (2) of movement in the direction of the optical axis in the numerical value data of the focus cam and the zoom compensation cam in the range from the amount of rotation (ANGLE=0.0) to the amount of rotation (ANGLE=10.0) coincides with the movement locus of the second lens unit calculated using the paraxial data in the upper table in Table 46.

Tables 48, 49, and 50 below summarize the amount DX (mm) of movement for focusing, in the direction of the optical axis, of the focusing lens unit, the imaging magnifications $\beta_K$ of the respective lens units, the conversion coefficient $\gamma_x$ associated with the direction of the optical axis, the slope (dx/da) of the focus cam, and the conversion coefficient $\gamma_a$ associated with the direction of rotation at the wide-angle end (F=28.8), the middle position (F=50.0), and the telephoto end (F=103.0) according to the second embodiment, respectively. The arrangements of the respective tables and the meanings of the reference symbols are the same as those in the first embodiment.

TABLE 48

Amount DX (mm) of Movement for Focusing in Direction of Optical Axis at Wide-angle End (28.8 mm) in Fourth Embodiment

| R | .000 | ANG | .000 | 1) | .000 | 2) | .000 | 3) | .000 | 4) | .000 |
|---|---|---|---|---|---|---|---|---|---|---|---|
| R | 10.000 | ANG | -.260 | 1) | .000 | 2) | .043 | 3) | .000 | 4) | .000 |
| R | 5.000 | ANG | -.532 | 1) | .000 | 2) | .086 | 3) | .000 | 4) | .000 |
| R | 3.000 | ANG | -.912 | 1) | .000 | 2) | .143 | 3) | .000 | 4) | .000 |
| R | 2.000 | ANG | -1.421 | 1) | .000 | 2) | .217 | 3) | .000 | 4) | .000 |
| R | 1.000 | ANG | -3.223 | 1) | .000 | 2) | .443 | 3) | .000 | 4) | .000 |
| R | .700 | ANG | -5.217 | 1) | .000 | 2) | .645 | 3) | .000 | 4) | .000 |
| R | .500 | ANG | -9.000 | 1) | .000 | 2) | .928 | 3) | .000 | 4) | .000 |

Imaging Magnification $\beta_K$ of Lens Units at Wide-angle End (28.8 mm) in Fourth Embodiment

| R | .000 | ANG | .000 | 1) | .000 | 2) | -.280 | 3) | -12.818 | 4) | .114 |
|---|---|---|---|---|---|---|---|---|---|---|---|
| R | 10.000 | ANG | -.260 | 1) | -.007 | 2) | -.277 | 3) | -12.818 | 4) | .114 |
| R | 5.000 | ANG | -.532 | 1) | -.015 | 2) | -.274 | 3) | -12.818 | 4) | .114 |
| R | 3.000 | ANG | -.912 | 1) | -.025 | 2) | -.270 | 3) | -12.818 | 4) | .114 |
| R | 2.000 | ANG | -1.421 | 1) | -.038 | 2) | -.264 | 3) | -12.818 | 4) | .114 |
| R | 1.000 | ANG | -3.223 | 1) | -.084 | 2) | -.247 | 3) | -12.818 | 4) | .114 |
| R | .700 | ANG | -5.217 | 1) | -.131 | 2) | -.232 | 3) | -12.818 | 4) | .114 |
| R | .500 | ANG | -9.000 | 1) | -.209 | 2) | -.211 | 3) | -12.818 | 4) | .114 |

Conversion Coefficient $\gamma_x$ Associated With Direction of Optical Axis at Wide-angle End (28.8 mm) in Fourth Embodiment

| R | .000 | ANG | .000 | 1) | .000 | 2) | 1.954 | 3) | .000 | 4) | .000 |
|---|---|---|---|---|---|---|---|---|---|---|---|
| R | 10.000 | ANG | -.260 | 1) | .000 | 2) | 1.958 | 3) | .000 | 4) | .000 |
| R | 5.000 | ANG | -.532 | 1) | .000 | 2) | 1.962 | 3) | .000 | 4) | .000 |
| R | 3.000 | ANG | -.912 | 1) | .000 | 2) | 1.967 | 3) | .000 | 4) | .000 |
| R | 2.000 | ANG | -1.421 | 1) | .000 | 2) | 1.973 | 3) | .000 | 4) | .000 |
| R | 1.000 | ANG | -3.223 | 1) | .000 | 2) | 1.991 | 3) | .000 | 4) | .000 |
| R | .700 | ANG | -5.217 | 1) | .000 | 2) | 2.007 | 3) | .000 | 4) | .000 |
| R | .500 | ANG | -9.000 | 1) | .000 | 2) | 2.027 | 3) | .000 | 4) | .000 |

TABLE 48-continued

Slope dx/da of Focus Cam at Wide-angle End (28.8 mm) in Fourth Embodiment

| | | | | | | | | | | | |
|---|---|---|---|---|---|---|---|---|---|---|---|
| R | .000 | ANG | .000 | 1) | .000 | 2) | -.166 | 3) | .000 | 4) | .000 |
| R | 10.000 | ANG | -.260 | 1) | .000 | 2) | -.161 | 3) | .000 | 4) | .000 |
| R | 5.000 | ANG | -.532 | 1) | .000 | 2) | -.156 | 3) | .000 | 4) | .000 |
| R | 3.000 | ANG | -.912 | 1) | .000 | 2) | -.148 | 3) | .000 | 4) | .000 |
| R | 2.000 | ANG | -1.421 | 1) | .000 | 2) | -.139 | 3) | .000 | 4) | .000 |
| R | 1.000 | ANG | -3.223 | 1) | .000 | 2) | -.113 | 3) | .000 | 4) | .000 |
| R | .700 | ANG | -5.217 | 1) | .000 | 2) | -.091 | 3) | .000 | 4) | .000 |
| R | .500 | ANG | -9.000 | 1) | .000 | 2) | -.062 | 3) | .000 | 4) | .000 |

Conversion Coefficient $\gamma_a$ Asociated With Direction of Rotation at Wide-angle End (28.8 mm) in Fourth Embodiment

| | | | | | | | | | | | |
|---|---|---|---|---|---|---|---|---|---|---|---|
| R | .000 | ANG | .000 | 1) | .000 | 2) | -.324 | 3) | .000 | 4) | .000 |
| R | 10.000 | ANG | -.260 | 1) | .000 | 2) | -.316 | 3) | .000 | 4) | .000 |
| R | 5.000 | ANG | -.532 | 1) | .000 | 2) | -.306 | 3) | .000 | 4) | .000 |
| R | 3.000 | ANG | -.912 | 1) | .000 | 2) | -.292 | 3) | .000 | 4) | .000 |
| R | 2.000 | ANG | -1.421 | 1) | .000 | 2) | -.275 | 3) | .000 | 4) | .000 |
| R | 1.000 | ANG | -3.223 | 1) | .000 | 2) | -.225 | 3) | .000 | 4) | .000 |
| R | .700 | ANG | -5.217 | 1) | .000 | 2) | -.182 | 3) | .000 | 4) | .000 |
| R | .500 | ANG | -9.000 | 1) | .000 | 2) | -.127 | 3) | .000 | 4) | .000 |

Condition Corresponding Values: $\gamma_{xR}/\gamma_{x0} = 1.04$, $\gamma_{aR}/\gamma_{a0} = 0.39$

TABLE 49

Amount DX (mm) of Movement for Focusing in Direction of Optical Axis at Middle Position (50.0 mm) in Fourth Embodiment

| | | | | | | | | | | | |
|---|---|---|---|---|---|---|---|---|---|---|---|
| R | .000 | ANG | .000 | 1) | .000 | 2) | .000 | 3) | .000 | 4) | .000 |
| R | 10.000 | ANG | -.258 | 1) | .000 | 2) | .077 | 3) | .000 | 4) | .000 |
| R | 5.000 | ANG | -.527 | 1) | .000 | 2) | .154 | 3) | .000 | 4) | .000 |
| R | 3.000 | ANG | -.905 | 1) | .000 | 2) | .257 | 3) | .000 | 4) | .000 |
| R | 2.000 | ANG | -1.413 | 1) | .000 | 2) | .385 | 3) | .000 | 4) | .000 |
| R | 1.000 | ANG | -3.230 | 1) | .000 | 2) | .770 | 3) | .000 | 4) | .000 |
| R | .700 | ANG | -5.226 | 1) | .000 | 2) | 1.103 | 3) | .000 | 4) | .000 |
| R | .500 | ANG | -9.000 | 1) | .000 | 2) | 1.552 | 3) | .000 | 4) | .000 |

Imaging Magnification $\beta_K$ of Lens Units at Middle Position (50.0 mm) in Fourth Embodiment

| | | | | | | | | | | | |
|---|---|---|---|---|---|---|---|---|---|---|---|
| R | .000 | ANG | .000 | 1) | .000 | 2) | -.366 | 3) | 20.985 | 4) | -.092 |
| R | 10.000 | ANG | -.258 | 1) | -.007 | 2) | -.361 | 3) | 20.985 | 4) | -.092 |
| R | 5.000 | ANG | -.527 | 1) | -.015 | 2) | -.355 | 3) | 20.985 | 4) | -.092 |
| R | 3.000 | ANG | -.905 | 1) | -.025 | 2) | -.347 | 3) | 20.985 | 4) | -.092 |
| R | 2.000 | ANG | -1.413 | 1) | -.039 | 2) | -.338 | 3) | 20.985 | 4) | -.092 |
| R | 1.000 | ANG | -3.230 | 1) | -.086 | 2) | -.309 | 3) | 20.985 | 4) | -.092 |
| R | .700 | ANG | -5.226 | 1) | -.135 | 2) | -.284 | 3) | 20.985 | 4) | -.092 |
| R | .500 | ANG | -9.000 | 1) | -.218 | 2) | -.251 | 3) | 20.985 | 4) | -.092 |

Conversion Coefficient $\gamma_x$ Asociated With Direction of Optical Axis at Middle Position (50.0 mm) in Fourth Embodiment

| | | | | | | | | | | | |
|---|---|---|---|---|---|---|---|---|---|---|---|
| R | .000 | ANG | -.000 | 1) | .000 | 2) | 3.242 | 3) | .000 | 4) | .000 |
| R | 10.000 | ANG | -.258 | 1) | .000 | 2) | 3.258 | 3) | .000 | 4) | .000 |
| R | 5.000 | ANG | -.527 | 1) | .000 | 2) | 3.273 | 3) | .000 | 4) | .000 |
| R | 3.000 | ANG | -.905 | 1) | .000 | 2) | 3.294 | 3) | .000 | 4) | .000 |
| R | 2.000 | ANG | -1.413 | 1) | .000 | 2) | 3.318 | 3) | .000 | 4) | .000 |
| R | 1.000 | ANG | -3.230 | 1) | .000 | 2) | 3.388 | 3) | .000 | 4) | .000 |
| R | .700 | ANG | -5.226 | 1) | .000 | 2) | 3.443 | 3) | .000 | 4) | .000 |
| R. | .500 | ANG | -9.000 | 1) | .000 | 2) | 3.510 | 3) | .000 | 4) | .000 |

Slope dx/da of Focus Cam at Middle Position (50.0 mm) in Fourth Embodiment

| | | | | | | | | | | | |
|---|---|---|---|---|---|---|---|---|---|---|---|
| R | .000 | ANG | .000 | 1) | .000 | 2) | -.305 | 3) | .000 | 4) | .000 |
| R | 10.000 | ANG | -.258 | 1) | .000 | 2) | -.292 | 3) | .000 | 4) | .000 |
| R | 5.000 | ANG | -.527 | 1) | .000 | 2) | -.280 | 3) | .000 | 4) | .000 |
| R | 3.000 | ANG | -.905 | 1) | .000 | 2) | -.263 | 3) | .000 | 4) | .000 |
| R | 2.000 | ANG | -1.413 | 1) | .000 | 2) | -.242 | 3) | .000 | 4) | .000 |
| R | 1.000 | ANG | -3.230 | 1) | .000 | 2) | -.187 | 3) | .000 | 4) | .000 |
| R | .700 | ANG | -5.226 | 1) | .000 | 2) | -.147 | 3) | .000 | 4) | .000 |
| R | .500 | ANG | -9.000 | 1) | .000 | 2) | -.095 | 3) | .000 | 4) | .000 |

Conversion Coefficient $\gamma_a$ Asociated With Direction of Rotation at Middle Position (50.0 mm) in Fourth Embodiment

| | | | | | | | | | | | |
|---|---|---|---|---|---|---|---|---|---|---|---|
| R | .000 | ANG | .000 | 1) | .000 | 2) | -.990 | 3) | .000 | 4) | .000 |
| R | 10.000 | ANG | -.258 | 1) | .000 | 2) | -.953 | 3) | .000 | 4) | .000 |
| R | 5.000 | ANG | -.527 | 1) | .000 | 2) | -.916 | 3) | .000 | 4) | .000 |
| R | 3.000 | ANG | -.905 | 1) | .000 | 2) | -.866 | 3) | .000 | 4) | .000 |
| R | 2.000 | ANG | -1.413 | 1) | .000 | 2) | -.804 | 3) | .000 | 4) | .000 |

TABLE 49-continued

| | | | | | | | | | | |
|---|---|---|---|---|---|---|---|---|---|---|
| R | 1.000 | ANG | -3.230 | 1) | .000 | 2) | -.632 | 3) | .000 | 4) .000 |
| R | .700 | ANG | -5.226 | 1) | .000 | 2) | -.507 | 3) | .000 | 4) .000 |
| R | .500 | ANG | -9.000 | 1) | .000 | 2) | -.335 | 3) | .000 | 4) .000 |

Condition Corresponding Values: $\gamma_{xR}/\gamma_{xo} = 1.08$, $\gamma_{aR}/\gamma_{ao} = 0.34$

TABLE 50

Amount DX (mm) of Movement for Focusing in Direction of Optical Axis at Telephoto End (103.0 mm) in Fourth Embodiment

| | | | | | | | | | | |
|---|---|---|---|---|---|---|---|---|---|---|
| R | .000 | ANG | .000 | 1) | .000 | 2) | .000 | 3) | .000 | 4) .000 |
| R | 10.000 | ANG | -.260 | 1) | .000 | 2) | .350 | 3) | .000 | 4) .000 |
| R | 5.000 | ANG | -.532 | 1) | .000 | 2) | .669 | 3) | .000 | 4) .000 |
| R | 3.000 | ANG | -.912 | 1) | .000 | 2) | 1.057 | 3) | .000 | 4) .000 |
| R | 2.000 | ANG | -1.421 | 1) | .000 | 2) | 1.496 | 3) | .000 | 4) .000 |
| R | 1.000 | ANG | -3.223 | 1) | .000 | 2) | 2.611 | 3) | .000 | 4) .000 |
| R | .700 | ANG | -5.217 | 1) | .000 | 2) | 3.414 | 3) | .000 | 4) .000 |
| R | .500 | ANG | -9.000 | 1) | .000 | 2) | 4.356 | 3) | .000 | 4) .000 |

Imaging Magnification $\beta_K$ of Lens Units at Telephoto End (103.0 mm) in Fourth Embodiment

| | | | | | | | | | | |
|---|---|---|---|---|---|---|---|---|---|---|
| R | .000 | ANG | .000 | 1) | .000 | 2) | -.652 | 3) | 10.590 | 4) -.212 |
| R | 10.000 | ANG | -.260 | 1) | -.007 | 2) | -.626 | 3) | 10.590 | 4) -.212 |
| R | 5.000 | ANG | -.532 | 1) | -.015 | 2) | -.602 | 3) | 10.590 | 4) -.212 |
| R | 3.000 | ANG | -.912 | 1) | -.025 | 2) | -.573 | 3) | 10.590 | 4) -.212 |
| R | 2.000 | ANG | -1.421 | 1) | -.039 | 2) | -.541 | 3) | 10.590 | 4) -.212 |
| R | 1.000 | ANG | -3.223 | 1) | -.087 | 2) | -.457 | 3) | 10.590 | 4) -.212 |
| R | .700 | ANG | -5.217 | 1) | -.138 | 2) | -.397 | 3) | 10.590 | 4) -.212 |
| R | .500 | ANG | -9.000 | 1) | -.228 | 2) | -.327 | 3) | 10.590 | 4) -.212 |

Conversion Coefficient $\gamma_x$ Asociated With Direction of Optical Axis at Telephoto End (103.0 mm) in Fourth Embodiment

| | | | | | | | | | | |
|---|---|---|---|---|---|---|---|---|---|---|
| R | .000 | ANG | .000 | 1) | .000 | 2) | 2.883 | 3) | .000 | 4) .000 |
| R | 10.000 | ANG | -.260 | 1) | .000 | 2) | 3.051 | 3) | .000 | 4) .000 |
| R | 5.000 | ANG | -.532 | 1) | .000 | 2) | 3.198 | 3) | .000 | 4) .000 |
| R | 3.000 | ANG | -.912 | 1) | .000 | 2) | 3.368 | 3) | .000 | 4) .000 |
| R | 2.000 | ANG | -1.421 | 1) | .000 | 2) | 3.552 | 3) | .000 | 4) .000 |
| R | 1.000 | ANG | -3.223 | 1) | .000 | 2) | 3.968 | 3) | .000 | 4) .000 |
| R | .700 | ANG | -5.217 | 1) | .000 | 2) | 4.225 | 3) | .000 | 4) .000 |
| R | .500 | ANG | -9.000 | 1) | .000 | 2) | 4.481 | 3) | .000 | 4) .000 |

Slope dx/da of Focus Cam at Telephoto End (103.0 mm) in Fourth Embodiment

| | | | | | | | | | | |
|---|---|---|---|---|---|---|---|---|---|---|
| R | .000 | ANG | .000 | 1) | .000 | 2) | -1.449 | 3) | .000 | 4) .000 |
| R | 10.000 | ANG | -.260 | 1) | .000 | 2) | -1.253 | 3) | .000 | 4) .000 |
| R | 5.000 | ANG | -.532 | 1) | .000 | 2) | -1.101 | 3) | .000 | 4) .000 |
| R | 3.000 | ANG | -.912 | 1) | .000 | 2) | -.944 | 3) | .000 | 4) .000 |
| R | 2.000 | ANG | -1.421 | 1) | .000 | 2) | -.791 | 3) | .000 | 4) .000 |
| R | 1.000 | ANG | -3.223 | 1) | .000 | 2) | -.488 | 3) | .000 | 4) .000 |
| R | .700 | ANG | -5.217 | 1) | .000 | 2) | -.333 | 3) | .000 | 4) .000 |
| R | .500 | ANG | -9.000 | 1) | .000 | 2) | -.186 | 3) | .000 | 4) .000 |

Conversion Coefficient $\gamma_a$ Asociated With Direction of Rotation at Telephoto End (103.0 mm) in Fourth Embodiment

| | | | | | | | | | | |
|---|---|---|---|---|---|---|---|---|---|---|
| R | .000 | ANG | .000 | 1) | .000 | 2) | -4.179 | 3) | .000 | 4) .000 |
| R | 10.000 | ANG | -.260 | 1) | .000 | 2) | -3.823 | 3) | .000 | 4) .000 |
| R | 5.000 | ANG | -.532 | 1) | .000 | 2) | -3.520 | 3) | .000 | 4) .000 |
| R | 3.000 | ANG | -.912 | 1) | .000 | 2) | -3.180 | 3) | .000 | 4) .000 |
| R | 2.000 | ANG | -1.421 | 1) | .000) | 2) | -2.810 | 3) | .000 | 4) .000 |
| R | 1.000 | ANG | -3.223 | 1) | .000 | 2) | -1.935 | 3) | .000 | 4) .000 |
| R | .700 | ANG | -5.217 | 1) | .000 | 2) | -1.406 | 3) | .000 | 4) .000 |
| R | .500 | ANG | -9.000 | 1) | .000 | 2) | -.833 | 3) | .000 | 4) .000 |

Condition Corresponding Values: $\gamma_{xR}/\gamma_{xo} = 1.55$, $\gamma_{aR}/\gamma_{ao} = 0.20$ As can be seen from Tables 48, 49, and 50, at each focal length, the conversion coefficient $\gamma_x$ associated with the direction of the optical axis increases but the value of the slope (dx/da) of the focus cam decreases as the photographing distance becomes closer to the closest distance. Therefore, as can be seen from these tables, the value of the conversion coefficient $\gamma_a$ associated with the direction of rotation, which is defined as the product of the conversion coefficient $\gamma_x$ and the slope (dx/da) of the focus cam, decreases as the photographing distance becomes closer to the closest distance by the influence of the slope (dx/da) of the focus cam, contrary to the case in which the rotation amount ratio ($a_F/a_Z$) is set to be 1.0, as in the embodiment of Japanese Patent Application Laid-Open No. 5-142475.

From Tables 48, 49, and 50, the rate of change, from the infinity in-focus position to the closest in-focus position, of the conversion coefficient $\gamma_a$ associated with the direction of rotation is ×0.39 at the wide-angle end (F=28.8), ×0.34 at the middle position (F=50.0), and ×0.20 at the telephoto end (F=103.0). When the number N of divisions of the focus range upon a change in conversion coefficient $\gamma_a$ in the fourth embodiment is calculated using formula (a), and is compared with that in the case in which the rotation amount ratio $(a_F/a_Z)$ is set to be 1.0, as in the embodiment of Japanese Patent Application Laid-Open No. 5-142475, the numbers $N_W$, $N_M$, and $N_T$ of divisions at the wide-angle end, middle position, and telephoto end respectively have the following values:

When the rotation amount ratio $(a_F/a_Z)$ is set to be 1.0

$$N_W > 11.2 \; N_M > 11.2 \; N_T > 8.3$$

Fourth Embodiment $$N_W > 5.1 \; N_M > 5.9 \; N_T > 8.9$$

Therefore, it can be seen that the numbers of divisions become small, compared to those in the case in which the rotation amount ratio $(a_F/a_Z)$ is set to be 1.0, as in the embodiment of Japanese Patent Application Laid-Open No. 5-142475.

As described above, in the fourth embodiment as well, since the rate of change of the conversion coefficient $\gamma_a$ associated with the direction of rotation is smaller than that in the case in which the rotation amount ratio $(a_F/a_Z)$ is set to be 1.0, as in the embodiment of Japanese Patent Application Laid-Open No. 5-142475, the number of data of the conversion coefficient $\gamma_a$ and the correction coefficient $\mu$ can be reduced, and the storage capacity can be suppressed.

Tables 51, 52, and 53 summarize the calculation results of the values of the conversion coefficient $K_a$ and the correction coefficient $\mu$ at the wide-angle end (F=28.8), middle position (F=50.0), and telephoto end (F=103.0) according to the fourth embodiment.

The arrangements of the tables and reference symbols are the same as those in the first embodiment. The position of the focusing lens in the first pair in the upper two tables in each of Tables 51, 52, and 53, i.e., in the third and fourth columns is (R, ANGLE)=(0.0, 0.0), and it indicates that this position corresponds to the infinity corresponding position. Similarly, the position of the focusing lens in the fourth pair in the lower two tables in each of Tables 42, 43, and 44, i.e., in the ninth and tenth columns is (R, ANGLE)=(0.5, −9.0), and it indicates that this position corresponds to the closest in-focus (R=0.5 m) corresponding position.

TABLE 51

Conversion Coefficients $K_a$: (rs), $\gamma_a$: (r) Associated with Direction of Rotation and Correction Coefficient $\mu$: (l) at Wide-angle End (28.8 mm) in Fourth Embodiment
F = 28.8 mm

| (R, ANGLE) = | .000 | .000 | 10.000 | −.260 | 5.000 | −.532 | 3.000 | −.912 |
|---|---|---|---|---|---|---|---|---|
| POS | R | r | rs | r | rs | r | rs | r | rs |
| 1 | .000 | −.324 | .000 |  | −.319 |  | −.313 |  | −.305 |
| 2 | 10.000 |  | −.321 | −.316 | .000 |  | −.310 |  | −.301 |
| 3 | 5.000 |  | −.317 |  | −.312 | −.306 | .000 |  | −.297 |
| 4 | 3.000 |  | −.312 |  | −.306 |  | −.300 | −.292 | .000 |
| 5 | 2.000 |  | −.304 |  | −.298 |  | −.293 |  | −.285 |
| 6 | 1.000 |  | −.280 |  | −.275 |  | −.269 |  | −.262 |
| 7 | .700 |  | −.257 |  | −.252 |  | −.247 |  | −.240 |
| 8 | .500 |  | −.220 |  | −.216 |  | −.211 |  | −.206 |

| POS | R | bf | l | bf | l | bf | l | bf | l |
|---|---|---|---|---|---|---|---|---|---|
| 1 | .000 | .00 | .00 | −.08 | 7.61 | −.17 | 6.62 | −.28 | 6.11 |
| 2 | 10.000 | .08 | 8.40 | .00 | .00 | −.08 | 6.25 | −.20 | 5.98 |
| 3 | 5.000 | .17 | 7.80 | .08 | 6.82 | .00 | .00 | −.11 | 5.99 |
| 4 | 3.000 | .28 | 7.26 | .20 | 6.48 | .11 | 6.05 | .00 | .00 |
| 5 | 2.000 | .43 | 6.98 | .35 | 6.41 | .26 | 6.15 | .15 | 6.11 |
| 6 | 1.000 | .90 | 6.66 | .81 | 6.33 | .73 | 6.15 | .61 | 6.00 |
| 7 | .700 | 1.34 | 6.48 | 1.25 | 6.22 | 1.16 | 6.05 | 1.03 | 5.88 |
| 8 | .500 | 1.98 | 6.18 | 1.89 | 5.98 | 1.79 | 5.82 | 1.66 | 5.63 |

| (R, ANGLE) = | 2.000 | −1.421 | 1.000 | −3.223 | .700 | −5.217 | .500 | −9.000 |
|---|---|---|---|---|---|---|---|---|
| POS | R | r | rs | r | rs | r | rs | r | rs |
| 1 | .000 |  | −.295 |  | −.262 |  | −.234 |  | −.192 |
| 2 | 10.000 |  | −.291 |  | −.259 |  | −.231 |  | −.190 |
| 3 | 5.000 |  | −.287 |  | −.256 |  | −.228 |  | −.187 |
| 4 | 3.000 |  | −.282 |  | −.251 |  | −.223 |  | −.183 |
| 5 | 2.000 | −.275 | .000 |  | −.245 |  | −.218 |  | −.179 |
| 6 | 1.000 |  | −.253 | −.225 | .000 |  | −.200 |  | −.163 |
| 7 | .700 |  | −.232 |  | −.206 | −.182 | .000 |  | −.148 |
| 8 | .500 |  | −.198 |  | −.175 |  | −.154 | −.127 | .000 |

| POS | R | bf | l | bf | l | bf | l | bf | l |
|---|---|---|---|---|---|---|---|---|---|
| 1 | .000 | −.42 | 5.88 | −.85 | 5.09 | −1.22 | 4.27 | −1.73 | 3.33 |
| 2 | 10.000 | −.34 | 5.83 | −.77 | 5.08 | −1.14 | 4.25 | −1.66 | 3.33 |
| 3 | 5.000 | −.26 | 5.85 | −.69 | 5.07 | −1.07 | 4.24 | −1.58 | 3.32 |
| 4 | 3.000 | −.14 | 5.84 | −.58 | 5.05 | −.96 | 4.22 | −1.48 | 3.31 |
| 5 | 2.000 | .00 | .00 | −.44 | 5.03 | −.83 | 4.19 | −1.35 | 3.30 |
| 6 | 1.000 | .46 | 5.74 | .00 | .00 | −.40 | 4.05 | −.94 | 3.27 |
| 7 | .700 | .88 | 5.62 | .41 | 4.77 | .00 | .00 | −.56 | 3.31 |
| 8 | .500 | 1.50 | 5.37 | 1.01 | 4.54 | .58 | 3.83 | .00 | .00 |

Condition Corresponding Values: $K_{ao}/\gamma_{ao} = 0.68$, $K_{aR}/\gamma_{aR} = 1.51$

TABLE 52

Conversion Coefficients $K_a$: (rs), $\gamma_a$: (r) Associated with Direction of Rotation and Correction Coefficient $\mu$: (l) at Middle Position (50.0 mm) in Fourth Embodiment
F = 50.0 mm

| (R, ANGLE) = | | .000 | .000 | 10.000 | −.258 | 5.000 | −.527 | 3.000 | −.905 |
|---|---|---|---|---|---|---|---|---|---|
| POS | R | r | rs | r | rs | r | rs | r | rs |
| 1 | .000 | −.989 | .000 | | −.964 | | −.938 | | −.904 |
| 2 | 10.000 | | −.979 | −.953 | .000 | | −.927 | | −.893 |
| 3 | 5.000 | | −.967 | | −.941 | −.915 | .000 | | −.882 |
| 4 | 3.000 | | −.950 | | −.925 | | −.900 | −.866 | .000 |
| 5 | 2.000 | | −.929 | | −.903 | | −.878 | | −.845 |
| 6 | 1.000 | | −.855 | | −.832 | | −.808 | | −.777 |
| 7 | .700 | | −.791 | | −.769 | | −.747 | | −.719 |
| 8 | .500 | | −.686 | | −.667 | | −.648 | | −.623 |

| PQS | R | bf | l | bf | l | bf | l | bf | l |
|---|---|---|---|---|---|---|---|---|---|
| 1 | .000 | .00 | .00 | −.25 | 21.45 | −.49 | 20.06 | −.82 | 18.89 |
| 2 | 10.000 | .25 | 23.31 | .00 | .00 | −.25 | 19.46 | −.58 | 18.67 |
| 3 | 5.000 | .51 | 22.59 | .25 | 20.95 | .00 | .00 | −.33 | 18.53 |
| 4 | 3.000 | .86 | 21.97 | .60 | 20.56 | .34 | 19.74 | .00 | .00 |
| 5 | 2.000 | 1.31 | 21.37 | 1.04 | 20.12 | .78 | 19.19 | .43 | 17.69 |
| 6 | 1.000 | 2.76 | 20.39 | 2.47 | 19.42 | 2.18 | 18.63 | 1.81 | 17.58 |
| 7 | .700 | 4.13 | 20.60 | 3.82 | 19.80 | 3.51 | 19.13 | 3.11 | 18.29 |
| 8 | .500 | 6.17 | 20.14 | 5.83 | 19.41 | 5.49 | 18.77 | 5.04 | 17.95 |

| (R, ANGLE) = | | 2.000 | −1.413 | 1.000 | −3.230 | .700 | −5.226 | .500 | −9.000 |
|---|---|---|---|---|---|---|---|---|---|
| POS | R | r | rs | r | rs | r | rs | r | rs |
| 1 | .000 | | −.861 | | −.735 | | −.637 | | −.506 |
| 2 | 10.000 | | −.850 | | −.726 | | −.629 | | −.500 |
| 3 | 5.000 | | −.839 | | −.716 | | −.621 | | −.493 |
| 4 | 3.000 | | −.824 | | −.703 | | −.609 | | −.484 |
| 5 | 2.000 | −.804 | .000 | | −.685 | | −.595 | | −.472 |
| 6 | 1.000 | | −.739 | −.632 | .000 | | −.551 | | −.435 |
| 7 | .700 | | −.684 | | −.588 | −.507 | .000 | | −.397 |
| 8 | .500 | | −.592 | | −.506 | | −.433 | −.335 | .000 |

| POS | R | bf | l | bf | l | bf | l | bf | l |
|---|---|---|---|---|---|---|---|---|---|
| 1 | .000 | −1.22 | 17.17 | −2.37 | 14.61 | −3.33 | 13.01 | −4.56 | 8.91 |
| 2 | 10.000 | −.98 | 16.98 | −2.16 | 14.60 | −3.13 | 13.02 | −4.37 | 8.88 |
| 3 | 5.000 | −.74 | 16.81 | −1.94 | 14.62 | −2.92 | 13.04 | −4.18 | 8.85 |
| 4 | 3.000 | −.42 | 16.58 | −1.63 | 14.68 | −2.63 | 13.07 | −3.92 | 8.81 |
| 5 | 2.000 | .00 | .00 | −1.25 | 14.86 | −2.27 | 13.12 | −3.58 | 8.75 |
| 6 | 1.000 | 1.34 | 16.67 | .00 | .00 | −1.11 | 12.70 | −2.51 | 8.43 |
| 7 | .700 | 2.61 | 17.58 | 1.17 | 16.71 | .00 | .00 | −1.50 | 8.12 |
| 8 | .500 | 4.49 | 17.09 | 2.92 | 14.54 | 1.63 | 11.09 | .00 | .00 |

Condition Corresponding Values: $K_{ao}/\gamma_{ao} = 0.69$, $K_{aR}/\gamma_{aR} = 1.51$

TABLE 53

Conversion Coefficient $K_a$: (rs), $\gamma_a$: (r) Associated with Direction of Rotation and Correction Coefficient $\mu$: (l) at Telephoto End (103.0 mm) in Fourth Embodiment
F = 103.0 mm

| (R, ANGLE) = | | .000 | .000 | 10.000 | −.260 | 5.000 | −.532 | 3.000 | −.912 |
|---|---|---|---|---|---|---|---|---|---|
| POS | R | r | rs | r | rs | r | rs | r | rs |
| 1 | .000 | −4.180 | .000 | | −3.855 | | −3.573 | | −3.259 |
| 2 | 10.000 | | −4.152 | −3.819 | .000 | | −3.543 | | −3.233 |
| 3 | 5.000 | | −4.121 | | −3.794 | −3.520 | .000 | | −3.213 |
| 4 | 3.000 | | −4.091 | | −3.767 | | −3.495 | −3.180 | .000 |
| 5 | 2.000 | | −4.050 | | −3.726 | | −3.451 | | −3.135 |
| 6 | 1.000 | | −3.907 | | −3.578 | | −3.301 | | −2.986 |
| 7 | .700 | | −3.747 | | −3.416 | | −3.139 | | −2.827 |
| 8 | .500 | | −3.440 | | −3.112 | | −2.841 | | −2.540 |

| POS | R | bf | l | bf | l | bf | l | bf | l |
|---|---|---|---|---|---|---|---|---|---|
| 1 | .000 | .00 | .00 | −1.02 | 106.64 | −1.90 | 127.23 | −2.97 | 120.34 |
| 2 | 10.000 | 1.08 | 164.84 | .00 | .00 | −.96 | 151.92 | −2.11 | 126.78 |
| 3 | 5.000 | 2.19 | 156.83 | 1.03 | 152.81 | .00 | .00 | −1.22 | 119.67 |
| 4 | 3.000 | 3.73 | 176.52 | 2.46 | 179.24 | 1.33 | 184.76 | .00 | .00 |
| 5 | 2.000 | 5.76 | 186.20 | 4.33 | 176.43 | 3.07 | 156.05 | 1.60 | 113.27 |

TABLE 53-continued

Conversion Coefficient $K_a$: (rs), $\gamma_a$: (r) Associated with Direction of Rotation and Correction Coefficient μ: (l) at Telephoto End (103.0 mm) in Fourth Embodiment
F = 103.0 mm

| 6 | 1.000 | 12.59 | 192.95 | 10.60 | 168.02 | 8.88 | 142.43 | 6.90 | 113.06 |
|---|---|---|---|---|---|---|---|---|---|
| 7 | .700 | 19.55 | 189.03 | 16.94 | 160.55 | 14.71 | 135.70 | 12.17 | 109.62 |
| 8 | .500 | 30.96 | 175.08 | 27.20 | 146.97 | 24.06 | 124.62 | 20.54 | 102.06 |

| (R, ANGLE) = | 2.000 | −1.421 | 1.000 | −3.223 | .700 | −5.217 | .500 | −9.000 |
|---|---|---|---|---|---|---|---|---|
| POS | R | r | rs | r | rs | r | rs | r | rs |
| 1 | .000 | | −2.926 | | −2.181 | | −1.718 | | −1.232 |
| 2 | 10.000 | | −2.902 | | −2.160 | | −1.700 | | −1.218 |
| 3 | 5.000 | | −2.880 | | −2.140 | | −1.682 | | −1.203 |
| 4 | 3.000 | | −2.847 | | −2.111 | | −1.657 | | −1.183 |
| 5 | 2.000 | −2.810 | .000 | | −2.073 | | −1.624 | | −1.157 |
| 6 | 1.000 | | −2.659 | −1.934 | .000 | | −1.514 | | −1.069 |
| 7 | .700 | | −2.506 | | −1.815 | −1.406 | .000 | | −.981 |
| 8 | .500 | | −2.234 | | −1.590 | | −1.214 | −.833 | .000 |

| POS | R | bf | l | bf | l | bf | l | bf | l |
|---|---|---|---|---|---|---|---|---|---|
| 1 | .000 | −4.16 | 100.97 | −7.03 | 55.12 | −8.96 | 40.47 | −11.09 | 23.17 |
| 2 | 10.000 | −3.37 | 103.32 | −6.40 | 54.80 | −8.43 | 40.38 | −10.65 | 23.07 |
| 3 | 5.000 | −2.56 | 103.11 | −5.76 | 54.22 | −7.88 | 40.24 | −10.19 | 22.96 |
| 4 | 3.000 | −1.45 | 109.95 | −4.88 | 53.47 | −7.13 | 40.09 | −9.57 | 22.80 |
| 5 | 2.000 | .00 | .00 | −3.73 | 52.11 | −6.16 | 39.89 | −8.77 | 22.60 |
| 6 | 1.000 | 4.79 | 89.05 | .00 | .00 | −3.02 | 39.55 | −6.18 | 21.85 |
| 7 | .700 | 9.51 | 87.85 | 3.62 | 58.52 | .00 | .00 | −3.71 | 20.98 |
| 8 | .500 | 16.93 | 82.65 | 9.19 | 51.65 | 4.59 | 33.50 | .00 | .00 |

Condition Corresponding Values: $K_{a0}/\gamma_{a0} = 0.82$, $K_{aR}/\gamma_{aR} = 1.48$ As calculation results of the rate of change of $K_a$ with respect to $\gamma_{av}$ at the infinity in-focus arrangement and the closest in-focus arrangement at the wide-angle end, middle position, and telephoto end in the case in which the rotation amount ratio $(a_F/a_Z)$ is set to be 1.0, as in the embodiment of Japanese Patent Application Laid-Open No. 5-142475 and in the fourth embodiment of the present invention in which said ratio $(a_F/a_Z)$ is set to be −0.90 are as follows.

| When the rotation amount ratio $(a_F/a_Z)$ is set to be 1.0 | | |
|---|---|---|
| | Infinity Arrangement $K_{a0}/\gamma_{a0}$ | Closest Arrangement $K_{aR}/\gamma_{aR}$ |
| Wide-angle End (F = 28.8) | 3.47 | 0.40 |
| Middle Position (F = 50.0) | 4.09 | 0.39 |
| Telephoto End (F = 103.0) | 4.98 | 0.39 |
| Fourth Embodiment | | |
| Wide-angle End (F = 28.8) | 0.68 | 1.51 |
| Middle Position (F = 50.0) | 0.69 | 1.51 |
| Telephoto End (F = 103.0) | 0.82 | 1.48 |

As described above, in the fourth embodiment as well, since the rate of change of $K_a$ with respect to $\gamma_a$ is small as compared to the conventional system, the contribution of the correction term $(\Delta Bf/\mu)$ in $K_a=\gamma_a(1-\Delta Bf/\mu)$ can be reduced. For this reason, an error of the conversion coefficient $K_a$ calculated based on $\gamma_a$ and μ or an error from the actual lens driving amount Δa obtained when only one pair of a conversion coefficient $\gamma_a$ value and a correction coefficient μ value are set can be reduced.

Next, in the case in which the rotation amount ratio $(a_F/a_Z)$ is set to be 1.0, as in the embodiment of Japanese Patent Application Laid-Open No. 5-142475 and the fourth embodiment of the present invention in which said ratio $(a_F/a_Z)$ is set to be −0.90, when the lens driving amounts upon focusing from the infinity in-focus lens arrangement to the closest distance object and upon focusing from the closest in-focus lens arrangement to the infinity object at the wide-angle end, middle position, and telephoto end are calculated from $\Delta a=\Delta Bf/[\gamma_a(1-\Delta Bf/\mu)]$, and errors from the actual lens driving amounts are then calculated, the following values are obtained. Note that the value of the correction coefficient μ upon focusing from the infinity in-focus lens arrangement to the closest distance object adopts a value at the object distance (POS-5), and the value of the correction coefficient μ upon focusing from the closest in-focus lens arrangement to the infinity object adopts a value at the object distance (POS-4).

| When the rotation amount ratio $(a_F/a_Z)$ is set to be 1.0 | | |
|---|---|---|
| | Infinity Arrangement → Closest In-focus State | Closest Arrangement → Infinity In-focus State |
| Wide-angle End (F = 28.8) | −7.4% | −12.2% |
| Middle Position (F = 50.0) | −18.4% | −12.1% |
| Telephoto End (F = 103.0) | −20.2% | −13.4% |
| Fourth Embodiment | | |
| Wide-angle End (F = 28.8) | −5.2% | −0.6% |
| Middle Position (F = 50.0) | −2.5% | −0.3% |
| Telephoto End (F = 103.0) | −1.3% | −0.5% |

As described above, in the fourth embodiment as well, even when only a pair of a conversion coefficient $\gamma_a$ value and a correction coefficient μ value are set for a given lens arrangement range, an error between the conversion coefficient $K_a$ calculated from $\gamma_a$ and $\mu$ and the lens driving amount $\Delta a$ for focusing becomes small as compared to the conventional system, and focusing can be realized with higher accuracy.

Table 54 summarizes the amount (ANGLE DA) of rotation for focusing upon manual focusing using the focus cam (the middle table in Table 46) of the fourth embodiment, the amount DX (mm) of movement, in the direction of the optical axis, of the focusing lens unit corresponding to the amount of rotation for focusing, and the displacement amount Bf (mm) of the imaging point when the amount (DX) of movement in the direction of the optical axis is given.

Note that the arrangement of the table and reference symbols are the same as those in the first embodiment. The upper table in Table 54 summarizes the displacement amount (Bf) of the imaging point corresponding to the photographing distances (R=5.0, 3.0, 2.0, 1.0, 0.7, and 0.5 m) in the respective zooming states of the focal lengths (F=28.8, 35.0, 50.0, 70.0, 85.0, and 103.0 mm), and the middle table summarizes the values of the amount (ANGLE DA) of rotation for focusing required for attaining an optimal in-focus state with respect to the respective photographing distances. The lower table summarizes the amounts (DX) of movement, in the direction of the optical axis, of the respective lens units corresponding to the amount (ANGLE DA) of rotation for focusing in association with the focal lengths and photographing distances.

TABLE 54

Displament Amount Bf (mm) of Imaging Point and Amount DX (mm) of Movement for Focusing in Fourth Embodiment

|   |           | 0.50 m | 0.70 m | 1.00 m | 2.00 m | 3.00 m | 5.00 m |
|---|-----------|--------|--------|--------|--------|--------|--------|
| F | 28.800 Bf | .000   | .000   | .000   | .000   | .000   | .000   |
| F | 3S.000 Bf | .000   | −.001  | .001   | .005   | .005   | .003   |
| F | 50.000 Bf | .000   | .004   | .005   | −.006  | −.006  | −.004  |
| F | 70.000 Bf | .000   | −.005  | −.011  | −.001  | .002   | .003   |
| F | 85.000 Bf | .000   | −.015  | −.009  | −.014  | −.013  | −.007  |
| F | 103.000 Bf| .000   | .000   | .000   | .000   | .000   | .000   |

|   | ANGLE DA | −9.000 | −5.217 | −3.223 | −1.421 | −.912 | −.532 |
|---|----------|--------|--------|--------|--------|-------|-------|

|   |            |      |       |      |      |   |         |
|---|------------|------|-------|------|------|---|---------|
| F | 28.800 DX  | .000 | .928  | .000 | .000 | R | 0.50 m  |
| F | 35.000 DX  | .000 | 1.086 | .000 | .000 | R | 0.50 m  |
| F | 50.000 DX  | .000 | 1.552 | .000 | .000 | R | 0.50 m  |
| F | 70.000 DX  | .000 | 2.432 | .000 | .000 | R | 0.50 m  |
| F | 85.000 DX  | .000 | 3.232 | .000 | .000 | R | 0.50 m  |
| F | 103.000 DX | .000 | 4.356 | .000 | .000 | R | 0.50 m  |
| F | 28.800 DX  | .000 | .645  | .000 | .000 | R | 0.70 m  |
| F | 35.000 DX  | .000 | .759  | .000 | .000 | R | 0.70 m  |
| F | 50.000 DX  | .000 | 1.102 | .000 | .000 | R | 0.70 m  |
| F | 70.000 DX  | .000 | 1.788 | .000 | .000 | R | 0.70 m  |
| F | 85.000 DX  | .000 | 2.447 | .000 | .000 | R | 0.70 m  |
| F | 103.000 DX | .000 | 3.414 | .000 | .000 | R | 0.70 m  |
| F | 28.800 DX  | .000 | .443  | .000 | .000 | R | 1.00 m  |
| F | 35.000 DX  | .000 | .522  | .000 | .000 | R | 1.00 m  |
| F | 50.000 DX  | .000 | .769  | .000 | .000 | R | 1.00 m  |
| F | 70.000 DX  | .000 | 1.286 | .000 | .000 | R | 1.00 m  |
| F | 85.000 DX  | .000 | 1.804 | .000 | .000 | R | 1.00 m  |
| F | 103.000 DX | .000 | 2.611 | .000 | .000 | R | 1.00 m  |
| F | 28.800 DX  | .000 | .217  | .000 | .000 | R | 2.00 m  |
| F | 35.000 DX  | .000 | .255  | .000 | .000 | R | 2.00 m  |
| F | 50.000 DX  | .000 | .387  | .000 | .000 | R | 2.00 m  |
| F | 70.000 DX  | .000 | .666  | .000 | .000 | R | 2.00 m  |
| F | 85.000 DX  | .000 | .975  | .000 | .000 | R | 2.00 m  |
| F | 103.000 DX | .000 | 1.496 | .000 | .000 | R | 2.00 m  |
| F | 28.800 DX  | .000 | .143  | .000 | .000 | R | 3.00 m  |
| F | 35.000 DX  | .000 | .169  | .000 | .000 | R | 3.00 m  |
| F | 5 0.000 DX | .000 | .258  | .000 | .000 | R | 3.00 m  |
| F | 70.000 DX  | .000 | .449  | .000 | .000 | R | 3.00 m  |
| F | 85.000 DX  | .000 | .670  | .000 | .000 | R | 3.00 m  |
| F | 103.000 DX | .000 | 1.057 | .000 | .000 | R | 3.00 m  |
| F | 28.800 DX  | .000 | .086  | .000 | .000 | R | 5.00 m  |
| F | 35.000 DX  | .000 | .100  | .000 | .000 | R | 5.00 m  |
| F | 50.000 DX  | .000 | .155  | .000 | .000 | R | 5.00 m  |
| F | 70.000 DX  | .000 | .272  | .000 | .000 | R | 5.00 m  |
| F | 85.000 DX  | .000 | .412  | .000 | .000 | R | 5.00 m  |
| F | 103.000 DX | .000 | .669  | .000 | .000 | R | 5.00 m  |

As can be seen from Table 54, so-called manual focusing can be attained since the displacement amounts of the imaging point at the respective focal lengths and photographing distances are very small, and fall within the depth of focus independently of the zooming state and photographing distance.

[Fifth Embodiment]

A zoom lens of the fifth embodiment is a zoom lens which has a five-unit arrangement, i.e., positive, negative, positive, negative and positive lens units, and attains focusing by a negative fourth lens unit. In this zoom lens, the rotation amount ratio ($a_F/a_Z$) of the rotation amount for focusing from the infinity in-focus position to the closest in-focus position (R=0.80 m) to the amount of rotation for zooming from the wide-angle end (F=28.8) to the telephoto end (F=126.0) is set to be −0.55.

Table 55 below summarizes various paraxial data of an optical system and data for defining the shape of a focus cam according to the fifth embodiment.

The upper table in Table 55 summarizes the focal lengths data, and principal point interval data of the respective lens units of the optical system corresponding to the fifth embodiment.

In this table, F1, F2, F3, F4 and F5 are respectively the focal lengths of first, second, third, fourth, and fifth lens units, and D1, D2, D3, D4, and D5 are respectively the principal point interval between the first and second lens units, the principal point interval between the second and third lens units, the principal point interval between the third and fourth lens units, and the principal point interval between the fourth and fifth lens unit, and the principal point interval between the fifth lens unit and a predetermined imaging plane in six zooming states (F=28.8 (1-POS), 35.0 (2-POS), 50.0 (3-POS), 70.0 (4-POS), 95.0 mm (5-POS), and 126.0 mm (6-POS)).

The middle table in Table 55 summarizes spline sample data when the shape (a curve $g_{2F}$ in FIG. 3) of the focus cam in the fourth lens unit of the fifth embodiment, which is used for focusing, is expressed by the above-mentioned spline function associated with the angle a of rotation of a rotatable lens barrel and the amount x of movement in the direction of the optical axis. In this middle table, (1), (2), (3), (4), and (5) correspond to the first, second, third, fourth, and fifth lens units, respectively.

Furthermore, the lower table in Table 55 summarizes the infinity focusing positions (infinity corresponding positions) at the respective focal lengths (F=28.8, 35.0, 50.0, 70.0, 95.0, and 126.0 mm), and the amounts of rotation (amounts of rotation for focusing) upon focusing to respective photographing distances (R=5.0, 3.0, 2.0, 1.5, 1.0, and 0.8 m) using the focus cam of the fifth embodiment. In the lower table in Table 55, since the amount of rotation for zooming from the wide-angle end (F=28.8) to the telephoto end (F=126.0) is set to be 10.0, and the amount of rotation for focusing from the infinity in-focus position to the closest in-focus position (R=0.80 m) is set to be −5.5, the rotation amount ratio ($a_F/a_Z$) of the amount of rotation for focusing to the amount of rotation for zooming in the first embodiment is −0.55.

TABLE 55

Fifth Embodiment F = 28.8 to 126.0 (Rotation Amount Ratio: $a_F/a_Z$ = −0.55)

Focal lengths and Principal Point Intervals of Lens Units of Fifth Embodiment

|    |          |    | 1-POS   | 2-POS   | 3-POS   | 4-POS   | 5-POS   | 6-POS    |
|----|----------|----|---------|---------|---------|---------|---------|----------|
|    |          | F  | 28.8000 | 35.0000 | 50.0000 | 70.0000 | 95.0000 | 126.0000 |
| F1 | 98.0000  | D1 | 9.3696  | 15.5678 | 26.0774 | 35.1343 | 42.9607 | 49.3378  |
| F2 | −20.2000 | D2 | 34.5121 | 30.5093 | 24.1872 | 19.0594 | 14.7856 | 10.6994  |
| F3 | 21.3000  | D3 | 8.9319  | 9.5307  | 10.6727 | 11.7442 | 12.4611 | 13.1911  |
| F4 | −19.6000 | D4 | 14.4820 | 13.8832 | 12.7412 | 11.6697 | 10.9528 | 10.2228  |
| F5 | 35.5000  | D5 | 49.8013 | 51.5975 | 55.0237 | 58.2383 | 61.1451 | 63.0195  |

Focus Cam Shape (Spline Interpolation Sample Point) Corresponding to Fifth Embodiment

|    | ANGLE    | (1)   | (2)   | (3)   | (4)    | (5)   |
|----|----------|-------|-------|-------|--------|-------|
| 1  | −10.0000 | .0000 | .0000 | .0000 | −.4328 | .0000 |
| 2  | −5.5000  | .0000 | .0000 | .0000 | −.3653 | .0000 |
| 3  | −3.3884  | .0000 | .0000 | .0000 | −.2845 | .0000 |
| 4  | −1.7882  | .0000 | .0000 | .0000 | −.1832 | .0000 |
| 6  | .7550    | .0000 | .0000 | .0000 | −.0886 | .0000 |
| 7  | .4267    | .0000 | .0000 | .0000 | −.0524 | .0000 |
| 8  | .0000    | .0000 | .0000 | .0000 | .0000  | .0000 |
| 9  | .5000    | .0000 | .0000 | .0000 | .0720  | .0000 |
| 10 | 4.5000   | .0000 | .0000 | .0000 | 1.1810 | .0000 |
| 11 | 6.0000   | .0000 | .0000 | .0000 | 2.0800 | .0000 |
| 12 | 6.6116   | .0000 | .0000 | .0000 | 2.5920 | .0000 |
| 13 | 8.2118   | .0000 | .0000 | .0000 | 4.3577 | .0000 |
| 14 | 8.7719   | .0000 | .0000 | .0000 | 5.1954 | .0000 |
| 15 | 9.2450   | .0000 | .0000 | .0000 | 6.0053 | .0000 |
| 16 | 9.5733   | .0000 | .0000 | .0000 | 6.6341 | .0000 |
| 17 | 10.0000  | .0000 | .0000 | .0000 | 7.5475 | .0000 |
| 18 | 11.0000  | .0000 | .0000 | .0000 | 10.1892| .0000 |

Amount of Rotation for Zooming and Amount of Rotation for Focusing of Fifth Embodiment
(Rotation Amount Ratio: $a_F/a_Z$ = −0.55)

| Focal Length | Infinity Correspond- ing Position | Photograph- ing Distance | Amount of Rotation for Focusing |
|---|---|---|---|
| 28.8 mm | .0000  | 5.00 m | −.427  |
| 35.0 mm | 1.3439 | 3.00 m | −.755  |
| 50.0 mm | 3.8037 | 2.00 m | −1.228 |
| 70.0 mm | 6.0180 | 1.50 m | −1.788 |

TABLE 55-continued

Fifth Embodiment F = 28.8 to 126.0 (Rotation Amount Ratio: $a_F/a_Z$ = −0.55)

| | | | |
|---|---|---|---|
| 95.0 mm | 8.0481 | 1.00 m | −3.388 |
| 126.0 mm | 10.0000 | 0.80 m | −5.500 |
| Condition Corresponding Value (1) | | 1.31 | |
| Condition Corresponding Value (2) | | 17.44 | |
| Condition Corresponding Value (3) | | −0.55 | |
| Condition Corresponding Value (4) | | 0.21 (wide-angle end) | |
| | | 0.26 (telephoto end) | |
| Condition Corresponding Value (5) | | 0.50 (wide-angle end) | |
| | | 0.56 (telephoto end) | |
| Condition Corresponding Value (6) | | 2.39 (wide-angle end) | |
| | | 2.00 (telephoto end) | |

Table 56 below summarizes the numerical value data of the cams of the focusing lens unit in the fifth embodiment, which data are calculated by interpolation based on a spline function on the basis of the sample data of the focus cam summarized in the middle table in Table 55. In this table (ANGLE) is the angle of rotation of the rotatable lens barrel, (2) is the amount (mm) of movement, in the direction of the optical axis, of the second lens unit, and (F) is the focal length (mm) of the entire system in an infinity in-focus state corresponding to the amount (ANGLE) of rotation.

TABLE 56

Cam Numerical Value Data of Focusing Lens Unit in Fifth Embodiment

| Focus Cam Numerical Value Data | | | Zoom Compensation Cam Numerical Value Data | | |
|---|---|---|---|---|---|
| ANGLE | (4) | F | ANGLE | (4) | F |
| −5.5000 | −.3653 | .0000 | | | |
| −5.0000 | −.3503 | .0000 | | | |
| −4.5000 | −.3329 | .0000 | | | |
| −4.0000 | −.3129 | .0000 | | | |
| −3.5000 | −.2900 | .0000 | | | |
| −3.0000 | −.2640 | .0000 | | | |
| −2.5000 | −.2341 | .0000 | | | |
| −2.0000 | −.1995 | .0000 | | | |
| −1.5000 | −.1593 | .0000 | | | |
| −1.0000 | −.1134 | .0000 | | | |
| −.5000 | −.0608 | .0000 | | | |
| .0000 | .0000 | 28.8000 | .0000 | .0000 | 28.8000 |
| .5000 | .0720 | 31.0285 | .5000 | .3775 | 31.0285 |
| 1.0000 | .1527 | 33.3443 | 1.0000 | .7403 | 33.3443 |
| 1.5000 | .2437 | 35.7763 | 1.5000 | 1.0933 | 35.7763 |
| 2.0000 | .3482 | 38.3954 | 2.0000 | 1.4434 | 38.3954 |
| 2.5000 | .4691 | 41.2540 | 2.5000 | 1.7885 | 41.2540 |
| 3.0000 | .6098 | 44.3801 | 3.0000 | 2.1201 | 44.3801 |
| 3.5000 | .7732 | 47.7884 | 3.5000 | 2.4272 | 47.7884 |
| 4.0000 | .9626 | 51.4883 | 4.0000 | 2.6982 | 51.4883 |
| 4.5000 | 1.1810 | 55.4931 | 4.5000 | 2.9324 | 55.4931 |
| 5.0000 | 1.4331 | 59.8203 | 5.0000 | 3.1395 | 59.8203 |
| 5.5000 | 1.7289 | 64.5708 | 5.5000 | 3.3332 | 64.5708 |
| 6.0000 | 2.0800 | 69.8013 | 6.0000 | 3.5238 | 69.8013 |
| 6.5000 | 2.4927 | 75.5383 | 6.5000 | 3.7167 | 75.5383 |
| 7.0000 | 2.9552 | 81.4767 | 7.0000 | 3.8432 | 81.4767 |
| 7.5000 | 3.4759 | 87.6730 | 7.5000 | 3.8489 | 87.6730 |
| 8.0000 | 4.0752 | 94.3296 | 8.0000 | 3.7003 | 94.3296 |
| 8.5000 | 4.7727 | 101.5681 | 8.5000 | 3.3763 | 101.5681 |
| 9.0000 | 5.5729 | 109.2585 | 9.0000 | 2.8865 | 109.2585 |
| 9.5000 | 6.4888 | 117.3718 | 9.5000 | 2.2362 | 117.3718 |
| 10.0000 | 7.5475 | 126.0000 | 10.0000 | 1.4115 | 126.0000 |

The left table in Table 56 summarizes the numerical value data of the focus cam of the fifth embodiment, and the right table in Table 56 summarizes the numerical value data of the zoom compensation cam of this embodiment. A value obtained by synthesizing the amounts (4) of movement in the direction of the optical axis in the numerical value data of the focus cam and the zoom compensation cam in the range from the amount of rotation (ANGLE=0.0) to the amount of rotation (ANGLE=10.0) coincides with the movement locus (a curve $g_4$ in FIG. 3) of the fourth lens unit calculated using the paraxial data in the upper table in Table 55.

Therefore, the zoom compensation cam (a curve $g_{4H}$ in FIG. 3) is determined by subtracting the focus cam (the curve $g_{4F}$ in FIG. 3) from the movement locus (the curve $g_4$ in FIG. 3) upon zooming of the fourth lens unit determined by the paraxial data in the upper table in Table 55.

Figure 3:
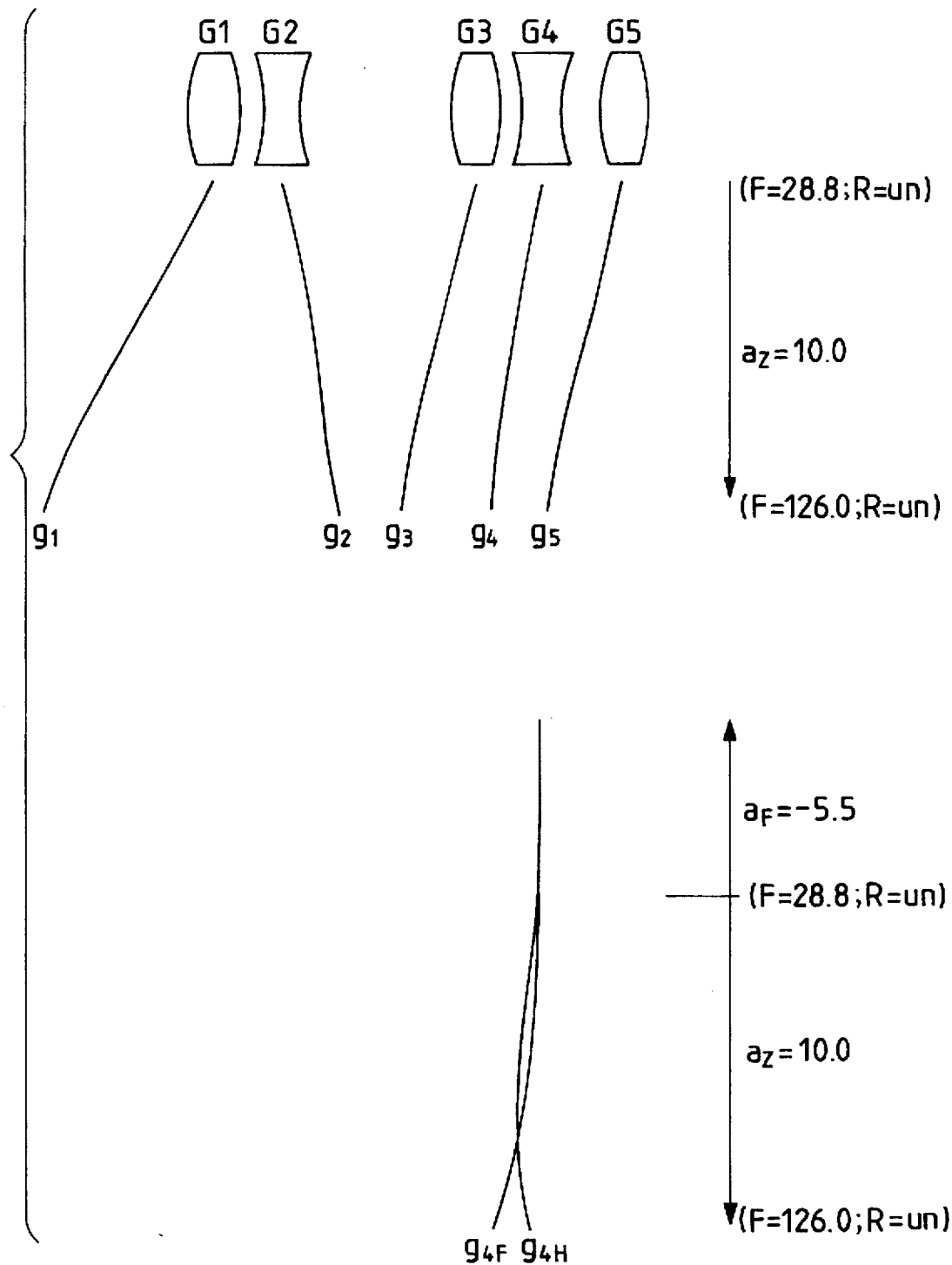
FIG. 3 is a view showing the movement loci for zooming of a zoom lens, the shapes of a focus cam and a zoom compensation cam of a second lens unit in the zoom lens according to the fifth embodiment of the present invention.
Figure 4:
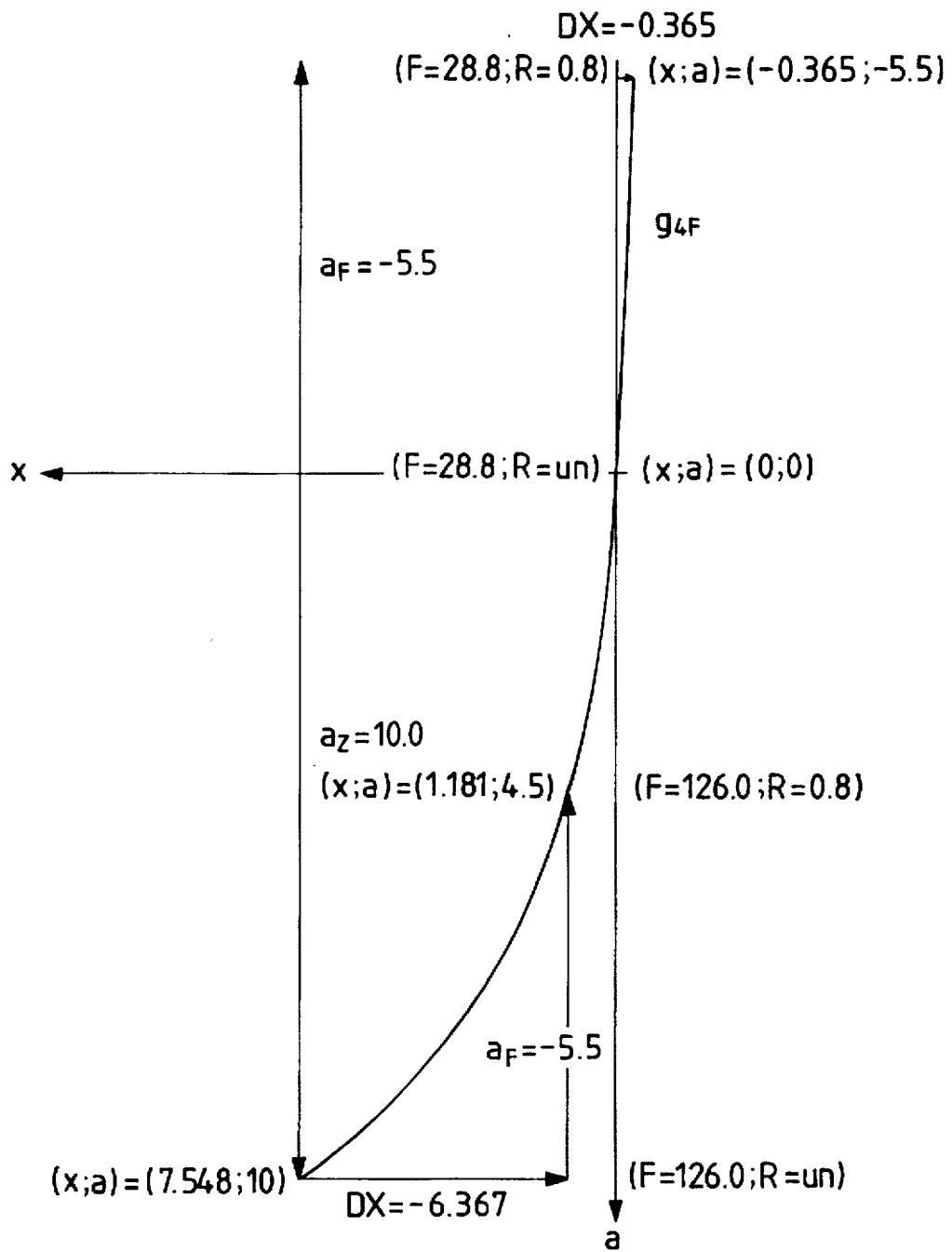
FIG. 4 is a view for explaining the shape of the focus cam in the zoom lens according to the fifth embodiment of the present invention.

FIG. 3 and FIG. 4 will be briefly described below.

FIG. 3 shows the paraxial arrangement and the movement loci upon zooming of the zoom lens according to the fifth embodiment, and FIG. 3 shows the shapes of the focus cam and the zoom compensation cam of the fourth lens unit of this embodiment. Referring to FIG. 1, G1, G2, G3, G4, and G5 respectively represent the first, second, third, fourth, and fifth lens units, and $g_1$, $g_2$, $g_3$, $g_4$ and $g_5$ respectively represent the movement loci upon zooming of the first, second, third, fourth, and fifth lens units. In addition, $g_{4F}$ and $g_{4H}$ respectively represent the shapes of the focus cam and the zoom compensation cam of the fourth lens unit. As described above, a shape obtained by synthesizing the focus cam $g_{4F}$ and the zoom compensation cam $g_{4H}$ of the fourth lens unit coincides with the movement locus $g_4$ of the fourth lens unit.

FIG. 4 is a view for explaining the shape of the focus cam $g_4F$ of the fifth embodiment. Referring to FIG. 4, (F=28.8; R=un) and (F=28.8; R=0.80) respectively represent the in-focus positions at the infinity and the closest distance (R=0.80 m) at the wide-angle end, and coordinate positions (x; a) on the focus cam are respectively (x; a)=(0; 0) and (x; a)=(−0.363; −5.5). On the other hand, (F=126; R=un) and (F=126; R=0.80) respectively represent the in-focus positions at the infinity and the closest distance (R=0.80 m) at the telephoto end, and coordinate positions (x; a) on the focus cam are respectively (x; a)=(7.548; 10) and (x; a)=(1.181; 4.5).

Upon zooming from the wide-angle end to the telephoto end, the fourth lens unit moves on the focus cam $g_{4F}$ from the coordinate position (0; 0) to the coordinate position (7.548; 10) for an infinity object, and from the coordinate position (−0.365; −5.5) to the coordinate position (1.181; 4.5) for a closest distance object. Therefore, the fourth lens unit moves by 10.0 in the direction of rotation (the direction of an axis a) in both the cases. On the other hand, upon focusing from the infinity arrangement to the closest distance object, the fourth lens unit moves on the focus cam $g_{4F}$ from the coordinate position (0; 0) to the coordinate position (−0.365; −5.5) at the wide-angle end, and from the coordinate position (7.548; 10) to the coordinate position (1.181;

4.5) at the telephoto end. Therefore, the fourth lens unit moves by −5.5 in the direction of rotation (the direction of the axis a) at these ends. In contrast to this, in the direction of the optical axis (the direction of an axis x), the fourth lens unit moves by −0.365 at the wide-angle end, and by −6.367 at the telephoto end.

Since the shape of the focus cam $g_{4F}$ is determined by interpolating the coordinates (F=28.8; R=0.80), (F=28.8; R=un), (F=126; R=0.80), and (F=126; R=un) by the spline function, the change in slope (dx/da) of the focus cam $g_{4F}$ becomes larger as the absolute value of the x-coordinate of (F=28.8; R=0.80) is smaller or as the absolute value of the x-coordinate of (F=126; R=un) is larger. More specifically, as the ratio ($\Delta x_{TR}/\Delta x_{WR}$) between the amounts $\Delta x_{TR}$ and $\Delta x_{WR}$ of movement, in the direction of the optical axis, of the focusing lens unit required for focusing from the infinity position to the closest distance position at the wide-angle end or telephoto end is larger, the change in slope (dx/da) of the focus cam becomes larger.

Tables 57, 58, and 59 below summarize the amount DX (mm) of movement for focusing, in the direction of the optical axis, of the focusing lens unit, the imaging magnifications $\beta_K$ of the respective lens units, the conversion coefficient $\gamma_x$ associated with the direction of the optical axis, the slope (dx/da) of the focus cam, and the conversion coefficient $\gamma_a$ associated with the direction of rotation at the wide-angle end (F=28.8), the middle position (F=70.0), and the telephoto end (F=126.0) according to the first embodiment, respectively. In these tables, (R) on the left side is the photographing distance (m), (ANG) is the amount of rotation on the focus cam upon focusing to the respective photographing distances, and 1), 2), 3), 4), and 5) on the right side respectively represent the first, second, third, fourth, and fifth lens units. Also, in these tables, the first table summarizes the amount DX (mm) of movement for focusing in the direction of the optical axis upon focusing to the respective photographing distances (R=10.0, 5.0, 3.0, 2.0, 1.5, 1.0, and 0.80 m) (note that movement toward the object side is positive). The second table summarizes the imaging magnifications $\beta_K$ of the respective lens units in an in-focus state at the respective photographing distances (R=10.0, 5.0, 3.0, 2.0, 1.5, 1.0, and 0.80 m). The third table summarizes the conversion coefficient $\gamma_x$ associated with the direction of the optical axis of the focusing lens unit in an in-focus state at the respective photographing distances (R=10.0, 5.0, 3.0, 2.0, 1.5, 1.0, and 0.80 m). Furthermore, the fourth table summarizes the slope (dx/da) of the focus cam at the positions, on the focus cam, corresponding to an in-focus state at the respective photographing distances (R=10.0, 5.0, 3.0, 2.0, 1.5, 1.0, and 0.80 m), and the fifth table summarizes the conversion coefficient $\gamma_a$ associated with the direction of rotation of the focusing lens unit in an in-focus state at the respective photographing distances (R=10.0, 5.0, 3.0, 2.0, 1.5, 1.0 and 0.80 m).

TABLE 57

Amount DX (mm) of Movement for Focusing in Direction of Optical Axis at Wide-angle End (28.8 mm) in Fifth Embodiment

| R | | ANG | | 1) | | 2) | | 3) | | 4) | | 5) | |
|---|---|---|---|---|---|---|---|---|---|---|---|---|---|
| R | .000 | ANG | .000 | 1) | .000 | 2) | .000 | 3) | .000 | 4) | .000 | 5) | .000 |
| R | 10.000 | ANG | −.204 | 1) | .000 | 2) | .000 | 3) | .000 | 4) | −.026 | 5) | .000 |
| R | 5.000 | ANG | −.427 | 1) | .000 | 2) | .000 | 3) | .000 | 4) | −.052 | 5) | .000 |
| R | 3.000 | ANG | −.755 | 1) | .000 | 2) | .000 | 3) | .000 | 4) | −.089 | 5) | .000 |
| R | 2.000 | ANG | −1.228 | 1) | .000 | 2) | .000 | 3) | .000 | 4) | −.135 | 5) | .000 |
| R | 1.500 | ANG | −1.788 | 1) | .000 | 2) | .000 | 3) | .000 | 4) | −.183 | 5) | .000 |
| R | 1.000 | ANG | −3.388 | 1) | .000 | 2) | .000 | 3) | .000 | 4) | −.284 | 5) | .000 |
| R | .800 | ANG | −5.500 | 1) | .000 | 2) | .000 | 3) | .000 | 4) | −.365 | 5) | .000 |

Imaging Magnification $\beta_K$ of Lens Units at Wide-angle End (28.8 mm) in Fifth Embodiment

| R | .000 | ANG | .000 | 1) | .000 | 2) | −.295 | 3) | −.541 | 4) | −4.568 | 5) | −.403 |
|---|---|---|---|---|---|---|---|---|---|---|---|---|---|
| R | 10.000 | ANG | −.204 | 1) | −.010 | 2) | −.291 | 3) | −.542 | 4) | −4.570 | 5) | −.403 |
| R | 5.000 | ANG | −.427 | 1) | −.020 | 2) | −.287 | 3) | −.543 | 4) | −4.571 | 5) | −.403 |
| R | 3.000 | ANG | −.755 | 1) | −.035 | 2) | −.281 | 3) | −.545 | 4) | −4.573 | 5) | −.403 |
| R | 2.000 | ANG | −1.228 | 1) | −.055 | 2) | −.274 | 3) | −.547 | 4) | −4.575 | 5) | −.403 |
| R | 1.500 | ANG | −1.788 | 1) | −.076 | 2) | −.266 | 3) | −.549 | 4) | −4.578 | 5) | −.403 |
| R | 1.000 | ANG | −3.388 | 1) | −.125 | 2) | −.250 | 3) | −.554 | 4) | −4.583 | 5) | −.403 |
| R | .800 | ANG | −5.500 | 1) | −.168 | 2) | −.238 | 3) | −.557 | 4) | −4.587 | 5) | −.403 |

Conversion Coefficient $\gamma_x$ Associated With Direction of Optical Axis at Wide-angle End (28.8 mm) in Fifth Embodiment

| R | .000 | ANG | .000 | 1) | .000 | 2) | .000 | 3) | .000 | 4) | −3.225 | 5) | .000 |
|---|---|---|---|---|---|---|---|---|---|---|---|---|---|
| R | 10.000 | ANG | −.204 | 1) | .000 | 2) | .000 | 3) | .000 | 4) | −3.227 | 5) | .000 |
| R | 5.000 | ANG | −.427 | 1) | .000 | 2) | .000 | 3) | .000 | 4) | −3.229 | 5) | .000 |
| R | 3.000 | ANG | −.755 | 1) | .000 | 2) | .000 | 3) | .000 | 4) | −3.231 | 5) | .000 |
| R | 2.000 | ANG | −1.228 | 1) | .000 | 2) | .000 | 3) | .000 | 4) | −3.235 | 5) | .000 |
| R | 1.500 | ANG | −1.788 | 1) | .000 | 2) | .000 | 3) | .000 | 4) | −3.239 | 5) | .000 |
| R | 1.000 | ANG | −3.388 | 1) | .000 | 2) | .000 | 3) | .000 | 4) | −3.246 | 5) | .000 |
| R | .800 | ANG | −5.500 | 1) | .000 | 2) | .000 | 3) | .000 | 4) | −3.252 | 5) | .000 |

Slope dx/da of Focus Cam at Wide-angle End (28.8 mm) in Fifth Embodiment

| R | .000 | ANG | .000 | 1) | .000 | 2) | .000 | 3) | .000 | 4) | .133 | 5) | .000 |
|---|---|---|---|---|---|---|---|---|---|---|---|---|---|
| R | 10.000 | ANG | −.204 | 1) | .000 | 2) | .000 | 3) | .000 | 4) | .123 | 5) | .000 |
| R | 5.000 | ANG | −.427 | 1) | .000 | 2) | .000 | 3) | .000 | 4) | .115 | 5) | .000 |
| R | 3.000 | ANG | −.755 | 1) | .000 | 2) | .000 | 3) | .000 | 4) | .105 | 5) | .000 |
| R | 2.000 | ANG | −1.228 | 1) | .000 | 2) | .000 | 3) | .000 | 4) | .092 | 5) | .000 |
| R | 1.500 | ANG | −1.788 | 1) | .000 | 2) | .000 | 3) | .000 | 4) | .079 | 5) | .000 |
| R | 1.000 | ANG | −3.388 | 1) | .000 | 2) | .000 | 3) | .000 | 4) | .050 | 5) | .000 |
| R | .800 | ANG | −5.500 | 1) | .000 | 2) | .000 | 3) | .000 | 4) | .028 | 5) | .000 |

TABLE 57-continued

Amount DX (mm) of Movement for Focusing in Direction of Optical Axis at Wide-angle End (28.8 mm) in Fifth Embodiment Conversion Coefficient $\gamma_a$ Associated With Direction of Rotation at Wide-angle End (28.8 mm) in Fifth Embodiment

| R | .000 | ANG | .000 | 1) | .000 | 2) | .000 | 3) | .000 | 4) | −.428 | 5) | .000 |
|---|---|---|---|---|---|---|---|---|---|---|---|---|---|
| R | 10.000 | ANG | −.204 | 1) | .000 | 2) | .000 | 3) | .000 | 4) | −.397 | 5) | .000 |
| R | 5.000 | ANG | −.427 | 1) | .000 | 2) | .000 | 3) | .000 | 4) | −.371 | 5) | .000 |
| R | 3.000 | ANG | −.755 | 1) | .000 | 2) | .000 | 3) | .000 | 4) | −.339 | 5) | .000 |
| R | 2.000 | ANG | −1.228 | 1) | .000 | 2) | .000 | 3) | .000 | 4) | −.299 | 5) | .000 |
| R | 1.500 | ANG | −1.788 | 1) | .000 | 2) | .000 | 3) | .000 | 4) | −.257 | 5) | .000 |
| R | 1.000 | ANG | −3.388 | 1) | .900 | 2) | .000 | 3) | .000 | 4) | −.163 | 5) | .000 |
| R | .800 | ANG | −5.500 | 1) | .000 | 2) | .000 | 3) | .000 | 4) | −.090 | 5) | .000 |

Condition Corresponding Values: $\gamma_{xR}/\gamma_{x0} = 1.01$, $\gamma_{aR}/\gamma_{a0} = 0.21$

TABLE 58

Amount DX (mm) of Movement for Focusing in Direction of Optical Axis at Middle Position (70.0 mm) in Fifth Embodiment

| R | .000 | ANG | .000 | 1) | .000 | 2) | .000 | 3) | .000 | 4) | .000 | 5) | .000 |
|---|---|---|---|---|---|---|---|---|---|---|---|---|---|
| R | 10.000 | ANG | −.196 | 1) | .000 | 2) | .000 | 3) | .000 | 4) | −.146 | 5) | .000 |
| R | 5.000 | ANG | −.410 | 1) | .000 | 2) | .000 | 3) | .000 | 4) | −.294 | 5) | .000 |
| R | 3.000 | ANG | −.729 | 1) | .000 | 2) | .000 | 3) | .000 | 4) | −.496 | 5) | .000 |
| R | 2.000 | ANG | −1.195 | 1) | .000 | 2) | .000 | 3) | .000 | 4) | −.754 | 5) | .000 |
| R | 1.500 | ANG | −1.756 | 1) | .000 | 2) | .000 | 3) | .000 | 4) | −1.021 | 5) | .000 |
| R | 1.000 | ANG | −3.344 | 1) | .000 | 2) | .000 | 3) | .000 | 4) | −1.578 | 5) | .000 |
| R | .800 | ANG | −5.500 | 1) | .000 | 2) | .000 | 3) | .000 | 4) | −2.019 | 5) | .000 |

Imaging Magnification $\beta_K$ of Lens Units at Middle Position (70.0 mm) in Fifth Embodiment

| R | .000 | ANG | .000 | 1) | .000 | 2) | −.473 | 3) | −.774 | 4) | −3.044 | 5) | −.641 |
|---|---|---|---|---|---|---|---|---|---|---|---|---|---|
| R | 10.000 | ANG | −.196 | 1) | −.010 | 2) | −.463 | 3) | −.780 | 4) | −3.051 | 5) | −.641 |
| R | 5.000 | ANG | −.410 | 1) | −.021 | 2) | −.452 | 3) | −.786 | 4) | −3.059 | 5) | −.641 |
| R | 3.000 | ANG | −.729 | 1) | −.035 | 2) | −.438 | 3) | −.795 | 4) | −3.069 | 5) | −.641 |
| R | 2.000 | ANG | −1.195 | 1) | −.055 | 2) | −.420 | 3) | −.806 | 4) | −3.082 | 5) | −.641 |
| R | 1.500 | ANG | −1.756 | 1) | −.077 | 2) | −.402 | 3) | −.817 | 4) | −3.096 | 5) | −.641 |
| R | 1.000 | ANG | −3.344 | 1) | −.128 | 2) | −.366 | 3) | −.840 | 4) | −3.124 | 5) | −.641 |
| R | .800 | ANG | −5.500 | 1) | −.173 | 2) | −.339 | 3) | −.859 | 4) | −3.147 | 5) | −.641 |

Conversion Coefficient $\gamma_x$ Associated With Direction of Optical Axis at Middle Position (70.0 mm) in Fifth Embodiment

| R | .000 | ANG | .000 | 1) | .000 | 2) | .000 | 3) | .000 | 4) | −3.390 | 5) | .000 |
|---|---|---|---|---|---|---|---|---|---|---|---|---|---|
| R | 10.000 | ANG | −.196 | 1) | .000 | 2) | .000 | 3) | .000 | 4) | −3.409 | 5) | .000 |
| R | 5.000 | ANG | −.410 | 1) | .000 | 2) | .000 | 3) | .000 | 4) | −3.428 | 5) | .000 |
| R | 3.000 | ANG | −.729 | 1) | .000 | 2) | .000 | 3) | .000 | 4) | −3.454 | 5) | .000 |
| R | 2.000 | ANG | −1.195 | 1) | .000 | 2) | .000 | 3) | .000 | 4) | −3.487 | 5) | .000 |
| R | 1.500 | ANG | −1.756 | 1) | .000 | 2) | .000 | 3) | .000 | 4) | −3.521 | 5) | .000 |
| R | 1.000 | ANG | −3.344 | 1) | .000 | 2) | .000 | 3) | .000 | 4) | −3.594 | 5) | .000 |
| R | .800 | ANG | −5.500 | 1) | .000 | 2) | .000 | 3) | .000 | 4) | −3.652 | 5) | .000 |

Slope dx/da of Focus Cam at Middle Position (70.0 m) in Fifth Embodiment

| R | .000 | ANG | .000 | 1) | .000 | 2) | .000 | 3) | .000 | 4) | .770 | 5) | .000 |
|---|---|---|---|---|---|---|---|---|---|---|---|---|---|
| R | 10.000 | ANG | −.196 | 1) | .000 | 2) | .000 | 3) | .000 | 4) | .719 | 5) | .000 |
| R | 5.000 | ANG | −.410 | 1) | .000 | 2) | .000 | 3) | .000 | 4) | .668 | 5) | .000 |
| R | 3.000 | ANG | −.729 | 1) | .000 | 2) | .000 | 3) | .000 | 4) | .599 | 5) | .000 |
| R | 2.000 | ANG | −1.195 | 1) | .000 | 2) | .000 | 3) | .000 | 4) | .514 | 5) | .000 |
| R | 1.500 | ANG | −1.756 | 1) | .000 | 2) | .000 | 3) | .000 | 4) | .438 | 5) | .000 |
| R | 1.000 | ANG | −3.344 | 1) | .000 | 2) | .000 | 3) | .000 | 4) | .275 | 5) | .000 |
| R | .800 | ANG | −5.500 | 1) | .000 | 2) | .000 | 3) | .000 | 4) | .154 | 5) | .000 |

Conversion Coefficient $\gamma_a$ Associated With Direction of Rotation at Middle Position (70.0 mm) in Fifth Embodiment

| R | .000 | ANG | .000 | 1) | .000 | 2) | .000 | 3) | .000 | 4) | −2.611 | 5) | .000 |
|---|---|---|---|---|---|---|---|---|---|---|---|---|---|
| R | 10.000 | ANG | −.196 | 1) | .000 | 2) | .000 | 3) | .000 | 4) | −2.452 | 5) | .000 |
| R | 5.000 | ANG | −.410 | 1) | .000 | 2) | .000 | 3) | .000 | 4) | −2.288 | 5) | .000 |
| R | 3.000 | ANG | −.729 | 1) | .000 | 2) | .000 | 3) | .000 | 4) | −2.067 | 5) | .000 |
| R | 2.000 | ANG | −1.195 | 1) | .000 | 2) | .000 | 3) | .000 | 4) | −1.794 | 5) | .000 |
| R | 1.500 | ANG | −1.756 | 1) | .000 | 2) | .000 | 3) | .000 | 4) | −1.542 | 5) | .000 |
| R | 1.000 | ANG | −3.344 | 1) | .000 | 2) | .000 | 3) | .000 | 4) | −.987 | 5) | .000 |
| R | .800 | ANG | −5.500 | 1) | .000 | 2) | .000 | 3) | .000 | 4) | −.562 | 5) | .000 |

Condition Corresponding Values: $\gamma_{xR}/\gamma_{x0} = 1.08$, $\gamma_{aR}/\gamma_{a0} = 0.22$

TABLE 59

Amount DX (mm) of Movement for Focusing in Direction of Optical Axis at Telephoto End
(126.0 mm) in Fifth Embodiment

| R | .000 | ANG | .000 | 1) | .000 | 2) | .000 | 3) | .000 | 4) | .000 | 5) | .000 |
|---|---|---|---|---|---|---|---|---|---|---|---|---|---|
| R | 10.000 | ANG | −.203 | 1) | .000 | 2) | .000 | 3) | .000 | 4) | −.452 | 5) | .000 |
| R | 5.000 | ANG | −.427 | 1) | .000 | 2) | .000 | 3) | .000 | 4) | −.913 | 5) | .000 |
| R | 3.000 | ANG | −.755 | 1) | .000 | 2) | .000 | 3) | .000 | 4) | −1.542 | 5) | .000 |
| R | 2.000 | ANG | −1.228 | 1) | .000 | 2) | .000 | 3) | .000 | 4) | −2.352 | 5) | .000 |
| R | 1.500 | ANG | −1.788 | 1) | .000 | 2) | .000 | 3) | .000 | 4) | −3.190 | 5) | .000 |
| R | 1.000 | ANG | −3.388 | 1) | .000 | 2) | .000 | 3) | .000 | 4) | −4.956 | 5) | .000 |
| R | .800 | ANG | −5.500 | 1) | .000 | 2) | .000 | 3) | .000 | 4) | −6.367 | 5) | .000 |

Imaging Magnification $\beta_x$ of Lens Units at Telephoto End (126.0 mm) in Fifth Embodiment

| R | .000 | ANG | .000 | 1) | −.000 | 2) | −.710 | 3) | −.890 | 4) | −2.626 | 5) | −.775 |
|---|---|---|---|---|---|---|---|---|---|---|---|---|---|
| R | 10.000 | ANG | −.203 | 1) | −.010 | 2) | −.686 | 3) | −.908 | 4) | −2.649 | 5) | −.775 |
| R | 5.000 | ANG | −.427 | 1) | −.021 | 2) | −.663 | 3) | −.927 | 4) | −2.673 | 5) | −.775 |
| R | 3.000 | ANG | −.755 | 1) | −.036 | 2) | −.632 | 3) | −.952 | 4) | −2.705 | 5) | −.775 |
| R | 2.000 | ANG | −1.228 | 1) | −.056 | 2) | −.595 | 3) | −.985 | 4) | −2.746 | 5) | −.775 |
| R | 1.500 | ANG | −1.788 | 1) | −.078 | 2) | −.559 | 3) | −1.019 | 4) | −2.789 | 5) | −.775 |
| R | 1.000 | ANG | −3.388 | 1) | −.130 | 2) | −.491 | 3) | −1.092 | 4) | −2.879 | 5) | −.775 |
| R | .800 | ANG | −5.500 | 1) | −.176 | 2) | −.442 | 3) | −1.150 | 4) | −2.951 | 5) | −.775 |

Conversion Coefficient $\gamma_x$ Associated With Direction of Optical Axis at Telephot End
(126.0 mm) in Fifth Embodiment

| R | .000 | ANG | .000 | 1) | .000 | 2) | .000 | 3) | .000 | 4) | −3.543 | 5) | .000 |
|---|---|---|---|---|---|---|---|---|---|---|---|---|---|
| R | 10.000 | ANG | −.203 | 1) | .000 | 2) | .000 | 3) | .000 | 4) | −3.617 | 5) | .000 |
| R | 5.000 | ANG | −.427 | 1) | .000 | 2) | .000 | 3) | .000 | 4) | −3.692 | 5) | .000 |
| R | 3.000 | ANG | −.755 | 1) | .000 | 2) | .000 | 3) | .000 | 4) | −3.795 | 5) | .000 |
| R | 2.000 | ANG | −1.228 | 1) | .000 | 2) | .000 | 3) | .000 | 4) | −3.931 | 5) | .000 |
| R | 1.500 | ANG | −1.788 | 1) | .000 | 2) | .000 | 3) | .000 | 4) | −4.073 | 5) | .000 |
| R | 1.000 | ANG | −3.388 | 1) | .000 | 2) | .Q00 | 3) | .000 | 4) | −4.380 | 5) | .000 |
| R | .800 | ANG | −5.500 | 1) | .000 | 2) | .000 | 3) | .000 | 4) | −4.632 | 5) | .000 |

Slope dx/da of Focus Cam at Telephoto End (126.0 mm) in Fifth Embodiment

| R | .000 | ANG | .000 | 1) | .000 | 2) | .000 | 3) | .000 | 4) | 2.316 | 5) | .000 |
|---|---|---|---|---|---|---|---|---|---|---|---|---|---|
| R | 10.000 | ANG | −.203 | 1) | .000 | 2) | .000 | 3) | .000 | 4) | 2.140 | 5) | .000 |
| R | 5.000 | ANG | −.427 | 1) | .000 | 2) | .000 | 3) | .000 | 4) | 2.000 | 5) | .000 |
| R | 3.000 | ANG | −.755 | 1) | .000 | 2) | .000 | 3) | .000 | 4) | 1.828 | 5) | .000 |
| R | 2.000 | ANG | −1.228 | 1) | .000 | 2) | .000 | 3) | .000 | 4) | 1.608 | 5) | .000 |
| R | 1.500 | ANG | −1.788 | 1) | .000 | 2) | .000 | 3) | .000 | 4) | 1.379 | 5) | .000 |
| R | 1.000 | ANG | −3.388 | 1) | .000 | 2) | .000 | 3) | .000 | 4) | .899 | 5) | .000 |
| R | .800 | ANG | −5.500 | 1) | .000 | 2) | .000 | 3) | .000 | 4) | .468 | 5) | .000 |

Conversion Coefficient $\gamma_a$ Associated With Direction of Rotation at Telephoto End
(126.0 mm) in Fifth Embodiment

| R | .000 | ANG | .000 | 1) | .000 | 2) | .000 | 3) | .000 | 4) | −8.205 | 5) | .000 |
|---|---|---|---|---|---|---|---|---|---|---|---|---|---|
| R | 10.000 | ANG | −.203 | 1) | .000 | 2) | .000 | 3) | .000 | 4) | −7.738 | 5) | .000 |
| R | 5.000 | ANG | −.427 | 1) | .000 | 2) | .000 | 3) | .000 | 4) | −7.383 | 5) | .000 |
| R | 3.000 | ANG | −.755 | 1) | .000 | 2) | .000 | 3) | .000 | 4) | −6.939 | 5) | .000 |
| R | 2.000 | ANG | −1.228 | 1) | .000 | 2) | .000 | 3) | .000 | 4) | −6.321 | 5) | .000 |
| R | 1.500 | ANG | −1.788 | 1) | .000 | 2) | .000 | 3) | .000 | 4) | −5.615 | 5) | .000 |
| R | 1.000 | ANG | −3.388 | 1) | .000 | 2) | .000 | 3) | .000 | 4) | −3.936 | 5) | .000 |
| R | .800 | ANG | −5.500 | 1) | .000 | 2) | .000 | 3) | .000 | 4) | −2.168 | 5) | .000 |

Condition Corresponding Values: $\gamma_{xR}/\gamma_{x0} = 1.31$, $\gamma_{aR}/\gamma_{a0} = 0.26$ As can be seen from Tables 57, 58, and 59, at each focal length, the conversion coefficient $\gamma_x$ associated with the direction of the optical axis increases but the value of the slope (dx/da) of the focus cam decreases as the photographing distance becomes closer to the closest distance. Therefore, as can be seen from these tables, the value of the conversion coefficient $\gamma_a$ associated with the direction of rotation, which is defined as the product of the conversion coefficient $\gamma_x$ and the slope (dx/da) of the focus cam, decreases as the photographing distance becomes closer to the closest distance by the influence of the slope (dx/da) of the focus cam, contrary to the case in which the rotation amount ratio ($a_F/a_Z$) is set to be 1.0, as in the embodiment of Japanese Patent Application Laid-Open No. 5-142475.

From Tables 57, 58, and 59, the rate of change, from the infinity in-focus position to the closest in-focus position, of the conversion coefficient $\gamma_a$ associated with the direction of rotation is ×0.21 at the wide-angle end (F=28.8), ×0.22 at the middle position (F=70.0), and ×0.26 at the telephoto end (F=126.0). When the number N of divisions of the focus range upon a change in conversion coefficient $\gamma_a$ in the fifth embodiment is calculated using formula (a), and is compared with that in the case in which the rotation amount ratio ($a_F/a_Z$) is set to be 1.0, as in the embodiment of Japanese Patent Application Laid-Open No. 5-142475, the numbers $N_W$, $N_M$, and $N_T$ of divisions at the wide-angle end, middle position, and telephoto end respectively have the following values:

When the rotation amount ratio ($a_F/a_Z$) is set to be 1.0

$N_W > 14.6 N_M > 16.1 N_T > 16.9$

Fifth Embodiment $N_W > 8.5 N_M > 8.4 N_T > 7.3$

Therefore, it can be seen that the numbers of divisions become small, compared to those in the case in which the rotation amount ratio ($a_F/a_Z$) is set to be 1.0, as in the embodiment of Japanese Patent Application Laid-Open No. 5-142475.

As described above, in the zoom lens of the fifth embodiment, since the rate of change, from the infinity in-focus position to the closest in-focus position, of the conversion coefficient $\gamma_a$ associated with the direction of rotation becomes much smaller than that in the case in which the rotation amount ratio $(a_F/a_Z)$ is set to be 1.0, as in the embodiment of Japanese Patent Application Laid-Open No. 5-142475, the number of data of the conversion coefficient $\gamma_a$ and the correction coefficient $\mu$ can be reduced, and the storage capacity can be suppressed.

Tables 60, 61, and 62 summarize the calculation results of the conversion coefficient $K_a$ and the correction coefficient $\mu$ at the wide-angle end (F=28.8), middle position (F=70.0), and telephoto end (F=126.0) according to the first embodiment. In these tables, (R) is the object distance (m), (ANG) is the amount of rotation for focusing from the infinity corresponding position on the focus cam, (r) is the conversion coefficient $\gamma_a$ in the direction of rotation, (rs) is the conversion coefficient $K_a$, (bf) is the defocus amount (mm), and (l) is the correction coefficient $\mu$. Each table has a matrix structure, and eight rows in the vertical direction indicated by (POS) represent the object positions (R=10.0, 5.0, 3.0, 2.0, 1.5, 1.0, and 0.80 mm), and four pairs (R, ANGLE) in the horizontal direction represent the lens arrangements of the focusing lens unit.

More specifically, the position of the focusing lens in the first pair in the upper two tables in each of Tables 60, 61, and 62, i.e., in the third and fourth columns is (R, ANGLE)=(0.0, 0.0), and it indicates that this position corresponds to the infinity corresponding position. Therefore, the third column (r) in the first table represents the value of the conversion coefficient $\gamma_a$ in the direction of rotation when the focusing lens unit is focused on an infinity object, and the fourth column (rs) represents the value of the conversion coefficient $K_a$ when the focusing lens unit is moved from an in-focus state on an infinity object to an in-focus state at the object distance in the second column. Furthermore, the third column (bf) in the second table represents the defocus amount $\Delta$Bf from a predetermined imaging position when the position of the focusing lens unit corresponds to the infinity corresponding position, and an object is located at an object distance in the second column, and the fourth column (l) represents the value of the correction coefficient $\mu$ when the focusing lens unit is moved from an in-focus state on an infinity object to an in-focus state at the object distance in the second column.

Similarly, the position of the focusing lens in the fourth pair in the lower two tables in each of Tables 60, 61, and 62, i.e., in the ninth and tenth columns is (R, ANGLE)=(0.80, −5.5), and it indicates that this position corresponds to the closest in-focus (R=0.80 m) corresponding position. Therefore, the ninth column (r) in the third table represents the value of the conversion coefficient $\gamma_a$ in the direction of rotation when the focusing lens unit is focused on a closest distance (R=0.80 m) object, and the tenth column (rs) represents the value of the conversion coefficient $K_a$ when the focusing lens unit is moved from an in-focus state on the closest distance (R=0.80 m) object to an in-focus state at the object distance in the second column. Furthermore, the ninth column (bf) in the fourth table represents the defocus amount $\Delta$Bf from a predetermined imaging position when the position of the focusing lens unit corresponds to the closest corresponding position, and the object is located at an object distance in the second column, and the tenth column (l) represents the value of the correction coefficient $\mu$ when the focusing lens unit is moved from an in-focus state on the closest distance (R=0.80 m) object to an in-focus state at the object distance in the second column.

As described above, since the conversion coefficient in the direction of rotation is calculated by $K_a=\Delta Bf/\Delta a$ (where $\Delta a$: the amount of rotation for focusing), and the correction coefficient $\mu$ is calculated by $\mu=\Delta Bf/(1-K_a/\gamma_a)$, the value of the conversion coefficient $K_a$ (eight row, fourth column in first table: −0.214) when the focusing lens unit is moved from an in-focus state on the infinity object to an in-focus state at the object distance (R=0.80 m) in Table 60 is calculated by $K_a=1.18/-5.5 = -0.214$ using $\Delta Bf=1.18$ and $\Delta a=-5.5$. On the other hand, the value of the correction coefficient $\mu$ (eight row, fourth column in second table: 2.37) is calculated as $\mu=2.37$ using $\Delta Bf=1.18$, $K_a=-0.214$, and $\gamma_a=-0.428$.

TABLE 60

Conversion Coefficients $K_a$: (rs), $\gamma_a$: (r) Associated with Direction of Rotation and Correction Coefficient $\mu$: (l) at Wide-angle End (28.8 mm) of Fifth Embodiment
F = 28.8 mm

| (R, ANGLE) = | | .000 | .000 | 10.000 | −.204 | 5.000 | −.427 | 3.000 | −.755 |
|---|---|---|---|---|---|---|---|---|---|
| POS | R | r | rs | r | rs | r | rs | r | rs |
| 1 | .000 | −.428 | .000 | | −.412 | | −.397 | | −.379 |
| 2 | 10.000 | | −.411 | −.397 | .000 | | −.383 | | −.367 |
| 3 | 5.000 | | −.396 | | −.383 | −.371 | .000 | | −.355 |
| 4 | 3.000 | | −.378 | | −.366 | | −.355 | −.339 | .000 |
| 5 | 2.000 | | −.355 | | −.344 | | −.333 | | −.318 |
| 6 | 1.500 | | −.331 | | −.320 | | −.310 | | −.296 |
| 7 | 1.000 | | −.271 | | −.262 | | −.253 | | −.241 |
| 8 | .800 | | −.214 | | −.207 | | −.199 | | −.189 |
| POS | R | bf | l | bf | l | bf | l | bf | l |
| 1 | .000 | .00 | .00 | −.08 | 2.20 | −.17 | 2.43 | −.29 | 2.45 |
| 2 | 10.000 | .08 | 2.20 | .00 | .00 | −.09 | 2.62 | −.20 | 2.50 |
| 3 | 5.000 | .17 | 2.32 | .09 | 2.50 | .00 | .00 | −.12 | 2.46 |
| 4 | 3.000 | .29 | 2.48 | .20 | 2.65 | .12 | 2.74 | .00 | .00 |
| 5 | 2.000 | .44 | 2.56 | .35 | 2.65 | .27 | 2.61 | .15 | 2.37 |
| 6 | 1.500 | .59 | 2.60 | .51 | 2.64 | .42 | 2.58 | .31 | 2.40 |
| 7 | 1.000 | .92 | 2.51 | .84 | 2.46 | .75 | 2.36 | .63 | 2.18 |
| 8 | .800 | 1.18 | 2.37 | 1.10 | 2.29 | 1.01 | 2.19 | .90 | 2.02 |

TABLE 60-continued

Conversion Coefficients $K_a$: (rs), $\gamma_a$: (r) Associated with Direction of Rotation and Correction Coefficient $\mu$: (l) at Wide-angle End (28.8 mm) of Fifth Embodiment
F = 28.8 mm

| (R, ANGLE) = | | 2.000 | −1.228 | 1.000 | −1.788 | 1.000 | −3.388 | .800 | −5.500 |
|---|---|---|---|---|---|---|---|---|---|
| POS | R | r | rs | r | rs | r | rs | r | rs |
| 1 | .000 | | −.356 | | −.331 | | −.272 | | −.216 |
| 2 | 10.000 | | −.344 | | −.321 | | −.263 | | −.208 |
| 3 | 5.000 | | −.333 | | −.311 | | −.254 | | −.200 |
| 4 | 3.000 | | −.318 | | −.296 | | −.241 | | −.189 |
| 5 | 2.000 | −.299 | .000 | | −.278 | | −.224 | | −.175 |
| 6 | 1.500 | | −.278 | −.257 | .000 | | −.205 | | −.159 |
| 7 | 1.000 | | −.224 | | −.205 | −.163 | .000 | | −.124 |
| 8 | .800 | | −.175 | | −.159 | | −.124 | −.090 | .000 |

| POS | R | bf | l | bf | l | bf | l | bf | l |
|---|---|---|---|---|---|---|---|---|---|
| 1 | .000 | −.44 | 2.29 | −.59 | 2.04 | −.92 | 1.37 | −1.19 | .86 |
| 2 | 10.000 | −.35 | 2.31 | −.51 | 2.04 | −.84 | 1.36 | −1.10 | .85 |
| 3 | 5.000 | −.27 | 2.30 | −.42 | 2.02 | −.75 | 1.34 | −1.02 | .84 |
| 4 | 3.000 | −.15 | 2.32 | −.31 | 1.99 | −.64 | 1.32 | −.90 | .82 |
| 5 | 2.000 | .00 | .00 | −.16 | 1.89 | −.48 | 1.28 | −.75 | .80 |
| 6 | 1.500 | .16 | 2.23 | .00 | .00 | −.33 | 1.26 | −.59 | .78 |
| 7 | 1.000 | .48 | 1.93 | .33 | 1.63 | .00 | .00 | −.26 | .70 |
| 8 | .800 | .75 | 1.79 | .59 | 1.55 | .26 | 1.11 | .00 | .00 |

Condition Corresponding Values: $K_{aO}/\gamma_{aO} = 0.50$, $K_{aR}/\gamma_{aR} = 2.39$

TABLE 61

Conversion Coefficients $K_a$: (rs), $\gamma_a$: (r) Associated with Direction of Rotation and Correction Coefficient $\mu$: (l) at Middle Position (70.0 mm) of Fifth Embodiment
F = 70.0 mm

| (R, ANGLE) = | | .000 | .000 | 10.000 | −.196 | 5.000 | −.410 | 3.000 | −.729 |
|---|---|---|---|---|---|---|---|---|---|
| POS | R | r | rs | r | rs | r | rs | r | rs |
| 1 | .000 | −2.610 | .000 | | −2.533 | | −2.450 | | −2.333 |
| 2 | 10.000 | | −2.528 | −2.450 | .000 | | −2.371 | | −2.257 |
| 3 | 5.000 | | −2.442 | | −2.367 | −2.290 | .000 | | −2.178 |
| 4 | 3.000 | | −2.321 | | −2.249 | | −2.173 | −2.066 | .000 |
| 5 | 2.000 | | −2.161 | | −2.093 | | −2.022 | | −1.923 |
| 6 | 1.500 | | −1.996 | | −1.933 | | −1.868 | | −1.778 |
| 7 | 1.000 | | −1.632 | | −1.580 | | −1.526 | | −1.451 |
| 8 | .800 | | −1.277 | | −1.234 | | −1.189 | | −1.126 |

| POS | R | bf | l | bf | l | bf | l | bf | l |
|---|---|---|---|---|---|---|---|---|---|
| 1 | .000 | .00 | .00 | −.50 | 14.70 | −1.00 | 14.34 | −1.70 | 13.15 |
| 2 | 10.000 | .50 | 15.81 | .00 | .00 | −.51 | 14.33 | −1.20 | 13.02 |
| 3 | 5.000 | 1.00 | 15.51 | .51 | 14.93 | .00 | .00 | −.69 | 12.87 |
| 4 | 3.000 | 1.69 | 15.25 | 1.20 | 14.58 | .69 | 13.60 | .00 | .00 |
| 5 | 2.000 | 2.58 | 15.00 | 2.09 | 14.35 | 1.59 | 13.58 | .90 | 12.95 |
| 6 | 1.500 | 3.51 | 14.90 | 3.02 | 14.30 | 2.52 | 13.66 | 1.83 | 13.08 |
| 7 | 1.000 | 5.46 | 14.57 | 4.97 | 14.01 | 4.48 | 13.43 | 3.80 | 12.75 |
| 8 | .800 | 7.02 | 13.75 | 6.54 | 13.18 | 6.05 | 12.59 | 5.37 | 11.82 |

| (R, ANGLE) = | | 2.000 | −1.195 | 1.500 | −1.756 | 1.000 | −3.344 | .800 | −5.500 |
|---|---|---|---|---|---|---|---|---|---|
| POS | R | r | rs | r | rs | r | rs | r | rs |
| 1 | .000 | | −2.177 | | −2.015 | | −1.652 | | −1.293 |
| 2 | 10.000 | | −2.105 | | −1.948 | | −1.597 | | −1.247 |
| 3 | 5.000 | | −2.031 | | −1.879 | | −1.539 | | −1.200 |
| 4 | 3.000 | | −1.927 | | −1.785 | | −1.461 | | −1.135 |
| 5 | 2.000 | −1.793 | .000 | | −1.664 | | −1.359 | | −1.049 |
| 6 | 1.500 | | −1.661 | −1.543 | .000 | | −1.250 | | −.956 |
| 7 | 1.000 | | −1.353 | | −1.247 | −.987 | .000 | | −.741 |
| 8 | .800 | | −1.044 | | −.954 | | −.740 | −.561 | .000 |

| POS | R | bf | l | bf | l | bf | l | bf | l |
|---|---|---|---|---|---|---|---|---|---|
| 1 | .000 | −2.60 | 12.16 | −3.54 | 11.58 | −5.52 | 8.21 | −7.11 | 5.46 |
| 2 | 10.000 | −2.10 | 12.10 | −3.04 | 11.59 | −5.03 | 8.15 | −6.62 | 5.42 |
| 3 | 5.000 | −1.59 | 12.06 | −2.53 | 11.62 | −4.52 | 8.08 | −6.11 | 5.37 |
| 4 | 3.000 | −.90 | 12.05 | −1.83 | 11.72 | −3.82 | 7.97 | −5.41 | 5.30 |

TABLE 61-continued

Conversion Coefficients $K_a$: (rs), $\gamma_a$: (r) Associated with Direction of Rotation and Correction Coefficient μ: (l) at Middle Position (70.0 mm) of Fifth Embodiment
F = 70.0 mm

| 5 | 2.000 | .00 | .00 | -.93 | 11.93 | -2.92 | 7.76 | -4.51 | 5.20 |
| 6 | 1.500 | .93 | 12.62 | .00 | .00 | -1.98 | 7.46 | -3.58 | 5.09 |
| 7 | 1.000 | 2.91 | 11.83 | 1.98 | 10.31 | .00 | .00 | -1.60 | 5.00 |
| 8 | .800 | 4.49 | 10.74 | 3.57 | 9.34 | 1.60 | 6.39 | .00 | .00 |

Condition Corresponding Values: $K_{aO}/\gamma_{aO} = 0.49$, $K_{aR}/\gamma_{aR} = 2.30$

TABLE 62

Conversion Coefficient $K_a$: (rs), $\gamma_a$: (r) Associated with Direction of Rotation and Correction Coefficient μ: (l) at Telephoto End (126.0 mm) of Fifth Embodiment
F = 126.0 mm

| (R, ANGLE) = | .000 | .000 | -.203 | 2.777 | 5.000 | -.427 | 3.000 | -.755 |
|---|---|---|---|---|---|---|---|---|
| POS R | r | rs | r | rs | r | rs | r | rs |
| 1 .000 | -8.209 | .000 | | -7.975 | | -7.761 | | -7.500 |
| 2 10.000 | | -7.943 | -7.742 | .000 | | -7.554 | | -7.325 |
| 3 5.000 | | -7.708 | | -7.534 | -7.387 | .000 | | -7.170 |
| 4 3.000 | | -7.437 | | -7.294 | | -7.160 | -6.930 | .000 |
| 5 2.000 | | -7.075 | | -6.951 | | -6.823 | | -6.614 |
| 6 1.500 | | -6.689 | | -6.581 | | -6.464 | | -6.276 |
| 7 1.000 | | -5.664 | | -5.576 | | -5.475 | | -5.310 |
| 8 .800 | | -4.602 | | -4.530 | | -4.444 | | -4.305 |

| POS | R | bf | l | bf | l | bf | l | bf | l |
|---|---|---|---|---|---|---|---|---|---|
| 1 | .000 | .00 | .00 | -1.62 | 53.88 | -3.31 | 65.46 | -5.66 | 68.89 |
| 2 | 10.000 | 1.62 | 49.82 | .00 | .00 | -1.69 | 74.73 | -4.04 | 70.94 |
| 3 | 5.000 | 3.29 | 53.95 | 1.68 | 62.63 | .00 | .00 | -2.35 | 67.91 |
| 4 | 3.000 | 5.62 | 59.75 | 4.02 | 69.57 | 2.35 | 76.44 | .00 | .00 |
| 5 | 2.000 | 8.69 | 62.90 | 7.12 | 69.69 | 5.47 | 71.55 | 3.13 | 68.60 |
| 6 | 1.500 | 11.96 | 64.62 | 10.43 | 69.54 | 8.80 | 70.43 | 6.48 | 68.73 |
| 7 | 1.000 | 19.19 | 61.91 | 17.76 | 63.48 | 16.22 | 62.65 | 13.98 | 59.84 |
| 8 | .800 | 25.31 | 57.61 | 23.99 | 57.82 | 22.55 | 56.60 | 20.43 | 53.93 |

| (R, ANGLE) = | 2.000 | -1.228 | 1.500 | -1.788 | 1.000 | -3.388 | .800 | -5.500 |
|---|---|---|---|---|---|---|---|---|
| POS R | r | rs | r | rs | r | rs | r | rs |
| 1 .000 | | -7.122 | | -6.691 | | -5.513 | | -4.326 |
| 2 10.000 | | -6.967 | | -6.553 | | -5.399 | | -4.232 |
| 3 5.000 | | -6.819 | | -6.417 | | -5.281 | | -4.132 |
| 4 3.000 | | -6.600 | | -6.220 | | -5.109 | | -3.988 |
| 5 2.000 | -6.322 | .000 | | -5.958 | | -4.866 | | -3.783 |
| 6 1.500 | | -6.000 | -5.618 | .000 | | -4.571 | | -3.543 |
| 7 1.000 | | -5.053 | | -4.716 | -3.938 | .000 | | -2.940 |
| 8 .800 | | -4.086 | | -3.807 | | -3.066 | -2.167 | .000 |

| POS | R | bf | l | bf | l | bf | l | bf | l |
|---|---|---|---|---|---|---|---|---|---|
| 1 | .000 | -8.75 | 69.13 | -11.97 | 62.65 | -18.68 | 46.70 | -23.79 | 23.87 |
| 2 | 10.000 | -7.14 | 69.99 | -10.39 | 62.40 | -17.19 | 46.35 | -22.41 | 23.52 |
| 3 | 5.000 | -5.46 | 69.51 | -8.74 | 61.42 | -15.64 | 45.85 | -20.96 | 23.11 |
| 4 | 3.000 | -3.12 | 70.92 | -6.43 | 59.98 | -13.45 | 45.24 | -18.92 | 22.51 |
| 5 | 2.000 | .00 | .00 | -3.34 | 55.23 | -10.51 | 44.59 | -16.16 | 21.66 |
| 6 | 1.500 | 3.36 | 65.93 | .00 | .00 | -7.31 | 45.49 | -13.15 | 20.70 |
| 7 | 1.000 | 10.92 | 54.38 | 7.55 | 47.00 | .00 | .00 | -6.21 | 17.39 |
| 8 | .800 | 17.46 | 49.36 | 14.13 | 43.83 | 6.48 | 29.27 | .00 | .00 |

Condition Corresponding Values: $K_{aO}/\gamma_{aO} = 0.56$, $K_{aR}/\gamma_{aR} = 2.00$ As can be seen from Tables 60, 61, and 62 above, when a change in conversion coefficient $K_a$: (rs) (e.g., the fourth column in the first table) at a given lens arrangement (e.g., at the infinity in-focus arrangement) is considered, the rate of change becomes small as compared to the change in $K_a$ (Tables 15, 16, and 17) in the case in which the rotation amount ratio ($a_F/a_Z$) is set to be 1.0, as in the embodiment of Japanese Patent Application Laid-Open No. 5-142475 examined previously.

More specifically, the amount Δa of rotation for focusing in the first embodiment at the infinity object side becomes relatively smaller than that at the closest object side, as compared to the case in which the rotation amount ratio ($a_F/a_Z$) is set to be 1.0, as the embodiment of Japanese Patent Application Laid-Open No. 5-142475. In fact, when the ratio between the amount of rotation for focusing upon focusing to the closest distance and the amount of rotation for focusing upon focusing to the object distance (R=5.0 m) is calculated in Tables 10 and 55, 4.296/10.0=0.430 in the case in which the rotation amount ratio ($a_F/a_Z$) is set to be 1.0, while -0.427/-5.5=0.078 in the fifth embodiment. As described above, when the focus cam with the arrangement of the present invention is used, since the amount Δa of rotation for focusing becomes relatively smaller at the infinity object side, the conversion coefficient $K_a$ becomes relatively large at the infinity object side, and consequently, the change in conversion coefficient $K_a$ in the direction of rotation can be reduced as compared to the conventional system.

The calculation results of the rate of change of $K_a$ with respect to $\gamma_a$ at the infinity in-focus arrangement and the closest in-focus arrangement at the wide-angle end, middle position, and telephoto end in the case in which the rotation amount ratio $(a_F/a_Z)$ is set to be 1.0, as in the embodiment of Japanese Patent Application Laid-Open No. 5-142475 and in the fifth embodiment of the present invention in which said ratio $(a_F/a_Z)$ is set to be −0.55 are as follows.

| When the rotation amount ratio $(a_F/a_Z)$ is set to be 1.0 | | |
|---|---|---|
| | Infinity Arrangement $K_{a0}/\gamma_{a0}$ | Closest Arrangement $K_{aR}/\gamma_{aR}$ |
| Wide-angle End (F = 28.8) | 4.76 | 0.34 |
| Middle Position (F = 70.0) | 5.78 | 0.31 |
| Telephoto End (F = 126.0) Fifth Embodiment | 6.58 | 0.28 |
| Wide-angle End (F = 28.8) | 0.50 | 2.39 |
| Middle Position (F = 70.0) | 0.49 | 2.30 |
| Telephoto End (F = 126.0) | 0.56 | 2.00 |

As described above, according to the present invention, since the rate of change of $K_a$ with respect to $\gamma_a$ is small as compared to the conventional system, the contribution of the correction term (ΔBf/μ) in $K_a = \gamma_a(1-\Delta Bf/\mu)$ can be reduced, the value of the correction coefficient μ can be set to be large as compared to the defocus amount ΔBf, and at the same time, the change in correction coefficient μ can be decreased.

Therefore, even when only a pair of a conversion coefficient $\gamma_a$ value and a correction coefficient μ value are set for a given lens arrangement range, an error in the conversion coefficient $K_a$ calculated using $\gamma_a$ and μ or in the actual lens driving amount Δa for focusing can be eliminated.

Next, in the case in which the rotation amount ratio $(a_F/a_Z)$ is set to be 1.0, as in the embodiment of Japanese Patent Application Laid-Open No. 5-142475 and the fifth embodiment of the present invention in which said ratio $(a_F/a_Z)$ is set to be −0.55, when the lens driving amounts upon focusing from the infinity in-focus lens arrangement to the closest distance object and upon focusing from the closest in-focus lens arrangement to the infinity object at the wide-angle end (F=28.8), middle position (F=70.0), and telephoto end (F=126.0) are calculated from $\Delta a = \Delta Bf/[\gamma_a(1-\Delta Bf/\mu)]$, and errors from the actual lens driving amounts are then calculated, the following values are obtained. Note that the value of the correction coefficient μ upon focusing from the infinity in-focus lens arrangement to the closest distance object adopts a value at the object distance (POS-5), and the value of the correction coefficient μ upon focusing from the closest in-focus lens arrangement to the infinity object adopts a value at the object distance (POS-4).

| When the rotation amount ratio $(a_F/a_Z)$ is set to be 1.0 | | |
|---|---|---|
| | Infinity Arrangement → Closest In-focus State | Closest Arrangement → Infinity In-focus State |
| Wide-angle End (F = 28.8) | −8.7% | −26.3% |
| Middle Position (F = 70.0) | −13.2% | −23.4% |
| Telephoto End (F = 126.0) Fifth Embodiment | −14.1% | −28.7% |
| Wide-angle End (F = 28.8) | −6.9% | −2.4% |
| Middle Position (F = 70.0) | −8.0% | −1.6% |
| Telephoto End (F = 126.0) | −6.2% | −2.9% |

As described above, even when only a pair of a conversion coefficient $\gamma_a$ value and a correction coefficient μ value are set for a given lens arrangement range, an error between the conversion coefficient $K_a$ calculated from $\gamma_a$ and μ and the lens driving amount Δa for focusing becomes small as compared to the conventional system, and focusing can be realized with higher accuracy.

Next, an examination will be made as to whether not only accurate auto-focusing but also so-called manual focusing can be attained in the zoom lens of the fifth embodiment.

Table 63 summarizes the amount (ANGLE DA) of rotation for focusing upon manual focusing using the focus cam (the middle table in Table 55) of the fifth embodiment, the amount DX (mm) of movement, in the direction of the optical axis, of the focusing lens unit corresponding to the amount of rotation for focusing, and the displacement amount Bf (mm) of the imaging point when the amount (DX) of movement in the direction of the optical axis is given.

The upper table in Table 63 summarizes the displacement amount (Bf) of the imaging point corresponding to the photographing distances (R=5.0, 3.0, 2.0, 1.5, 1.0, and 0.8 m) in the respective zooming states of the focal lengths (F=28.8, 35.0, 50.0, 70.0, 95.0, and 126.0 mm), and the middle table summarizes the values of the amount (ANGLE DA) of rotation for focusing required for attaining an optimal in-focus state with respect to the respective photographing distances (R=5.0, 3.0, 2.0, 1.5, 1.0, and 0.80 m). Note that the amounts of rotation for focusing, which have values for eliminating any displacement of the imaging point at the wide-angle end and the telephoto end, are selected. The lower table summarizes the amounts (DX) of movement, in the direction of the optical axis, of the respective lens units corresponding to the amount (ANGLE DA) of rotation for focusing in association with the photographing distances (R=5.0, 3.0, 2.0, 1.5, 1.0, and 0.8 m) in the respective zooming states with the focal lengths (F=28.8, 35.0, 50.0, 70.0, 95.0, and 126.0 mm). In the lower table, (F) is the focal length (mm) of the entire system, (R) is the photographing distance (m), and (DX) is the amount (mm) of movement, in the direction of the optical axis, of each of the first, second, third, fourth, and fifth lens units in turn from the right side. Note that the amount of movement in the direction of the optical axis toward the object side is represented by a positive value.

TABLE 63

Displacement Amount Bf (mm) of Imaging Point and Amount DX (mm) of movement for focusing in Fifth Embodiment

|  |  | 0.80 m | 1.00 m | 1.50 m | 2.00 m | 3.00 m | 5.00 m |
|---|---|---|---|---|---|---|---|
| 28.800 Bf |  | .000 | .000 | .000 | .000 | .000 | .000 |
| 35.000 Bf |  | .000 | .003 | −.001 | −.002 | .005 | .005 |
| 50.000 Bf |  | .000 | .008 | .006 | −.002 | −.003 | −.001 |
| 70.000 Bf |  | .000 | .044 | .049 | −.059 | −.054 | −.039 |
| 95.000 Bf |  | .000 | −.092 | −.012 | .037 | .039 | .027 |
| 126.000 Bf |  | .000 | .000 | .000 | .000 | .000 | .000 |

| ANGLE DA | −5.500 | −3.388 | −1.788 | −1.228 | −.755 | −.427 |
|---|---|---|---|---|---|---|

| | | | | | | | | |
|---|---|---|---|---|---|---|---|---|
| F | 28.800 DX | .000 | .000 | .000 | −.365 | .000 | R | 0.80 m |
| F | 35.000 DX | .000 | .000 | .000 | −.533 | .000 | R | 0.80 m |
| F | 50.000 DX | .000 | .000 | .000 | −1.061 | .000 | R | 0.80 m |
| F | 70.000 DX | .000 | .000 | .000 | −2.019 | .000 | R | 0.80 m |
| F | 95.000 DX | .000 | .000 | .000 | −3.656 | .000 | R | 0.80 m |
| F | 126.000 DX | .000 | .000 | .000 | −6.367 | .000 | R | 0.80 m |
| F | 28.800 DX | .000 | .000 | .000 | −.284 | .000 | R | 1.00 m |
| F | 35.000 DX | .000 | .000 | .000 | −.417 | .000 | R | 1.00 m |
| F | 50.000 DX | .000 | .000 | .000 | −.826 | .000 | R | 1.00 m |
| F | 70.000 DX | .000 | .000 | .000 | −1.590 | .000 | R | 1.00 m |
| F | 95.000 DX | .000 | .000 | .000 | −2.880 | .000 | R | 1.00 m |
| F | 126.000 DX | .000 | .000 | .000 | −4.956 | .000 | R | 1.00 m |
| F | 28.800 DX | .000 | .000 | .000 | −.183 | .000 | R | 1.50 m |
| F | 35.000 DX | .000 | .000 | .000 | −.268 | .000 | R | 1.50 m |
| F | 50.000 DX | .000 | .000 | .000 | −.533 | .000 | R | 1.50 m |
| F | 70.000 DX | .000 | .000 | .000 | −1.035 | .000 | R | 1.50 m |
| F | 126.000 DX | .000 | .000 | .000 | −3.190 | .000 | R | 1.50 m |
| F | 28.800 DX | .000 | .000 | .000 | −.135 | .000 | R | 2.00 m |
| F | 35.000 DX | .000 | .000 | .000 | −.198 | .000 | R | 2.00 m |
| F | 50.000 DX | .000 | .000 | .000 | −.396 | .000 | R | 2.00 m |
| F | 70.000 DX | .000 | .000 | .000 | −.771 | .000 | R | 2.00 m |
| F | 95.000 DX | .000 | .000 | .000 | −1.355 | .000 | R | 2.00 m |
| F | 126.000 DX | .000 | .000 | .000 | −2.352 | .000 | R | 2.00 m |
| F | 28.800 DX | .000 | .000 | .000 | −.089 | .000 | R | 3.00 m |
| F | 35.000 DX | .000 | .000 | .000 | −.128 | .000 | R | 3.00 m |
| F | 50.000 DX | .000 | .000 | .000 | −.260 | .000 | R | 3.00 m |
| F | 70.000 DX | .000 | .000 | .000 | −.511 | .000 | R | 3.00 m |
| F | 95.000 DX | .000 | .000 | .000 | −.886 | .000 | R | 3.00 m |
| F | 126.000 DX | .000 | .000 | .000 | −1.542 | .000 | R | 3.00 m |
| F | 28.800 DX | .000 | .000 | .000 | −.052 | .000 | R | 5.00 m |
| F | 35.000 DX | .000 | .000 | .000 | −.075 | .000 | R | 5.00 m |
| F | 50.000 DX | .000 | .000 | .000 | −.154 | .000 | R | 5.00 m |
| F | 70.000 DX | .000 | .000 | .000 | −.305 | .000 | R | 5.00 m |
| F | 95.000 DX | .000 | .000 | .000 | −.524 | .000 | R | 5.00 m |
| F | 126.000 DX | .000 | .000 | .000 | −.913 | .000 | R | 5.00 m |

As can be seen from Table 63, so-called manual focusing can be attained since the displacement amounts of the imaging point at the respective focal lengths and photographing distances are very small, and fall within the depth of focus independently of the zooming state and photographing distance.

[Sixth Embodiment]

The sixth embodiment is directed to a zoom lens which has a five-unit arrangement, i.e., positive, negative, positive, and positive lens units, and attains focusing by a negative second lens unit. In this zoom lens, the rotation amount ratio $(a_F/a_Z)$ of the rotation amount for focusing from the infinity in-focus position to the closest in-focus position (R=0.95 m) to the amount of rotation for zooming from the wide-angle end (F=24.7) to the telephoto end (F=194.0) is set to be −0.80.

Table 64 below summarizes various paraxial data of an optical system and data for defining the shape of a focus cam according to the sixth embodiment.

The upper table in Table 64 summarizes the focal lengths and principal point interval data of the respective lens units of the optical system corresponding to the sixth embodiment in association with six zooming states (focal length F=24.7 (1-POS), 35.0 (2-POS), 50.0 (3-POS), 85.0 (4-POS), 135.0 (5-POS), and 194.0 mm (6-POS)).

The middle table in Table 64 summarizes spline sample data when the shape of the focus cam in the second lens unit of the sixth embodiment, which is used for focusing, is expressed by the above-mentioned spline function associated with the angle a of rotation of a rotatable lens barrel and the amount x of movement in the direction of the optical axis. In this middle table, (1), (2), (3), and (4) correspond to the first, second, third, and fourth lens units, respectively.

Furthermore, the lower table in Table 64 summarizes the infinity focusing positions (infinity corresponding positions) at the respective focal lengths (F=24.7, 35.0, 50.0, 85.0, 135.0, and 194.0 mm), and the amounts of rotation (amounts of rotation for focusing) upon focusing to respective photographing distances (R=5.0, 3.0, 2.0, 1.5, 1.2, and 0.95 m) using the focus cam of the sixth embodiment. In this table, since the amount of rotation for zooming from the wide-angle end (F=24.7) to the telephoto end (F=194.0) is set to be 10.0, and the amount of rotation for focusing from the infinity in-focus position to the closest in-focus position (R=0.95 m) is set to be −8.0, the rotation amount ratio $(a_F/a_Z)$ of the amount of rotation for focusing to the amount of rotation for zooming in the fourth embodiment is −0.80.

TABLE 64

Second Embodiment F = 24.7 to 194.0 (Rotation Amount Ratio: $a_f/a_z = -0.80$)

Focal lengths and Principal Point Intervals of Lens Units of Sixth Embodiment

|    |          |    | 1-POS    | 2-POS   | 3-POS   | 4-POS   | 5-POS    | 6-POS    |
|----|----------|----|----------|---------|---------|---------|----------|----------|
|    |          | F  | 24.7000  | 35.0000 | 50.0000 | 85.0000 | 135.0000 | 194.0000 |
| F1 | 83.0000  | D1 | 8.4075   | 15.4045 | 23.5767 | 34.4070 | 43.3980  | 49.1234  |
| F2 | -15.0000 | D2 | 28.3223  | 23.1584 | 19.2184 | 14.3263 | 10.2768  | 6.6130   |
| F3 | 44.0000  | D3 | 8.1372   | 7.7418  | 7.2728  | 5.5880  | 5.1884   | 4.7906   |
| F4 | 60.0000  | D4 | 55.0055  | 63.1527 | 71.4749 | 84.9444 | 94.8409  | 101.9854 |

Focus Cam Shape (Spline Interpolation Sample Point) Corresponding to Sixth Embodiment

|    | ANGLE     | (1)   | (2)     | (3)   | (4)   |
|----|-----------|-------|---------|-------|-------|
| 1  | -10.0000  | .0000 | .5780   | .0000 | .0000 |
| 2  | -8.0000   | .0000 | .5191   | .0000 | .0000 |
| 3  | -5.1006   | .0000 | .4059   | .0000 | .0000 |
| 4  | -3.6046   | .0000 | .3218   | .0000 | .0000 |
| 5  | -2.4342   | .0000 | .2392   | .0000 | .0000 |
| 6  | -1.4844   | .0000 | .1580   | .0000 | .0000 |
| 7  | -.8361    | .0000 | .0942   | .0000 | .0000 |
| 8  | .0000     | .0000 | .0000   | .0000 | .0000 |
| 9  | .5000     | .0000 | -.0640  | .0000 | .0000 |
| 10 | 2.0000    | .0000 | -.2910  | .0000 | .0000 |
| 11 | 4.8994    | .0000 | -.9968  | .0000 | .0000 |
| 12 | 6.3953    | .0000 | -1.5990 | .0000 | .0000 |
| 13 | 7.5658    | .0000 | -2.2827 | .0000 | .0000 |
| 14 | 8.5156    | .000  | -3.0883 | .0000 | .0000 |
| 15 | 9.1639    | .000  | -3.8748 | .0000 | .0000 |
| 16 | 10.0000   | .000  | -5.5825 | .0000 | .0000 |
| 17 | 11.0000   | .0000 | -9.9000 | .0000 | .0000 |

Amount of Rotation for Zooming and Amount of Rotation for Focusing of Sixth Embodiment
(Rotation Amount Ratio: $a_f/a_z = -0.80$)

| Focal Length | Infinity Correspond- ing Position | Photograph- ing Distance | Amount of Rotation for Focusing |
|---|---|---|---|
| 24.7 mm | .0000 | 5.00 m | -.836 |
| 35.0 mm | 1.4533 | 3.00 m | -1.484 |
| 50.0 mm | 3.3444 | 2.00 m | -2.434 |
| 85.0 mm | 6.1312 | 1.50 m | -3.605 |
| 135.0 mm | 8.6279 | 1.20 m | -5.101 |
| 194.0 mm | 10.0000 | 0.95 m | -8.000 |
| Condition Corresponding Value (1) | | 2.18 | |
| Condition Corresponding Value (2) | | 10.19 | |
| Condition Corresponding Value (3) | | -0.80 | |
| Condition Corresponding Value (4) | | 0.26 (wide-angle end) 0.12 (telephoto end) | |
| Condition Corresponding Value (5) | | 0.55 (wide-angle end) 0.80 (telephoto end) | |
| Condition Corresponding Value (6) | | 1.98 (wide-angle end) 1.85 (telephoto end) | |

Table 65 below summarizes the numerical value data of the cams of the focusing lens unit in the sixth embodiment, which data are calculated by interpolation based on a spline function on the basis of the sample data of the focus cam summarized in the middle table in Table 64. Note that the meanings of the reference symbols in Table 65 are the same as those in the fifth embodiment.

TABLE 65

Cam Numerical Value Data of Focusing Lens Unit in Sixth Embodiment

| Focus Cam Numerical Value Data | | | Zoom Compensation Cam Numerical Value Data | | |
|---|---|---|---|---|---|
| ANGLE | (2) | F | ANGLE | (2) | F |
| -8.0000 | .5191 | .0000 | | | |
| -7.5000 | .5029 | .0000 | | | |
| -7.0000 | .4856 | .0000 | | | |
| -6.5000 | .4670 | .0000 | | | |
| -6.0000 | .4468 | .0000 | | | |

TABLE 65-continued

Cam Numerical Value Data of Focusing Lens Unit in Sixth Embodiment

| Focus Cam Numerical Value Data | | | Zoom Compensation Cam Numerical Value Data | | |
|---|---|---|---|---|---|
| ANGLE | (2) | F | ANGLE | (2) | F |
| −5.5000 | .4249 | .0000 | | | |
| −5.0000 | .4009 | .0000 | | | |
| −4.5000 | .3747 | .0000 | | | |
| −4.0000 | .3462 | .0000 | | | |
| −3.5000 | .3151 | .0000 | | | |
| −3.0000 | .2812 | .0000 | | | |
| −2.5000 | .2443 | .0000 | | | |
| −2.0000 | .2038 | .0000 | | | |
| −1.5000 | .1595 | .0000 | | | |
| −1.0000 | .1110 | .0000 | | | |
| −.5000 | .0581 | .0000 | | | |
| .0000 | .0000 | 24.7000 | .0000 | .0000 | 24.7000 |
| .5000 | −.0640 | 28.1820 | .5000 | .9557 | 28.1820 |
| 1.0000 | −.1332 | 31.7391 | 1.0000 | 1.9059 | 31.7391 |
| 1.5000 | −.2084 | 35.3374 | 1.5000 | 2.8823 | 35.3374 |
| 2.0000 | −.2910 | 38.9843 | 2.0000 | 3.9161 | 38.9843 |
| 2.5000 | −.3824 | 42.7873 | 2.5000 | 5.0190 | 42.7873 |
| 3.0000 | −.4844 | 46.8974 | 3.0000 | 6.2000 | 46.8974 |
| 3.5000 | −.5985 | 51.4940 | 3.5000 | 7.4659 | 51.4940 |
| 4.0000 | −.7264 | 56.7072 | 4.0000 | 8.8121 | 56.7072 |
| 4.5000 | −.8699 | 62.5219 | 4.5000 | 10.2142 | 62.5219 |
| 5.0000 | −1.0306 | 68.8723 | 5.0000 | 11.6417 | 68.8723 |
| 5.5000 | −1.2111 | 75.6992 | 5.5000 | 13.0715 | 75.6992 |
| 6.0000 | −1.4162 | 83.0056 | 6.0000 | 14.4965 | 83.0056 |
| 6.5000 | −1.6509 | 90.7764 | 6.5000 | 15.9065 | 90.7764 |
| 7.0000 | −1.9215 | 99.1459 | 7.0000 | 17.3051 | 99.1459 |
| 7.5000 | −2.2373 | 108.3906 | 7.5000 | 18.7079 | 108.3906 |
| 8.0000 | −2.6106 | 118.8434 | 8.0000 | 20.1317 | 118.8434 |
| 8.5000 | −3.0721 | 131.3527 | 8.5000 | 21.6429 | 131.3527 |
| 9.0000 | −3.6548 | 146.7241 | 9.0000 | 23.2762 | 146.7241 |
| 9.5000 | −4.3955 | 165.4668 | 9.5000 | 25.0563 | 165.4668 |
| 10.0000 | −5.5825 | 194.0000 | 10.0000 | 27.5064 | 194.0000 |

The left table in Table 65 summarizes the numerical value data of the focus cam of the sixth embodiment, and the right table in Table 65 summarizes the numerical value data of the zoom compensation cam of this embodiment. A value obtained by synthesizing the amounts (2) of movement in the direction of the optical axis in the numerical value data of the focus cam and the zoom compensation cam in the range from the amount of rotation (ANGLE=0.0) to the amount of rotation (ANGLE=10.0) coincides with the movement locus of the second lens unit calculated using the paraxial data in the upper table in Table 64.

Tables 66, 67, and 68 below summarize the amount DX (mm) of movement for focusing, in the direction of the optical axis, of the focusing lens unit, the imaging magnifications $\beta_K$ of the respective lens units, the conversion coefficient $\gamma_x$ associated with the direction of the optical axis, the slope (dx/da) of the focus cam, and the conversion coefficient $\gamma_a$ associated with the direction of rotation at the wide-angle end (F=24.7), the middle position (F=85.0), and the telephoto end (F=194.0) according to the sixth embodiment, respectively. The arrangements of the respective tables and the meanings of the reference symbols are the same as those in the sixth embodiment.

TABLE 66

Amount DX (mm) of Movement for Focusing in Direction of Optical Axis at Wide-angle End (24.7 mm) in Sixth Embodiment

| R | .000 | ANG | .000 | 1) | .000 | 2) | .000 | 3) | .000 | 4) | .000 |
|---|---|---|---|---|---|---|---|---|---|---|---|
| R | 10.000 | ANG | −.399 | 1) | .000 | 2) | .047 | 3) | .000 | 4) | .000 |
| R | 5.000 | ANG | −.836 | 1) | .000 | 2) | .094 | 3) | .000 | 4) | .000 |
| R | 3.000 | ANG | −1.484 | 1) | .000 | 2) | .158 | 3) | .000 | 4) | .000 |
| R | 2.000 | ANG | −2.434 | 1) | .000 | 2) | .239 | 3) | .000 | 4) | .000 |
| R | 1.500 | ANG | −3.605 | 1) | .000 | 2) | .322 | 3) | .000 | 4) | .000 |
| R | 1.200 | ANG | −5.101 | 1) | .000 | 2) | .406 | 3) | .000 | 4) | .000 |
| R | .950 | ANG | −8.000 | 1) | .000 | 2) | .519 | 3) | .000 | 4) | .000 |

Imaging Magnification $\beta_K$ of Lens Units at Wide-angle End (24.7 mm) in Sixth Embodiment

| R | .000 | ANG | .000 | 1) | .000 | 2) | −.252 | 3) | −14.203 | 4) | .083 |
|---|---|---|---|---|---|---|---|---|---|---|---|
| R | 10.000 | ANG | −.399 | 1) | −.008 | 2) | −.249 | 3) | −14.202 | 4) | .083 |
| R | 5.000 | ANG | −.836 | 1) | −.017 | 2) | −.245 | 3) | −14.203 | 4) | .083 |
| R | 3.000 | ANG | −1.484 | 1) | −.029 | 2) | −.241 | 3) | −14.203 | 4) | .083 |
| R | 2.000 | ANG | −2.434 | 1) | −.046 | 2) | −.236 | 3) | −14.203 | 4) | .083 |
| R | 1.500 | ANG | −3.605 | 1) | −.063 | 2) | −.230 | 3) | −14.203 | 4) | .083 |
| R | 1.200 | ANG | −5.101 | i) | −.082 | 2) | −.225 | 3) | −14.203 | 4) | .083 |
| R | .950 | ANG | −8.000 | 1) | −.108 | 2) | −.217 | 3) | −14.203 | 4) | .083 |

Conversion Coefficient $\gamma_x$ Associated With Direction of Optical Axis at Wide-angle End (24.7 mm) in Sixth Embodiment

| R | .000 | ANG | .000 | 1) | .000 | 2) | 1.309 | 3) | .000 | 4) | .000 |
|---|---|---|---|---|---|---|---|---|---|---|---|
| R | 10.000 | ANG | −.399 | 1) | .000 | 2) | 1.311 | 3) | .000 | 4) | .000 |
| R | 5.000 | ANG | −.836 | 1) | .000 | 2) | 1.314 | 3) | .000 | 4) | .000 |
| R | 3.000 | ANG | −1.484 | 1) | .000 | 2) | 1.316 | 3) | .000 | 4) | .000 |
| R | 2.000 | ANG | −2.434 | 1) | .000 | 2) | 1.320 | 3) | .000 | 4) | .000 |
| R | 1.500 | ANG | −3.605 | 1) | .000 | 2) | 1.324 | 3) | .000 | 4) | .000 |
| R | 1.200 | ANG | −5.101 | 1) | .000 | 2) | 1.327 | 3) | .000 | 4) | .000 |
| R | .950 | ANG | −8.000 | 1) | .000 | 2) | 1.332 | 3) | .000 | 4) | .000 |

TABLE 66-continued

Slope dx/da of Focus Cam at Wide-angle End (24.7 mm) in Sixth Embodiment

| | | | | | | | | | | | |
|---|---|---|---|---|---|---|---|---|---|---|---|
| R | .000 | ANG | .000 | 1) | .000 | 2) | -.122 | 3) | .000 | 4) | .000 |
| R | 10.000 | ANG | -.399 | 1) | .000 | 2) | -.113 | 3) | .000 | 4) | .000 |
| R | 5.000 | ANG | -.836 | 1) | .000 | 2) | -.104 | 3) | .000 | 4) | .000 |
| R | 3.000 | ANG | -1.484 | 1) | .000 | 2) | -.093 | 3) | .000 | 4) | .000 |
| R | 2.000 | ANG | -2.434 | 1) | .000 | 2) | -.078 | 3) | .000 | 4) | .000 |
| R | 1.500 | ANG | -3.605 | 1) | .000 | 2) | -.064 | 3) | .000 | 4) | .000 |
| R | 1.200 | ANG | -5.101 | 1) | .000 | 2) | -.049 | 3) | .000 | 4) | .000 |
| R | .950 | ANG | -8.000 | 1) | .000 | 2) | -.032 | 3) | .000 | 4) | .000 |

Conversion Coefficient $\gamma_a$ Associated With Direction of Rotation at Wide-angle End (24.7 mm) in Sixth Embodiment

| | | | | | | | | | | | |
|---|---|---|---|---|---|---|---|---|---|---|---|
| R | .000 | ANG | .000 | 1) | .000 | 2) | -.160 | 3) | .000 | 4) | .000 |
| R | 10.000 | ANG | -.399 | 1) | .000 | 2) | -.148 | 3) | .000 | 4) | .000 |
| R | 5.000 | ANG | -.836 | 1) | .000 | 2) | -.137 | 3) | .000 | 4) | .000 |
| R | 3.000 | ANG | -1.484 | 1) | .000 | 2) | -.122 | 3) | .000 | 4) | .000 |
| R | 2.000 | ANG | -3.434 | 1) | .000 | 2) | -.103 | 3) | .000 | 4) | .000 |
| R | 1.500 | ANG | -3.605 | 1) | .000 | 2) | -.084 | 3) | .000 | 4) | .000 |
| R | 1.200 | ANG | -5.101 | 1) | .000 | 2) | -.065 | 3) | .000 | 4) | .000 |
| R | .950 | ANG | -8.000 | 1) | .000 | 2) | -.042 | 3) | .000 | 4) | .000 |

Condition Corresponding Values: $\gamma_{xR}/\gamma_{x0} = 1.02$, $\gamma_{aR}/\gamma_{a0} = 0.26$

TABLE 67

Amount DX (mm) of Movement for Focusing in Direction of Optical Axis at Middle Position (85.0 mm) in Sixth Embodiment

| | | | | | | | | | | | |
|---|---|---|---|---|---|---|---|---|---|---|---|
| R | .000 | ANG | .000 | 1) | .000 | 2) | .000 | 3) | .000 | 4) | .000 |
| R | 10.000 | ANG | -.395 | 1) | .000 | 2) | .170 | 3) | .000 | 4) | .000 |
| R | 5.000 | ANG | -.827 | 1) | .000 | 2) | .337 | 3) | .000 | 4) | .000 |
| R | 3.000 | ANG | -1.470 | 1) | .000 | 2) | .555 | 3) | .000 | 4) | .000 |
| R | 2.000 | ANG | -2.411 | 1) | .000 | 2) | .822 | 3) | .000 | 4) | .000 |
| R | 1.500 | ANG | -3.579 | 1) | .000 | 2) | 1.082 | 3) | .000 | 4) | .000 |
| R | 1.200 | ANG | -5.105 | 1) | .000 | 2) | 1.338 | 3) | .000 | 4) | .000 |
| R | .950 | ANG | -8.000 | 1) | .000 | 2) | 1.667 | 3) | .000 | 4) | .000 |

Imaging Magnification $\beta_K$ of Lens Unit at Middle Position (85.0 mm) in Sixth Embodiment

| | | | | | | | | | | | |
|---|---|---|---|---|---|---|---|---|---|---|---|
| R | .000 | ANG | .000 | 1) | .000 | 2) | -.447 | 3) | 5.517 | 4) | -.416 |
| R | 10.000 | ANG | -.395 | 1) | -.008 | 2) | -.435 | 3) | 5.517 | 4) | -.416 |
| R | 5.000 | ANG | -.827 | 1) | -.017 | 2) | -.424 | 3) | 5.517 | 4) | -.416 |
| R | 3.000 | ANG | -1.470 | 1) | -.030 | 2) | -.410 | 3) | 5.517 | 4) | -.416 |
| R | 2.000 | ANG | -2.411 | 1) | -.047 | 2) | -.392 | 3) | 5.517 | 4) | -.416 |
| R | 1.500 | ANG | -3.579 | 1) | -.065 | 2) | -.374 | 3) | 5.517 | 4) | -.416 |
| R | 1.200 | ANG | -5.105 | 1) | -.085 | 2) | -.357 | 3) | 5.517 | 4) | -.416 |
| R | .950 | ANG | -8.000 | 1) | -.114 | 2) | -.335 | 3) | 5.517 | 4) | -.416 |

Conversion Coefficient $\gamma_x$ Associated With Direction of Optical Axis at Middle Position (85.0 mm) in Sixth Embodiment

| | | | | | | | | | | | |
|---|---|---|---|---|---|---|---|---|---|---|---|
| R | .000 | ANG | -.000 | 1) | .000 | 2) | 4.211 | 3) | .000 | 4) | .000 |
| R | 10.000 | ANG | -.395 | 1) | .000 | 2) | 4.264 | 3) | .000 | 4) | .000 |
| R | 5.000 | ANG | -.827 | 1) | .000 | 2) | 4.314 | 3) | .000 | 4) | .000 |
| R | 3.000 | ANG | -1.470 | 1) | .000 | 2) | 4.378 | 3) | .000 | 4) | .000 |
| R | 2.000 | ANG | -2.411 | 1) | .000 | 2) | 4.453 | 3) | .000 | 4) | .000 |
| R | 1.500 | ANG | -3.579 | 1) | .000 | 2) | 4.523 | 3) | .000 | 4) | .000 |
| R | 1.200 | ANG | -5.105 | 1) | .000 | 2) | 4.588 | 3) | .000 | 4) | .000 |
| R | .950 | ANG | -8.000 | 1) | .000 | 2) | 4.668 | 3) | .000 | 4) | .000 |

Slope dx/da of Focus Cam at Middle Position (85.0 mm) in Sixth Embodiment

| | | | | | | | | | | | |
|---|---|---|---|---|---|---|---|---|---|---|---|
| R | .000 | ANG | .000 | 1) | .000 | 2) | -.454 | 3) | .000 | 4) | .000 |
| R | 10.000 | ANG | -.395 | 1) | .000 | 2) | -.408 | 3) | .000 | 4) | .000 |
| R | 5.000 | ANG | -.827 | 1) | .000 | 2) | -.365 | 3) | .000 | 4) | .000 |
| R | 3.000 | ANG | -1.470 | 1) | .000 | 2) | -.315 | 3) | .000 | 4) | .000 |
| R | 2.000 | ANG | -2.411 | 1) | .000 | 2) | -.254 | 3) | .000 | 4) | .000 |
| R | 1.500 | ANG | -3.579 | 1) | .000 | 2) | -.195 | 3) | .000 | 4) | .000 |
| R | 1.200 | ANG | -5.105 | 1) | .000 | 2) | -.145 | 3) | .000 | 4) | .000 |
| R | .950 | ANG | -8.000 | 1) | .000 | 2) | -.087 | 3) | .000 | 4) | .000 |

Conversion Coefficient $\gamma_a$ Associated With Direction of Rotation at Middle Position (85.0 mm) in Sixth Embodiment

| | | | | | | | | | | | |
|---|---|---|---|---|---|---|---|---|---|---|---|
| R | .000 | ANG | .000 | 1) | .000 | 2) | -1.912 | 3) | .000 | 4) | .000 |
| R | 10.000 | ANG | -.395 | 1) | .000 | 2) | -1.741 | 3) | .000 | 4) | .000 |
| R | 5.000 | ANG | -.827 | 1) | .000 | 2) | -1.577 | 3) | .000 | 4) | .000 |
| R | 3.000 | ANG | -1.470 | 1) | .000 | 2) | -1.378 | 3) | .000 | 4) | .000 |
| R | 2.000 | ANG | -2.411 | 1) | .000 | 2) | -1.131 | 3) | .000 | 4) | .000 |

TABLE 67-continued

| | | | | | | | | | | |
|---|---|---|---|---|---|---|---|---|---|---|
| R | 1.500 | ANG | -3.579 | 1) | .000 | 2) | -.882 | 3) | .000 | 4) .000 |
| R | 1.200 | ANG | -5.105 | 1) | .000 | 2) | -.663 | 3) | .000 | 4) .000 |
| R | .950 | ANG | -8.000 | 1) | .000 | 2) | -.405 | 3) | .000 | 4) .000 |

Condition Corresponding Values: $\gamma_{xR}/\gamma_{x0} = 1.11$, $\gamma_{aR}/\gamma_{a0} = 0.21$

TABLE 68

Amount DX (mm) of Movement for Focusing in Direction of Optical Axis at Telephoto End (194.0 mm) in Sixth Embodiment

| | | | | | | | | | | |
|---|---|---|---|---|---|---|---|---|---|---|
| R | .000 | ANG | .000 | 1) | .000 | 2) | .000 | 3) | .000 | 4) .000 |
| R | 10.000 | ANG | -.387 | 1) | .000 | 2) | .975 | 3) | .000 | 4) .000 |
| R | 5.000 | ANG | -.836 | 1) | .000 | 2) | 1.708 | 3) | .000 | 4) .000 |
| R | 3.000 | ANG | -1.484 | 1) | .000 | 2) | 2.494 | 3) | .000 | 4) .000 |
| R | 2.000 | ANG | -2.434 | 1) | .000 | 2) | 3.300 | 3) | .000 | 4) .000 |
| R | 1.500 | ANG | -3.605 | 1) | .000 | 2) | 3.983 | 3) | .000 | 4) .000 |
| R | 1.200 | ANG | -5.101 | 1) | .000 | 2) | 4.586 | 3) | .000 | 4) .000 |
| R | .950 | ANG | -8.000 | 1) | .000 | 2) | 5.291 | 3) | .000 | 4) .000 |

Imaging Magnification $\beta_K$ of Lens Units at Telephoto End (194.0 mm) in Sixth Embodiment

| | | | | | | | | | | |
|---|---|---|---|---|---|---|---|---|---|---|
| R | .000 | ANG | .000 | 1) | .000 | 2) | -.795 | 3) | 4.203 | 4) -.700 |
| R | 10.000 | ANG | -.387 | 1) | -.009 | 2) | -.730 | 3) | 4.203 | 4) -.700 |
| R | 5.000 | ANG | -.836 | 1) | -.017 | 2) | -.681 | 3) | 4.203 | 4) -.700 |
| R | 3.000 | ANG | -1.484 | 1) | -.030 | 2) | -.628 | 3) | 4.203 | 4) -.700 |
| R | 2.000 | ANG | -2.434 | 1) | -.047 | 2) | -.575 | 3) | 4.203 | 4) -.700 |
| R | 1.500 | ANG | -3.605 | 1) | -.066 | 2) | -.529 | 3) | 4.203 | 4) -.700 |
| R | 1.200 | ANG | -5.101 | 1) | -.087 | 2) | -.489 | 3) | 4.203 | 4) -.700 |
| R | .950 | ANG | -8.000 | 1) | -.118 | 2) | -.442 | 3) | 4.203 | 4) -.700 |

Conversion Coefficient $\gamma_x$ Associated With Direction of Optical Axis at Telephoto End (194.0 mm) in Sixth Embodiment

| | | | | | | | | | | |
|---|---|---|---|---|---|---|---|---|---|---|
| R | .000 | ANG | .000 | 1) | .000 | 2) | 3.189 | 3) | .000 | 4) .000 |
| R | 10.000 | ANG | -.387 | 1) | .000 | 2) | 4.046 | 3) | .000 | 4) .000 |
| R | 5.000 | ANG | -.836 | 1) | .000 | 2) | 4.642 | 3) | .000 | 4) .000 |
| R | 3.000 | ANG | -1.484 | 1) | .000 | 2) | 5.236 | 3) | .000 | 4) .000 |
| R | 2.000 | ANG | -2.434 | 1) | .000 | 2) | 5.795 | 3) | .000 | 4) .000 |
| R | 1.500 | ANG | -3.605 | 1) | .000 | 2) | 6.230 | 3) | .000 | 4) .000 |
| R | 1.200 | ANG | -5.101 | 1) | .000 | 2) | 6.584 | 3) | .000 | 4) .000 |
| R | .950 | ANG | -8.000 | 1) | .000 | 2) | 6.963 | 3) | .000 | 4) .000 |

Slope dx/da of Focus Cam at Telephot End (194.0 mm) in Sixth Embodiment

| | | | | | | | | | | |
|---|---|---|---|---|---|---|---|---|---|---|
| R | .000 | ANG | .000 | 1) | .000 | 2) | -3.120 | 3) | .000 | 4) .000 |
| R | 10.000 | ANG | -.387 | 1) | .000 | 2) | -2.002 | 3) | .000 | 4) .000 |
| R | 5.000 | ANG | -.836 | 1) | .000 | 2) | -1.388 | 3) | .000 | 4) .000 |
| R | 3.000 | ANG | -1.484 | 1) | .000 | 2) | -1.044 | 3) | .000 | 4) .000 |
| R | 2.000 | ANG | -2.434 | 1) | .000 | 2) | -.697 | 3) | .000 | 4) .000 |
| R | 1.500 | ANG | -3.605 | 1) | .000 | 2) | -.488 | 3) | .000 | 4) .000 |
| R | 1.200 | ANG | -5.101 | 1) | .000 | 2) | -.332 | 3) | .000 | 4) .000 |
| R | .950 | ANG | -8.000 | 1) | .000 | 2) | -.174 | 3) | .000 | 4) .000 |

Conversion Coefficient $\gamma_a$ Associated With Direction of Rotation at Telephoto End (194.0 mm) in Sixth Embodiment

| | | | | | | | | | | |
|---|---|---|---|---|---|---|---|---|---|---|
| R | .000 | ANG | .000 | 1) | .000 | 2) | -9.950 | 3) | .000 | 4) .000 |
| R | 10.000 | ANG | -.387 | 1) | .000 | 2) | -8.098 | 3) | .000 | 4) .000 |
| R | 5.000 | ANG | -.836 | 1) | .000 | 2) | -6.441 | 3) | .000 | 4) .000 |
| R | 3.000 | ANG | -1.484 | 1) | .000 | 2) | -5.466 | 3) | .000 | 4) .000 |
| R | 2.000 | ANG | -2.434 | 1) | .000 | 2) | -4.041 | 3) | .000 | 4) .000 |
| R | 1.500 | ANG | -3.605 | 1) | .000 | 2) | -3.041 | 3) | .000 | 4) .000 |
| R | 1.200 | ANG | -5.101 | 1) | .000 | 2) | -2.187 | 3) | .000 | 4) .000 |
| R | .950 | ANG | -8.000 | 1) | .000 | 2) | -1.208 | 3) | .000 | 4) .000 |

Condition Corresponding Values: $\gamma_{xR}/\gamma_{x0} = 2.18$, $\gamma_{aR}/\gamma_{a0} = 0.12$ As can be seen from Tables 66, 67, and 68, at each focal length, the conversion coefficient $\gamma_x$ associated with the direction of the optical axis increases but the value of the slope (dx/da) of the focus cam decreases as the photographing distance becomes closer to the closest distance. Therefore, as can be seen from these tables, the value of the conversion coefficient $\gamma_a$ associated with the direction of rotation, which is defined as the product of the conversion coefficient $\gamma_x$ and the slope (dx/da) of the focus cam, decreases as the photographing distance becomes closer to the closest distance by the influence of the slope (dx/da) of the focus cam, contrary to the case in which the rotation amount ratio ($a_F/a_Z$) is set to be 1.0, as in the embodiment of Japanese Patent Application Laid-Open No. 5-142475.

From Tables 66, 67, and 68, the rate of change, from the infinity in-focus position to the closest in-focus position, of the conversion coefficient $\gamma_a$ associated with the direction of rotation is ×0.26 at the wide-angle end (F=24.7), ×0.21 at the middle position (F=85.0), and ×0.12 at the telephoto end (F=194.0). When the number N of divisions of the focus range upon a change in conversion coefficient $\gamma_a$ in the second embodiment is calculated using formula (a), and is compared with that in the case in which the rotation amount ratio ($a_F/a_Z$) is set to be 1.0, as in the embodiment of Japanese Patent Application Laid-Open No. 5-142475, the numbers $N_W$, $N_M$, and $N_T$ of divisions at the wide-angle end, middle position, and telephoto end respectively have the following values:

When the rotation amount ratio ($a_F/a_Z$) is set to be 1.0

$$N_W > 16.1 N_M > 15.8 N_T > 13.7$$

Sixth Embodiment $$N_W > 7.3 N_M > 8.5 N_T > 11.6$$

Therefore, it can be seen that the numbers of divisions become small, compared to those in the case in which the rotation amount ratio ($a_F/a_Z$) is set to be 1.0, as in the embodiment of Japanese Patent Application Laid-Open No. 5-142475.

As described above, in the sixth embodiment as well, since the rate of change of the conversion coefficient $\gamma_a$ associated with the direction of rotation is smaller than that in the case in which the rotation amount ratio ($a_F/a_Z$) is set to be 1.0, as in the embodiment of Japanese Patent Application Laid-Open No. 5-142475, the number of data of the conversion coefficient $\gamma_a$ and the correction coefficient $\mu$ can be reduced, and the storage capacity can be suppressed.

Tables 69, 70, and 71 summarize the calculation results of the conversion coefficient $K_a$ and the correction coefficient $\mu$ at the wide-angle end (F=24.7), middle position (F=85.0), and telephoto end (F=194.0) according to the sixth embodiment. The arrangements of the tables and reference symbols are the same as those in the fifth embodiment. The position of the focusing lens in the first pair in the upper two tables in each of Tables 69, 70, and 71, i.e., in the third and fourth columns is (R, ANGLE)=(0.0, 0.0), and it indicates that this position corresponds to the infinity corresponding position. Similarly, the position of the focusing lens in the fourth pair in the lower two tables in each of Tables 69, 70, and 71, i.e., in the ninth and tenth columns is (R, ANGLE)=(0.95, −8.0), and it indicates that this position corresponds to the closest in-focus (R=0.95 m) corresponding position.

TABLE 69

Conversion Coefficients $K_a$: (rs), $\gamma_a$: (r) Associated with Direction of Rotation and Correction Coefficient $\mu$: (l) at Wide-angle End (24.7 mm) in Sixth Embodiment
F = 24.7 mm

| (R, ANGLE) = | .000 | .000 | 10.000 | −.399 | 5.000 | −.836 | 3.000 | −1.484 |
|---|---|---|---|---|---|---|---|---|
| POS  R | r | rs | r | rs | r | rs | r | rs |
| 1  .000 | −.160 | .000 |  | −.153 |  | −.147 |  | −.139 |
| 2  10.000 |  | −.154 | −.148 | .000 |  | −.142 |  | −.134 |
| 3  5.000 |  | −.148 |  | −.143 | −.137 | .000 |  | −.129 |
| 4  3.000 |  | −.141 |  | −.135 |  | −.130 | −.122 | .000 |
| 5  2.000 |  | −.131 |  | −.126 |  | −.120 |  | −.113 |
| 6  1.500 |  | −.120 |  | −.115 |  | −.110 |  | −.103 |
| 7  1.200 |  | −.107 |  | −.103 |  | −.098 |  | −.092 |
| 8  .950 |  | −.088 |  | −.084 |  | −.080 |  | −.075 |

| POS  R | bf | l | bf | l | bf | l | bf | l |
|---|---|---|---|---|---|---|---|---|
| 1  .000 | .00 | .00 | −.06 | 1.65 | −.12 | 1.66 | −.21 | 1.56 |
| 2  10.000 | .06 | 1.70 | .00 | .00 | −.06 | 1.71 | −.15 | 1.56 |
| 3  5.000 | .12 | 1.73 | .06 | 1.73 | .00 | .00 | −.08 | 1.53 |
| 4  3.000 | .21 | 1.77 | .15 | 1.76 | .08 | 1.71 | .00 | .00 |
| 5  2.000 | .32 | 1.76 | .26 | 1.71 | .19 | 1.61 | .11 | 1.42 |
| 6  1.500 | .43 | 1.71 | .37 | 1.65 | .30 | 1.54 | .22 | 1.37 |
| 7  1.200 | .55 | 1.67 | .48 | 1.59 | .42 | 1.49 | .33 | 1.33 |
| 8  .950 | .71 | 1.58 | .64 | 1.49 | .58 | 1.40 | .49 | 1.26 |

| (R, ANGLE) = | 2.000 | −2.434 | 1.500 | −3.605 | 1.200 | −5.101 | .950 | −8.000 |
|---|---|---|---|---|---|---|---|---|
| POS  R | r | rs | r | rs | r | rs | r | rs |
| 1  .000 |  | −.127 |  | −.115 |  | −.103 |  | −.083 |
| 2  10.000 |  | −.123 |  | −.111 |  | −.099 |  | −.080 |
| 3  5.000 |  | −.119 |  | −.107 |  | −.095 |  | −.077 |
| 4  3.000 |  | −.112 |  | −.101 |  | −.089 |  | −.072 |
| 5  2.000 | −.103 | .000 |  | −.093 |  | −.082 |  | −.066 |
| 6  1.500 |  | −.094 | −.084 | .000 |  | −.074 |  | −.059 |
| 7  1.200 |  | −.084 |  | −.075 | −.065 | .000 |  | −.052 |
| 8  .950 |  | −.068 |  | −.060 |  | −.052 | −.042 | .000 |

| POS  R | bf | l | bf | l | bf | l | bf | l |
|---|---|---|---|---|---|---|---|---|
| 1  .000 | −.31 | 1.32 | −.42 | 1.13 | −.52 | .92 | −.67 | .68 |
| 2  10.000 | −.25 | 1.31 | −.36 | 1.12 | −.46 | .91 | −.61 | .67 |
| 3  5.000 | −.19 | 1.28 | −.30 | 1.10 | −.40 | .89 | −.55 | .67 |
| 4  3.000 | −.11 | 1.24 | −.21 | 1.08 | −.32 | .88 | −.47 | .66 |
| 5  2.000 | .00 | .00 | −.11 | 1.07 | −.22 | .86 | −.37 | .65 |
| 6  1.500 | .11 | 1.19 | .00 | .00 | −.11 | .82 | −.26 | .65 |
| 7  1.200 | .22 | 1.17 | .11 | 1.00 | .00 | .00 | −.15 | .66 |
| 8  .950 | .38 | 1.10 | .26 | .93 | .15 | .76 | .00 | .00 |

Condition Corresponding Values: $K_{aO}/\gamma_{aO} = 0.55$, $K_{aR}/\gamma_{aR} = 1.98$

TABLE 70

Conversion Coefficients $K_a$: (rs), $\gamma_a$: (r) Associated with Direction of Rotation and Correction Coefficient μ: (l) at Middle Position (85.0 mm) in Sixth Embodiment
F = 85.0 mm

| (R, ANGLE) = | .000 | .000 | 10.000 | -.395 | 5.000 | -.827 | 3.000 | -1.470 |
|---|---|---|---|---|---|---|---|---|
| POS | R | r | rs | r | rs | r | rs | r | rs |
| 1 | .000 | -1.912 | .000 | | -1.795 | | -1.681 | | -1.538 |
| 2 | 10.000 | | -1.856 | -1.741 | .000 | | -1.630 | | -1.491 |
| 3 | 5.000 | | -1.796 | | -1.684 | -1.576 | .000 | | -1.443 |
| 4 | 3.000 | | -1.715 | | -1.608 | | -1.506 | -1.378 | .000 |
| 5 | 2.000 | | -1.607 | | -1.505 | | -1.409 | | -1.285 |
| 6 | 1.500 | | -1.478 | | -1.383 | | -1.291 | | -1.173 |
| 7 | 1.200 | | -1.329 | | -1.240 | | -1.156 | | -1.046 |
| 8 | .950 | | -1.108 | | -1.032 | | -.959 | | -.865 |

| POS | R | bf | l | bf | l | bf | l | bf | l |
|---|---|---|---|---|---|---|---|---|---|
| 1 | .000 | .00 | .00 | -.71 | 22.83 | -1.39 | 20.87 | -2.26 | 19.58 |
| 2 | 10.000 | .73 | 24.85 | .00 | .00 | -.70 | 20.65 | -1.60 | 19.71 |
| 3 | 5.000 | 1.48 | 24.54 | .73 | 22.39 | .00 | .00 | -.93 | 19.97 |
| 4 | 3.000 | 2.52 | 24.47 | 1.73 | 22.64 | .97 | 21.68 | .00 | .00 |
| 5 | 2.000 | 3.87 | 24.25 | 3.04 | 22.45 | 2.23 | 21.01 | 1.21 | 17.89 |
| 6 | 1.500 | 5.29 | 23.33 | 4.40 | 21.43 | 3.56 | 19.68 | 2.48 | 16.64 |
| 7 | 1.200 | 6.78 | 22.22 | 5.84 | 20.32 | 4.94 | 18.53 | 3.80 | 15.78 |
| 8 | .950 | 8.86 | 21.06 | 7.85 | 19.27 | 6.88 | 17.56 | 5.65 | 15.19 |

| (R, ANGLE) = | 2.000 | -2.411 | 1.500 | -3.579 | 1.200 | -5.105 | .950 | -8.000 |
|---|---|---|---|---|---|---|---|---|
| POS | R | r | rs | r | rs | r | rs | r | rs |
| 1 | .000 | | -1.366 | | -1.194 | | -1.020 | | -.796 |
| 2 | 10.000 | | -1.324 | | -1.155 | | -.985 | | -.767 |
| 3 | 5.000 | | -1.280 | | -1.115 | | -.948 | | -.737 |
| 4 | 3.000 | | -1.220 | | -1.058 | | -.897 | | -.695 |
| 5 | 2.000 | -1.131 | .000 | | -.976 | | -.824 | | -.637 |
| 6 | 1.500 | | -1.027 | -.882 | .000 | | -.744 | | -.575 |
| 7 | 1.200 | | -.913 | | -.783 | -.663 | .000 | | -.510 |
| 8 | .950 | | -.753 | | -.645 | | -.545 | -.405 | .000 |

| POS | R | bf | l | bf | l | bf | l | bf | l |
|---|---|---|---|---|---|---|---|---|---|
| 1 | .000 | -3.29 | 15.85 | -4.27 | 12.08 | -5.21 | 9.68 | -6.37 | 6.59 |
| 2 | 10.000 | -2.67 | 15.66 | -3.68 | 11.88 | -4.64 | 9.56 | -5.84 | 6.52 |
| 3 | 5.000 | -2.03 | 15.38 | -3.07 | 11.62 | -4.06 | 9.43 | -5.29 | 6.45 |
| 4 | 3.000 | -1.15 | 14.71 | -2.23 | 11.20 | -3.26 | 9.26 | -4.54 | 6.34 |
| 5 | 2.000 | .00 | .00 | -1.14 | 10.72 | -2.22 | 9.14 | -3.56 | 6.21 |
| 6 | 1.500 | 1.20 | 13.05 | .00 | .00 | -1.14 | 9.27 | -2.54 | 6.05 |
| 7 | 1.200 | 2.46 | 12.71 | 1.19 | 10.61 | .00 | .00 | -1.48 | 5.68 |
| 8 | .950 | 4.21 | 12.58 | 2.85 | 10.64 | 1.58 | 8.81 | .00 | .00 |

Condition Corresponding Values: $K_{aO}/\gamma_{aO}$ = 0.58, $K_{aR}/\gamma_{aR}$ = 1.97

TABLE 71

Conversion Coefficients $K_a$: (rs), $\gamma_a$: (r) Associated with Direction of Rotation and Correction Coefficient μ: (l) at Telephoto End (194.0 mm) in Sixth Embodiment
F = 194.0 mm

| (R, ANGLE) = | .000 | .000 | 10.000 | -.387 | 5.000 | -.836 | 3.000 | -.484 |
|---|---|---|---|---|---|---|---|---|
| POS | R | r | rs | r | rs | r | rs | r | rs |
| 1 | .000 | -9.949 | .000 | | -8.337 | | -6.891 | | -5.730 |
| 2 | 10.000 | | -10.079 | -8.097 | .000 | | -6.609 | | -5.571 |
| 3 | 5.000 | | -9.704 | | -7.682 | -6.441 | .000 | | -5.534 |
| 4 | 3.000 | | -9.609 | | -7.677 | | -6.548 | -5.466 | .000 |
| 5 | 2.000 | | -9.436 | | -7.493 | | -6.308 | | -5.140 |
| 6 | 1.500 | | -9.170 | | -7.203 | | -5.997 | | -4.844 |
| 7 | 1.200 | | -8.799 | | -6.817 | | -5.614 | | -4.493 |
| 8 | .950 | | -7.993 | | -6.050 | | -4.901 | | -3.865 |

| POS | R | bf | l | bf | l | bf | l | bf | l |
|---|---|---|---|---|---|---|---|---|---|
| 1 | .000 | .00 | .00 | -3.23 | 108.94 | -5.76 | 82.57 | -8.51 | 175.82 |
| 2 | 10.000 | 3.90 | -300.11 | .00 | .00 | -2.97 | 114.03 | -6.11 | 316.75 |
| 3 | 5.000 | 8.11 | 328.89 | 3.45 | 67.21 | .00 | .00 | -3.59 | 290.18 |
| 4 | 3.000 | 14.26 | 417.01 | 8.42 | 162.09 | 4.24 | -256.10 | .00 | .00 |
| 5 | 2.000 | 22.97 | 445.08 | 15.34 | 205.66 | 10.08 | 488.95 | 4.88 | 81.86 |

TABLE 71-continued

Conversion Coefficients $K_a$: (rs), $\gamma_a$: (r) Associated with Direction of Rotation and Correction Coefficient μ: (l) at Telephoto End (194.0 mm) in Sixth Embodiment
F = 194.0 mm

| 6 | 1.500 | 33.05 | 422.06 | 23.17 | 209.83 | 16.60 | 240.82 | 10.27 | 90.19 |
|---|---|---|---|---|---|---|---|---|---|
| 7 | 1.200 | 44.88 | 388.16 | 32.13 | 203.11 | 23.94 | 186.33 | 16.25 | 91.23 |
| 8 | .950 | 63.94 | 325.16 | 46.05 | 182.14 | 35.11 | 146.87 | 25.18 | 85.98 |

| (R, ANGLE) = | | 2.000 | −2.434 | 1.500 | −3.605 | 1.200 | −5.101 | .950 | −8.000 |
|---|---|---|---|---|---|---|---|---|---|
| POS | R | r | rs | r | rs | r | rs | r | rs |
| 1 | .000 | | −4.642 | | −3.779 | | −3.063 | | −2.237 |
| 2 | 10.000 | | −4.521 | | −3.678 | | −2.977 | | −2.168 |
| 3 | 5.000 | | −4.449 | | −3.599 | | −2.901 | | −2.102 |
| 4 | 3.000 | | −4.299 | | −3.461 | | −2.778 | | −2.002 |
| 5 | 2.000 | −4.041 | .000 | | −3.260 | | −2.606 | | −1.862 |
| 6 | 1.500 | | −3.809 | −3.041 | .000 | | −2.412 | | −1.705 |
| 7 | 1.200 | | −3.505 | | −2.773 | −2.187 | .000 | | −1.523 |
| 8 | .950 | | −2.973 | | −2.319 | | −1.799 | −1.209 | .000 |

| POS | R | bf | l | bf | l | bf | l | bf | l |
|---|---|---|---|---|---|---|---|---|---|
| 1 | .000 | −11.30 | 76.03 | −13.62 | 56.13 | −15.62 | 39.02 | −17.90 | 21.03 |
| 2 | 10.000 | −9.25 | 77.85 | −11.83 | 56.48 | −14.03 | 38.86 | −16.51 | 20.79 |
| 3 | 5.000 | −7.11 | 70.37 | −9.96 | 54.30 | −12.37 | 37.91 | −15.06 | 20.37 |
| 4 | 3.000 | −4.08 | 63.91 | −7.34 | 53.20 | −10.05 | 37.18 | −13.04 | 19.88 |
| 5 | 2.000 | .00 | .00 | −3.82 | 52.99 | −6.95 | 36.33 | −10.36 | 19.17 |
| 6 | 1.500 | 4.46 | 77.72 | .00 | .00 | −3.61 | 35.12 | −7.50 | 18.24 |
| 7 | 1.200 | 9.35 | 70.51 | 4.15 | 47.13 | .00 | .00 | *4.42 | 16.98 |
| 8 | .950 | 16.54 | 62.58 | 10.19 | 42.94 | 5.21 | 29.35 | .00 | .00 |

Condition Corresponding Values: $K_{a0}/\gamma_{a0} = 0.80$, $K_{aR}/\gamma_{aR} = 1.85$ The calculation results of the rate of change of $K_a$ with respect to $\gamma_a$ the infinity in-focus arrangement and the closest in-focus arrangement at the wide-angle end, middle position, and telephoto end in the case in which the rotation amount ratio ($a_F/a_Z$) is set to be 1.0, as in the embodiment of Japanese Patent Application Laid-Open No. 5-142475 and in the sixth embodiment of the present invention in which said ratio ($a_F/a_Z$) is set to be −0.80 are as follows.

| When the rotation amount ratio ($a_F/a_Z$) is set to be 1.0 | | |
|---|---|---|
| | Infinity Arrangement $K_{a0}/\gamma_{a0}$ | Closest Arrangement $K_{aR}/\gamma_{aR}$ |
| Wide-angle End (F = 24.7) | 6.14 | 0.31 |
| Middle Position (F = 85.0) | 7.63 | 0.31 |
| Telephoto End (F = 194.0) | 12.40 | 0.29 |
| Sixth Embodiment | | |
| Wide-angle End (F = 24.7) | 0.55 | 1.98 |
| Middle Position (F = 85.0) | 0.58 | 1.97 |
| Telephoto End (F = 194.0) | 0.80 | 1.85 |

As described above, in the sixth embodiment as well, since the rate of change of $K_a$ with respect to $\gamma_a$ is small as compared to the conventional system, the contribution of the correction term ($\Delta Bf/\mu$) in $K_a = \gamma_a(1-\Delta Bf/\mu)$ can be reduced. For this reason, an error of the conversion coefficient $K_a$ calculated based on $\gamma_a$ and μ or an error from the actual lens driving amount Δa obtained when only one pair of a conversion coefficient $\gamma_a$ value and a correction coefficient μ value are set can be reduced.

Next, in the case in which the rotation amount ratio ($a_F/a_Z$) is set to be 1.0, as in the embodiment of Japanese Patent Application Laid-Open No. 5-142475 and the sixth embodiment of the present invention in which said ratio ($a_F/a_Z$) is set to be −0.80, when the lens driving amounts upon focusing from the infinity in-focus lens arrangement to the closest distance object and upon focusing from the closest in-focus lens arrangement to the infinity object at the wide-angle end, middle position, and telephoto end are calculated from $\Delta a=\Delta Bf/[\gamma_a(1-\Delta Bf/\mu)]$, and errors from the actual lens driving amounts are then calculated, the following values are obtained. Note that the value of the correction coefficient μ upon focusing from the infinity in-focus lens arrangement to the closest distance object adopts a value at the object distance (POS-5), and the value of the correction coefficient μ upon focusing from the closest in-focus lens arrangement to the infinity object adopts a value at the object distance (POS-4).

| When the rotation amount ratio ($a_F/a_Z$) is set to be 1.0 | | |
|---|---|---|
| | Infinity Arrangement → Closest In-focus State | Closest Arrangement → Infinity In-focus State |
| Wide-angle End (F = 24.7) | −11.4% | −29.7% |
| Middle Position (F = 85.0) | −12.3% | −34.8% |
| Telephoto End (F = 194.0) | −15.1% | −32.9% |
| Sixth Embodiment | | |
| Wide-angle End (F = 24.7) | −7.8% | −1.5% |
| Middle Position (F = 85.0) | −8.7% | −2.0% |
| Telephoto End (F = 194.0) | −6.2% | −2.6% |

As described above, in the sixth embodiment as well, even when only a pair of a conversion coefficient $\gamma_a$ value and a correction coefficient μ value are set for a given lens arrangement range, an error between the conversion coefficient $K_a$ calculated from $\gamma_a$ and $\mu$ and the lens driving amount $\Delta a$ for focusing becomes small as compared to the conventional system, and focusing can be realized with higher accuracy.

Table 72 summarizes the amount (ANGLE DA) of rotation for focusing upon manual focusing using the focus cam (the middle table in Table 64) of the sixth embodiment, the amount DX (mm) of movement, in the direction of the optical axis, of the focusing lens unit corresponding to the amount of rotation for focusing, and the displacement amount Bf (mm) of the imaging point when the amount (DX) of movement in the direction of the optical axis is given.

Note that the arrangement of the table and reference symbols are the same as those in the fifth embodiment. The upper table in Table 72 summarizes the displacement amount (Bf) of the imaging point corresponding to the photographing distances (R=5.0, 3.0, 2.0, 1.5, 1.2, and 0.95 m) in the respective zooming states of the focal lengths (F=24.7, 35.0, 50.0, 85.0, 135.0, and 194.0 mm), and the middle table summarizes the values of the amount (ANGLE DA) of rotation for focusing required for attaining an optimal in-focus state with respect to the respective photographing distances. The lower table summarizes the amounts (DX) of movement, in the direction of the optical axis, of the respective lens units corresponding to the amount (ANGLE DA) of rotation for focusing in association with the focal lengths and photographing distances.

TABLE 72

Displacement Amount Bf (mm) of Imaging Point and Amount DX (mm) of movement for focusing in Sixth Embodiment

|   |          | 0.95 m | 1.20 m | 1.50 m | 2.00 m | 3.00 m | 5.00 m |
|---|----------|--------|--------|--------|--------|--------|--------|
| F | 24.700 Bf | .000 | .000 | .000 | .000 | .000 | .000 |
| F | 35.000 Bf | .000 | .000 | .000 | .002 | .002 | .003 |
| F | 50.000 Bf | .000 | .003 | .007 | .012 | .005 | .000 |
| F | 85.000 Bf | .000 | .003 | −.022 | −.026 | −.020 | −.015 |
| F | 135.000 Bf | .000 | −.049 | −.048 | −.047 | −.053 | −.063 |
| F | 194.000 Bf | .000 | .000 | .000 | .000 | .000 | .000 |

|   | ANGLE DA | −8.000 | −5.101 | −3.605 | −2.434 | −1.484 | −.836 |
|---|----------|--------|--------|--------|--------|--------|-------|

| | | | | | | | |
|---|---|---|---|---|---|---|---|
| F | 24.700 DX | .000 | .519 | .000 | .000 | R | 0.95 m |
| F | 35.000 DX | .000 | .670 | .000 | .000 | R | 0.95 m |
| F | 50.000 DX | .000 | .945 | .000 | .000 | R | 0.95 m |
| F | 85.000 DX | .000 | 1.667 | .000 | .000 | R | 0.85 m |
| F | 135.000 DX | .000 | 3.128 | .000 | .000 | R | 0.95 m |
| F | 194.000 DX | .000 | 5.291 | .000 | .000 | R | 0.95 m |
| F | 24.700 DX | .000 | .406 | .000 | .000 | R | 1.20 m |
| F | 35.000 DX | .000 | .526 | .000 | .000 | R | 1.20 m |
| F | 50.000 DX | .000 | .744 | .000 | .000 | R | 1.20 m |
| F | 85.000 DX | .000 | 1.337 | .000 | .000 | R | 1.20 m |
| F | 135.000 DX | .000 | 2.604 | .000 | .000 | R | 1.20 m |
| F | 194.000 DX | .000 | 4.586 | .000 | .000 | R | 1.20 m |
| F | 24.700 DX | .000 | .322 | .000 | .000 | R | 1.50 m |
| F | 35.000 DX | .000 | .418 | .000 | .000 | R | 1.50 m |
| F | 50.000 DX | .000 | .593 | .000 | .000 | R | 1.50 m |
| F | 85.000 DX | .000 | 1.087 | .000 | .000 | R | 1.50 m |
| F | 135.000 DX | .000 | 2.170 | .000 | .000 | R | 1.50 m |
| F | 194.000 DX | .000 | 3.983 | .000 | .000 | R | 1.50 m |
| F | 24.700 DX | .000 | .239 | .000 | .000 | R | 2.00 m |
| F | 35.000 DX | .000 | .310 | .000 | .000 | R | 2.00 m |
| F | 50.000 DX | .000 | .441 | .000 | .000 | R | 2.00 m |
| F | 85.000 DX | .000 | .828 | .000 | .000 | R | 2.00 m |
| F | 135.000 DX | .000 | 1.705 | .000 | .000 | R | 2.00 m |
| F | 194.000 DX | .000 | 3.300 | .000 | .000 | R | 2.00 m |
| F | 24.700 DX | .000 | .158 | .000 | .000 | R | 3.00 m |
| F | 35.000 DX | .000 | .205 | .000 | .000 | R | 3.00 m |
| F | 50.000 DX | .000 | .295 | .000 | .000 | R | 3.00 m |
| F | 85.000 DX | .000 | .559 | .000 | .000 | R | 3.00 m |
| F | 135.000 DX | .000 | 1.202 | .000 | .000 | R | 3.00 m |
| F | 194.000 DX | .000 | 2.494 | .000 | .000 | R | 3.00 m |
| F | 24.700 DX | .000 | .094 | .000 | .000 | R | 5.00 m |
| F | 35.000 DX | .000 | .121 | .000 | .000 | R | 5.00 m |
| F | 50.000 DX | .000 | .178 | .000 | .000 | R | 5.00 m |
| F | 85.000 DX | .000 | .340 | .000 | .000 | R | 5.00 m |
| F | 135.000 DX | .000 | .762 | .000 | .000 | R | 5.00 m |
| F | 194.000 DX | .000 | 1.708 | .000 | .000 | R | 5.00 m |

As can be seen from Table 72, in the zoom lens of the sixth embodiment, so-called manual focusing can be attained since the displacement amounts of the imaging point at the respective focal lengths and photographing distances are very small, and fall within the depth of focus independently of the zooming state and photographing distance.

As described above, in the embodiments, the present invention can be applied to zoom lens systems based on various lens unit arrangements or focusing lens units.

As described above, according to the present invention, in an inner focusing type zoom lens which is attached to, e.g., an auto-focusing camera which has focus detection means, storage means, calculation means, and the like, the number of data of specific coefficients (e.g., the conversion coefficient $\gamma_a$ and the correction coefficient μ) required for autofocusing can be reduced as compared to the conventional system, without making the barrel mechanism larger. Furthermore, an error upon calculation of the lens driving amount of the focusing lens unit using the stored specific coefficients in correspondence with the detected defocus amount can be reduced as compared to the conventional system.

In other words, when the arrangement of the present invention is adopted, since the rate of change of the conversion coefficient $\gamma_a$ is reduced as compared to the conventional system, the number of data of the conversion coefficient $\gamma_a$, the correction coefficient μ, and the like which are stored for calculating the lens driving amount for focusing can be reduced, and a cost reduction can be realized in terms of the storage capacity.

Furthermore, since the change in conversion coefficient $K_a$ to the conversion coefficient $\gamma_a$ becomes small, the contribution of the correction term ($\Delta Bf/\mu$) in $K_a = \gamma_a(1-\Delta Bf/\mu)$ can be reduced.

Therefore, an error of the conversion coefficient $K_a$ calculated based on $\gamma_a$ and μ or an error from the actual lens driving amount $\Delta a$ obtained when only one pair of a conversion coefficient $\gamma_a$ value and a correction coefficient μ value are set for a certain lens arrangement range can be reduced.

In the present invention, the conversion coefficient $\gamma_a$ at an in-focus point and the conversion coefficient μ which is defined by formula $K_a=\gamma_a(1-\Delta Bf/\mu)$ are set to be specific coefficients. Alternatively, a correction coefficient defined by a formula different from the above-mentioned formula may be set. Furthermore, the conversion coefficient $\gamma_a$ need not always be set in correspondence with the sensitivity (dBf/da) associated with the direction of rotation at an in-focus point. As long as focusing accuracy can be improved, the sensitivity at a point other than the in-focus point and the corresponding correction coefficient may be set to be specific coefficients.

Note that the present invention can be applied to various other zoom lens systems based on lens unit arrangements or focusing lens units other than those in the above-mentioned embodiments, as a matter of course.

What is claimed is:

1. A zoom lens system in which a movement locus of a focusing lens unit is defined by synthesizing a focus cam and a zoom compensation cam so as to achieve an in-focus state by a substantially constant amount of rotation for an identical object distance independently of a zooming state upon expression of a predetermined movement locus for zooming by an amount of movement, in a direction of an optical axis, of lens units, and an angle of rotation of a rotatable lens barrel, said zoom lens satisfying the following conditional formulas at least at the telephoto end:

$$1.00 < \gamma_{xR}/\gamma_{xO}$$

$$4.50 < \Delta X_{TR}/\Delta X_{WR} < 10.00$$

$$-1.00 < a_F/a_Z < -0.60$$

where $\gamma_{xO}$: the ratio (dBf/dx) of an amount dBf of infinitesimal movement of an imaging plane to an amount dx of infinitesimal movement, in the direction of the optical axis, of said focusing lens unit at an infinity in-focus point $\gamma_{xR}$: the ratio (dBf/dx) of an amount dBf of infinitesimal movement of an imaging plane to an amount dx of infinitesimal movement, in the direction of the optical axis, of said focusing lens unit at a closest in-focus point $\Delta x_{WR}$: an amount of movement, in the direction of the optical axis, of said focusing lens unit required for focusing from an infinity position to a closest distance position at a wide-angle end $\Delta x_{TR}$: an amount of movement, in the direction of the optical axis, of said focusing lens unit required for focusing from an infinity position to a closest distance position at a telephoto end $a_Z$: an amount of rotation of said focusing lens unit on said focus cam corresponding to zooming from the wide-angle end to the telephoto end $a_F$: an amount of rotation corresponding to focusing from an infinity in-focus state to a closest in-focus state.

2. A zoom lens system according to claim 1, wherein said zoom lens satisfies the following conditional formula at least at the wide-angle end and the telephoto end:

$$0.13 < \gamma_{aR}/\gamma_{aO} < 0.80$$

where $\gamma_{aO}$: the ratio (dBf/da) of the amount dBf of infinitesimal movement of the imaging plane to an amount da of infinitesimal movement, in a direction of rotation, of said focusing lens unit on said focus cam at the infinity in-focus point $\gamma_{aR}$: the ratio (dBf/da) of the amount dBf of infinitesimal movement of the imaging plane to an amount da of infinitesimal movement, in a direction of rotation, of said focusing lens unit on said focus cam at the closest in-focus point.

3. A zoom lens system according to claim 2, wherein said zoom lens satisfies the following conditional formulas at least at the wide-angle end and the telephoto end:

$$0.50 < K_{aO}/\gamma_{aO} < 1.30$$

$$0.80 < K_{aR}/\gamma_{aR} < 1.80$$

where $K_{aO}$: the conversion coefficient $K_a$, which are expressed by $K_a=\Delta Bf/\mu a$ and are obtained when said focusing lens unit is located in lens arrangements corresponding to the infinity in-focus state $K_{aR}$: the conversion coefficient $K_a$, which are expressed by $K_a=\Delta Bf/\Delta a$ and are obtained when said focusing lens unit is located in lens arrangements corresponding to the closest in-focus state $\Delta Bf$: a defocus amount between an imaging position of an object at an arbitrary position and a predetermined imaging point position $\Delta a$: an angle of rotation of said focusing lens unit on said focus cam required for attaining an in-focus state on the object.

4. A zoom lens system according to claim 1, wherein said zoom lens satisfies the following conditional formulas at least at the wide-angle end and the telephoto end:

$$0.50 < K_{aO}/\gamma_{aO} < 1.30$$

$$0.80 < K_{aR}/\gamma_{aR} < 1.80$$

where $\gamma_{aO}$: the ratio (dBf/da) of the amount dBf of infinitesimal movement of the imaging plane to an amount da of infinitesimal movement, in a direction of rotation, of said focusing lens unit on said focus cam at the infinity in-focus point $\gamma_{aR}$: the ratio (dBf/da) of the amount dBf of infinitesimal movement of the imaging plane to an amount da of infinitesimal movement, in a direction of rotation, of said focusing lens unit on said focus cam at the closest in-focus point $K_{aO}$: the conversion coefficient $K_a$, which are expressed by $K_a = \Delta Bf/\Delta a$ and are obtained when said focusing lens unit is located in lens arrangements corresponding to the infinity in-focus state $K_{aR}$: the conversion coefficient $K_a$, which are expressed by $K_a = \Delta Bf/\Delta a$ and are obtained when said focusing lens unit is located in lens arrangements corresponding to the closest in-focus state $\Delta Bf$: a defocus amount between an imaging position of an object at an arbitrary position and a predetermined imaging point position $\Delta a$: an angle of rotation of said focusing lens unit on said focus cam required for attaining an in-focus state on the object.

5. A zoom lens system in which a movement locus of a focusing lens unit is defined by synthesizing a focus cam and a zoom compensation cam so as to achieve an in-focus state by a substantially constant amount of rotation for an identical object distance independently of a zooming state upon expression of a predetermined movement locus for zooming by an amount of movement, in a direction of an optical axis, of lens units, and an angle of rotation of a rotatable lens barrel, said zoom lens satisfying the following conditional formulas at least at the telephoto end:

$$1.00 < \gamma_{xR}/\gamma_{xO}$$

$$10.00 < \Delta x_{TR}/\Delta x_{WR} < 30.00$$

$$-1.00 < a_F/a_Z < -0.50$$

where $\gamma_{xO}$: the ratio (dBf/dx) of an amount dBf of infinitesimal movement of an imaging plane to an amount dx of infinitesimal movement, in the direction of the optical axis, of said focusing lens unit at an infinity in-focus point $\gamma_{xR}$: the ratio (dBf/dx) of an amount dBf of infinitesimal movement of an imaging plane to an amount dx of infinitesimal movement, in the direction of the optical axis, of said focusing lens unit at a closest in-focus point $\Delta x_{WR}$: an amount of movement, in the direction of the optical axis, of said focusing lens unit required for focusing from an infinity position to a closest distance position at a wide-angle end $\Delta x_{TR}$: an amount of movement, in the direction of the optical axis, of said focusing lens unit required for focusing from an infinity position to a closest distance position at a telephoto end $a[<i]nfZ$: an amount of rotation of said focusing lens unit on said focus cam corresponding to zooming from the wide-angle end to the telephoto end $a_F$: an amount of rotation corresponding to focusing from an infinity in-focus state to a closest in-focus state.

6. A zoom lens system according to claim 5, wherein said zoom lens satisfies the following conditional formula at least at the wide-angle end and the telephoto end:

$$0.08 < \gamma_{aR}/\gamma_{aO} < 0.70$$

where $\gamma_{aO}$: the ratio (dBf/da) of the amount dBf of infinitesimal movement of the imaging plane to an amount da of infinitesimal movement, in a direction of rotation, of said focusing lens unit on said focus cam at the infinity in-focus point $\gamma_{aR}$: the ratio (dBf/da) of the amount dBf of infinitesimal movement of the imaging plane to an amount da of infinitesimal movement, in a direction of rotation, of said focusing lens unit on said focus cam at the closest in-focus point.

7. A zoom lens system according to claim 6, wherein said zoom lens satisfies the following conditional formulas at least at the wide-angle end and the telephoto end:

$$0.35 < K_{aO}/\gamma_{aO} < 1.00$$

$$1.00 < K_{aR}/\gamma_{aR} < 3.00$$

where $K_{aO}$: the conversion coefficient $K_a$, which are expressed by $K_a = \Delta Bf/\Delta a$ and are obtained when said focusing lens unit is located in lens arrangements corresponding to the infinity in-focus state $K_{aR}$: the conversion coefficient $K_a$, which are expressed by $K_a = \Delta Bf/\Delta a$ and are obtained when said focusing lens unit is located in lens arrangements corresponding to the closest in-focus state $\Delta Bf$: a defocus amount between an imaging position of an object at an arbitrary position and a predetermined imaging point position $\Delta a$: an angle of rotation of said focusing lens unit on said focus cam required for attaining an in-focus state on the object.

8. A zoom lens system according to claim 5, wherein said zoom lens satisfies the following conditional formulas at least at the wide-angle end and the telephoto end:

$$0.35 < K_{aO}/\gamma_{aO} < 1.00$$

$$1.00 < K_{aR}/\gamma_{aR} < 3.00$$

where $\gamma_{aO}$: the ratio (dBf/da) of the amount dBf of infinitesimal movement of the imaging plane to an amount da of infinitesimal movement, in a direction of rotation, of said focusing lens unit on said focus cam at the infinity in-focus point $\gamma_{aR}$: the ratio (dBf/da) of the amount dBf of infinitesimal movement of the imaging plane to an amount da of infinitesimal movement, in a direction of rotation, of said focusing lens unit on said focus cam at the closest in-focus point $K_{aO}$: the conversion coefficient $K_a$, which are expressed by $K_a = \Delta Bf/\Delta a$ and are obtained when said focusing lens unit is located in lens arrangements corresponding to the infinity in-focus state $K_{aR}$: the conversion coefficient $K_a$, which are expressed by $K_a = \Delta Bf/\Delta a$ and are obtained when said focusing lens unit is located in lens arrangements corresponding to the closest in-focus state $\Delta Bf$: a defocus amount between an imaging position of an object at an arbitrary position and a predetermined imaging point position $\Delta a$: an angle of rotation of said focusing lens unit on said focus cam required for attaining an in-focus state on the object.

* * * * *